(12) United States Patent
Qu et al.

(10) Patent No.: US 11,082,269 B2
(45) Date of Patent: Aug. 3, 2021

(54) SIGNAL PROCESSING METHOD, SIGNAL PROCESSING APPARATUS, COMPUTER READABLE STORAGE MEDIUM, AND COMPUTER PROGRAM PRODUCT

(71) Applicant: HUAWEI TECHNOLOGIES CO., LTD., Guangdong (CN)

(72) Inventors: Bingyu Qu, Beijing (CN); Hao Sun, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/689,954

(22) Filed: Nov. 20, 2019

(65) Prior Publication Data
US 2020/0092149 A1  Mar. 19, 2020

Related U.S. Application Data

(63) Continuation of application No. PCT/CN2018/116061, filed on Nov. 17, 2018.

(30) Foreign Application Priority Data

Nov. 17, 2017  (CN) .......................... 201711148427.6

(51) Int. Cl.
*H04W 72/12* (2009.01)
*H04L 27/20* (2006.01)
(Continued)

(52) U.S. Cl.
CPC ........ *H04L 27/2053* (2013.01); *H04L 5/0051* (2013.01); *H04L 5/0094* (2013.01); *H04L 27/2607* (2013.01); *H04L 27/2614* (2013.01)

(58) Field of Classification Search
CPC .. H04B 7/0478; H04B 7/0617; H04B 7/0669; H04L 25/03178; H04L 25/03834;
(Continued)

(56) References Cited

U.S. PATENT DOCUMENTS

2015/0280945 A1  10/2015  Tan et al.
2016/0337157 A1*  11/2016  Papasakellariou ..... H04B 3/232
(Continued)

FOREIGN PATENT DOCUMENTS

CN  106464618 A  2/2017
KR  20050018333 A  2/2005

OTHER PUBLICATIONS

Motorola,"Uplink Reference Signal Generation Methods",3GPP RAN WG1 #47bis R1-070152,Sorrento, Italy,Jan. 15-19, 2007,total 8 pages.
(Continued)

*Primary Examiner* — Phuc H Tran
(74) *Attorney, Agent, or Firm* — Womble Bond Dickinson (US) LLP

(57) ABSTRACT

This application provides a sequence-based signal processing method, a signal processing apparatus, a computer readable storage medium, and a computer program product. A sequence meeting a requirement in an environment in which a signal is sent by using a reference signal or a control channel is determined, where the sequence is a sequence $\{f_n\}$ including N elements, $f_n$ is an element in the sequence $\{f_n\}$, and the determined sequence $\{f_n\}$ meets a preset condition; then the N elements in the sequence $\{f_n\}$ are mapped to N subcarriers respectively, to generate a first signal; and the first signal is sent. By using the foregoing determined sequence, weak cross-correlation between sequences can be maintained, and a relatively small PAPR value and a relatively small CM value of the reference signal or the control channel can be maintained, to meet a requirement in a communications application environment in which the signal is sent by using the reference signal or the control channel, particularly when a data signal on which π/2-BPSK
(Continued)

Map a sequence including N elements to N subcarriers, to obtain an N-element frequency domain signal — S301

Convert the N-element frequency domain signal into a time-domain signal, and add a cyclic prefix to the time-domain signal, to generate a first signal — S302

Send the first signal by using a radio frequency — S303 modulation is performed is sent or frequency shaping is performed on the reference signal or the control channel.

20 Claims, 6 Drawing Sheets

(51) Int. Cl.
*H04L 5/00* (2006.01)
*H04L 27/26* (2006.01)

(58) Field of Classification Search
CPC .......... H04L 25/0384; H04L 25/03859; H04L 27/2003; H04L 27/2615; H04L 27/3411; H04L 27/3444; H04L 5/0007; H04L 5/0048; H04J 11/005; H04J 13/10; H04W 72/0413; G01N 2800/245; G01N 33/564; G01N 33/6863
See application file for complete search history.

(56) References Cited

U.S. PATENT DOCUMENTS

| | | | |
|---|---|---|---|
| 2017/0238344 A1* | 8/2017 | McGowan | H04L 5/0007 370/329 |
| 2017/0367084 A1* | 12/2017 | Cheng | H04W 28/04 |
| 2017/0374658 A1* | 12/2017 | Kim | H04W 72/0406 |
| 2018/0124790 A1* | 5/2018 | Yerramalli | H04W 16/14 |
| 2018/0124815 A1* | 5/2018 | Papasakellariou | H04W 72/042 |
| 2019/0007175 A1* | 1/2019 | Kwak | H04B 1/713 |

OTHER PUBLICATIONS

Qualcomm Incorporated,"Low Papr Modulation",3GPP TSG RAN WG1 Meeting #90 R1-1714186,Prague, Czech Republic, 21th Aug. 25, 2017,total 4 pages.

Qualcomm Incorporated,"Remaining issues on DMRS design",3GPP TSG RAN WG1 Meeting 90bis R1-1718547, Prague, CZ, 9th Oct. 13, 2017,total 14 pages.

InterDigital Inc.,"Sequence design for 1-symbol short-PUCCH of up to 2 bits",3GPP TSG RAN WG1 Meeting NR#3 R1-1716478,Nagoya, Japan, 18th Sep. 21, 2017,total 19 pages.

Huawei et al.,"Short PUCCH for UCI of up to 2 bits",3GPP TSG RAN WG1 Meeting #90bis R1-1717066, Prague, Czech Republic, 9 Oct. 13, 2017,total 14 pages.

Qualcomm Incorporated,"Channelization of 1-symbol short PUCCH with 1 or 2 bits payload",3GPP TSG RAN WG1 Meeting #90b R1-1718559,Prague, CZ Oct. 9-13, 2017,total 19 pages.

Intel Corporation et al.,"WF on new NR CG sequences for PUCCH",3GPP TSG RAN WG1 Meeting #90-bis R1-1718949,Prague, Czech Republic, 9th Oct. 13, 2017,total 7 pages.

* cited by examiner

SIGNAL PROCESSING METHOD, SIGNAL PROCESSING APPARATUS, COMPUTER READABLE STORAGE MEDIUM, AND COMPUTER PROGRAM PRODUCT

CROSS-REFERENCE TO RELATED APPLICATIONS

This application is a continuation of International Application No. PCT/CN2018/116061, filed on Nov. 17, 2018, which claims priority to Chinese Patent Application No. 201711148427.6, filed on Nov. 17, 2017, the disclosures of which are incorporated herein by reference in their entireties.

TECHNICAL FIELD

This application relates to the field of communications technologies, and in particular, to a signal processing method, a signal processing apparatus, a computer readable storage medium, and a computer product.

BACKGROUND

Currently, in an LTE system, there are 30 root sequences $\{x_i\}$, i=0, 1, 2, ..., N−1 whose lengths are N, where N=6, 12, 18, or 24, which are used for a demodulation reference signal (DMRS) in the LTE system. In a 5G NR (new radio) system, 30 low-PAPR (peak to average power ratio) sequences whose lengths are N=12 are defined, and are used to transmit a 1-bit or 2-bit reference signal or control channel (physical uplink control channel) that occupies one RB, or transmit a DMRS of a data channel that occupies one RB.

In the NR system, π/2-BPSK modulation is considered, and is applied to DFT-S-OFDM (discrete Fourier transformation-spread OFDM) transmission, or is applied to a single carrier system. After π/2-BPSK modulation is performed on a signal, for example, after π/2-BPSK modulation is performed on a bit sequence $b_i$, i=0, 1, 2, ..., N−1 including 0 and 1, the bit sequence becomes $u(1-2b_i) \cdot j^i$, i=0, 1, 2, ... N−1, where j is a unit of an imaginary number, $j=\sqrt{-1}$, u is a complex number, and a value of u is the same for different values of i (i=0, 1, 2, ..., N−1); after discrete Fourier transformation (DFT) and frequency domain spectrum shaping (FDSS) are performed on the bit sequence, the bit sequence is mapped to a frequency domain subcarrier, then inverse fast Fourier transformation (IFFT) is performed on the bit sequence, and then the bit sequence is sent. FDSS is frequency domain spectrum shaping, and may be implemented before or after DFT. This transmission method is referred to as π/2-BPSK DFT-S-OFDM. When π/2-BPSK DFT-S-OFDM is used, spectrum utilization is reduced, but a PAPR may be very low, and therefore, transmission can be performed at higher power.

FDSS may be freely selected during implementation. Same FDSS processing may be performed on a reference signal and data, so that a receiver can demodulate the data based on the reference signal without knowing the specifically used FDSS. When π/2-BPSK DFT-S-OFDM is used, a data channel has a very low PAPR after FDSS is performed on the data channel, and the reference signal also may have a very low PAPR after FDSS is performed on the reference signal, to ensure that both a data signal and the reference signal have low PAPRs.

Existing DMRS sequences in the LTE system and the NR system cannot meet a low-PAPR requirement after FDSS is performed on the DMRS sequences. In a formulation process of the LTE system, many sequences were proposed, and it is verified that only the following two sequences have PAPRs lower than 2.1 dB after FDSS is performed on the sequences by using a 3-tap coefficient [0.28 1 0.28]: a $\{x_i\}$, $x_i = u \cdot e^{\pi j a_i/4}$, i=0, 1, 2, ..., N−1, where $a_i$ is {−3, 1, 1, 3, −3, 3, −3, −3, 3, 1, 3, −1} or {1, 1, 1, 1, −3, −3, −3, 1, −3, −3, 1, −3}.

Qualcomm Incorporated proposed in R1-1718547 to perform π/2-BPSK on a sequence in time domain, to generate a π/2-BPSK DFT-S-OFDM reference signal. A disadvantage of this solution is that a sequence modulated in time domain has serious amplitude flapping in frequency domain, and consequently, channel estimation performance is affected.

SUMMARY

In view of this, embodiments of this application provide a sequence-based signal processing method, a signal processing apparatus, a communications system, a computer readable storage medium, and a computer program product, so as to resolve a prior-art problem that a PAPR of a signal of a sent sequence cannot meet a low-PAPR requirement in a communications system and the signal of the sent sequence does not have relatively good frequency domain flatness, particularly when π/2-BPSK is performed on a data channel or frequency domain spectrum shaping is performed on the sent signal of the sequence.

A first aspect of the embodiments of this application provides a sequence-based signal processing method, including: determining a sequence $\{f_n\}$ including N elements, where: $f_n$ is an element in the sequence $\{f_n\}$, the sequence $\{f_n\}$ meets a preset condition, the preset condition is $f_n = A \cdot x_n \cdot e^{2\pi j \cdot a \cdot n}$, a value of n ranges from 0 to N−1, A is a non-zero complex number, a is a real number, $j=\sqrt{-1}$, an element $x_n = u \cdot e^{\rho_M \pi j \cdot s_n/M}$, u is a non-zero complex number, M is 4, 12, or 16, $\rho_M$ is a real number, $\rho_M$ is 1 or −1 when M is 4, $\rho_M = 2$ or −2 when M is 12 or 16, a sequence $\{s_n\}$ including an element $s_n$ is a sequence in a first sequence set or an equivalent sequence of the sequence in the first sequence set, or a sequence in a second sequence set or an equivalent sequence of the sequence in the second sequence set, or a sequence in a third sequence set or an equivalent sequence of the sequence in the third sequence set, and for the sequences in the first sequence set, the second sequence set, and the third sequence set herein, refer to descriptions in the specification; and sending a signal generated based on the sequence $\{f_n\}$, where the sequence $\{f_n\}$ is mapped to N subcarriers.

In the foregoing solution, by using the foregoing determined sequence, when a signal is sent by using a reference signal or a control channel, weak cross-correlation between sequences can be maintained, and a relatively small PAPR value and a relatively small CM (cross modulation) value can be maintained. Therefore, a requirement in a communications application environment in which the signal is sent by using the reference signal or the control channel is met.

In one embodiment, the N elements in the sequence $\{f_n\}$ are mapped to N consecutive subcarriers respectively; or the N elements in the sequence $\{f_n\}$ are mapped to N equally spaced subcarriers respectively.

In one embodiment, the sending a signal generated based on the sequence $\{f_n\}$ includes: when frequency shaping is performed on the sequence $\{f_n\}$, or when π/2-BPSK modulation is performed on a data channel, sending the signal generated based on the sequence $\{f_n\}$.

In one embodiment, the first signal is a reference signal; or the first signal is used to carry communication information.

In one embodiment, the sequence $\{s_n\}$ including the element $s_n$ is a sequence in a fourth sequence set or an equivalent sequence of the sequence in the fourth sequence set. For the sequence in the fourth sequence set herein, refer to descriptions in the specification.

In one embodiment, the sequence $\{s_n\}$ including the element $s_n$ is a sequence in a fifth sequence set or an equivalent sequence of the sequence in the fifth sequence set. For the sequence in the fifth sequence set herein, refer to descriptions in the specification.

In one embodiment, the sequence $\{s_n\}$ including the element $s_n$ is a sequence in a sixth sequence set or an equivalent sequence of the sequence in the sixth sequence set. For the sequence in the sixth sequence set herein, refer to descriptions in the specification.

In one embodiment, when M=4, the equivalent sequence is $\{q_n\}$, in the equivalent sequence $\{q_n\}$, $q_n = s_n + u_n \pmod 8$, and in a sequence $\{u_n\}$ including $u_n$, $u_n = f + g \cdot n \pmod 8$, $f \in \{0,2,4,6\}$, and $g \in \{0,2,4,6\}$; or when M=12 or 16, the equivalent sequence is $\{q_n\}$, in the equivalent sequence $\{q_n\}$, $q_n = s_n + s_n \pmod M$, and in a sequence $\{u_n\}$ including $u_n$, $u_n = f + g \cdot n \pmod M$, $f \in \{0, 1, 2, \ldots M-1\}$, and $g \in \{0, 1, 2, \ldots, M-1\}$.

A second aspect of the embodiments of this application provides a sequence-based signal processing method. The signal processing method includes: receiving a first signal carried on N subcarriers, and obtaining N elements in a sequence $\{f_n\}$, where the first signal is generated by mapping the sequence $\{f_n\}$ to the N subcarriers, $f_n$ is an element in the sequence $\{f_n\}$, the sequence $\{f_n\}$ meets a preset condition, the preset condition is $f_n = A \cdot x_n \cdot e^{2\pi j \cdot a \cdot n}$, a value of n ranges from 0 to N−1, A is a non-zero complex number, a is a real number, an element $x_n = u \cdot e^{\rho_M \pi j \cdot s_n / M}$, u is a non-zero complex number, M=4, 12, or 16, $\rho_M$ is a real number, $\rho_M$ is 1 or −1 when M=4, $\rho_M$=2 or −2 when M=12 or 16, a sequence $\{s_n\}$ including an element $s_n$ is a sequence in a first sequence set or an equivalent sequence of the sequence in the first sequence set, or a sequence in a second sequence set or an equivalent sequence of the sequence in the second sequence set, or a sequence in a third sequence set or an equivalent sequence of the sequence in the third sequence set, and for the sequences in the first sequence set, the second sequence set, and the third sequence set herein, refer to descriptions in the specification; and processing the first signal based on the N elements in the sequence $\{f_n\}$.

In the foregoing solution, by using the foregoing determined sequence, when a DMRS or a control signal is sent by using a reference signal or a control channel, weak cross-correlation between sequences can be maintained, a relatively small PAPR value and a relatively small CM value can be maintained, and a requirement for frequency domain flatness is met. Therefore, a requirement in a communications application environment in which the signal is sent by using the reference signal or the control channel is met.

In one embodiment, the receiving a first signal carried on N subcarriers includes: obtaining, on N consecutive subcarriers, the first signal on the N subcarriers; or obtaining, on N equally spaced subcarriers, the first signal on the N subcarriers.

In one embodiment, the processing the first signal based on the N elements in the sequence $\{f_n\}$ includes: when frequency shaping is performed on the first signal, or when π/2-BPSK modulation is performed on a received data channel, processing the first signal based on the N elements in the sequence $\{f_n\}$.

In one embodiment, the first signal is a reference signal; or the first signal is used to carry communication information.

In one embodiment, a set including the sequence $\{s_n\}$ including the element $s_n$ includes some or all of sequences in a fourth sequence set or some or all of equivalent sequences of the sequences in the fourth sequence set. For the sequences in the fourth sequence set herein, refer to descriptions in the specification.

In one embodiment, the set including the sequence $\{s_n\}$ including the element $s_n$ includes some or all of sequences in a fifth sequence set or some or all of equivalent sequences of the sequences in the fifth sequence set. For the sequences in the fifth sequence set herein, refer to descriptions in the specification.

In one embodiment, the set including the sequence $\{s_n\}$ including the element $s_n$ includes some or all of sequences in a sixth sequence set or some or all of equivalent sequences of the sequences in the sixth sequence set. For the sequences in the sixth sequence set herein, refer to descriptions in the specification.

In a possible design, when M=4, the equivalent sequence is $\{q_n\}$, in the equivalent sequence $\{q_n\}$, $q_n = s_n + u_n \pmod 8$, and in a sequence $\{u_n\}$ including $u_n$, $u_n = f + g \cdot n \pmod 8$, $f \in \{0,2,4,6\}$, and $g \in \{0,2,4,6\}$; or when M=12 or 16, an equivalent sequence of $\{s_n\}$ is $\{q_n\}$, in the equivalent sequence $\{q_n\}$, $q_n = s_n + u_n \pmod M$, and in a sequence $\{u_n\}$ including $u_n$, $u_n = f + g \cdot n \pmod M$, $f \in \{0, 1, 2, \ldots M-1\}$, and $g \in \{0, 1, 2, \ldots, M-1\}$.

A third aspect of the embodiments of this application provides a signal processing apparatus. The signal processing apparatus may be a communications device, or may be a chip in a communications device, and the communications device or the chip has a function of implementing the sequence-based signal processing method according to any one embodiment of the first aspect. The function may be implemented by hardware, or may be implemented by hardware executing corresponding software. The hardware or the software includes one or more units corresponding to the foregoing function.

The communications device includes a processing unit and a transceiver unit. The processing unit may be a processor, the transceiver unit may be a transceiver, and the transceiver includes a radio frequency circuit. In one embodiment, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device is enabled to perform the sequence-based signal processing method according to any one embodiment of the first aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip is enabled to perform the sequence-based signal processing method according to any one embodiment of the first aspect. In one embodiment, the storage unit may be a storage unit (for example, a register or a buffer) in the chip, or the storage unit may be a storage unit (for example, a read-only memory (ROM)) that is in the communications device and that is located outside the chip, or another type of static storage device (for example, a random access memory (RAM)) that can store static information and an instruction, or the like.

The processor mentioned in the third aspect may be a central processing unit (CPU), a microprocessor, or an application-specific integrated circuit (ASIC), or may be one or more integrated circuits configured to control program execution of the sequence-based signal processing method according to any one embodiment of the first aspect.

A fourth aspect of the embodiments of this application provides a signal processing apparatus. The signal processing apparatus may be a communications device, or may be a chip in a communications device, and the communications device or the chip has a function of implementing the sequence-based signal processing method according to any one embodiment of the second aspect. The function may be implemented by hardware, or may be implemented by hardware executing corresponding software. The hardware or the software includes one or more units corresponding to the foregoing function.

The communications device includes a processing unit and a transceiver unit. The processing unit may be a processor, the transceiver unit may be a transceiver, and the transceiver includes a radio frequency circuit. In one embodiment, the communications device further includes a storage unit, and the storage unit may be, for example, a memory. When the communications device includes the storage unit, the storage unit is configured to store a computer executable instruction, the processing unit is connected to the storage unit, and the processing unit executes the computer executable instruction stored in the storage unit, so that the communications device is enabled to perform the sequence-based signal processing method according to any one embodiment of the second aspect.

The chip includes a processing unit and a transceiver unit. The processing unit may be a processor, and the transceiver unit may be an input/output interface, a pin, a circuit, or the like on the chip. The processing unit may execute a computer executable instruction stored in a storage unit, so that the chip is enabled to perform the sequence-based signal processing method according to any one embodiment of the second aspect. In one embodiment, the storage unit may be a storage unit (for example, a register or a buffer) in the chip, or the storage unit may be a storage unit (for example, a read-only memory (ROM)) that is in the communications device and that is located outside the chip, or another type of static storage device (for example, a random access memory (RAM)) that can store static information and an instruction, or the like.

The processor mentioned in the fourth aspect may be a central processing unit (CPU), a microprocessor, or an application-specific integrated circuit (ASIC), or may be one or more integrated circuits configured to control program execution of the sequence-based signal processing method according to any one embodiment of the second aspect.

A fifth aspect of the embodiments of this application provides a communications system. The communications system includes the signal processing apparatus provided in the third aspect of the embodiments of this application and the signal processing apparatus provided in the fourth aspect of the embodiments of this application.

A sixth aspect of the embodiments of this application provides a computer readable storage medium, configured to store a computer instruction, and when the computer instruction is run on a computer, the computer is enabled to perform the sequence-based signal processing method provided in the first aspect or the second aspect of the embodiments of this application.

A seventh aspect of the embodiments of this application provides a computer program product including instructions, and when the computer program product is run on a computer, the computer is enabled to perform the sequence-based signal processing method provided in the first aspect or the second aspect of the embodiments of this application.

An eighth aspect of the embodiments of this application provides a chip. The chip includes an input interface, an output interface, at least one memory, and at least one processor. The at least one memory is configured to store code, the at least one processor is configured to execute the code in the memory, and when executing the code, the processor implements the sequence-based signal processing method provided in the first aspect or the second aspect of the embodiments of this application.

According to the sequence-based signal processing method, the signal processing apparatus, the communications system, the computer readable storage medium, and the computer program product that are disclosed in the embodiments of this application, a sequence meeting a requirement in an environment in which a signal is sent by using a reference signal or a control channel is determined, where the sequence is a sequence $\{f_n\}$ including N elements, $f_n$ is an element in the sequence $\{f_n\}$, and the determined sequence $\{f_n\}$ meets a preset condition; then the N elements in the sequence $\{f_n\}$ are mapped to N subcarriers respectively, to generate a first signal; and the first signal is sent. By using the foregoing determined sequence, when the signal is sent by using the reference signal or the control channel, weak cross-correlation between sequences can be maintained, a relatively small PAPR value and a relatively small CM value can be maintained, and a requirement for frequency domain flatness can be met. Therefore, a requirement in a communications application environment in which the signal is sent by using the reference signal or the control channel is met.

DESCRIPTION OF EMBODIMENTS

Figure 1:
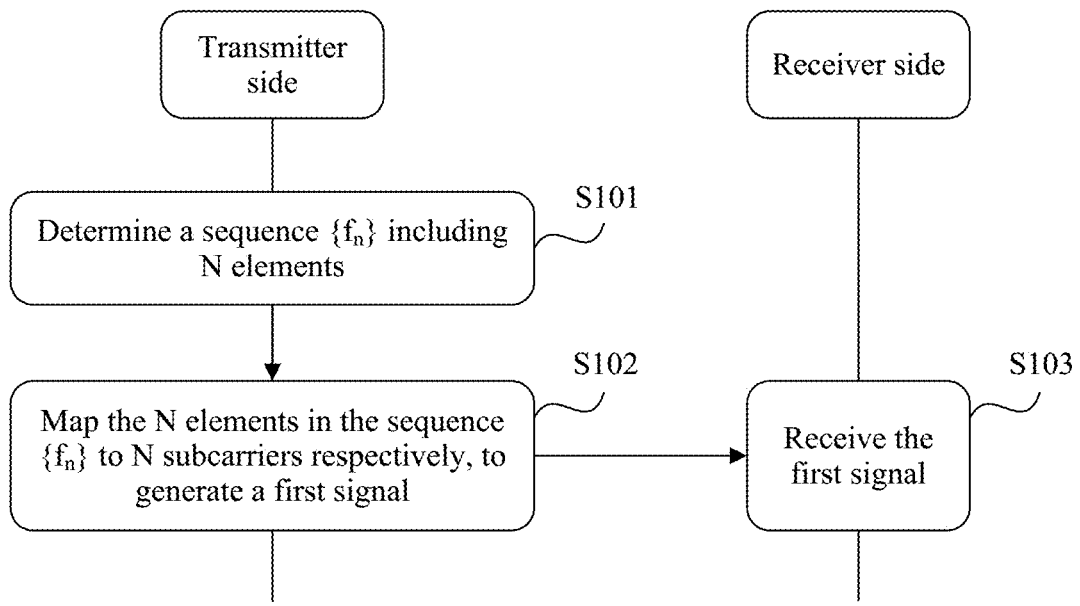
FIG. 1 is a schematic flowchart of sequence-based signal sending processing according to an embodiment of this application.

Embodiments of this application provide a sequence-based signal processing method, a related device, and a communications system. A sequence meeting a requirement in an environment in which a signal is sent by using a reference signal or a control channel is determined. In this way, when the signal is sent by using the reference signal or the control channel, weak cross-correlation between sequences can be maintained, and a relatively small PAPR value and a relatively small CM value can be maintained. Therefore, a requirement in a communications application environment in which the signal is sent by using the reference signal or the control channel is met.

In the embodiments, claims, and accompanying drawings of this application, the terms "first", "second", and the like are intended to distinguish between different objects but are not intended to describe a specific order. In addition, the terms "include" and "have" are not exclusive. For example, a process, method, system, product, or device including a series of steps or units is not limited to the listed steps or units, and may further include steps or units that are not listed.

Currently, in an LTE system, a 4G system, a 4.5G system, and a 5G system, UCI (uplink channel information) and a DMRS can be sent by using a reference signal or a control channel. To improve coverage performance of a reference signal or a control channel, the reference signal or the control channel is sent in a sequence-based modulation manner. To be specific, on all OFDM symbols that are used to transmit UCI, to-be-sent signals are modulated to one computer generated sequence (CGS). CGSs are filtered, to ensure that each sent signal has a relatively small PAPR value and a relatively small CM value, thereby improving coverage of the reference signal or the control channel. Because a reference signal or a control channel may also be used for coverage on a cell border, for a user on the cell border, cross-correlation between sequences needs to be further considered when the CGSs are filtered.

For example, a first cell and a second cell are adjacent to each other. If cross-correlation between a first sequence used by the first cell and a second sequence used by the second cell is relatively strong, interference from a reference signal or a control channel sent by user equipment in the first cell may be caused, on a border of the first cell, to a base station serving the second cell when the base station sends a signal by using a reference signal or a control channel. Consequently, receiving performance of the reference signal or the control channel deteriorates. Therefore, sequences with weak cross-correlation need to be determined when the CGSs are filtered.

To ensure that a relatively small PAPR value and a relatively small CM value can be maintained, and weak cross-correlation between sequences can be maintained when UCI and a DMRS are sent by using the reference signal or the control channel in the LTE system, the 4G system, the 4.5G system, and the 5G system, or even another communications system or communications application environment that has a higher requirement, the embodiments of this application provide a specific implementation process of sequence-based signal processing. The specific implementation process is described in detail in the following embodiments.

In the embodiments of this application, sequence-based signal processing is described mainly from a receiver side and a transmitter side in a communications system or a communication application environment. The receiver side may be a network device, and the transmitter side may be a terminal device; or the receiver side may be a terminal device, and the transmitter side may be a network device. In the following embodiments, an example in which the receiver side is a network device and the transmitter side is a terminal device is used for description, but the present invention is not limited thereto.

The terminal device in the embodiments of this application may be user equipment. The user equipment may be a wired device, or may be a wireless device. The wireless device may be a handheld device having a wireless connection function, or another processing device connected to a wireless modem, or a mobile terminal that communicates with one or more core networks by using a radio access network. For example, a wireless terminal may be a mobile phone, a computer, a tablet computer, a personal digital assistant (PDA), a mobile internet device (MID), a wearable device, an e-book reader, or the like. For another example, the wireless terminal may also be a portable, pocket-sized, handheld, computer built-in, or vehicle-mounted mobile device. For still another example, the wireless terminal may be a mobile station or an access point.

The network device in the embodiments of this application may be a base station. The base station may include a macro base station, a micro base station, a relay node, an access point, a base station controller, a transmission point, a reception point, and the like that are in various forms. In systems in which different radio access technologies are used, specific names of the base station may be different.

FIG. 1 is a schematic flowchart of a sequence-based signal processing method according to an embodiment of this application. The method includes the following operations.

Operation S101. A terminal device determines a sequence $\{f_n\}$ including N elements. N is a positive integer greater than 1, for example, may be 12, 18, or 24.

In one embodiment, performing of operation S101 may be: when a modulation scheme used for sending a data channel is $\pi/2$-BPSK, determining to send a reference signal or a control signal by using the sequence $\{f_n\}$. This is because when $\pi/2$-BPSK is used for the data channel, a very low PAPR may be obtained through filtering. Therefore, the reference signal or the control signal is required to have a similar very low PAPR after filtering is performed. In the present invention, after a sequence passes through different filters, a PAPR of the sequence is similar to or lower than the PAPR of the data channel. The data channel and the reference signal may occupy different symbols in a slot, for example, a DFT-S-OFDM symbol or an OFDM symbol. Same FDSS may be used for the data channel and the reference signal, so that a receiver may demodulate data based on the reference signal without knowing an FDSS coefficient used by a transmitter.

In $\pi/2$-BPSK modulation of a signal, specifically, for example, a bit sequence $b_i$, i=0, 1, 2, ..., N−1 including 0 and 1 is $u(1-2b_i) \cdot j^i$, i=0, 1, 2, ..., N−1 after $\pi/2$-BPSK modulation is performed on the sequence, where j is a unit of an imaginary number, $j=\sqrt{-1}$, u is a complex number, and a value of u is the same for different values of i (i=0, 1, 2, ..., N−1).

Alternatively, when frequency domain spectrum shaping (FDSS) is performed on a sent signal, a signal determined by the sequence {$f_n$} is used, and the sent signal includes a data signal or the sequence {$f_n$}.

In one embodiment, performing of S101 may be: determining, by the terminal device after accessing a network, the sequence {$f_n$} including the N elements; or may be: determining, by a network device when the terminal device accesses a network, a sequence {$x_n$} and configuring the sequence {$x_n$} for the terminal device; and determining, by the terminal device based on the sequence {$x_n$}, the sequence {$f_n$} including the N elements.

In one embodiment, $f_n$ indicates an element in the sequence {$f_n$}, and the determined sequence {$f_n$} meets a preset condition. The preset condition is $f_n = A \cdot x_n \cdot e^{2\pi j \cdot a \cdot n}$, where an element $x_n = u \cdot e^{\rho_M \cdot j \cdot s_n / M}$, u is a non-zero complex number, M=4, 12, or 16, $\rho_M$ is a real number determined by M, $\rho_M$ is 1 or −1 when M=4, $\rho_M$=2 or −2 when M=12 or 16, n is an integer herein, a value of n ranges from 0 to N−1, A is a non-zero complex number, a is a real number, $j=\sqrt{-1}$, and u is a non-zero complex number.

A sequence {$s_n$} including an element $s_n$ is a sequence in a first sequence set or an equivalent sequence of the sequence in the first sequence set, or a sequence in a second sequence set or an equivalent sequence of the sequence in the second sequence set, or a sequence in a third sequence set or an equivalent sequence of the sequence in the third sequence set.

Figure 11:
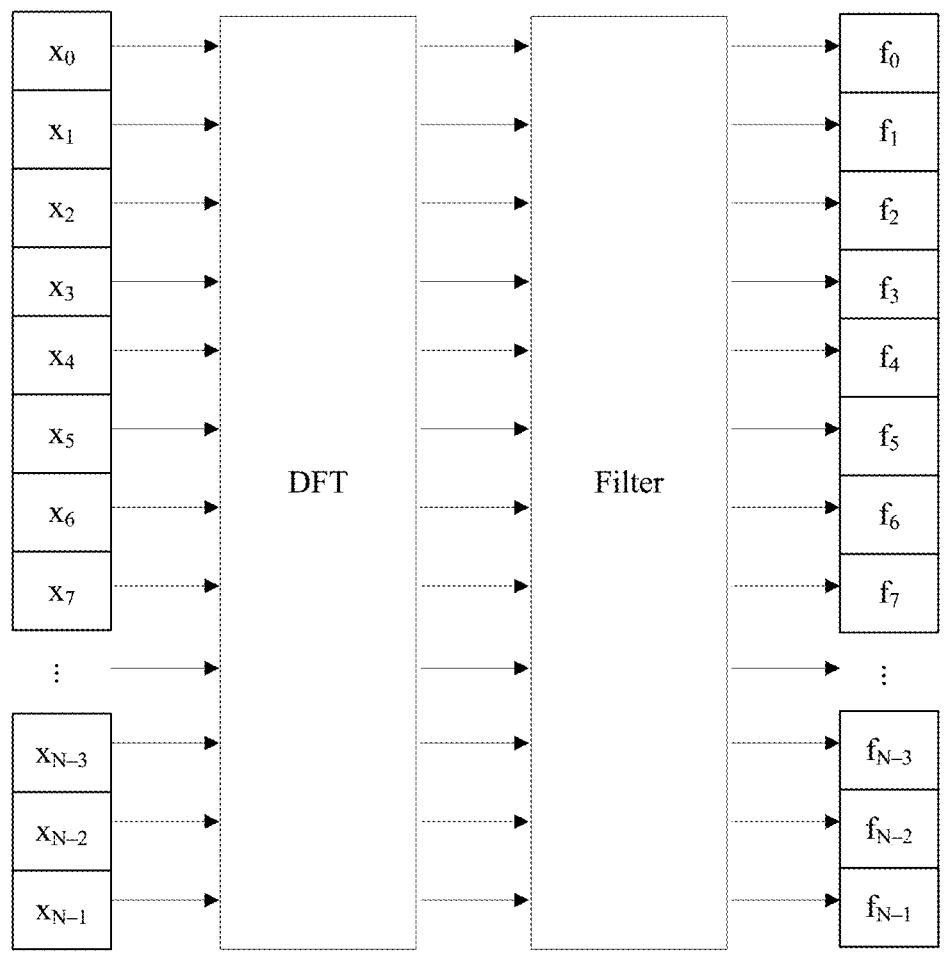
FIG. 11 is an implementation of a filter according to an embodiment of this application.

A sequence length in the first sequence set is 12; and after a 3-tap coefficient [0.28 1 0.28] is used to perform FDSS on a sequence in the first sequence set and an equivalent sequence {$f_n$} that corresponds to the sequence, both PAPRs of the sequences are lower than 2.1 dB. FDSS may be represented by multiplying $$C(k) = 1 + \alpha \cdot e^{-j\frac{2\pi(k-N/2)}{N}} + \alpha \cdot e^{j\frac{2\pi(k-N/2)}{N}}$$

by an element on a subcarrier on which DFT is performed and that is numbered k, where DFT may be DFT transformation defined in specification 36.211 for an LTE system and performed before an uplink data signal is mapped to a subcarrier, N is a quantity of elements, k=0, 1, 2, . . . , or N−1, α=0.28 or α is equal to another value, and α corresponds to three-tap filtering [α 1 α]. An implementation of a filter is shown in FIG. 11. Filtering is performed after DFT, for example, the element on the subcarrier on which DFT is performed and that is numbered k is multiplied by $$C(k) = 1 + \alpha \cdot e^{-j\frac{2\pi(k-N/2)}{N}} + \alpha \cdot e^{j\frac{2\pi(k-N/2)}{N}}.$$

α=0.28 is a filtering coefficient, or the filtering coefficient may be 0.12, 0.2, 0.36, or the like. When a value of the filtering coefficient is 0.2 or 0.12, a PAPR of a to-be-transmitted signal on which filtering is performed (for example, a signal on which π/2-BPSK modulation is performed and a signal {$f_n$} determined by a sequence) increases.

The first sequence set includes some or all of the following sequences, and
M=4:

{−1, −1, −1, −1, −1, −1, 3, −1, 3, 3, −1, −1}, {3, 3, −1, 3, −1, 3, 3, −1, −1, −1, −1, −1}, {−1, −1, −1, −1, −1, −1, −3, 3, −1, 3, −3, −1, −1, −1}, {−1, −1, −1, −1, 1, 3, −1, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1}, {1, 3, −1, 1, −3, −1, −3, 3, −3, −3, −1, −1}, {−3, 3, −1, 3, −1, 3, 3, −1, −1, −1, −1, −1, −1}, {1, 3, −1, −1, 3, −1, −1, 3, 3, −1, −1, −1, −1, −1}, {3, −1, 3, 3, −1, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −1, −3, 3, −1, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −1, 3, −1, −1}, {−3, 1, −1, −1, 3, 1, 3, −1, −1, 1, −1, −1}, {1, −3, −1, −1, 3, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, −1, −1, −1}.

A sequence length in the second sequence set is 12; and after FDSS is performed on a sequence in the second sequence set and an equivalent sequence {$f_n$} that corresponds to the sequence, both PAPRs of the sequences are far lower than 1.9 dB, where the second sequence set includes a sequence in a sequence set 2A and/or a sequence set 2B.

The sequence set 2A includes some or all of the following sequences, and M=12:

{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 3, 4, 5, 3, 0, 7, 0, 4, 8, 8}, {0, 0, 9, 8, 7, 9, 0, 5, 0, 8, 4, 4}, {0, 0, 4, 6, 10, 11, 5, 1, 3, 1, 2, 0}, {0, 0, 0, 4, 4, 6, 0, 4, 1, 11, 6, 2}, {0, 0, 6, 3, 1, 8, 8, 10, 6, 10, 5, 10}, {0, 0, 3, 6, 10, 2, 9, 5, 3, 3, 4, 4}, {0, 0, 4, 3, 9, 8, 3, 6, 2, 5, 4, 6}, {0, 0, 1, 5, 5, 7, 1, 5, 2, 0, 7, 3}, {0, 0, 10, 9, 9, 6, 9, 1, 11, 5, 3, 10}, {0, 0, 8, 7, 6, 2, 4, 7, 4, 9, 7, 1}, {0, 0, 1, 4, 6, 9, 4, 10, 8, 7, 5, 6}, {0, 0, 9, 7, 6, 2, 4, 7, 4, 9, 6, 0}, {0, 0, 6, 7, 0, 1, 8, 4, 7, 5, 5, 5}, {0, 0, 4, 8, 0, 4, 0, 8, 7, 8, 9, 10}, {0, 0, 10, 9, 8, 10, 1, 6, 2, 10, 6, 7}, {0, 0, 4, 1, 7, 5, 10, 0, 8, 9, 7, 9}, {0, 0, 5, 0, 7, 1, 2, 8, 8, 8, 7, 9}, {0, 0, 7, 0, 5, 11, 10, 4, 4, 4, 5, 3}, {0, 0, 8, 8, 7, 7, 10, 2, 9, 5, 1, 11}, {0, 0, 9, 8, 7, 8, 11, 4, 0, 8, 3, 3}, {0, 0, 3, 4, 5, 4, 1, 8, 0, 4, 9, 9}, {0, 0, 4, 0, 6, 4, 9, 11, 7, 7, 6, 8}, {0, 0, 7, 5, 4, 11, 0, 3, 11, 4, 1, 5}, {0, 0, 8, 8, 8, 4, 7, 10, 7, 1, 0, 5}, {0, 0, 4, 0, 5, 2, 6, 7, 3, 3, 0, 0}, {0, 0, 7, 6, 5, 0, 1, 4, 0, 4, 2, 6}, {0, 0, 3, 6, 9, 0, 7, 2, 0, 0, 0, 0}, {0, 0, 1, 2, 4, 3, 8, 2, 2, 10, 10, 7}, {0, 0, 11, 1, 1, 0, 4, 9, 7, 2, 3, 10}, {0, 0, 4, 8, 11, 4, 1, 6, 5, 4, 3, 10}, {0, 0, 8, 4, 1, 8, 11, 6, 7, 8, 9, 2}, {0, 0, 2, 2, 5, 4, 9, 3, 4, 0, 0, 10}, {0, 0, 3, 10, 3, 0, 4, 5, 0, 11, 9, 10}, {0, 0, 11, 0, 1, 11, 3, 8, 7, 2,2, 10}, {0, 0, 2, 5, 8, 11, 6, 1, 11, 10, 10, 10}, {0, 0, 4, 7, 10, 2, 10, 5, 4, 4, 3, 4}, {0, 0, 6, 6, 8, 7, 6, 0, 4, 10, 7, 2}, {0, 0, 5, 3, 11, 10, 4, 8, 5, 7, 7, 10}, {0, 0, 4, 7, 10, 4, 0, 7, 7, 6, 6, 8}, {0, 0, 8, 7, 5, 6, 9, 1, 9, 4, 10, 10}, {0, 0, 4, 5, 7, 6, 3, 11, 3, 8, 2, 2}, {0, 0, 8, 4, 4, 11, 0, 3, 0, 5, 1, 6}, {0, 0, 5, 5, 7, 6, 5, 11, 3, 9, 6, 1}, {0, 0, 3, 3, 4, 3, 0, 7, 0, 3, 8, 8}, {0, 0, 9, 8, 6, 7, 10, 2, 10, 5, 0, 0}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 6, 0, 4, 10, 8, 4, 5, 6, 6, 10}, {0, 0, 7, 3, 1, 6, 6, 7, 2, 5, 1, 4}, {0, 0, 4, 1, 7, 5, 11, 1, 9, 10, 9, 11}, {0, 0, 4, 1, 10, 4, 3, 4, 10, 1, 9, 0}, {0, 0, 4, 0, 6, 4, 8, 10, 6, 6, 4, 6}, {0, 0, 0, 10, 8, 6, 0, 6, 9, 11, 0, 1}, {0, 0, 4, 2, 11, 2, 1, 7, 9, 5, 10, 0}, {0, 0, 8, 10, 1, 10, 11, 5, 3, 7, 2, 0}, {0, 0, 6, 4, 2, 0, 1, 4, 10, 5, 0, 7}, {0, 0, 4, 6, 11, 4, 10, 7, 5, 5, 6, 7}, {0, 0, 11, 0, 1, 4, 9, 3, 0, 9, 7, 7}, {0, 0, 1, 0, 11, 8, 3, 9, 0, 3, 5, 5}, {0, 0, 4, 6, 10, 2, 9, 5, 4, 4, 5, 5}, {0, 0, 7, 1, 9, 3, 5, 9, 8, 7, 6, 3}, {0, 0, 5, 9, 1, 6, 3, 10, 10, 10, 10, 0}, {0, 0, 2, 3, 6, 6, 11, 6, 7, 4, 4, 1}, {0, 0, 3, 5, 8, 8, 2, 9, 10, 7, 8, 6}, {0, 0, 10, 0, 11, 9, 1, 5, 3, 9, 10, 5}, {0, 0, 5, 10, 3, 9, 7, 3, 4, 5, 6, 9}, {0, 0, 4, 8, 1, 6, 2, 11, 10, 0, 2, 3}, {0, 0, 8, 4, 11, 6, 10, 1, 2, 0, 10, 9}, {0, 0, 4, 1, 9, 3, 1, 2, 8, 10, 6, 8}, {0, 0, 3, 11, 4, 1, 6, 7, 2, 2, 0, 1}, {0, 0, 5, 6, 7, 3, 2, 7, 3, 6, 0, 7}, {0, 0, 7, 6, 5, 9, 10, 5, 9, 6, 0, 5}, {0, 0, 7, 5, 2, 2, 4, 7, 2, 8, 2, 1}, {0, 0, 2, 5, 8, 11, 6, 1, 11, 11, 10, 11}, {0, 0, 4, 8, 1, 6, 3, 11, 11, 0, 0, 2}, {0, 0, 7, 1, 7, 0, 1, 4, 2, 0, 10, 7}, {0, 0, 8, 1, 7, 3, 2, 1, 4, 6, 11, 0}, {0, 0, 10, 7, 4, 1, 6, 11, 1, 1, 1, 2}, {0, 0, 4, 7, 10, 3, 11, 6, 6, 5, 5, 6}, {0, 0, 7, 6, 3, 3, 5, 8, 3, 9, 3, 2}, {0, 0, 9, 10, 2, 3, 4, 0, 6, 1, 1, 9}, {0, 0, 5, 4, 2, 11, 0, 3, 9, 4, 11, 6}, {0, 0, 4, 8, 11, 4, 1, 6, 5, 4, 3, 11}, {0, 0, 8, 4, 1, 8, 11, 6, 7, 8, 9, 1}, {0, 0, 7, 4, 1, 11, 0, 2, 7, 1, 7, 3}, {0, 0, 10, 10, 10, 7, 10, 2, 0, 6, 5, 0}, {0, 0, 0, 9, 9, 7, 1, 8, 11, 1, 4, 3}, {0, 0, 0, 3, 3, 5, 11, 4, 1, 11, 8, 9}, {0, 0, 0, 6, 9, 4, 6, 5, 11, 8, 4, 1}, {0, 0, 7, 8, 11, 11, 11, 6, 11, 6, 4, 0}, {0, 0, 5, 11, 5, 8, 8, 1, 11, 9, 8, 10}, {0, 0, 3, 5, 6, 9, 4, 7, 4, 2, 10, 7}, {0, 0, 6, 4, 3, 10, 11, 1, 9, 2, 10, 3}, {0, 0, 6, 5, 0, 0, 8, 0, 9, 0, 1, 4}, {0, 0, 0, 10, 9, 7, 1, 8, 11, 1, 4, 4}, {0, 0, 8, 7, 5, 6, 9, 1, 9, 4, 11, 10}, {0, 0, 1, 3, 3, 4, 10, 1, 9, 6, 1, 8}, {0, 0, 1, 3, 5, 7, 1, 7, 4, 3, 2, 1}, {0, 0, 1, 10, 0, 9, 0, 5, 4, 11, 9, 5}, {0, 0, 5, 8, 1, 6, 2, 11, 11, 0, 2, 2}, {0, 0, 7, 4, 11, 6, 10, 1, 1, 0, 10, 10}, {0, 0, 6, 11, 4, 8, 8, 10, 7, 4, 1, 9}, {0, 0, 11, 9, 9, 7, 1, 8, 11, 1, 4, 4}, {0, 0, 3, 1, 9, 5, 4, 6, 11, 4, 10, 3}, {0, 0, 0, 3, 7, 10, 2, 10, 5, 4, 3, 3, 4}, {0, 0, 0, 1, 1, 0, 4, 9, 7, 2, 2, 9}, {0, 0, 8, 8, 7, 4, 6, 10, 7, 1, 11, 5}, {0, 0, 5, 9, 1, 5, 1, 9, 8, 9, 10, 11}, {0, 0, 11, 1, 3, 10, 11, 6, 3, 7, 4, 10}, {0, 0, 11, 0, 2, 3, 8, 2, 10, 9, 6, 6}, {0, 0, 10, 0, 9, 11, 7, 1, 1, 5, 7, 9}, {0, 0, 8, 8, 11, 11, 11, 6, 11, 5, 4, 11}, {0, 0, 11, 10, 0, 9, 1, 5, 4, 11, 10, 5}, {0, 0, 9, 2, 10, 6, 5, 5, 8, 0, 5, 7}, {0, 0, 8, 6, 4, 5, 7, 11, 5, 0, 7, 7}, {0, 0, 2, 4, 6, 8, 4, 4, 0, 6, 1, 6}, {0, 0, 2, 3, 5, 4, 9, 3, 3, 11, 0, 8}, {0, 0, 6, 9, 0, 5, 2, 7, 6, 5, 4, 11}, {0, 0, 6, 3, 0, 7, 10, 5, 6, 7, 8, 1}, {0, 0, 6, 4, 11, 10, 5, 8, 5, 7, 8, 11}, {0, 0, 6, 4, 2, 10, 10, 1, 9, 2, 9, 2}, {0, 0, 4, 9, 0, 5, 2, 9, 9, 9, 9, 0}, {0, 0, 3, 7, 10, 2, 10, 5, 4, 4, 4, 5}, {0, 0, 9, 8, 7, 6, 11, 9, 2, 6, 10, 4}, {0, 0, 3, 4, 5, 6, 1, 3, 10, 6, 2, 8}, {0, 0, 3, 5, 7, 9, 5, 8, 4, 1, 10, 6}, {0, 0, 1, 10, 8, 6, 0, 6, 9, 10, 0, 11}, {0, 0, 11, 2, 4, 6, 0, 6, 3, 2, 0, 1}, {0, 0, 2, 4, 5, 9, 3, 9, 7, 5, 4, 5}, {0, 0, 10, 6, 4, 0, 4, 10, 11, 0, 1, 0}, {0, 0, 2, 6, 8, 0, 8, 2, 1, 0, 11, 0}, {0, 0, 4, 5, 7, 6, 4, 11, 5, 9, 3, 3}, {0, 0, 0, 8, 5, 3, 8, 1, 4, 3, 5, 3}, {0, 0, 0, 4, 7, 9, 4, 11, 8, 9, 7, 9}, {0, 0, 7, 6, 5, 4, 6, 10, 5, 1, 9, 4}, {0, 0, 4, 8, 0, 4, 0, 8, 7, 8, 9, 9}, {0, 0, 8, 4, 0, 8, 0, 4, 5, 4, 3, 3}, {0, 0, 0, 0, 1, 11, 3, 8, 7, 2, 2, 9}, {0, 0, 5, 2, 0, 6, 5, 7, 2, 5, 1, 3}, {0, 0, 5, 11, 5, 8, 8, 10, 6, 4, 0, 9}, {0, 0, 6, 8, 1, 5, 0, 4, 3, 10, 10, 0, 0}, {0, 0, 6, 6, 8, 8, 6, 0, 4, 10, 9, 4}, {0, 0, 4, 2, 1, 10, 11, 2, 7, 3, 10, 5}, {0, 0, 8, 7, 5, 6, 8, 0, 7, 2, 9, 8}, {0, 0, 5, 3, 11, 8, 8, 10, 4, 9, 4, 9}, {0, 0, 7, 5, 3, 10, 11, 1, 9, 1, 10, 2}, {0, 0, 3, 6, 8, 0, 8, 0, 10, 8, 6, 1}, {0, 0, 3, 10, 6, 11, 8, 9, 2, 3, 11, 11}, {0, 0, 11, 0, 0, 2, 7, 0, 9, 6, 2, 3}, {0, 0, 1, 0, 0, 10, 5, 0, 3, 6, 10, 9}, {0, 0, 7, 10, 4, 10, 7, 5, 6, 8, 11, 11}, {0, 0, 4, 8, 1, 5, 4, 6, 3, 11, 9, 4}, {0, 0, 1, 1, 4, 2, 7, 1, 1, 10, 8, 6}, {0, 0, 3, 8, 1, 3, 2, 6, 3, 0, 10, 10}, {0, 0, 4, 7, 10, 2, 10, 4, 3, 2, 1, 2}, {0, 0, 10, 10, 9, 11, 3, 8, 5, 1, 9, 9}, and {0, 0, 2, 2, 3, 1, 9, 4, 7, 11, 3, 3}.

The sequence set 2B includes some or all of the following sequences, and M=16:

{9, 8, 11, 14, 1, 5, 14, 6, 3, 1, 0, 0}, {13, 12, 14, 1, 4, 7, 0, 8, 4, 3, 0, 0}, {14, 5, 11, 2, 9, 13, 9, 6, 10, 10, 0, 0}, {10, 12, 1, 3, 10, 10, 4, 14, 2, 15, 0, 0}, {12, 9, 12, 6, 12, 7, 12, 13, 5, 4, 0, 0}, {13, 12, 0, 2, 4, 8, 1, 8, 5, 3, 0, 0}, {13, 15, 6, 10, 1, 4, 14, 10, 14, 13, 0, 0}, {9, 8, 2, 0, 13, 14, 1, 6, 15, 8, 0, 0}, {11, 11, 15, 3, 8, 13, 7, 1, 15, 0, 0}, {7, 3, 6, 14, 7, 11, 6, 4, 9, 9, 0, 0}, {12, 12, 7, 6, 5, 7, 11, 2, 11, 6, 0, 0}, {4, 4, 9, 10, 11, 9, 5, 14, 5, 10, 0, 0}, {13, 14, 9, 8, 6, 8, 12, 2, 12, 6, 0, 0}, {3, 2, 7, 8, 10, 8, 4, 14, 4, 10, 0, 0}, {2, 10, 14, 4, 12, 15, 10, 7, 11, 11, 0, 0}, {4, 3, 4, 6, 8, 11, 3, 10, 6, 3, 0, 0}, {9, 6, 9, 4, 10, 5, 11, 12, 4, 4, 0, 0}, {2, 14, 0, 9, 15, 9, 14, 14, 5, 4, 0, 0}, {7, 6, 1, 15, 12, 13, 0, 5, 14, 7, 0, 0}, {13, 13, 9, 8, 6, 8, 12, 2, 12, 6, 0, 0}, {3, 3, 7, 8, 10, 8, 4, 14, 4, 10, 0, 0}, {6, 5, 8, 11, 15, 3, 12, 5, 2, 1, 0, 0}, {7, 15, 4, 13, 5, 9, 6, 3, 8, 8, 0, 0}, {13, 13, 1, 5, 10, 14, 8, 2, 15, 0, 0, 0}, {10, 9, 5, 5, 15, 0, 7, 14, 11, 15, 0, 0}, {13, 12, 6, 7, 1, 0, 8, 14, 12, 14, 0, 0}, {0, 6, 10, 13, 5, 6, 0, 11, 15, 13, 0, 0}, {11, 11, 13, 0, 3, 6, 15, 7, 4, 2, 0, 0}, {6, 2, 4, 13, 2, 12, 0, 0, 7, 5, 0, 0}, {6, 9, 3, 10, 0, 8, 6, 15, 15, 1, 0, 0}, {13, 4, 15, 11, 6, 1, 5, 13, 14, 15, 0, 0}, {8, 1, 6, 14, 6, 10, 6, 4, 9, 9, 0, 0}, {15, 15, 0, 2, 5, 8, 0, 8, 4, 2, 0, 0}, {13, 2, 9, 0, 8, 12, 8, 5, 10, 10, 0, 0}, {2, 2, 13, 15, 10, 11, 3, 11, 9, 13, 0, 0}, {9, 0, 6, 14, 6, 10, 7, 4, 9, 9, 0, 0}, {1, 10, 6, 3, 15, 11, 0, 9, 12, 14, 0, 0}, {13, 2, 11, 3, 10, 3, 2, 12, 13, 15, 0, 0}, {6, 11, 10, 0, 9, 15, 4, 2, 14, 12, 0, 0}, {6, 6, 1, 15, 12, 13, 0, 5, 14, 7, 0, 0}, {8, 8, 3, 4, 14, 14, 6, 13, 11, 14, 0, 0}, {7, 8, 4, 4, 3, 5, 9, 0, 10, 6, 0, 0}, {1, 6, 10, 13, 5, 6, 0, 11, 15, 13, 0, 0}, {1, 4, 0, 1, 0, 2, 7, 14, 9, 5, 0, 0}, {15, 8, 3, 8, 1, 11, 14, 0, 11, 10, 0, 0}, {1, 8, 13, 8, 15, 5, 2, 0, 5, 6, 0, 0}, {9, 15, 10, 4, 0, 8, 12, 2, 1, 1, 0, 0}, {7, 9, 4, 5, 3, 5, 10, 0, 12, 6, 0, 0}, {0, 15, 10, 9, 7, 9, 13, 3, 13, 7, 0, 0}, {0, 1, 6, 7, 9, 7, 3, 13, 3, 9, 0, 0}, {7, 10, 15, 1, 8, 9, 2, 13, 1, 15, 0, 0}, {9, 11, 1, 3, 9, 10, 4, 14, 2, 15, 0, 0}, {9, 1, 5, 9, 1, 3, 13, 9, 13, 12, 0, 0}, {12, 2, 7, 10, 2, 4, 14, 10, 14, 13, 0, 0}, {10, 8, 11, 14, 1, 5, 14, 6, 3, 1, 0, 0}, {7, 12, 1, 7, 14, 1, 12, 8, 12, 11, 0, 0}, {9, 8, 11, 13, 1, 5, 13, 6, 2, 1, 0, 0}, {6, 6, 6, 9, 10, 12, 4, 11, 6, 4, 0, 0}, {10, 10, 10, 7, 6, 4, 12, 5, 10, 12, 0, 0}, {12, 3, 3, 10, 4, 11, 0, 15, 12, 11, 0, 0}, {6, 6, 10, 11, 1, 0, 9, 2, 5, 1, 0, 0}, {10, 13, 1, 3, 10, 10, 4, 14, 2, 15, 0, 0}, {9, 8, 11, 14, 1, 5, 14, 6, 3, 2, 0, 0}, {6, 11, 15, 1, 8, 9, 2, 13, 1, 15, 0, 0}, {1, 8, 2, 9, 1, 5, 9, 7, 2, 15, 0, 0}, {12, 11, 14, 0, 3, 7, 15, 7, 3, 1, 0, 0}, {9, 7, 11, 13, 0, 5, 14, 6, 4, 2, 0, 0}, {11, 1, 2, 9, 3, 10, 0, 15, 12, 11, 0, 0}, {7, 7, 1, 2, 13, 14, 5, 13, 10, 15, 0, 0}, {0, 0, 5, 7, 13, 13, 6, 0, 3, 0, 0, 0}, {13, 3, 9, 0, 8, 12, 8, 5, 10, 10, 0, 0}, {5, 10, 15, 1, 8, 9, 2, 13, 0, 14, 0, 0}, {2, 5, 11, 13, 5, 7, 1, 12, 0, 15, 0, 0}, {0, 14, 1, 10, 3, 8, 3, 2, 7, 7, 0, 0}, {4, 5, 9, 10, 0, 15, 8, 1, 4, 0, 0, 0}, {10, 6, 10, 0, 5, 15, 2, 1, 8, 5, 0, 0}, {4, 0, 2, 11, 1, 11, 15, 15, 6, 5, 0, 0}, {10, 1, 6, 14, 6, 10, 6, 4, 9, 9, 0, 0}, {9, 5, 9, 0, 9, 12, 7, 5, 10, 9, 0, 0}, {15, 0, 10, 9, 7, 9, 13, 3, 13, 7, 0, 0}, {1, 0, 6, 7, 9, 7, 3, 13, 3, 9, 0, 0}, {14, 4, 11, 2, 9, 13, 9, 6, 10, 10, 0, 0}, {5, 4, 0, 14, 11, 12, 15, 4, 14, 7, 0, 0}, {11, 2, 7, 15, 7, 11, 7, 4, 9, 9, 0, 0}, {13, 6, 0, 13, 4, 14, 0, 9, 10, 11, 0, 0}, {4, 12, 15, 6, 13, 0, 11, 7, 11, 10, 0, 0}, {7, 3, 7, 14, 7, 11, 6, 4, 9, 9, 0, 0}, {9, 1, 6, 13, 6, 10, 6, 4, 9, 10, 0, 0}, {11, 8, 11, 4, 11, 6, 11, 12, 4, 3, 0, 0}, {14, 11, 14, 7, 13, 8, 13, 13, 5, 4, 0, 0}, {4, 14, 0, 6, 14, 1, 11, 8, 12, 11, 0, 0}, {6, 8, 9, 14, 7, 13, 5, 3, 14, 13, 0, 0}, {1, 0, 4, 8, 12, 0, 10, 3, 1, 0, 0, 0}, {9, 9, 14, 2, 7, 12, 6, 0, 15, 15, 0, 0}, {15, 15, 2, 4, 6, 9, 2, 9, 5, 3, 0, 0}, {4, 0, 3, 11, 1, 11, 15, 15, 6, 4, 0, 0}, {5, 5, 9, 12, 15, 3, 12, 5, 2, 1, 0, 0}, {15, 12, 15, 8, 14, 9, 13, 14, 6, 4, 0, 0}, {9, 13, 3, 8, 15, 2, 13, 9, 13, 12, 0, 0}, {12, 0, 4, 6, 12, 12, 5, 15, 2, 15, 0, 0}, {14, 12, 15, 2, 4, 8, 1, 8, 5, 3, 0, 0}, {5, 6, 3, 3, 1, 4, 9, 15, 11, 5, 0, 0}, {8, 8, 4, 4, 2, 5, 10, 0, 12, 6, 0, 0}, {8, 8, 12, 12, 14, 11, 6, 0, 4, 10, 0, 0}, {2, 13, 3, 14, 7, 4, 2, 5, 11, 0, 0, 0}, {14, 3, 13, 2, 9, 12, 14, 11, 5, 0, 0, 0}, {4, 10, 10, 0, 9, 15, 4, 2, 14, 13, 0, 0}, {9, 1, 6, 14, 6, 10, 6, 4, 9, 9, 0, 0}, {6, 10, 10, 0, 9, 15, 4, 2, 14, 12, 0, 0}, {1, 10, 14, 4, 12, 15, 10, 7, 11, 11, 0, 0}, {13, 2, 15, 4, 13, 2, 7, 5, 0, 13, 0, 0}, {5, 9, 6, 8, 9, 12, 2, 10, 6, 3, 0, 0}, {2, 2, 7, 8, 10, 8, 4, 13, 4, 9, 0, 0}, {12, 10, 13, 0, 2, 7, 0, 7, 5, 3, 0, 0}, {9, 6, 9, 0, 5, 15, 2, 1, 9, 6, 0, 0}, {15, 13, 7, 7, 1, 1, 9, 15, 12, 15, 0, 0}, {7, 10, 3, 10, 0, 8, 6, 15, 15, 1, 0, 0}, {13, 15, 4, 6, 12, 12, 5, 15, 2, 15, 0, 0}, {7, 10, 3, 10, 0, 8, 7, 0, 15, 1, 0, 0}, {14, 9, 12, 3, 12, 12, 6, 10, 9, 15, 0, 0}, {14, 15, 1, 4, 12, 2, 8, 5, 0, 14, 0, 0}, {4, 6, 11, 15, 6, 7, 1, 12, 0, 14, 0, 0}, {2, 1, 6, 9, 13, 1, 10, 3, 0, 0, 0, 0}, {11, 3, 15, 11, 6, 1, 5, 13, 15, 0, 0, 0}, {13, 11, 2, 11, 7, 0, 5, 9, 7, 7, 0, 0}, {3, 5, 14, 5, 9, 0, 11, 7, 9, 9, 0, 0}, {4, 8, 12, 14, 6, 7, 1, 12, 1, 15, 0, 0}, {4, 7, 11, 15, 6, 7, 1, 12, 0, 14, 0, 0}, {1, 14, 0, 9, 15, 9, 14, 14, 5, 4, 0, 0}, {0, 11, 14, 7, 14, 8, 12, 13, 4, 3, 0, 0}, {9, 9, 13, 13, 14, 11, 7, 0, 6, 11, 0, 0}, {7, 7, 3, 2, 5, 9, 0, 10, 5, 0, 0}, {3, 8, 5, 15, 9, 5, 7, 3, 7, 12, 0, 0}, {13, 8, 11, 1, 7, 11, 9, 13, 9, 4, 0, 0}, {0, 0, 11, 10, 8, 10, 13, 3, 12, 6, 0, 0}, {0, 0, 5, 6, 8, 6, 3, 13, 4, 10, 0, 0}, {5, 4, 7, 9, 13, 2, 10, 4, 1, 0, 0, 0}, {5, 12, 14, 1, 8, 9, 2, 13, 0, 14, 0, 0}, {7, 10, 3, 10, 0, 8, 6, 15, 15, 0, 0, 0}, {11, 3, 4, 11, 1, 4, 14, 10, 13, 12, 0, 0}, {7, 4, 7, 14, 7, 11, 6, 4, 9, 9, 0, 0}, {15, 14, 15, 1, 3, 8, 0, 8, 5, 2, 0, 0}, {0, 9, 12, 3, 11, 14, 9, 6, 10, 10, 0, 0}, {12, 1, 13, 6, 15, 10, 11, 6, 9, 13, 0, 0}, {2, 13, 3, 9, 0, 5, 4, 9, 6, 3, 0, 0}, {13, 12, 10, 6, 2, 14, 4, 11, 14, 15, 0, 0}, {13, 9, 12, 6, 12, 7, 12, 13, 5, 4, 0, 0}, {2, 7, 15, 7, 13, 6, 5, 14, 14, 0, 0, 0}, {3, 10, 7, 4, 0, 12, 1, 10, 12, 14, 0, 0}, {10, 9, 4, 15, 10, 5, 10, 0, 1, 1, 0, 0}, {3, 14, 2, 7, 15, 1, 11, 8, 12, 10, 0, 0}, {14, 15, 11, 10, 7, 9, 13, 2, 13, 6, 0, 0}, {10, 7, 8, 10, 11, 14, 6, 12, 8, 5, 0, 0}, {10, 0, 6, 14, 6, 10, 6, 4, 9, 9, 0, 0}, {5, 15, 4, 13, 5, 9, 5, 3, 8, 8, 0, 0}, {5, 4, 4, 6, 8, 11, 2, 10, 5, 3, 0, 0}, {15, 15, 5, 6, 8, 6, 3, 12, 4, 9, 0, 0}, {1, 1, 11, 10, 8, 10, 13, 4, 12, 7, 0, 0}, {13, 11, 5, 6, 0, 0, 8, 14, 12, 15, 0, 0}, {7, 13, 8, 0, 7, 7, 12, 8, 8, 2, 0, 0}, {10, 12, 2, 4, 10, 10, 4, 14, 2, 15, 0, 0}, {5, 5, 9, 9, 11, 9, 5, 15, 5, 10, 0, 0}, {11, 11, 7, 7, 5, 7, 11, 1, 11, 6, 0, 0}, {5, 15, 3, 12, 5, 9, 5, 3, 8, 8, 0, 0}, {13, 4, 13, 5, 13, 5, 5, 14, 14, 0, 0, 0}, {14, 2, 9, 0, 8, 12, 8, 5, 10, 10, 0, 0}, {6, 5, 10, 12, 15, 4, 13, 5, 3, 1, 0, 0}, {15, 13, 15, 2, 4, 8, 1, 8, 5, 2, 0, 0}, {11, 14, 4, 9, 0, 3, 13, 9, 14, 13, 0, 0}, {15, 14, 15, 0, 3, 8, 15, 8, 4, 1, 0, 0}, {4, 4, 7, 10, 14, 2, 11, 4, 1, 0, 0, 0}, {8, 3, 5, 13, 13, 0, 0, 7, 5, 0, 0}, {0, 4, 13, 5, 12, 5, 4, 13, 14, 0, 0, 0}, {13, 4, 10, 5, 12, 3, 0, 15, 4, 5, 0, 0}, {3, 12, 6, 11, 4, 13, 0, 1, 12, 11, 0, 0}, {5, 5, 14, 10, 3, 12, 1, 5, 5, 3, 0, 0}, {11, 11, 2, 6, 13, 4, 15, 11, 11, 13, 0, 0}, {8, 7, 7, 9, 10, 13, 4, 11, 6, 3, 0, 0}, {3, 2, 5, 8, 12, 1, 9, 3, 0, 0, 0, 0}, {10, 6, 8, 0, 5, 15, 2, 1, 8, 6, 0, 0}, {2, 14, 0, 6, 11, 14, 11, 15, 10, 5, 0, 0}, {14, 2, 0, 10, 5, 2, 5, 1, 6, 11, 0, 0}, {11, 7, 11, 4, 11, 6, 11, 12, 4, 3, 0, 0}, {11, 1, 7, 1, 6, 13, 12, 3, 0, 15, 0, 0}, {15, 13, 2, 1, 2, 15, 9, 2, 6, 11, 0, 0}, {9, 11, 0, 2, 9, 10, 4, 14, 2, 0, 0, 0}, {13, 5, 9, 0, 9, 12, 8, 5, 10, 10, 0, 0}, {9, 8, 10, 13, 1, 4, 13, 6, 2, 2, 0, 0}, {2, 3, 7, 8, 10, 8, 4, 14, 4, 10, 0, 0}, {14, 13, 9, 8, 6, 8, 12, 2, 12, 6, 0, 0}, {0, 1, 5, 7, 13, 13, 6, 0, 3, 0, 0, 0}, {0, 5, 3, 8, 0, 5, 8, 5, 0, 13, 0, 0}, {1, 12, 15, 5, 13, 0, 10, 7, 11, 10, 0, 0}, {6, 3, 6, 14, 7, 11, 6, 4, 9, 9, 0, 0}, {13, 12, 0, 0, 1, 14, 8, 1, 5, 10, 0, 0}, {1, 9, 13, 4, 12, 15, 10, 7, 11, 10, 0, 0}, {15, 4, 13, 5, 12, 5, 4, 13, 14, 0, 0, 0}, {9, 12, 7, 0, 8, 1, 1, 11, 12, 14, 0, 0}, {11, 6, 8, 0, 5, 15, 2, 1, 8, 6, 0, 0}, {1, 14, 1, 10, 3, 8, 3, 2, 7, 7, 0, 0}, {13, 3, 12, 4, 12, 4, 4, 13, 14, 15, 0, 0}, {6, 12, 11, 1, 10, 0, 4, 2, 14, 12, 0, 0}, {13, 12, 15, 2, 4, 8, 1, 8, 5, 3, 0, 0}, {2, 5, 11, 14, 5, 7, 1, 12, 0, 14, 0, 0}, {1, 13, 15, 8, 14, 8, 13, 13, 4, 3, 0, 0}, {12, 3, 8, 0, 8, 12, 8, 5, 10, 10, 0, 0}, {1, 13, 9, 6, 14, 9, 12, 6, 8, 11, 0, 0}, {9, 5, 7, 15, 4, 14, 1, 1, 8, 5, 0, 0}, {13, 14, 9, 9, 7, 8, 12, 2, 12, 7, 0, 0}, {15, 12, 15, 1, 4, 8, 1, 8, 5, 3, 0, 0}, and {2, 14, 2, 10, 0, 10, 14, 14, 6, 4, 0, 0}.

The third sequence set includes a sequence in a sequence set 3A and/or a sequence in a sequence set 3B.

The sequence set 3A includes some or all of the following sequences, N=18, and M=4:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 1, 3, −1}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {1, −3, −3, 1, 1, 3, −1, −1, 3, 3, 3, 3, 1, −3, −1, 3, −1, 3}, {−3, 1, 1, 3, −1, −1, 3, 3, 3, 3, 1, 3, −1, −1, 3, −3}, {−3, −3, 3, −1, −1, 3, −3, 3, 3, 3, −3, 1, −1, 3, −3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 3, 1, 3, 3, −1, 3, −1, 1, −3, −3}, {−1, 1, 3, 3, −3, 3, 3, 1, −3, −1, 3, −3, 3, −1, −3, 1, 1}, {1, 3, 3, 3, 1, 3, 3, −3, 1, −1, 3, 3, −3, −3}, {−3, 3, 3, 3, −3, 3, 3, 1, −3, −1, 3, 3, −3, 3, −1, −1, 1, 1}, {3, −1, 1, −3, −1, −1, −1, −3, −1, −1, 3, 3, 1, −3, −1, −3, 3, 1}, {3, −1, −3, 1, −1, −1, −1, 1, −1, −1, 3, 3, −3, 1, −1, 1, 3, −3}, {−1, −3, 3, −1, −1, 3, 3, −1, 3, 3, 3, 3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −3, 3, −1, −1, 3, 3, 3, 3, −1, 3, −1, 3, −1}, {−1, 1, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, 3, −1, −1, −3, 3, 1, 3, 3, 3, −3, 1, −3, 1, −3, 1}, {−3, 1, −1, −3, 3, 3, 1, 3, 1, −3, 3, 3, −3, −1, 1, 3}, {3, −3, −1, 1, 3, 3, −3, 3, −1, −3, 3, 1, 3, −1, 1, −3, −1}, {3, 1, −1, −3, 3, 3, 1, 3, −1, 1, 3, 3}, {3, −1, 3, −1, 1, −3, 3, 1, 3, 3, 3, −1, −1, 3, 3, −3, −3, −1, −3, 3}, {3, −1, 3, −1, 1, −3, 3, 1, 1, 1, 3, 3, −1, 1, −1, 1, 3, −3}, {3, −1, −3, 1, −1, 1, 1, 1, 1, −1, 3, 3, −3, 1, −1, −1, −3, −3}, {3, −1, −3, −3, −1, −3, −3, −3, −1, 3, 3, 1, −3, −1, −1, 3, 1}, {3, 1, 3, −1, 3, −3, 3, −1, −3, 3, 3, 3, −3, −1, 1, −3, −1, 1}, {3, −3, 3, −1, 3, 1, 3, −1, 1, 3, 3, 3, 1, −1, −3, 1, −1, −3}, {−1, −1, −1, 3, 3, −1, 3, −1, −1, 3, 3, −3, 3, 3, 3, −1, −1}, {−1, −1, −1, 3, 3, −1, 3, −1, −1, 3, 3, 3, 1, 3, 3, −1, −1}, {−1, 1, 3, −1, 1, −3, −3, 3, −1, 3, 3, 3, −3, −3, −1, −3}, {−1, −3, 3, 1, −1, −3, 1, 1, 3, −1, 3, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, 3, −1, 3, 3, −3, −3, −1, −3, −1, 1}, {1, −3, −1, 1, 3, 3, −3, −3, 1, 3, 3, 1, −1, −3, 3, −3, 1}, {−3, 1, −1, −3, 3, 3, 1, 3, 1, −3, 3, 3, −3, −1, 1, 3, 1, −3}, {3, −1, 1, −3, −1, 3, −3, 3, 1, −3, 3, 3, −3, −1, −1, 1, −3}, {3, −1, −3, 1, −1, 3, 1, 3, −3, 1, 3, 3, 3, 1, −1, −1, −3, 1}, {1, −3, −3, 1, −3, 1, −1, 3, 3, 3, −1, −1, 3, −1, 1, 3, 1, 1, 3}, {−3, 1, 1, −3, 1, 1, −1, −3, 3, 3, 1, −1, −1, −1, 1, 3}, {−1, −1, −1, 3, 3, −1, 3, −3, 3, −1, 3, 3, −1, −1, −1, 3}, {−1, −1, −1, 3, 3, −1, 3, 1, −3, 3, 3, −1, −1, −1, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, −3, 1, −3, 3}, {1, −3, 1, −1, −1, −1, −1, 1, −1, −1, 3, 3, −3, 1, −1, 1, −3}, {−3, 1, −3, −1, −1, −1, −1, −3, −1, −1, 3, 3, 1, −3, −1, −3, 1, 1}, {−3, 1, −3, 3, −1, −1, 3, −1, −3, 3, 3, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, −3, 3, 3, −3, −3, −1, −3, 3, 3}, {3, −3, −1, −3, 1, −1, 3, −1, 1, 3, 3, 3, 1, 1, −1, 1, 3, 3}, {−3, 3, −1, 3, −1, −1, 1, −1, −1, −1, 3, 3, −1, 3, −1, 1, −3, 3}, {1, 3, −1, 3, −1, −1, −3, −1, −1, −1, 3, 3, −1, 1, −1, 1, 3}, {1, 1, −1, 1, −3, −1, 1, −1, 1, 3, 3, −1, 3, 1, −3, −3, −1}, {−3, −3, −1, −3, 1, −1, −3, −1, −1, 3, 3, −1, 3, −3, 1, 1, −1}, {−3, −1, 3, 1, −1, 3, −1, 3, 3, 3, −1, 1, −1, 3, −1, 3}, {1, −1, 3, −3, −1, 3, 3, −1, 3, 3, 3, −1, −3, −1, 3, −1, 3}, {−1, 1, 3, 3, −3, 3, −1, −1, 1, −3, 3, 1, 3, 3, 3, 1, 3}, {−1, −3, 3, 3, 1, 3, −1, −1, −3, 1, 3, −3, 3, 3, 3, −3, 3}, {3, −1, 3, −1, −3, 1, −3, 3, 1, 1, 3, 3, −1, −1, −3, 1, 1, 3}, {3, −1, 3, 1, −3, −1, 3, 3, 3, 3, −1, −3, 1, −3, 3}, {1, 3, −1, −1, 3, −3, −1, −3, 1, 3, 3, 3, −3, 1, −3, 3, −3}, {−3,

3, −1, −1, 3, 1, −1, 1, 3, −3, 3, 3, 3, 3, 1, −3, 1, 3, 1}, {1, 3, −3, 3, 3, 1, 3, 1, 1, −1, 3, 3, −3, 1, −3, −3, −1, 1}, {−3, 3, 1, 3, 3, −3, 3, −3, −3, −1, 3, 3, 1, −3, 1, 1, −1, −3}, {−1, 3, 3, −1, 3, 3, −1, −1, 3, 3, 3, 3, −1, 3, −1, 3, −1, −1}, {3, 3, −3, 1, −3, −1, 3, 3, 1, 1, 3, 3, −1, −1, 3, 1, −3, 3, 3, −3}, {1, 3, 1, −3, 1, −1, 3, −3, −3, 3, 3, −1, 1, −3, 1, 3, 1}, {−3, −1, 3, 3, 1, −3, −1, −3, 3, 1, 3, 3, 3, −1, 3, 3, −3, −1}, {1, −1, 3, 3, −3, 1, −1, 1, 3, −3, 3, 3, 3, −1, 3, 3, 1, −1}, {3, 1, −1, 1, −1, −3, 3, 1, 3, −1, 3, 3, −3, −3, −3, 1, 3, 3}, {3, −3, −1, −3, −1, 1, 3, −3, 3, −1, 3, 3, 1, 1, 1, −3, 3, 3}, {−1, 3, 1, −1, −1, 3, −1, −3, −3, 1, 3, 3, −3, 3, −3, −3, −1, −3}, {−1, 3, −3, −1, −1, 3, −1, 1, 1, −3, 3, 3, 1, 3, 1, 1, −1, 1}, {−1, 1, 3, −1, −1, 3, −1, −1, 3, 3, 3, 3, −1, 3, −1, 3, −1, 1}, {−1, −3, 3, −1, −1, 3, −1, −1, 3, 3, 3, −1, 3, −1, 3, −1, −3}, {−1, −3, −1, −3, −1, 1, 1, 3, 3, −1, 3, 3, 1, 1, −1, −3, 1, −3}, and {−1, 1, −1, 1, −1, −3, −3, 3, 3, −1, 3, 3, −3, −3, −1, 1, −3, 1}.

The sequence set 3B includes some or all of the following sequences, N=24, and M=4:

{−3, −3, −3, 1, 1, −3, −3, 1, 1, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, −3, −3, 1, 1, 1, 1}, {1, 1, −3, 1, −3, −3, 1, −3, 1, 1, −3, 1, 1, 1, −3, 1, 1, 1, −3, −3, −3, −3, 1, 1}, {1, −3, −3, −3, 1, 1, −3, −3, 1, 1, −3, −3, −3, −3, 1, −3, 1, −3, −3, 1, −3, 1, 1}, {3, 3, −3, −3, 1, 3, 3, −3, 3, −1, 3, −1, 3, 3, 1, 1, −3, −1, −1, −3, −3, 1, 1}, {−1, −1, −3, −3, 1, −1, −1, −3, −1, 3, 3, −3, −3, −3, −1, 3, −1, 3, −1, 1, 1, −1, −1, 1, 1}, {3, 3, −1, −3, 1, 3, 1, 1, −1, 3, 3, −3, −3, 3, −3, 1, 3, 3, −1, −3, 1, 3, 1, 1}, {−1, −1, 3, −3, 1, −1, 1, 1, 3, −1, −1, −3, −3, −1, −3, 1, −1, −1, −3, 3, 1, −1, 1, 1}, {−1, 1, −1, 1, −3, −3, 1, 3, 1, 3, 1, 1, −3, −3, 1, −1, 1, −1, 1, −3, −3, 1, 1}, {3, 1, 3, 1, −3, −3, 1, 1, −1, 1, −1, 1, 1, −3, −3, 1, 3, 1, 3, 1, −3, −3, 1, 1}, {1, 3, 3, −1, 1, −1, 1, 1, 1, 3, −1, 3, 1, −1, −3, −3, 1, 3, 3, −1, 1, −1, 1, 1}, {1, −1, −1, 3, 1, 3, 1, 1, 1, −1, 3, −1, 1, 3, −3, −3, 1, −1, −1, 3, 1, 3, 1, 1}, {1, 1, −1, −1, 3, 3, 1, 1, −3, −1, 3, −1, 3, 1, 3, 3, −1, −1, 1, 1, −1, −1, 1}, {1, 1, 3, 3, −1, −1, 1, 1, −3, 3, −1, 3, −1, 1, −1, −1, 3, 3, 1, 1, 3, 3, 1, 1}, {−3, −3, 3, −3, −1, −3, 1, 1, 1, −3, −1, −3, 3, −3, −3, 1, −3, −3, 3, −3, −1, 3, 1, 1}, {−3, −3, −1, −3, 3, −3, 1, 1, 1, −3, 3, −3, −1, −3, 3, 1, −3, −3, −1, 3, 3, −3, 1, 1}, {3, 1, −3, −1, 3, −1, 1, 1, 3, −3, 3, 3, 3, 1, −3, 3, 1, −3, −1, 3, −1, 1, 1}, {−1, 1, −3, 3, −1, 3, 1, 1, −1, −3, −3, −1, −1, −1, 1, −3, −1, 1, −3, 3, −1, 3, 1, 1}, {3, −3, −3, −1, −3, 1, −3, −1, 3, −1, 3, 3, −3, −1, −1, −3, −3, 1, −3, 3, 1, 1}, {−1, −3, −3, 3, −3, 1, −3, 3, −1, 3, −1, −1, −3, 3, 3, −3, −1, 1, −3, −1, 1, 1, 1}, {3, −3, −1, 3, 1, 3, −1, 1, 3, −3, −1, 1, 1, 1, −3, 1, 1, 1}, {−1, −3, 1, 3, 3, 3, −1, 1, −3, −3, −1, 3, −3, −3, −1, 1, −3, 3, −1, 1, 1}, {−1, −1, −3, −3, 3, 3, 3, 3, 1, 3, −3, −3, 3, −1, 1, −3, 3, −1, 3, 3, −1, −3, 1, 1}, {3, 3, −3, −3, −1, −1, −1, −1, 1, −1, −3, −3, −1, 3, 1, −3, −1, 3, −1, −1, 3, −3, 1, 1}, {1, 3, 3, −1, 3, −3, −1, −3, −1, 3, −1, 3, 1, 1, −1, −1, 3, 3, 1, 1}, {1, −1, −1, 3, −1, −3, −3, 3, −1, 3, 1, 1, −1, −1, 1, 1}, {−1, 3, −3, −3, 1, −3, 3, −3, −3, 1, −3, −3, 3, −1, −1, −3, −3, 3, 3, 3, −1, 1, 1}, {3, −1, −3, −3, 1, −3, −1, −3, −3, 1, −3, −3, −1, 3, 3, 3, −1, −3, −1, −1, −1, 3, 1, 1}, {−1, 3, 3, −3, −1, −3, 1, 1, −1, −1, −1, −3, −1, 3, 1, −1, 3, 3, −3, −1, −3, 1, 1, 1}, {3, −1, −1, −3, 3, −3, 1, 1, 3, 3, −3, 3, 1, −3, 1, 3, −1, −1, −3, −3, 3, 1, 1, 1}, {−3, 1, −1, 1, 1, 1, 1, −3, 1, −1, 3, 1, 1, −3, −3, −3, 1, 3, −1, 1, 1, 1, 1}, {1, −3, −1, 3, −3, 3, −3, 1, 3, −1, 1, 1, 3, 1, −3, −1, −3, −1, −3, 1, 1, 1, 1}, {1, −3, 3, −1, −3, −1, −3, 1, 3, 1, 1, −1, −3, −1, 1, 1, −3, −3, −1, 1, 1, 1, 1}, {−3, 1, −1, 3, −3, −3, 1, 3, 1, 3, −1, −3, −3, −3, 1, −1, −3, 3, −1, 1}, {3, −1, 1, −3, 1, −3, −3, 1, 3, 3, 1, −3, −1, −3, 1, 1, 3, 3, 1, −3, 3, 3, 1, 1, 1, 1}, {1, 3, −3, −1, 3, 3, 1, −3, 3, 3, 1, 1, −3, 3, 3, 1, −3, 3, −1, 1, 1, 1}

−1, −3, 1, −3, 3, −1, −3, 1, 1, −1, −1, 1, −3, −1, 3, 1, 3, −3, −3, −3, 1, 1, 1}, {−1, 1, −1, −1, 3, −1, 3, −3, −3, −1, −3, 1, 1, −3, 1, 1, 1, −1, −1, 3, 3, −1, 1, 1}, {3, 1, 3, 3, −1, 3, −1, −3, −3, 3, −3, 1, 1, −3, 1, 1, 1, 3, 3, −1, −1, 3, 1, 1}, {1, −1, −3, −1, 3, 3, 1, −1, 1, 1, −3, 1, 1, 1, 1, 3, −3, −1, −3, −3, −3, −1, 1, 1}, {1, 3, −3, 3, −1, 3, −1, 1, 3, 3, 1, 1, 3, 1, 1, −1, −3, 3, −3, −3, −3, −3, 1, 1}, {−3, −1, −1, 3, −3, 1, 1, 3, −3, 1, 1, 1, 3, 3, 1, −3, 1, −1, −3, −3, 3, 3, 1, 1}, {−3, 3, 3, −1, −3, 1, 1, −1, −3, 1, 1, 1, −1, −1, 1, −3, 1, 3, −3, −3, −1, −1, 1, 1}, {3, −1, −3, −3, 1, 1, −1, 3, −3, 1, −3, −3, −3, 3, −3, 3, 1, −3, −3, −1, −3, 1, 1, 1}, {−1, 3, −3, −3, 1, 1, 3, −1, −3, 1, −3, −3, −3, −1, −3, −1, 1, −3, −3, 3, −3, 1, 1, 1}, {−3, −1, 3, 3, 1, 1, −1, 3, −3, −3, −3, −3, −3, 1, −1, 3, 3, −3, −3, 1, 1}, {−3, 3, −1, −1, 1, 1, 3, −1, 3, 1, −3, −3, −3, −1, −3, −3, 1, 3, −1, −1, −3, −3, 1, 1}, {1, −3, 1, 1, −3, 1, 1, 3, 1, −1, 1, −3, −3, −3, 1, −1, 1, 3, 1, 1, −3, 1, 1, 1}, {1, −3, 1, 1, −3, 1, 1, −1, 1, 3, 1, −3, −3, −3, 1, 3, 1, −1, 1, 1, −3, 1, 1, 1}, {1, −3, −3, −3, 1, 1, −3, −3, −3, 1, −3, −3, −3, 1, −3, 1, 1, −3, −3, 1, −3, 1, 1, 1}, {−1, −1, −1, −3, −1, −3, 3, −3, 3, 3, 3, −1, −3, 1, 3, −3, 3, −3, −1, −1, −3, 3, 1, 1}, {3, 3, 3, −3, 3, −3, −3, −1, −3, −1, −1, −3, 3, −1, −3, 3, −3, −3, 1, 1, 1}, {−3, −3, −3, 1, −3, 1, 1, −3, 1, −3, 1, 1, 1, 1, −3, −3, 1, 1, −3, −3, 1, 1, 1, 1}, {−1, −3, −3, 3, −1, −1, 1, 1, −1, 1, −3, −1, −1, 3, 1, −3, −1, −3, −3, 3, −1, −1, 1, 1}, {3, −3, −3, −1, 3, 3, 1, 1, 3, 1, −3, 3, −3, −3, −3, 1, 1, −1, 3, 3, 1, 1}, {−1, 3, 3, 3, 1, 1, 1, 1, 1, 3, −1, −3, −3, −1, −1, −1, 1}, {1, 3, −3, 1, 3, 1, 1, −1, −3, −3, 1, 3, 1, −1, −3, −3, 1, 1}, {3, −1, −3, −1, −1, 1, 1, 1, 1, 3, −1, 3, 1, 1, −1, −3, 1, −1, −3, −3, −3, 1, 1}, {1, 1, −3, 3, 3, 1, −3, 3, 1, −3, 1, 1, −3, −3, −3, 1, 1, 1, 1, 1}, {1, −1, 1, −3, −3, 1, −3, 1, −3, −3, 1, 1, −3, −3, −3, −3, −3, −1, 1, 1}, {1, 3, 1, −3, −3, 1, −3, 1, −3, −3, −3, −3, −3, −3, 3, 1, 1}, {−1, −1, 1, 1, 1, −3, 3, 3, −1, −1, −1, 1, −3, −1, 1, −1, −3, 1, −3, 3, 1, 3, 1, 1}, {3, 3, 1, 1, 1, −3, −1, −1, 3, 3, 1, −3, −1, −1, −1, −1, 1, 1}, {1, −3, 1, 3, −1, −1, 1, −3, 1, 3, −3, 1, 3, 1, −3, −3}, {1, −3, 1, 3, 3, 1, 1, −3, 1, −3, 1, −1, −1}, {3, −1, −1, −3, −3, −3, 1, 1, 3, −1, −3, −1, 1, 1, 1, 1}, {−1, 3, −3, −3, 1, 1, −1, 3, 1, −1, −1, −1, −1, 3, 1, −1, −1, −1, 1, 1}, {1, 3, 3, 1, 1, 1, −3, 3, −3, 1, 3, 1, 3, 3, −1, −1, 3, 3, −1, −3, 1, 1}, {3, −1, 1, 3, 1, −1, 1, 1, 3, −1, 3, −1, −1, −1, −1, 3, −3, 3, 1, −1, 1, 1}, {−3, −1, −3, 1, −3, 3, −1, 1, 3, 1, 1, 1, 1, 3, 3, 1, −1, −1, −3, 1, −3, 3, 1, 1}, {−3, 3, −3, 1, −3, −1, 3, 1, 1, 1, −1, −1, 1, 3, 3, −3, −3, −1, 1, 1}, {1, −3, −3, −1, −1, 1, 1, −3, 1, −3, 1, 1, 1, −3, −3, 1}, {1, −3, −3, 1, 3, 3, 1, −3, 1, −3, 1, −1, −1, 1, 1, 1, −3, −3, 1, 3, 3, 1, 1}, {3, −1, −1, −3, −3, −3, 1, 1, −1, −1, 3, −1, −3, −1, −1, −1, −3, 1, −1, −1, −1, 1, 1}, {−1, 3, 3, −3, −3, −3, 1, 1, −1, 3, 1, −1, 3, −3, 3, 3, 3, −1, 1, 3, 3}

3, 1, 1}, {−1, 1, −3, 1, −1, −3, 1, −3, −3, 1, −1, −1, −3, −3, −1, −1, 1, −3, 1, 3, 3, −3, 1, 1}, {3, 1, −3, 1, 3, −3, 1, −3, −3, 1, 3, 3, −3, −3, 3, 3, 1, −3, 1, −1, −1, −3, 1, 1}, {3, 3, 1, −3, −1, −3, 1, −1, 1, −3, −3, −3, 1, 1, −3, 1, 1, −1, 1, 1, 1, 1}, {−1, −1, 1, −3, −3, −3, 1, 3, −1, −3, −3, 1, 1, −3, 1, 3, 1, 1, 1, 1, 1}, {−1, 1, 3, 1, 3, −3, −1, 3, −1, −1, 1, 3, −1, −3, 1, −1, −1, −3, −3, −3, 3, 1, 1}, {3, 1, −1, 1, −1, −3, 3, −1, 3, 3, 1, −1, 3, −3, 1, 3, 3, −3, −3, −3, −1, 1, 1}, {1, −1, −3, −3, 1, −1, 3, 3, 1, −1, −3, −1, −3, 1, 3, −3, 1, 3, 3, 3, −3, 1, 1}, {1, 3, −3, −3, 1, 3, −1, −1, 1, 3, −3, 3, −3, 1, −1, −3, 1, −1, −1, −1, −3, 1, 1}, {3, −1, −3, −3, −3, 3, −3, 3, 3, 3, 1, −3, 1, −3, −3, 3, −1, −1, 1, 3, −3, −1, 1}, {−1, 3, −3, −3, −3, −1, −3, −1, −1, −1, 1, −3, 1, −3, −3, −1, 3, 3, 1, −1, −3, 3, 1}, {3, −3, −3, 1, −3, 1, 1, −3, 1, −1, 3, −3, −3, −3, 3, −1, −1, −3, 3, −3, −1, 1, 1}, {−1, −3, −3, 1, −3, 1, 1, −3, 1, 3, −1, −3, −3, −3, −1, 3, 3, −3, −1, −1, −3, 3, 1, 1}, {1, 3, 3, 1, −3, 3, 1, 3, 3, 3, −3, −3, 1, 3, 1, −1, −3, −3, 1, −3, 3, 1, 1}, {1, −1, −1, 1, −3, −1, 1, −1, −1, −1, −3, −3, 1, −1, 1, 3, 3, −1, −3, 1, −3, −1, 1, 1}, {−3, −3, −1, 3, −3, −1, −1, 3, −3, −1, 3, 1, −1, −3, −1, 3, 1, 3, 3, 3, 1, 1, 1, 1}, {−3, −3, 3, −1, −3, 3, 3, −1, −3, 3, −1, 3, −3, 3, −1, 1, −1, −1, −1, 1, 1, 1, 1}, {3, 3, 3, −1, 1, 3, 3, 3, 3, 1, −3, −1, −3, 1, −3, 1, 3, 3, 1, −3, −3, 1, 1}, {−1, −1, −1, 3, 1, −1, −1, −1, −1, 1, −3, 3, −3, 1, −3, −3, 1, −1, 1, −3, −3, 1, 1}, {−3, −3, −1, 3, −3, −1, −1, 3, 1, 3, 3, 3, 1, 1, −1, 1, −1, −1, 1, 1, 3, −3, −1, −3, 1, 1}, {−3, −3, −1, −3, 3, 1, −3, −3, −1, 3, −1, 1, −1, −1, 1, 1, 3, −3, −1, 1, 1}, {3, 1, 1, 1, −1, 1, 1, −1, −3, 1, 1, 3, −1, 1, −1, 3, 3, −3, −1, −3, −1, 1, 1}, {−1, 1, 1, 1, 3, 1, 1, 3, −3, 1, 1, −1, 3, 1, 3, −1, −1, −1, −3, −3, 3, 1, 1}, {1, 1, 1, −1, −1, 1, −1, −3, −3, 1, −3, 3, −1, 1, −3, −3, 3, −3, −1, −1, −1, 1, 1, 1}, {1, 1, 1, 3, 3, 1, 3, −3, −3, 1, −3, −1, 3, 1, −3, −3, −1, −3, 3, 3, 3, 1, 1, 1}, {1, 1, 3, 1, 1, −1, 1, −1, 1, −1, 3, −1, 1, 3, −3, 3, 1, −1, −3, −3, −3, −3, 1, 1}, {1, 1, −1, 1, 1, 3, 1, 3, −1, 3, 1, −1, −3, −1, 1, 3, −3, −3, −3, −3, 1, 1}, {1, 3, −3, −3, 3, −3, −1, 3, 3, 1, 3, −3, 3, −1, 1, −1, −3, −1, −1, 3, 1, −1, 1, 1}, {1, −1, −3, −3, −1, −3, 3, −1, −1, 1, −3, −1, 3, 1, 3, −3, 3, 3, −1, 1, 3, 1, 1}, {−1, −1, 3, −1, −1, −3, 1, 3, −3, −1, 3, 1, −3, 1, 1, 1, 1, −3, −3, 3, 1, 1}, {3, 3, −1, 3, 3, −3, 1, −1, −3, 3, −1, 1, −3, 1, 1, 1, 1, −3, −3, −1, 1, 1, 1, 1}, {3, −3, −1, 1, −1, 3, 1, 1, 3, 1, 3, 1, −1, −1, −3, 1, 3, −3, −1, 1, −1, 3, 1, 1}, {−1, −3, 3, 1, 3, −1, 1, 1, −1, 1, −3, 3, −3, 1, −1, −3, 3, 1, 3, −1, 1, 1}, {3, −1, 3, −1, −3, 1, −3, −3, −1, 1, −3, 3, 3, 3, 1, 1, 3, 1, 1, 3, −1, 3, −3, −1, −1, 1, 1}, {−1, 3, −1, 3, 1, 3, −3, −3, −1, −3, 1, 1, −1, 1, −3, −3, −1, 1, 1, 1, 1}, {−3, 2, −1, 3, 3, −1, 3, 1, 1}, {−3, −1, 3, −1, −3, 1, −1, −1, −3, −1, 1, 1, −3, 3, −3, 1, 3, −3, −1, 1, 1}, {−1, 3, −1, 3, −3, 1, 3, −3, 1, −3, 3, −1, −3, −3, 3, 3, 1, 1, 1, 1}, {−1, −3, 1, 3, −1, 3, 1, −3, 3, 3, 1, 1, 1, 1}, {−1, −3, 3, 3, −3, 1, 3, 3, −1, 3, 3, 1, 1, 1}, {−1, 3, 3, 3, −1, 1, −3, 1, −1, −3, −3, −1, 3, 3, 1, 1, 1}, {3, −1, 3, 3, −1, −3, −1, 3, −1, 1, 1, 1, 1, 1}, {−1, −3, 1, 3, −3, −1, −1, 1, 3, −3, −3, −1, 3, 3, −3, −1, −3, 3, −3, −1, 1, −3, 3}, {1, −3, −1, 1, 3, 3, −1, 1, −3, −1, −3, 1, 3, 3, 3, 1, 1, 1}

−3, −3, 1, 3, 1, −1, 1, 1, −3, 1, 1, −1, 1, 3, 1, 1}, {−1, 1, 3, 3, 1, −3, 3, −3, 3, −1, −1, 1, 3, 1, 1, −1, 1, −1, −1, 3, 3, −3, 1, 1}, {3, 1, −1, −1, 1, −3, −1, −3, −1, 3, 3, 1, −1, 1, 1, 3, 1, 3, 3, −1, −1, −3, 1, 1}, {−3, 1, 1, 3, 3, 1, −3, −3, 1, 3, −1, 3, 3, 3, −3, −1, −3, 3, −3, 3, 1, 1, 1, 1}, {−3, 1, 1, −1, −1, 1, −3, −3, 1, −1, 3, −1, −1, −1, −3, 3, −3, −1, −3, −1, 1, 1, 1, 1}, {1, 3, 3, −1, 1, −1, −3, 3, 1, 3, −1, −3, 1, 3, −3, 3, 3, −3, 3, −3, −1, −1, 1, 1}, {1, −1, −3, 1, 3, −3, −1, 1, −1, 3, −3, 1, −1, −3, −1, −1, −3, −1, −3, 3, 3, 1, 1}, {−3, −3, −3, −3, 1, 1, −1, 1, −3, 1, 3, 1, −1, −3, −1, −1, 1, −3, −3, 1, 1, −3, 1, 1}, {−3, −3, −3, −3, 1, 1, 3, 1, −3, 1, −1, 1, −3, −3, 3, 1, −3, −3, 1, 1, −3, 1, 1}, {−1, 3, 1, 1, −1, 3, 3, 1, 3, −3, −3, −1, 1, 3, 1, −1, −3, −1, −3, −3, 3, 3, 1, 1}, {3, −1, 1, 1, 3, −1, −1, 1, −1, −3, −3, 3, 1, −1, 3, −1, 1, −3, −3, 3, −1, −1, −1, 1, 1}, {3, −3, −1, 3, 3, −1, −1, −3, 1, 3, 1, −3, −1, −1, −3, −1, −1, −3, 1, 1, −3, 1, 1}, {−1, −3, 3, −1, −1, −1, 3, 3, −3, 1, −1, 1, −3, 3, 3, −3, 3, 3, −3, 1, 1, −3, 1, 1}, {−1, 1, 1, −1, −3, −3, 1, 1, 3, 1, 1, 3, 1, −3, 1, −3, −1, 1, 1, −1, −3, −3, 1, 1}, {3, 1, 1, 3, −3, 1, 1, −1, 1, 1, −1, 1, −3, 1, 3, 1, 1, 3, −3, 1, 1}, {3, 1, −3, 3, 1, 1, −3, −3, −1, 1, −1, −3, 1, 3, −1, 1, −1, −1, −3, −1, −1, 1, 1, 1}, {−1, 1, −3, −1, 1, 1, −3, −3, 3, 1, 3, −3, 1, −1, 3, 1, 3, 3, −3, 3, 3, 1, 1, 1}, {1, −3, −3, 1, 3, 3, 1, 1, −3, 1, 1, −3, −3, −3, −1, 1, 1, −3, −1, 1}, {1, −3, −3, 1, −1, −1, 1, −1, 1, 1, −3, 1, 1, 3, −3, −3, −1, 1, −1, −3, −1, 3, 1, 1, 1}, {3, −3, −1, 3, −1, −3, 1, 1, 3, −1, −1, 3, 1, −1, −3, −3, 3, −1, −3, 1, 1}, {−1, −3, 3, −1, 3, −3, 1, 1, −1, −3, −1, 3, 3, 1, −3, 3, −1, 3, −3, 1, 1}, {−3, 1, −3, −1, −1, 3, −1, −1, −1, −3, −1, −1, 1, −3, 3, −1, −3, −1, −1, −3, 3, 1, 1}, {−3, 1, −3, 3, 3, −1, 3, 3, −3, 3, 3, 1, −3, −1, −1, 3, −1, 3, 3, −3, 1, 1}, {−3, 3, −3, −1, 3, −1, 3, 1, 1, −3, 1, −3, −3, −1, 1, −1, −3, −1, −1, −3, 3, 1, 1, 1}, {−3, −1, −3, 3, −1, 3, −1, 1, 1, −3, 1, −3, −3, 3, 1, 3, 3, 3, −3, −1, 1, 1}, {−1, −3, −3, −1, −1, 3, 1, 1, −1, 1, −3, 3, −1, −1, 1, −3, −1, −3, −3, −1, −1, 3, 1, 1, 1}, {3, −3, 3, 3, −1, 1, 1, 3, 1, −3, −1, 3, 3, 1, −3, −3, −3, 3, 3, −1, 1, 1, 1}, {3, −1, −1, −3, −3, 1, 3, −1, 1, −3, −3, −3, −1, −1, −3, 3, −1, −3, 1, 3, 3, 1, 1}, {−1, 3, 3, −3, −3, −3, 1, −1, 3, 1, −3, −3, −3, 3, −1, −1, 1, 1}, {3, −1, −1, 1, 3, 1, 1, −1, −1, 3, 1, −3, 3, 1, −3, −1, −3, −1, −3, 1, 1}, {−1, 3, 3, 1, 1, −1, 1, 1, 3, 3, −1, 1, −3, −1, −3, 1, −1, 3, 3, 1, 1, −1, 1, 1}, {1, 3, 1, 1, 3, −1, 3, 3, 1, −3, 1, −3, −1, −1, −3, −3, 1, 1, 3, 3, −3, −1, 1, 1}, and {1, −1, 1, 1, −1, 3, −1, −1, 1, −3, 1, −3, 3, 3, −3, −3, 1, 1, −1, −1, −3, 3, 1, 1}.

A PAPR of a sequence $\{f_n\}$ that corresponds to a sequence in the set 3A and on which filtering is performed by using a parameter $\alpha=0.28$ is lower than 2.0 dB.

A PAPR of a sequence $\{f_n\}$ that corresponds to a sequence in the set 3B and on which filtering is performed by using a parameter $\alpha=0.28$ is lower than 2.0 dB.

An equivalent sequence of the sequence $\{s_n\}$ in each sequence set described above may be represented by $\{q_n\}$. When M=4, the equivalent sequence of $\{s_n\}$ is $\{q_n\}$ in the equivalent sequence $\{q_n\}$, $q_n=s_n+u_n(\mod 8)$, and in a sequence $\{u_n\}$ including $u_n$, $u_n=f+g\cdot n(\mod 8)$, $f \in \{0,2,4,6\}$, and $g \in \{0,2,4,6\}$, or when M=12 or 16, the equivalent sequence of $\{s_n\}$ is $\{q_n\}$, in the equivalent sequence $\{q_n\}$, $q_n=s_n+u_n(\mod M)$, and in a sequence $\{u_n\}$ including $u_n$, $u_n=f+g\cdot n(\mod M)$, $f \in \{0, 1, 2, \ldots M-1\}$; and $g \in \{0, 1, 2, \ldots, M-1\}$.

In one embodiment, when M=4, the sequence $\{u_n\}$ including $u_n$ includes:

$u_n=f+g\cdot n(\mod 8)$, where n=0, 1, ..., or N−1, N is a sequence length, $f \in \{0,2,4,6\}$ and $g \in \{0,2,4,6\}$.

For example, when N is 24, and M=4, $\{u_n\}$ includes the following 16 sequences:

{0, 0, 0, 0, 0, 0, 0, 0, 0, 0, 0, 0, 0, 0, 0, 0, 0, 0, 0, 0, 0, 0};

{0, 2, 4, 6, 0, 2, 4, 6, 0, 2, 4, 6, 0, 2, 4, 6, 0, 2, 4, 6, 0, 2, 4, 6};

{0, 4, 0, 4, 0, 4, 0, 4, 0, 4, 0, 4, 0, 4, 0, 4, 0, 4, 0, 4, 0, 4, 0, 4};

{0, 6, 4, 2, 0, 6, 4, 2, 0, 6, 4, 2, 0, 6, 4, 2, 0, 6, 4, 2, 0, 6, 4, 2};

{2, 0, 6, 4, 2, 0, 6, 4, 2, 0, 6, 4, 2, 0, 6, 4, 2, 0, 6, 4};

{2, 2, 2, 2, 2, 2, 2, 2, 2, 2, 2, 2, 2, 2, 2, 2, 2, 2, 2, 2, 2, 2, 2, 2};

{2, 4, 6, 0, 2, 4, 6, 0, 2, 4, 6, 0, 2, 4, 6, 0, 2, 4, 6, 0};

{2, 6, 2, 6, 2, 6, 2, 6, 2, 6, 2, 6, 2, 6, 2, 6, 2, 6, 2, 6, 2, 6, 2, 6};

{4, 0, 4, 0, 4, 0, 4, 0, 4, 0, 4, 0, 4, 0, 4, 0, 4, 0, 4, 0, 4, 0, 4, 0};

{4, 2, 0, 6, 4, 2, 0, 6, 4, 2, 0, 6, 4, 2, 0, 6, 4, 2, 0, 6};

{4, 4, 4, 4, 4, 4, 4, 4, 4, 4, 4, 4, 4, 4, 4, 4, 4, 4, 4, 4, 4, 4, 4, 4};

{4, 6, 0, 2, 4, 6, 0, 2, 4, 6, 0, 2, 4, 6, 0, 2, 4, 6, 0, 2};

{6, 0, 2, 4, 6, 0, 2, 4, 6, 0, 2, 4, 6, 0, 2, 4, 6, 0, 2, 4};

{6, 2, 6, 2, 6, 2, 6, 2, 6, 2, 6, 2, 6, 2, 6, 2, 6, 2, 6, 2, 6, 2};

{6, 4, 2, 0, 6, 4, 2, 0, 6, 4, 2, 0, 6, 4, 2, 0, 6, 4, 2, 0}; and

{6, 6, 6, 6, 6, 6, 6, 6, 6, 6, 6, 6, 6, 6, 6, 6, 6, 6, 6, 6, 6, 6, 6, 6}.

For example, a sequence {−3, 3, 1, −1, 1, −1, −3, −1, 3, −3, −3, −1, 1, 3, −3, 3, 3, −1, 3, −3, 3, −3, −3, −3} is equivalent to the following 16 sequences:

{1, 1, 1, 1, −3, −3, −3, 1, −1, 3, −3, 1, −3, 1, −3, −3, −1, −3, 3, −1, −1, 3, −3, −1};

{1, 3, −3, −1, −3, −1, 1, −1, −1, −3, 1, −1, −3, 3, 1, 3, −1, −1, −1, −3, −1, −3, 1, −3};

{1, −3, 1, −3, −3, 1, −3, −3, −1, −1, −3, −3, −3, −3, 1, −1, 1, 3, 3, −1, −1, −3, 3};

{1, −1, −3, 3, −3, 3, 1, 3, −1, 1, 1, 3, −3, −1, 1, −1, −1, 3, −1, 1, −1, 1, 1, 1};

{3, 1, −1, −3, −1, −3, 3, −3, 1, 3, 3, −3, −1, 1, 3, 1, 1, −3, 1, 3, 1, 3, 3, 3};

{3, 3, 3, 3, −1, −1, −1, 3, 1, −3, −1, 3, −1, 3, −1, −1, 1, −1, −3, 1, 1, −3, −1, 1};

{3, −3, −1, 1, −1, 1, 3, 1, 1, −1, 3, 1, −1, −3, 3, −3, 1, 1, 1, −1, 1, −1, 3, −1};

{3, −1, 3, −1, −1, 3, −1, −1, 1, 1, −1, −1, −1, −1, 3, 1, 3, −3, −3, 1, 1, −1, −3};

{−3, 1, −3, 1, 1, −3, 1, 1, 3, 3, 1, 1, 1, 1, 1, −3, 3, −3, −1, −1, 3, 3, 1, −1};

{−3, 3, 1, −1, 1, −1, −3, −1, 3, −3, −3, −1, 1, 3, −3, 3, 3, −1, 3, −3, 3, −3, −3, −3};

{−3, −3, −3, −3, 1, 1, 1, −3, 3, −1, 1, −3, 1, −3, 1, 1, 3, 1, −1, 3, 3, −1, 1, 3};

{−3, −1, 1, 3, 1, 3, −3, 3, 3, 1, −3, 3, 1, −1, −3, −1, 3, 3, 3, 1, 3, 1, −3, 1};

{−1, 1, 3, −3, 3, −3, −1, −3, −3, 3, −1, −3, 3, 1, −1, 1, −3, −3, −3, 3, −3, 3, −1, 3};

{−1, 3, −1, 3, 3, −1, 3, 3, −3, −3, 3, 3, 3, 3, 3, −1, −3, −1, 1, 1, −3, −3, 3, 1};

{−1, −3, 3, 1, 3, 1, −1, 1, −3, −1, −1, 1, 3, −3, −1, −3, −3, 1, −3, −1, −3, −1, −1, −1}; and {−1, −1, −1, −1, 3, 3, 3, −1, −3, 1, 3, −1, 3, −3, 3, −3, 3, 1, −3, −3, 1, 3, −3}.

Herein, an equivalent sequence of $\{s_n\}$ is $\{q_n\}$, and a difference between a sequence $\{u \cdot e^{\pi j \cdot s_n/4}\}$ and a sequence $\{u \cdot e^{\pi j q_n/4}\}$ is a constant, or a constant and a cyclic shift transformation. Therefore, a maximum value of an absolute value of a cyclic shift autocorrelation value between the two sequences is 1. Based on a definition, a sequence is equivalent to the sequence itself.

Figure 2:
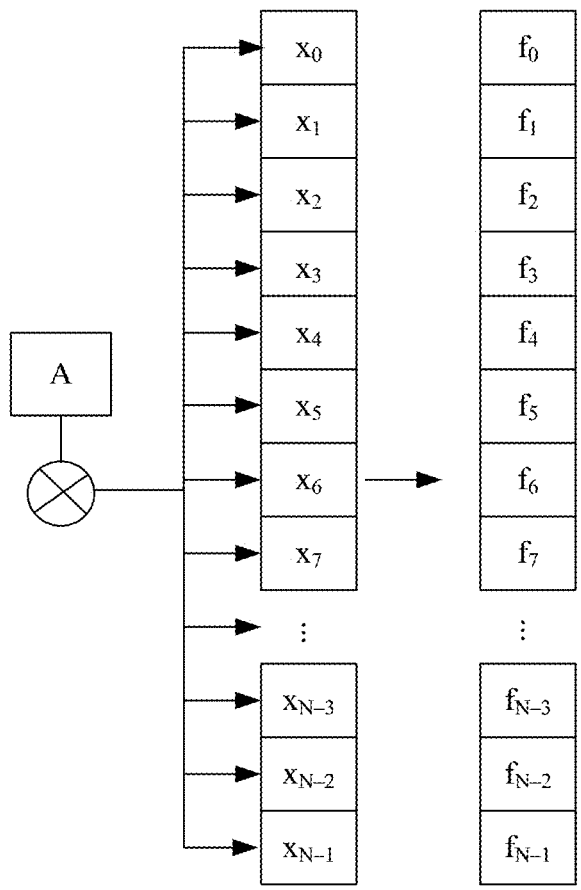
FIG. 2 is a schematic diagram of determining a sequence $\{f_n\}$ by a terminal device according to an embodiment of this application.

In one embodiment, a process in which the terminal device determines the sequence $\{f_n\}$ including the N elements after accessing the network may be shown in FIG. 2. A specific procedure is as follows:

The terminal device determines the sequence $\{x_n\}$ and A. The value of n ranges from 0 to N−1, and A is a non-zero complex number. The sequence $\{x_n\}$ may be stored in the terminal device, or may be configured by the network device for the terminal device, or may be obtained by the terminal device through calculation based on a predefined formula. For example, the sequence $\{x_n\}$ is obtained by using an element $x_n = u \cdot e^{\rho_M \pi \cdot j \cdot s_n/M}$ in the $\{x_n\}$ disclosed above, where u is a non-zero complex, M=4, 12, or 16, $\rho_M$ is a real number, $\rho_M$ is 1 or −1 when M=4, and $\rho_M$=2 or −2 when M=12 or 16. A sequence $\{f_n = A \cdot x_n\}$ is obtained by separately multiplying A by $x_n$. A value range of A is $\{1, -1, j, -j\}$.

Operation S102. The terminal device maps the sequence $\{f_n\}$ including the N elements to N subcarriers, to generate a first signal, and sends the first signal to a network device.

Herein, performing of operation S102 is mainly as follows: The terminal device maps the N elements in the configured sequence $\{f_n\}$ to the N subcarriers respectively, to generate the first signal, and sends the first signal to the network device.

Figure 3:
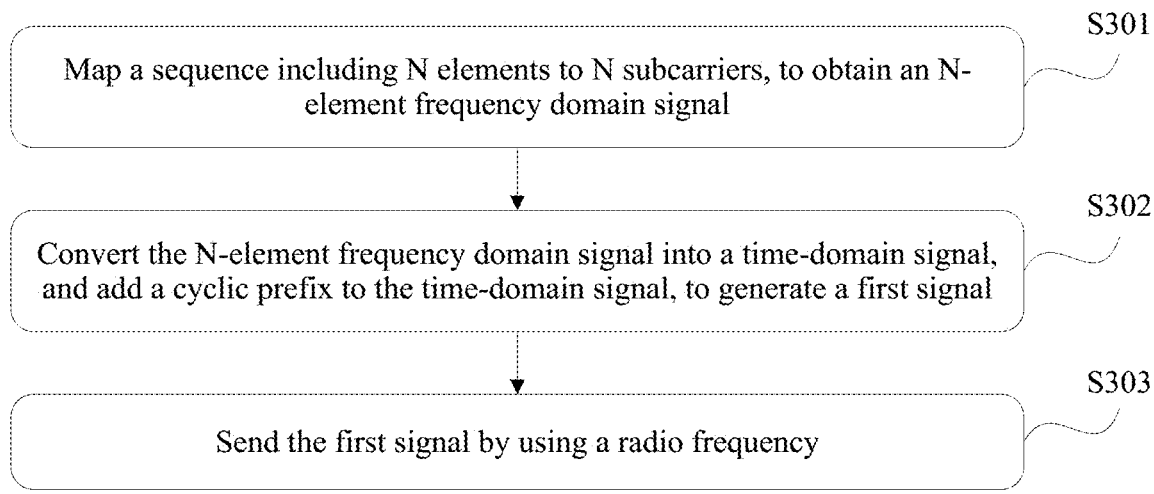
FIG. 3 is a schematic flowchart of generating and sending a first signal by a terminal device according to an embodiment of this application.

In one embodiment, a specific process in which a terminal maps the sequence $\{f_n\}$ including the N elements to the N subcarriers, to generate the first signal, and sends the first signal to the network device is shown in FIG. 3, and includes the following operations.

Operation S301. The terminal device maps the sequence $\{f_n\}$ including the N elements to the N subcarriers, to obtain an N-element frequency domain signal (that is, a frequency domain signal including the N elements).

Figure 4A:
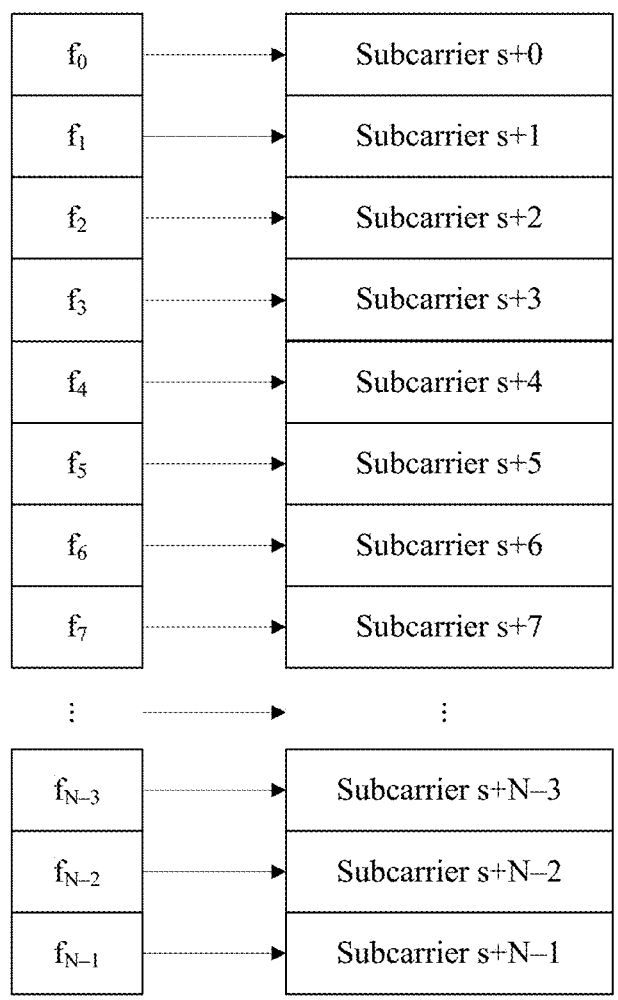
FIG. 4a and FIG. 4b are schematic diagrams of mapping a sequence $\{f_n\}$ including N elements to N subcarriers according to an embodiment of this application.
Figure 4B:
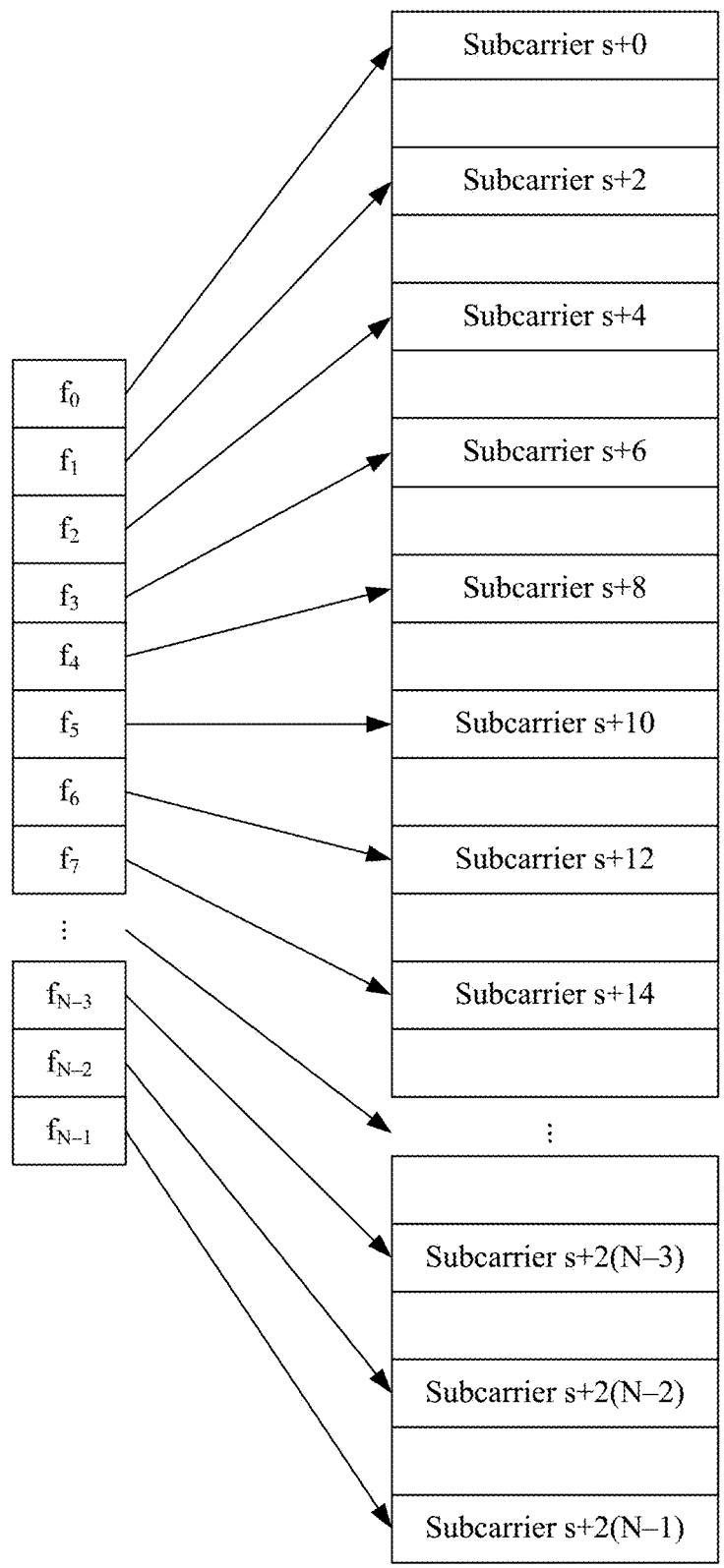

In FIG. 4a and FIG. 4b disclosed in the following embodiments of this application, s indicates an index of a first subcarrier, in subcarriers in a communications system, in the N subcarriers to which the sequence $\{f_n\}$ is mapped.

In one embodiment, the terminal device maps the sequence $\{f_n\}$ including the N elements to N consecutive subcarriers. As shown in FIG. 4a, in one embodiment, elements $f_0$ to $f_{N-1}$ in the sequence $\{f_n\}$ are mapped to N consecutive subcarriers respectively, and the subcarriers are numbered s+0, s+1, . . . , and s+N−1.

In one embodiment, the terminal device successively maps the N elements in the sequence $\{f_n\}$ to the N subcarriers in descending order of the subcarriers. One element in the sequence $\{f_n\}$ is mapped to one frequency domain subcarrier. The frequency domain subcarrier is a minimum unit of a frequency domain resource, and is used to carry data information.

In one embodiment, the terminal device successively maps the N elements in the sequence $\{f_n\}$ to the N subcarriers in ascending order of the subcarriers. Mapping one element in the sequence $\{f_n\}$ to one subcarrier means that the element is carried on the subcarrier. After mapping, when the terminal device sends data by using a radio frequency, it is equivalent that the element is sent on the subcarrier. In the communications system, different terminal devices may occupy different subcarriers to send data. Locations of the N subcarriers in a plurality of subcarriers in the communications system may be predefined or may be configured by the network device by using signaling.

In one embodiment, the N elements in the sequence $\{f_n\}$ may alternatively be mapped to N equally spaced subcarriers respectively. As shown in FIG. 4b, in one embodiment, spacings between the N subcarriers are 1, and the N subcarriers are equally spaced in frequency domain. A spacing between subcarriers to which elements $f_0$ to $f_{N-1}$ in the sequence $\{f_n\}$ are mapped is one subcarrier. Specifically, the elements $f_0$ to $f_{N-1}$ in the sequence $\{f_n\}$ are mapped to N equally spaced subcarriers respectively, and the subcarriers are numbered s+0, s+2, . . . , and s+2(N−1).

In this embodiment of this application, a manner of mapping the N elements in the sequence $\{f_n\}$ to the N subcarriers respectively is not limited to the foregoing manner.

Operation S302. Convert the N-element frequency domain signal into a time-domain signal through inverse fast Fourier transformation (IFFT), and add a cyclic prefix to the time-domain signal, to generate the first signal.

Operation S303. Send the first signal by using a radio frequency.

In one embodiment, when operation S302 is performed, the time-domain signal obtained by the terminal device by performing IFFT on the generated N-element frequency domain signal is an OFDM symbol. When operation S303 is performed, the terminal device sends the first signal by using the radio frequency. In other words, the terminal device sends, on the N subcarriers, the first signal that carries the sequence $\{f_n\}$.

In one embodiment, the terminal device may send, on one OFDM symbol, the first signal carrying the sequence $\{f_n\}$, or may send, on a plurality of OFDM symbols, the first signal carrying the sequence $\{f_n\}$.

In one embodiment, the first signal is a reference signal. Specifically, the first signal may be UCI and a DMRS. Alternatively, the first signal may be acknowledgement (ACK) information, negative acknowledgement (NACK) information, or uplink scheduling request (SR) information. This embodiment of this application does not limit the first signal to including only the foregoing information.

In one embodiment, the first signal is used to carry communication information. In one embodiment, the communication information may be carried in a sequence selection manner, or may be carried in a sequence modulation manner, but is not limited thereto.

In one embodiment, in the sequence selection manner, $2^n$ orthogonal sequences are allocated for one terminal device. In one embodiment, the $2^n$ orthogonal sequences may be $2^n$ cyclic shifts of one root sequence, and the $2^n$ orthogonal sequences can carry n-bit information. For example, the $2^n$ orthogonal sequences are four sequences numbered 0, 1, 2, and 3, 00 corresponds to a sequence 0, 01 corresponds to a sequence 1, 10 corresponds to a sequence 2, and 11 corresponds to a sequence 3. In this case, the four sequences can carry two-bit information.

It should be noted that for the sequence selection manner, different cyclic shifts are indicated by using different values of a in the sequence $\{f_n\}$. In one embodiment, a may carry different information.

In one embodiment, in the sequence modulation manner, one sequence is allocated for one user, and a modulation symbol is generated for information that needs to be transmitted by the user. The modulation symbol includes but is not limited to a BPSK symbol, a QPSK symbol, an 8 QAM symbol, a 16 QAM symbol, and the like. The modulation symbol is multiplied by the sequence, to generate an actual to-be-sent sequence. For example, one BPSK symbol may be 1 or −1, and for one sequence $\{f_n\}$, a sent sequence may be $\{f_n\}$ or $\{-f_n\}$ after modulation is performed based on the BPSK symbol.

In one embodiment, according to the description corresponding to FIG. 2 in the specification, after accessing the network, the terminal device may determine, based on A and the sequence $\{x_n\}$, the sequence $\{f_n\}$ that includes the N elements and that is configured by the network device.

It should be noted that for the sequence modulation manner, different information is carried by using different values of A in the sequence $\{f_n\}$.

In one embodiment, A may be a modulation symbol. In this case, A is obtained after a data information bit or control information bit is modulated. A is carried on the N elements included in the sequence $\{f_n\}$, and A does not change with n.

In one embodiment, A is a constant. For example, A=1. For example, A may be a symbol known to both the terminal device and the network device. Alternatively, A may indicate an amplitude.

It should be noted that, A is a constant in a transmission time unit does not mean that A is fixed, and A may change when the first signal is sent at different moments. For example, all the N elements included in the sequence $\{f_n\}$ or the sequence $\{x_n\}$ are a reference signal, and A is an amplitude of the reference signal. When the terminal device sends the first signal for a first time, the first signal may be sent based on A=1. When the terminal device sends the first signal for a second time, the first signal may be sent based on A=2.

Operation S103. The network device receives the first signal carried on the N subcarriers, to obtain the N elements in the sequence $\{f_n\}$.

It can be learned from operation S102 that the first signal is generated by mapping the N elements in the sequence $\{f_n\}$ including the N elements to the N subcarriers respectively. For a detailed description of the sequence $\{f_n\}$, refer to corresponding descriptions in operations S101 and S102. Details are not described herein again.

In one embodiment, in performing of operation S103, a process in which the network device receives the first signal carried on the N subcarriers is as follows: The time-domain signal is obtained and the cyclic prefix is removed. Then M-element FFT is performed on a signal obtained after the cyclic prefix is removed, to obtain the N-element frequency domain signal, where M is greater than or equal to N. Then the terminal device receives the first signal carried on the N subcarriers, where the first signal is the sequence $\{f_n\}$ including the N elements. For example, the receiving device receives the signal on the N subcarriers based on locations that are configured by a base station or predefined and that are of the N subcarriers in subcarriers in the communications system.

In one embodiment, after accessing the network, the terminal device sends a reference signal or a control channel by using the configured sequence $\{f_n\}$, and the network device receives the reference signal or the control channel by using the sequence $\{f_n\}$ configured for the terminal device.

Operation S104. The network device processes the first signal based on the N elements in the sequence $\{f_n\}$.

Figure 5:
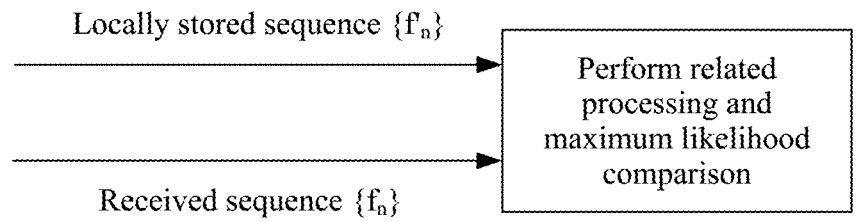
FIG. 5 is a schematic diagram of processing a first signal by a network device according to an embodiment of this application.

In one embodiment of operation S104, FIG. 5 is a schematic diagram of a process in which the network device processes the first signal. The network device obtains all possible sequences by traversing a locally stored sequence $\{f'_n\}$, and separately performs related processing and maximum likelihood comparison on the obtained sequence {f$_n$} and all the possible sequences of the sequence {f'$_n$}, to obtain data transmitted by the terminal device.

With reference to the description corresponding to operation S102 in the specification, a value combination of two-bit information is {(0, 0), (0, 1), (1, 0), and (1, 1)}. With reference to FIG. 2, when the two-bit information is (0, 0), the obtained sequence {f'$_n$} is a sequence {f'$_{1,n}$}; when the two-bit information is (0, 1), the obtained sequence {f'$_n$} is a sequence {f'$_{2,n}$}; when the two-bit information is (1, 0), the obtained sequence {f'$_n$} is a sequence {f'$_{3,n}$}; or when the two-bit information is (1, 1), the obtained sequence {f'$_n$} is a sequence {f'$_{4,n}$}. The sequence {f$_n$} is separately correlated with {f'$_{1,n}$}, {f'$_{2,n}$}, {f'$_{3,n}$}, and {f'$_{4,n}$}, to obtain four correlation values. A value of the 2 bits of information corresponding to a largest correlation value is the data obtained by the network device. For example, if the largest correlation value is obtained by performing correlation on the sequence {f$_n$} and the sequence, the {f'$_{1,n}$}, the 2 bits of information are (0, 0).

According to the sequence-based signal processing method disclosed in this embodiment of this application, the sequence meeting a requirement in an environment in which a signal is sent by using the reference signal or the control channel is determined, where the sequence is the sequence {f$_n$} including the N elements, f$_n$ is the element in the sequence {f$_n$}, the determined sequence {f$_n$} meets the preset condition, the preset condition is $f_n = A \cdot x_n \cdot e^{2\pi \cdot j \cdot a \cdot n}$, the value of n ranges from 0 to N−1, A is a non-zero complex number, a is a real number, $j=\sqrt{-1}$, the element $x_n = u \cdot e^{\rho_M \pi \cdot j \cdot s_n/M}$, u is a non-zero complex number, M=4, 12, or 16, $\rho_M$ is a real number, $\rho_M$ is 1 or −1 when M=4, $\rho_M$=2 or −2 when M=12 or 16, and the sequence {s$_n$} including the element s$_n$ is the sequence in the first sequence set or the equivalent sequence of the sequence in the first sequence set, or the sequence in the second sequence set or the equivalent sequence of the sequence in the second sequence set; then the N elements in the sequence {f$_n$} are mapped to the N subcarriers respectively, to generate the first signal; and the first signal is sent. By using the foregoing determined sequence, when the signal is sent by using the reference signal or the control channel, weak cross-correlation between sequences can be maintained, and a relatively small PAPR value and a relatively small CM value can be maintained. Therefore, a requirement in a communications application environment in which the signal is sent by using the reference signal or the control channel is met.

In one embodiment, based on the foregoing sequence-based signal processing method disclosed in this embodiment of this application, the sequence {x$_n$} including the element x$_n$ is determined from a first set, at least K sequences in the first set meet $x_n = u \cdot e^{\rho_M \pi \cdot j \cdot s_n/M}$, K is a positive integer greater than or equal to 2, a sequence {s$_n$} including an element s$_n$ corresponding to each of the at least K sequences is a sequence in a fourth sequence set or an equivalent sequence of the sequence in the fourth sequence set. A peak-to-average ratio of a sequence {f$_n$} corresponding to each sequence in the fourth sequence set is lower than 2.1 dB, and a cross-correlation value between any cyclic shift of any one sequence in the sequence {f$_n$} corresponding to the fourth sequence set and any cyclic shift of another sequence in the sequence {f$_n$} is relatively small.

During specific implementation, the fourth sequence set includes some or all of the following 30 sequences whose lengths are 12, N=12, and M=4:

{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1}, {1, 3, −1, 1, −3, −1, −3, 3, −3, −3, −1, −1}, {3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −1, −3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −1, 3, −1, −1}, {−3, 1, −1, −1, 3, 1, 3, −1, −1, 1, −1, −1}, {1, −3, −1, −1, 3, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, 3, −1, −1, −1}.

In one embodiment, based on the foregoing sequence-based signal processing method disclosed in this embodiment of this application, the sequence including the element x$_n$ is determined from the first set, the at least K sequences in the first set meet $x_n = u \cdot e^{\rho_M \pi \cdot j \cdot s_n/M}$, K is a positive integer greater than or equal to 2, the sequence {s$_n$} including the element s$_n$ corresponding to each of the at least K sequences is a sequence in a fifth sequence set or an equivalent sequence of the sequence in the fifth sequence set.

The fifth sequence set includes at least one of the following: a sequence in a sequence set 5A, a sequence in a sequence set 5B, a sequence in a sequence set 5C, and a sequence in a sequence set 5D. Cross-correlation between sequences in the sequence sets 5A, 5B, 5C, and 5D is relatively low.

The sequence set 5A includes some or all of the following sequences, N=12, and M=12:

{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 8, 10, 1, 10, 11, 5, 3, 7, 2, 0}, {0, 0, 11, 1, 3, 10, 11, 6, 3, 7, 4, 10}, {0, 0, 9, 2, 10, 6, 5, 5, 8, 0, 5, 7}, {0, 0, 3, 4, 5, 6, 1, 3, 10, 6, 2, 8}, {0, 0, 5, 11, 5, 8, 8, 10, 6, 4, 0, 9}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 8, 2, 9, 10, 2, 10, 4}, {0, 0, 7, 7, 0, 1, 7, 3, 6, 4, 3, 3}, {0, 0, 10, 1, 1, 1, 8, 8, 1, 7, 2, 1}, {0, 0, 9, 7, 10, 6, 5, 9, 11, 8, 1, 3}, {0, 0, 5, 6, 8, 7, 4, 0, 4, 9, 3, 5}, {0, 0, 3, 9, 0, 0, 1, 9, 5, 4, 9, 3}, {0, 0, 7, 5, 4, 3, 7, 4, 10, 1, 4, 9}, {0, 0, 0, 10, 1, 8, 2, 2, 8, 8, 10, 1}, {0, 0, 0, 2, 11, 4, 10, 10, 4, 4, 2, 11}, {0, 0, 6, 4, 0, 11, 1, 3, 10, 3, 8, 6}, {0, 0, 8, 6, 6, 1, 0, 4, 0, 2, 3, 4}, {0, 0, 5, 4, 0, 1, 2, 8, 3, 8, 10, 7}, {0, 0, 7, 8, 0, 11, 10, 4, 9, 4, 2, 5}, {0, 0, 2, 10, 9, 8, 2, 9, 0, 1, 5, 2}, {0, 0, 4, 5, 10, 6, 0, 0, 0, 9, 10, 2}, {0, 0, 5, 6, 0, 1, 4, 1, 4, 0, 8, 8}, {0, 0, 7, 10, 6, 9, 6, 5, 10, 10, 1, 5}, {0, 0, 10, 11, 10, 0, 3, 10, 7, 3, 6, 0}, {0, 0, 4, 9, 1, 10, 1, 0, 7, 6, 2, 4}, {0, 0, 8, 10, 3, 9, 7, 0, 1, 0, 0, 7}, {0, 0, 8, 1, 4, 1, 4, 4, 11, 10, 3, 7}, {0, 0, 1, 6, 10, 3, 5, 3, 10, 7, 0, 9}, {0, 0, 11, 7, 5, 7, 7, 1, 7, 9, 5, 0}, {0, 0, 6, 0, 2, 7, 1, 11, 0, 10, 5, 3}, {0, 0, 4, 9, 11, 5, 6, 4, 8, 5, 11, 7}, {0, 0, 8, 5, 9, 3, 2, 11, 2, 4, 3, 8}, {0, 0, 8, 1, 6, 3, 10, 0, 2, 0, 0, 6}, {0, 0, 6, 11, 3, 10, 9, 11, 11, 6, 3, 2}, {0, 0, 5, 3, 8, 6, 4, 5, 10, 2, 9, 3}, {0, 0, 6, 2, 10, 3, 4, 2, 3, 9, 10, 1}, {0, 0, 5, 0, 11, 8, 3, 6, 6, 9, 5, 8}, {0, 0, 7, 1, 0, 5, 2, 3, 10, 11, 11, 4}, {0, 0, 11, 8, 4, 11, 5, 8, 11, 11, 10, 9}, {0, 0, 0, 5, 10, 1, 9, 5, 3, 5, 5, 11}, {0, 0, 7, 1, 6, 6, 1, 2, 0, 4, 2, 4}, and {0, 0, 6, 1, 0, 7, 11, 2, 1, 3, 10, 7}.

The sequence set 5B includes some or all of the following sequences, N=12, and M=12:

{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 6, 0, 8, 2, 4, 8, 7, 6, 6, 2}, {0, 0, 8, 10, 1, 10, 11, 5, 3, 7, 2, 0}, {0, 0, 3, 4, 5, 6, 1, 3, 10, 6, 2, 8}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 8, 2, 9, 10, 2, 10, 4}, {0, 0, 10, 1, 1, 1, 8, 8, 1, 7, 2, 1}, {0, 0, 9, 7, 10, 6, 5, 9, 11, 8, 1, 3}, {0, 0, 11, 1, 10, 0, 8, 3, 3, 7, 9, 11}, {0, 0, 4, 7, 11, 1, 11, 11, 6, 1, 8, 3}, {0, 0, 3, 9, 0, 0, 1, 9, 5, 4, 9, 3}, {0, 0, 0, 10, 1, 8, 2, 2, 8, 8, 10, 1}, {0, 0, 0, 2, 11, 4, 10, 10, 4, 4, 2, 11}, {0, 0, 10, 3, 0, 5, 3, 4, 10, 0, 4, 8}, {0, 0, 7, 8, 0, 0, 10, 4, 9, 5, 4, 5}, {0, 0, 9, 10, 9, 11, 2, 9, 6, 2, 6, 11}, {0, 0, 4, 5, 10, 6, 0, 0, 0, 9, 10, 2}, {0, 0, 5, 6, 0, 1, 4, 1, 4, 0, 8, 8}, {0, 0, 2, 6, 11, 8, 11, 8, 7, 1, 1, 8}, {0, 0, 4, 2, 10, 11, 11, 5, 0, 3, 6, 3}, {0, 0, 0, 7, 1, 4, 11, 10, 1, 0, 7, 6}, {0, 0, 3, 0, 10, 9, 4, 10, 2, 3, 5, 4}, {0, 0, 7, 3, 7, 2, 11, 10, 0, 2, 9, 11}, {0, 0, 0, 9, 8, 11, 0, 6, 1, 4, 0, 8}, {0, 0, 8, 5, 9, 3, 2, 11, 2, 4, 3, 8}, {0, 0, 2, 6, 8, 2, 3, 0, 5, 2, 7, 5}, {0, 0, 3, 7, 2, 6, 8, 8, 5, 2, 7, 4}, {0, 0, 0, 5, 10, 1, 9, 5, 3, 5, 5, 11}, and {0, 0, 5, 7, 11, 5, 1, 11, 11, 0, 3, 0}.

The sequence set 5C includes some or all of the following sequences, N=12, and M=16:

{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {10, 9, 5, 5, 15, 0, 7, 14, 11, 15, 0, 0}, {6, 9, 3, 10, 0, 8, 6, 15, 15, 1, 0, 0}, {13, 4, 15, 11, 6, 1, 5, 13, 14, 15, 0, 0}, {6, 11, 10, 0, 9, 15, 4, 2, 14, 12, 0, 0}, {15, 8, 3, 8, 1, 11, 14, 0, 11, 10, 0, 0}, {13, 6, 0, 13, 4, 14, 0, 9, 10, 11, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {3, 9, 6, 14, 5, 6, 11, 7, 8, 3, 0, 0}, {10, 8, 4, 15, 10, 5, 10, 0, 1, 1, 0, 0}, {5, 3, 12, 8, 9, 2, 14, 1, 2, 11, 0, 0}, {10, 10, 4, 4, 12, 13, 4, 15, 4, 0, 0, 0}, {11, 11, 6, 13, 3, 13, 1, 1, 11, 10, 0, 0}, {13, 7, 10, 11, 2, 8, 11, 7, 0, 15, 0, 0}, {12, 0, 6, 15, 8, 8, 0, 15, 1, 13, 0, 0}, {11, 9, 4, 9, 1, 10, 7, 5, 8, 11, 0, 0}, {8, 11, 11, 0, 6, 11, 10, 4, 15, 1, 0, 0}, {1, 7, 3, 7, 12, 15, 7, 2, 15, 0, 0, 0}, {3, 13, 1, 9, 2, 11, 11, 1, 3, 1, 0, 0}, {5, 0, 4, 2, 7, 6, 13, 6, 7, 2, 0, 0}, {13, 13, 14, 2, 5, 6, 1, 3, 12, 5, 0, 0}, {3, 2, 1, 14, 0, 5, 7, 1, 10, 3, 0, 0}, {5, 11, 8, 11, 8, 2, 14, 2, 6, 14, 0, 0}, {0, 5, 3, 15, 13, 4, 4, 8, 2, 7, 0, 0}, {14, 8, 7, 1, 2, 9, 15, 12, 1, 1, 0, 0}, {4, 6, 12, 10, 8, 12, 14, 8, 3, 8, 0, 0}, {14, 12, 11, 4, 14, 9, 11, 6, 9, 12, 0, 0}, {14, 7, 15, 3, 9, 5, 14, 15, 0, 12, 0, 0}, {1, 7, 13, 9, 1, 14, 4, 6, 2, 3, 0, 0}, {1, 5, 3, 2, 11, 6, 3, 7, 14, 0, 0, 0}, {0, 12, 2, 0, 2, 13, 8, 13, 0, 6, 0, 0}, {3, 15, 8, 6, 0, 12, 14, 14, 4, 11, 0, 0}, {5, 5, 13, 13, 6, 7, 11, 7, 12, 5, 0, 0}, {11, 13, 2, 12, 7, 14, 10, 11, 2, 3, 0, 0}, {14, 1, 10, 4, 1, 10, 1, 5, 5, 5, 0, 0}, {9, 15, 1, 7, 6, 1, 12, 0, 11, 14, 0, 0}, {3, 15, 10, 14, 4, 12, 10, 12, 12, 5, 0, 0}, {10, 15, 8, 3, 12, 15, 6, 3, 3, 5, 0, 0}, {8, 6, 9, 4, 4, 3, 9, 9, 2, 9, 0, 0}, {7, 8, 15, 0, 12, 14, 2, 11, 6, 14, 0, 0}, {2, 11, 15, 4, 2, 3, 11, 0, 13, 8, 0, 0}, {14, 5, 1, 12, 14, 13, 5, 0, 3, 8, 0, 0}, {11, 10, 0, 9, 12, 2, 12, 8, 9, 9, 0, 0}, {0, 12, 6, 4, 12, 11, 6, 10, 6, 12, 0, 0}, {5, 8, 5, 15, 15, 2, 1, 11, 3, 7, 0, 0}, {3, 13, 0, 2, 4, 12, 12, 5, 15, 3, 0, 0}, {13, 3, 0, 14, 12, 4, 4, 11, 1, 13, 0, 0}, {9, 3, 5, 5, 0, 13, 6, 12, 0, 14, 0, 0}, {13, 14, 8, 5, 6, 14, 14, 3, 14, 2, 0, 0}, {13, 7, 10, 11, 8, 14, 12, 4, 7, 1, 0, 0}, {7, 15, 13, 3, 1, 6, 11, 4, 2, 0, 0, 0}, {15, 5, 12, 3, 14, 15, 12, 3, 3, 9, 0, 0}, {12, 4, 6, 7, 13, 1, 12, 3, 1, 14, 0, 0}, {3, 3, 12, 2, 1, 11, 8, 13, 2, 14, 0, 0}, {13, 3, 14, 14, 15, 5, 8, 3, 14, 2, 0, 0}, {5, 11, 0, 2, 1, 4, 1, 12, 5, 8, 0, 0}, {11, 5, 0, 14, 15, 12, 15, 4, 11, 8, 0, 0}, {7, 3, 9, 9, 6, 0, 14, 3, 11, 15, 0, 0}, {9, 4, 7, 12, 1, 2, 14, 6, 2, 5, 0, 0}, {13, 7, 14, 8, 14, 2, 3, 1, 14, 8, 0, 0}, {7, 2, 12, 0, 0, 8, 14, 12, 12, 5, 0, 0}, {11, 10, 15, 10, 13, 14, 2, 10, 6, 4, 0, 0}, {2, 9, 8, 8, 2, 14, 3, 12, 14, 2, 0, 0}, {3, 8, 3, 1, 5, 3, 8, 12, 6, 4, 0, 0}, {2, 13, 11, 1, 13, 3, 15, 1, 9, 10, 0, 0}, {8, 2, 9, 12, 6, 11, 2, 1, 6, 4, 0, 0}, and {15, 6, 12, 15, 4, 2, 8, 7, 3, 4, 0, 0}.

The sequence set 5D includes some or all of the following sequences, N=12, and M=16:

{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {6, 9, 3, 10, 0, 8, 6, 15, 15, 1, 0, 0}, {13, 4, 15, 11, 6, 1, 5, 13, 14, 15, 0, 0}, {15, 8, 3, 8, 1, 11, 14, 0, 11, 10, 0, 0}, {11, 1, 2, 9, 3, 10, 0, 15, 12, 11, 0, 0}, {13, 6, 0, 13, 4, 14, 0, 9, 10, 11, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {14, 6, 0, 14, 7, 7, 14, 2, 15, 2, 0, 0}, {3, 9, 6, 14, 5, 6, 11, 7, 8, 3, 0, 0}, {5, 3, 12, 8, 9, 2, 14, 1, 2, 11, 0, 0}, {10, 10, 4, 4, 12, 13, 4, 15, 4, 0, 0, 0}, {3, 11, 3, 14, 10, 12, 6, 8, 13, 11, 0, 0}, {1, 7, 3, 7, 12, 15, 7, 2, 15, 0, 0, 0}, {12, 9, 4, 9, 1, 10, 7, 5, 8, 11, 0, 0}, {4, 14, 1, 9, 2, 12, 11, 1, 3, 2, 0, 0}, {5, 0, 4, 2, 7, 6, 13, 6, 7, 2, 0, 0}, {13, 14, 12, 14, 2, 6, 3, 11, 4, 4, 0, 0}, {5, 11, 8, 11, 8, 2, 14, 2, 6, 14, 0, 0}, {11, 5, 8, 5, 8, 14, 2, 14, 10, 2, 0, 0}, {14, 8, 7, 1, 2, 9, 15, 12, 1, 1, 0, 0}, {14, 2, 14, 10, 2, 0, 0}, {0, 3, 15, 3, 0, 2, 12, 5, 5, 10, 0, 0}, {13, 7, 13, 11, 6, 0, 1, 0, 5, 12, 0, 0}, {11, 13, 2, 12, 7, 14, 10, 11, 2, 3, 0, 0}, {15, 2, 12, 8, 13, 6, 0, 0, 4, 4, 0, 0}, {2, 14, 13, 7, 5, 1, 5, 2, 8, 12, 0, 0}, {1, 4, 3, 9, 4, 14, 6, 8, 1, 2, 0, 0}, {2, 8, 3, 0, 1, 15, 7, 2, 5, 10, 0, 0}, {7, 6, 15, 11, 5, 13, 3, 6, 6, 4, 0, 0}, {2, 11, 15, 4, 2, 3, 11, 0, 13, 8, 0, 0}, {15, 12, 3, 6, 7, 15, 0, 11, 1, 14, 0, 0}, {0, 12, 6, 4, 12, 11, 6, 10, 6, 12, 0, 0}, {13, 3, 0, 14, 12, 4, 4, 11, 1, 13, 0, 0}, {12, 2, 8, 9, 2, 4, 9, 6, 10, 5, 0, 0}, {5, 15, 2, 3, 6, 13, 13, 6, 0, 3, 0, 0}, {8, 6, 2, 12, 13, 2, 8, 1, 14, 0, 0, 0}, {14, 9, 2, 6, 10, 1, 15, 0, 14, 6, 0, 0}, {11, 1, 14, 12, 10, 1, 3, 5, 15, 6, 0, 0}, {7, 8, 5, 11, 10, 12, 4, 4, 14, 4, 0, 0}, {14, 0, 9, 5, 3, 11, 15, 14, 0, 10, 0, 0}, {4, 14, 0, 1, 8, 13, 9, 1, 0, 13, 0, 0}, {10, 12, 5, 12, 12, 7, 4, 11, 0, 14, 0, 0}, {5, 11, 11, 9, 0, 11, 0, 5, 5, 0, 0, 0}, {1, 1, 6, 6, 8, 15, 3, 15, 12, 3, 0, 0}, {8, 0, 14, 3, 1, 6, 11, 4, 2, 15, 0, 0}, {8, 2, 5, 7, 0, 5, 10, 7, 0, 0, 0, 0}, {13, 7, 10, 15, 2, 2, 0, 11, 3, 11, 0, 0}, {5, 7, 2, 15, 5, 2, 10, 13, 8, 10, 0, 0}, and {1, 10, 2, 13, 8, 12, 3, 1, 1, 5, 0, 0}.

In one embodiment, a set including the sequence {$s_n$} including the element $s_n$ includes some or all of sequences in a sixth sequence set or some or all of equivalent sequences of the sequences in the sixth sequence set.

The sixth sequence set includes at least one of the following: a sequence in a sequence set 6A, a sequence in a sequence set 6B, a sequence in a sequence set 6C, and a sequence in a sequence set 6D. Cross-correlation between sequences in the sequence sets 6A, 6B, 6C, and 6D is relatively low.

The sequence set 6A includes some or all of the following sequences, N=18, and M=4:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {1, −3, −3, 1, 1, 3, −1, −1, 3, 1, 3, 3, 3, 1, −3, −1, 3, 1}, {−3, 1, 1, −3, −3, 3, −1, −1, 3, −3, 3, 3, 3, −3, 1, −1, 3, −3}, {−3, 1, 3, −3, 1, 3, −1, −1, 3, 3, 3, 3, −3, 1, −1, −3, −3, 3}, {1, −3, 3, 1, −3, 3, −1, 3, −3, −3, 3, 3, 3, 1, −3, −1, 1, 1, 3}, {1, −1, −3, 3,

−1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 3, 1, 3, 3, −3, 1, −1, 3, 3, 1, 3, −1, 1, −3, −3}, {−1, 1, 3, 3, −3, 3, 3, 1, −3, −1, 3, 3, −3, 3, −1, −3, 1, 1}, {3, −1, 1, −3, −1, −1, −1, −3, −1, −1, 3, 3, 1, −3, −1, −3, 3, 1}, {3, −1, −3, 1, −1, −1, −1, 1, −1, −1, 1, −1, −3, −3, 1, −1, 1, 3, −3}, {−1, −3, 3, −1, −1, 3, 3, −1, 3, 3, 3, 3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −1, 3, −1, −1, 3, 3, 3, 3, −1, 3, −1, 3, −1}, {−1, 3, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, −1, −1, −3, 3, 1, 3, 3, 3, −3, 1, −3, 1, −3}, {−3, 1, −1, −3, 3, −1, −1, 1, 3, −3, 3, 3, 3, 1, −3, 1, −3, 1}, {3, −3, −1, 1, 3, 3, −3, 3, −1, −3, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, 1, −3, −3, −3, −1, 3, 3, 1, −3, −3, 3, 3, −3}, {3, −1, 3, −3, 1, −3, 1, 1, 1, −1, 3, 3, −3, 1, 1, 3, 3, 1}, {−3, 1, −1, 1, −1, −3, −3, 3, −1, 3, 3, −3, −1, 3, −3, −1, 1}, {1, −3, −1, −3, −1, 1, 1, 3, −1, 3, 3, 1, −1, 3, 1, −1, −3}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1, −1, −3}, {3, −1, 1, 3, 1, −1, 1, 1, 1, −1, 3, 3, −3, 1, −1, −1, 3, −3}, {3, −1, −3, 3, −3, −1, −3, −3, −3, −1, 3, 3, 1, −3, −1, −1, 3, 1}, {3, 1, 3, −1, 3, −3, 3, −1, −3, 3, 3, 3, −3, −1, 1, −3, −1, 1}, {3, −3, 3, −1, 3, 1, 3, −1, 1, 3, 3, 3, 1, −1, −3, −1, −3}, {−1, −1, −1, −3, 3, −1, −1, 3, −1, 3, 3, 3, 3, −1, −3}, {−1, 1, 3, −3, −1, 1, −3, −3, 3, −1, 3, 3, 3, −3, −3, −1, −3}, {−1, −3, 3, 1, −1, −3, 1, 1, 3, −1, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, −1, 3, 3, −3, −3, −1, −3, −1, 1}, {1, −3, −1, 1, 3, 3, −3, 3, −3, 1, 3, 3, 1, −1, −3, −3, 3, 1}, {−3, 1, −1, −3, 3, 3, 1, 3, 1, −3, 3, 3, 3, −3, −1, 1, 3, 1, −3}, {3, −1, 1, −3, −1, 3, −3, 3, 1, −3, 3, 3, 3, −3, −1, −1, 1, −3}, {3, −1, −3, 1, −1, 3, 1, 3, −3, 1, 3, 3, 3, 1, −1, −1, −3, 1}, {1, −3, −3, 1, −3, 1, −3, 1, 3, 3, 3, −1, −1, 3, −3, −3, 3}, {−3, 1, 1, −3, 1, −3, 1, −3, 3, 3, 3, 3, −1, −1, 3, 1, 1, 3}, {−1, −1, −1, 3, −1, 3, −3, 3, −1, 3, 3, −1, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, 3, −3, 1, −3, 3}, {−3, 1, −3, 3, −1, −1, 3, −1, −3, 3, 3, 3, −3, −1, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, 3, 3, 3, −3, −3, −1, −3, 3, 3}, {3, −3, −1, −3, 1, −3, −1, 1, 3, 3, 3, 1, 1, −1, 1, 3, 3}, {−3, 3, −1, 3, −1, −1, 1, −1, −1, −1, 3, 3, −1, −3, −1, 1, −3, 3}, {1, 3, −1, 3, −1, −1, −3, −1, −1, −1, 3, 3, −1, 1, −1, −3, 1, 3}, {1, 1, −1, 1, −3, −1, 1, −1, 1, 3, 3, −1, 3, 1, 1, −3, −3, −3, −1}, {−3, −3, −1, −3, 1, −1, −3, −1, −1, 3, 3, −3, −1, −3, −1, 1, −1}, {−3, −1, 3, 1, −1, 3, −3, 1, 3, 3, 3, 3, −1, 1, −1, 3, −1}, {1, −1, −3, −1, 3, 3, −1, 3, 3, 3, −1, −3, −1, 3, −1}, {−1, 1, 3, 3, −3, −1, −1, 1, −3, 3, 3, 1, 3, 3, 3, 1, 3}, {−1, −3, 3, 3, 1, 3, −1, −1, −3, 1, 3, 3, 3, 3, 3, −3, 3}, {3, −1, −3, −1, 3, −1, −3, 1, 1, 3, 3, 3, −1, 1, −3, 1, 3}, {3, −1, 3, −1, 1, −3, 1, −3, −3, 3, 3, 3, −1, −3, 1, −3, 3}, {1, 3, −3, 3, 3, 1, 3, 1, 1, −1, 3, 3, −3, −3, −1, 1}, {−3, 3, 1, 3, −3, 3, −3, −3, −3, −1, 3, 3, 1, −3, 1, 1, −1, −3}, {−1, 3, 3, −1, 3, 3, 3, 3, −1, 1, 3, −1, 1, 3, −1, −1}, {3, 1, −1, 1, −1, 3, 3, 3, 3, 1, 3, 3, −3, 3, −3, −1, −1, 3, 3, 1, 3, 3}, {3, −3, −1, −3, −1, 1, 3, −3, 3, −1, 3, 3, 1, 1, 1, −3, 3, 3}, {−1, 3, 1, −1, −1, 3, −1, −3, −3, 1, 3, 3, −3, 3, −3, −3, 1, −3}, and {−1, 3, −3, −1, −1, 3, −1, 1, 1, −3, 3, 3, 1, 3, 1, 1, −1, 1}.

The sequence set 6B includes some or all of the following sequences, N=18, and M=4:
 {3, −1, 1, 1, −1, −3, −3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, −3, 1, 3, −1, 3, −1, 3}, {−1, 1, −3, 1, −1, −3, −3, 3, −1, 3, 3, −3, −1, 1, −3, 1}, {−1, −3, 1, −1, −3, −3, 3, −1, 3, 3, 3, −3, −1, 1, −1, −3, 1}, {−3, 3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, −1, 1, 3, −3, 1, 3}, {−3, 1, 3, −3, 1, 3, −1, 3, 1, 1, 3, 3, −3, 1, −1, −3, −3, 3}, {1, −3, 3, 1, −3, −3, −3, 3, 3, 1, −3, −1, 1, 1, 3}, {1, −1, −3, 3, −1, 1, 3, 1, 3, 3, 3, 1, −1, −1, 1, 3}, {−3, −1, 1, 3, −1, −3, 3, 3, −1, −1, −1, −1, −3, 3, 1}, {3, −1, −3, −1, −1, 3, −3, −1, −3, 3, −3, −3, −3, −1, −1, 3, 1}, {3, −1, −3, −1, −1, −1, −1, −1, −3, −1, 3, 1}, {3, −1, −3, 1, −1, 1, 1, 3, 3, −3, 1, −1, 1, 3, −3}, {1, −3, −1, 1, 3, −1, −1, −3, 3, 1, 3, 3, 3, −3, 1, −3, 1, −3}, {−3, 1, −1, 1, −1, 1, 3, 3, 3, −3, 1, −3, 1, −3, 1}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1, −1, −3}, {3, −1, 1, 3, 1, −1, 1, 1, 1, −1, 3, 3, 1, −1, −1, 3, −3}, {3, −3, 3, 3, 1, −1, 3, 3, 1, −1}, and {3, 1, −1, 1, −1, −3, 3, 1, 3, −1, 3, 3, −3, −3, −3, 1, 3, 3}.

The sequence set 6C includes some or all of the following sequences, N=24, and M=4:
 {−3, −3, −3, 1, 1, −3, −3, 1, 1, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, −3, −3, 1, 1, 1, 1}, {1, 1, −3, 1, −3, −3, 1, −3, 1, 1, −3, 1, 1, 1, −3, 1, 1, 1, −3, −3, −3, −3, 1, 1}, {1, −3, −3, −3, 1, 1, −3, 1, 1, −3, −3, −3, −3, 1, −3, 1, −3, −3, 1, −3, 1, 1}, {3, 3, −3, −3, 1, 3, 3, −3, −3, 3, −1, 3, 3, 1, 1, −3, −1, −1, −3, −3, 1, 1}, {−1, −1, −3, −3, 1, −1, −1, −3, −3, −1, 3, −1, 3, −1, −1, 1, 1, −3, 3, 3, −3, −3, 1, 1}, {3, 3, −1, −3, 1, 3, 1, 1, −1, 3, 3, −3, −3, 3, −3, 1, 3, 3, −1, −3, 1, 3, 1, 1}, {−1, −1, 3, −3, 1, −1, 1, 1, 3, −1, −1, −3, −3, −1, −3, 1, −1, −1, 3, −3, 1, −1, 1, 1}, {1, 3, 3, −1, 1, −1, 1, 1, 1, 3, −1, 3, 1, −1, −3, 1, 3, 3, −1, 1, −1, 1, 1, 1}, {1, −1, −1, 3, 1, 3, 1, 1, 1, −1, 3, −1, 1, 3, 1, −1, 1, 1, 3, −1, 1, 3, 1, 1}, {1, 1, −1, −1, 3, 3, 1, 1, −1, −1, 1, 3, 1, 3, 1, 1}, {1, 1, −1, −1, 3, 3, 1, 1, −1, −1, 1, 3, 1, 3, 1, 1}, {3, −3, −3, −1, −3, 1, −3, −1, 3, 3, −3, −1, −1, −3, −3, 3, 3, 1, 1}, {−1, −3, −3, 3, −3, 1, −3, 3, −1, −1, 3, −1, −1, 3, 3, −3, −3, −3}, {3, −1, 1, −3, −1, 1, 1, 3, −1, 1, 3, −1, 1, 3, −3, −1, 1, 3, 1, 1}, {−1, −3, 3, 1, −3, 1, 1, 1, −3, 1, −3, 1, 1, 1, 1, 1}, {−1, −1, −3, −3, 3, 3, 3, 1, 3, −3, −3, −1, 1, −3, 3, −1, 3, 3, −1, −3, 1, 1}, {3, 3, −3, −3, −1, −1, −1, −1, 1, −1, −3, −1, 3, 1, −3, −1, 3, −1, −1, 3, −1, 1, 1}, {−1, 3, −3, −3, 1, −3, −3, −1, −1, −1, 3, −3, 3, 3, 3, −1, 1, 1}, {3, −1, −3, −3, 1, −3, −1, −1, −3, −3, −1, 3, 3, −1, 1, 1}, {−1, 1, 3, 3, −3, −1, −3, 1, 1, −1, −3, 1, 1, 1, 1, 1}, {−1, −1, 3, −3, −1, −3, 1, 1, −1, −1, −1, −3, 1, −3, −1, 1, 3, 3, −3, −1, −3, 1, 1}, {3, −1, −1, −3, 3, 3, −3, 3, 1, −3, 1, −1, −1, −3, 3, 1, 1}, {−1, 1, −1, −1, 3, −1, −3, −3, −1, 1, −3, 1, 1, 1, −1, −1, 3, 3, −1, 1, 1}, {3, 1, 3, 3, −1, 3, −1, −3, −3, 3, −1, 1, −3, 1, 1, 1, 3, 3, −1, −1, 3, 1, 1}, {−3, −1, −1, 3, −3, 1, 1, 3, −3, 1, 1, 3, 3, 1, −3, 1, −1, −3, −3, 3, 3, 1, 1}, {−3, 3, 3, −1, −3, 1, 1, −1, −3, 1, 1, 1, −1, −1, 1, −3, 1, 3, −3, −3, −1, −1, 1, 1}, {−3, −1, 3, 3, 1, 1, −3, 1, −3, −3, −3, 3, 3, 3, −3, −3, −3, 1, −1, 3, −3, −3, 1, 1}, {−3, 3, −1, −1, 1, 1, 3, −1, 1, −3, −3, −3, −1, −3, −1, 1}, {1, 1, −3, 1, −3, −3, −3, 1, −3, 1, 1, −3, 1, 1, 1, 1}, {−3, −3, 1, 1, 1, 1}, {−1, 3, 3, −3, 3, 3, −3, −1, 3, −1, −1, −3, −1, −3, −1, 3, 3, −1, −1, 3, 1, 1}, {3, −1, 1, −3, −1, −1, 1, −3, −1, 1, −1, −3, −3, −3, −3, 1, 1, 1, 1}, {-1, 3, 1, -3, 3, 3, 1, -3, 3, 1, 3, -3, 1, 3, 1, -3, -3, -3, -3, 1, 1, 1, 1, 1}, {-1, -1, 1, 1, 1, -3, 3, 3, -1, -1, -1, 1, -3, -1, 1, -1, -3, 1, -3, 3, 1, 3, 1, 1}, {3, 3, 1, 1, 1, -3, -1, -1, 3, 3, 3, 1, -3, 3, 1, 3, -3, 1, -3, -1, 1, -1, 1, 1}, {1, -3, 1, 3, -1, -1, 3, 3, 3, -1, 1, 1, -3, 3, 3, -3, -3, -3, 3, -1, 1, -3, 1, 1}, {1, -3, 1, -1, 3, 3, -1, -1, -1, 3, 1, 1, -3, -1, -1, -3, -1, 3, 1, -3, 1, 1}, {3, -1, -1, -1, 1, -1, -1, -3, -1, 3, 3, 1, -3, -3, -1, 3, -1, -3, 1, 3, -3, -3, 1, 1}, {-1, 3, 3, 3, 1, 3, 3, -3, 3, -1, -1, 1, -3, -3, 3, -1, 3, -3, 1, -1, -3, -3, 1, 1}, {-3, 1, -3, -3, 3, -3, 3, -1, -1, -1, -1, -3, 1, 3, -1, -3, 3, -1, 1, 1}, {-3, 1, -3, -3, -1, -3, -1, 3, 3, 3, 3, -3, 1, -3, -3, -1, 3, 1, -1, -1, -3, 1, 1}, {3, 1, 3, -1, 3, -3, -1, -1, -1, 1, 3, -3, 3, 1, 3, 1, -1, 3, 3, 1, 1, 3, 1, 1}, {-1, 1, -1, 3, -1, -3, 3, 3, 3, 1, -1, -3, -1, 1, -1, 1, 3, -1, -1, 1, 1, -1, 1, 1}, {1, -3, 1, -3, 1, 1, -3, 1, 1, 1, -3, 1, 1, 1, 1, -3, -3, -3, -3, 1, 1, -3, 1, 1}, {-1, 3, 1, -1, 1, 3, 1, 1, -1, 3, 1, -3, -1, 3, 3, 3, 3, -1, -3, -1, 1, 3, 1, 1}, {3, -1, 1, 3, 1, -1, 1, 1, 3, -1, 1, -3, 3, -1, -1, -1, -1, 3, -3, 3, 1, -1, 1, 1}, {-1, 1, -3, 1, -1, -3, 1, -3, -3, 1, -1, -1, -3, -3, -1, -1, 1, -3, 1, 3, 3, -3, 1, 1}, {3, 1, -3, 1, 3, -3, 1, -3, -3, 1, 3, 3, -3, -3, 3, 3, 1, -3, 1, -1, -1, -3, 1, 1}, {3, 3, 1, -3, -1, -3, 1, -1, 1, -1, 3, -3, -3, 1, 1, -3, 1, 1, -1, 1, 1, 1, 1, 1}, {-1, -1, 1, -3, 3, -3, 1, 3, 1, 3, -1, -3, -3, 1, 1, -3, 1, 1, 3, 1, 1, 1, 1}, {3, -1, -3, -3, -3, 3, -3, 3, 3, 3, 1, -3, 1}, {-3, 3, 3, -1, -1, 1, 3, 3, 3, -1, 1, 1, -3, -3, 3, -1, -3, 3, 1, 1}, {3, 3, 3, -1, 1, 3, 3, 3, 3, 1, -3, -1, -3, 1, -3, -3, 1, 3, 3}, {1, -3, -3, 1, 3, 1, -1, -1, -1, 1, -3, 3, -3, -3, -3, -1, 1, -3, 3, 1, 3, 1, -1, 1, 1}, {-1, -3, 1, 3, 1, -1, -1, -1, 1, -3, 3, -3, -3, -3, -3, -1, 3, -3, 1, 1}, {-1, 1, -3, 1, -1, -3, 1, 3, 3, 3, 1, 1, -1, -3, 3, 1, 1}, {-3, -3, 3, -1, -3, 3, 1, -3, 3, -1, 3, -3, 1, 1, -1, -1, -1, 1, 1, 3, -3, -1, 1, 1}, {1, 1, 3, 1, 1, -1, 1, -1, -1, 3, -1, 1, 3, -3, 3, 1, -1, -3, -3, -3, -3, 1, 1}, {1, 1, -1, 1, 1, 3, 1, 3, -1, 3, 1, -1, -3, -1, 1, 3, -3, -3, -3, -3, 1, 1}, {-1, 1, 3, 1, -3, 3, -3, 3, -1, -1, 1, 3, 1, 1, -1, 1, -1, -1, 3, 3, -3, 1, 1}, {3, 1, -1, -1, 1, -3, -1, -3, -1, 3, 3, 1, -1, 1, 3, 1, 3, 3, -1, -1, -3, 1, 1}, {1, 3, 3, -1, 1, -1, -3, 3, 1, 3, -1, -3, 1, 3, -3, 3, 3, -3, 3, -3, -1, -1, 1, 1}, {1, -1, -1, 3, 1, 3, -3, -1, 1, -1, 3, -3, 3, -1, -1, -3, -1, -1, -3, -1, -3, -1, -3}, {3, 3, 1, 1}, {1, -3, -3, 1, 3, 3, 1, 3, 1, 1, -3, 1, 1, -3, -3, -3, 1, -1, 1, -1, -3, -1, 1, 1}, and {1, -3, -3, 1, -1, -1, 1, -1, 1, 1, -3, 1, 1, -3, -3, -3, 1, 3, 1, 3, -3, 3, 1, 1}.

The sequence set 6D includes some or all of the following sequences, N=24, and M=4:

{-3, -3, -3, 1, 1, -3, 1, 1, 1, -3, -3, -3, -3, 1, -3, 1, -3, -3, 1, -3, 1, 1, 1}, {1, 1, -3, 1, -3, -3, -3, -3, 1, -3, 1, 1, 1, -3, 1, 1, 1, 1, -3, -3, 1, 1, 1, 1}, {1, 3, 1, -3, -3, 1, -3, 1, -3, -3, 1, 1, -3, -3, -3, -3, -3, -3, -3, 1, 1}, {1, -3, -3, -3, 1, 1, -3, -3, -3, 1, -3, -3, -3, 1, -3, 1, -3, 1, 1, 1, -3, -3, 1, -3}, {1, 1, -3, -3, 1, -3, 1, 1}, {-1, -1, -1, -3, -1, -3, 3, -3, 3, 3, 3, -1, -3, 1, 3, -3, 3, -3, -1, -1, -3, -3, 1, 1}, {1, 3, -3, -3, 3, -3, -3, -3, -3, -3, -3, 3, 1, -3, -3, -3, 3, -1, -1, -1, -1, 3, 3, 1, 1}, {1, -1, -1, 3, 1, 3, 1, 1, 1, -1, 3, -1, 1, -3, -3, -3, -3, -1, 1, 3, -3, -3, -3, -3, -1, 1, 3, -3}, {-1, -1, 3, 3, 3, 1, 3, 3, -3, 3, -3, -1, 1, -3, -3, -3, -3, -3, -3, -3, -1, -1, -1, 3, -3}, {-1, -3, 3, -3, -1, -1, -1, -3, -3, -3, -1, -1, -3, 1, -3, 3, 3, 3, -1, -1, -1, -3, -3}, {1, 3, 1, -1, -1, -1, 1, 1, -3, -3, -1, 3, 3, 3, 1, 3, 1, -3, 3, 1, 1, -3, -1, 1, 1}, {-3, 1, 3, -1, 3, -3, -1, -1, -1, 1, 3, -3, 3, 1, 3, 1, 1, 1, 1}, {3, 1, 1, 3, 1, 1}, {3, -1, -3, -3, 1, -3, -1, -3, -1, -3, -1, -3, 3, 3, -1, -3, -1, -1, -1, 3, 1, 1}, {-1, -3, -3, 3, -3, 1, 3, -1, -3, -1, 3, -3, -3, -3, 1, -3, -1, -3, -3, -3, 1, 1, 1}, {1, -3, 1, 1, -3, -3, -3, -3, -3, 1, 3, 1, 3, -3, 3, 1, 1}, {-3, 1, 3, -1, -3, -3, 1, 1, -3, 1, -1, -3, -3, -3, -3, -3, 1, 3, 1, 1, 1, -3, -1, -1, 3, -3, -3, -3, -3, -3, 1, 3, 1, 3, -3, 3, 1, 1}, and {-1, -3, -3, 3, -1, -1, 1, 1, -1, 1, 3, -1, -1, 3, 1, -3, -1, -3, -3, 3, -1, -1, 1}.

Generally, a sequence with a relatively small PAPR also has a relatively small CM value. It is verified that the foregoing sequences all have very small CM values.

Based on the sequence-based signal processing method disclosed in this embodiment of this application, when M=4, an equivalent sequence of the sequence $\{s_n\}$ in each sequence set described above may be expressed as $\{q_n\}$. An element $q_n$ in the equivalent sequence $\{d_n\}$ meets $q_n = s_n + u_n$ (mod 8).

In one embodiment, a sequence $\{u_n\}$ including an element $u_n$ includes:

$u_n = f + g \cdot n \pmod{8}$, where n=0, 1, ..., or N−1, N is a sequence length, $f \in \{0,2,4,6\}$ $g \in \{0,2,4,6\}$, and (mod8) indicates that the foregoing equation holds true in a case of a modulus 8.

If M=12, an equivalent sequence $\{s_n\}$ of a sequence in each sequence set described above may be expressed as $\{q_n\}$. An element $q_n$ in the equivalent sequence $\{q_n\}$ meets $q_n = s_n + u_n \pmod{M}$.

During specific implementation, a sequence $\{u_n\}$ including an element $u_n$ includes:

$u_n = f + g \cdot n \pmod{M}$ where n=0, 1, ..., or N−1, N is a sequence length, $f \in \{0, 1, 2, \ldots, M-1\}$ $g \in \{0, 1, 2, \ldots, M-1\}$, and M=12.

Herein, an equivalent sequence of $\{s_n\}$ is $\{q_n\}$, and a difference between a sequence $\{u \cdot e^{j2\pi j s_n / M}\}$ and a sequence $\{u \cdot e^{j2\pi j q_n / M}\}$ is a constant, or a constant and/or a cyclic shift transformation. Therefore, a maximum value of an absolute value of a cyclic shift autocorrelation value between the two sequences is 1.

When M=16, a definition of an equivalent sequence is similar, that is, an equivalent sequence of the sequence $\{s_n\}$ in each sequence set described above is expressed by $\{q_n\}$. An element $q_n$ in the equivalent sequence $\{q_n\}$ meets $q_n=s_n+u_n(\mod M)$, and M=16.

During specific implementation, a sequence $\{u_n\}$ including an element $u_n$ includes:

$u_n=f+g\cdot n(\mod M)$, where n=0, 1, . . . , or N−1, N is a sequence length, $f \in \{0, 1, 2, \ldots, M-1\}$, $g \in \{0, 1, 2, \ldots, M-1\}$ and M=16.

According to the sequence-based signal processing method provided in this embodiment of this application, the sequence meeting a requirement in an environment in which a signal is sent by using a reference signal or a control channel is determined, where the sequence is the sequence $\{f_n\}$ including N elements, $f_n$ is the element in the sequence $\{f_n\}$, and the determined sequence $\{f_n\}$ meets the preset condition; then the N elements in the sequence $\{f_n\}$ are mapped to the N subcarriers respectively, to generate the first signal; and the first signal is sent. By using the foregoing determined sequence, when the signal is sent by using the reference signal or the control channel, weak cross-correlation between sequences can be maintained, and a relatively small PAPR value and a relatively small CM value can be maintained. Therefore, a requirement in a communications application environment in which the signal is sent by using the reference signal or the control channel is met.

Based on the foregoing sequence-based signal processing method disclosed in the embodiments of this application, the embodiments of this application further disclose a signal processing apparatus for performing the sequence-based signal processing method and a communications system.

Figure 6:
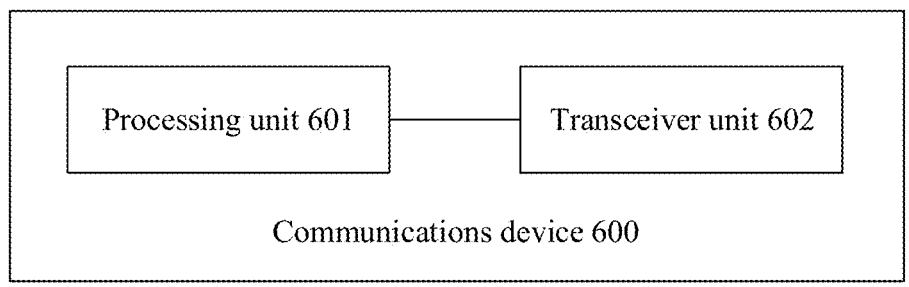
FIG. 6 is a schematic structural diagram of a terminal device according to an embodiment of this application.

FIG. 6 is a schematic structural diagram of a sequence-based signal processing apparatus 600 according to an embodiment of this application. The signal processing apparatus 600 may be a communications device, or may be a chip in a communications device. The signal processing apparatus 600 includes a processing unit 601 and a transceiver unit 602.

The processing unit 601 is configured to determine a sequence $\{f_n\}$ including N elements, where $f_n$ is an element in the sequence $\{f_n\}$, and the sequence $\{f_n\}$ meets a preset condition.

For the preset condition used in the processing unit 601, refer to the preset condition disclosed in the foregoing sequence-based signal processing method disclosed in the embodiments of this application. The preset conditions are consistent, and details are not described herein again.

The processing unit 601 is further configured to map the N elements in the sequence $\{f_n\}$ to N subcarriers respectively, to generate a first signal.

The transceiver unit 602 is configured to send the first signal.

For a corresponding operation performed by the signal processing apparatus 600 disclosed in this embodiment of this application, refer to a corresponding operation performed in the foregoing sequence-based signal processing method disclosed in the embodiments of this application, and details are not described herein again.

With reference to the sequence-based signal processing method disclosed in the embodiments of this application, the signal processing apparatus disclosed in this embodiment of this application may also be directly implemented by using hardware, a memory executed by a processor, or a combination thereof.

Figure 7:
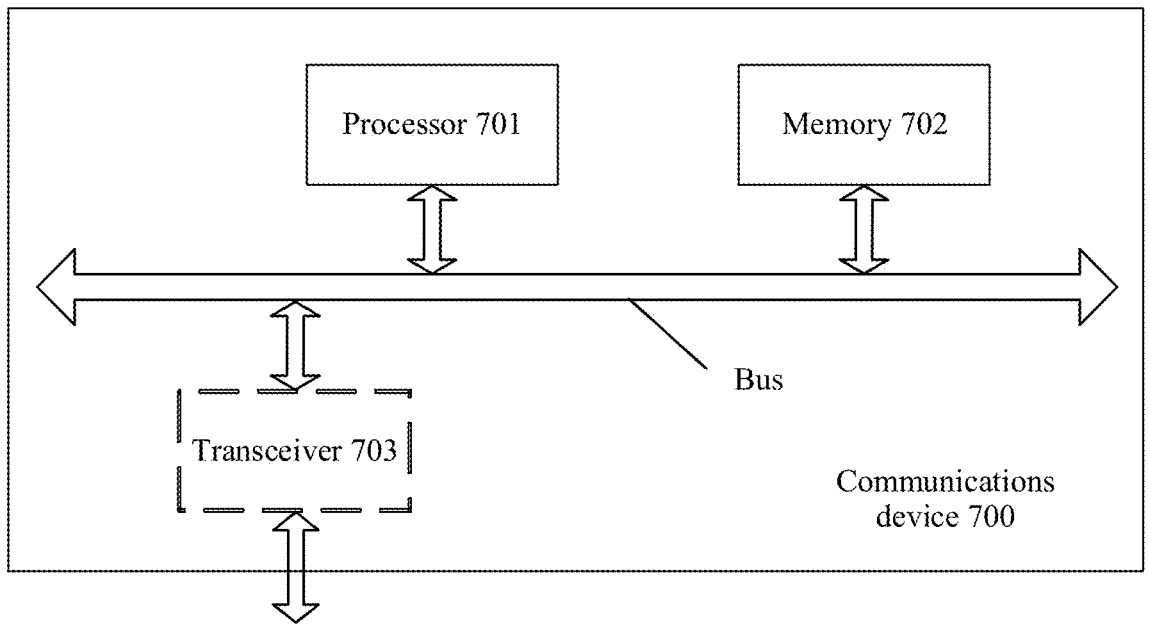
FIG. 7 is a schematic structural diagram of another terminal device according to an embodiment of this application.

As shown in FIG. 7, a signal processing apparatus 700 includes a processor 701 and a transceiver 703. In one embodiment, the signal processing apparatus 700 further includes a memory 702.

The processor 701 is coupled to the memory 702 by using a bus, and the processor 701 is coupled to the transceiver 703 by using the bus.

The processor 701 may be specifically a central processing unit (CPU), a network processor (NP), an application-specific integrated circuit (ASIC), or a programmable logic device (PLD). The foregoing PLD may be a complex programmable logic device (CPLD), a field-programmable gate array (field FPGA), or generic array logic (GAL).

The memory 702 may be specifically a content-addressable memory (CAM) or a random-access memory (RAM). The CAM may be a ternary content-addressable memory (TCAM).

When the signal processing apparatus 700 is a communications device, the transceiver 703 may be a radio frequency circuit. When the signal processing apparatus 700 is a chip in a terminal device, the transceiver 703 may be an input/output interface, a pin, a circuit, or the like on the chip.

Alternatively, the memory 702 may be integrated in the processor 701. If the memory 702 and the processor 701 are devices independent of each other, the memory 702 is connected to the processor 701, for example, the memory 702 may communicate with the processor 701 by using the bus. The transceiver 703 and the processor 701 may communicate with each other by using the bus, or the transceiver 703 may be directly connected to the processor 701.

The memory 702 is configured to store an operation program, code, or an instruction for sequence-based signal processing. In one embodiment, the memory 702 includes an operating system and an application program, and is configured to store an operation program, code, or an instruction for sequence-based signal processing.

When needing to perform an operation related to sequence-based signal processing, the processor 701 or a hardware device may invoke and execute the operation program, code, or instruction stored in the memory 702, to complete a sequence-based signal processing process performed by the terminal device in FIG. 1 to FIG. 6. For a specific process, refer to the foregoing corresponding part of the embodiments of this application. Details are not described herein again.

It may be understood that FIG. 7 shows merely a simplified design of the signal processing apparatus 700. In actual application, the signal processing apparatus 700 may include any quantities of transceivers, processors, memories, and the like, and all signal processing apparatuses 700 that can implement the embodiments of this application fall within the protection scope of the embodiments of this application.

Figure 8:
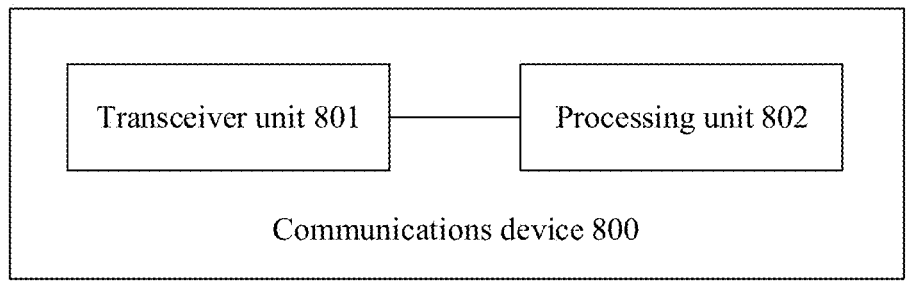
FIG. 8 is a schematic structural diagram of a network device according to an embodiment of this application.

FIG. 8 is a schematic structural diagram of a sequence-based signal processing apparatus 800 according to an embodiment of this application. The signal processing apparatus 800 may be a communications device, or may be a chip in a communications device. The signal processing apparatus 800 includes a transceiver unit 801 and a processing unit 802.

The transceiver unit 801 is configured to receive a first signal carried on N subcarriers.

The processing unit 802 is configured to obtain N elements in a sequence $\{f_n\}$, where the first signal is generated by mapping the N elements in the sequence $\{f_n\}$ including the N elements to the N subcarriers respectively, $f_n$ is an element in the sequence $\{f_n\}$, and the sequence $\{f_n\}$ meets a preset condition.

For the preset condition used in the transceiver unit 801, refer to the preset condition disclosed in the foregoing sequence-based signal processing method disclosed in the embodiments of this application. The preset conditions are consistent, and details are not described herein again.

The processing unit 802 is further configured to process the first signal based on the N elements in the sequence $\{f_n\}$.

For a corresponding operation performed by the signal processing apparatus 800 disclosed in this embodiment of this application, refer to a corresponding operation performed in the foregoing sequence-based signal processing method disclosed in the embodiments of this application, and details are not described herein again.

With reference to the sequence-based signal processing method disclosed in the embodiments of this application, the signal processing apparatus disclosed in this embodiment of this application may also be directly implemented by using hardware, a memory executed by a processor, or a combination thereof.

Figure 9:
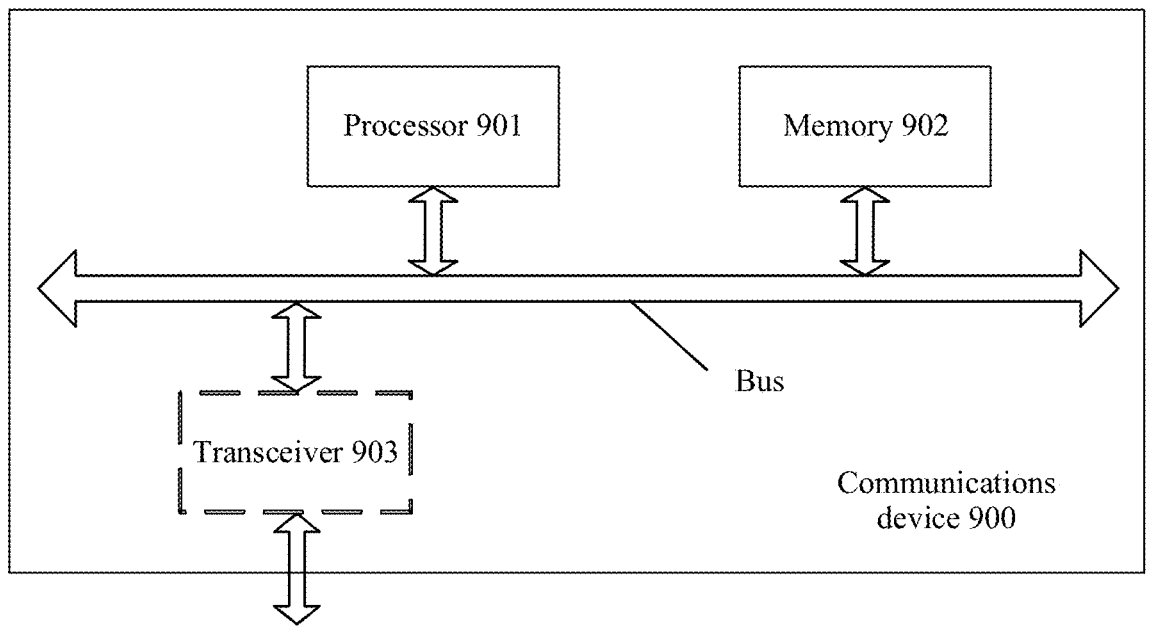
FIG. 9 is a schematic structural diagram of another network device according to an embodiment of this application.

As shown in FIG. 9, the signal processing apparatus 900 includes a processor 901 and a transceiver 903. Optionally, the signal processing apparatus 900 further includes a memory 902.

The processor 901 is coupled to the memory 902 by using a bus, and the processor 901 is coupled to the transceiver 903 by using the bus.

The processor 901 may be specifically a CPU, an NP, an ASIC, or a PLD. The PLD may be a CPLD, an FPGA, or GAL.

The memory 902 may be specifically a CAM or a RAM. The CAM may be a TCAM.

When the signal processing apparatus 900 is a communications device, the transceiver 903 may be a radio frequency circuit. When the signal processing apparatus 900 is a chip in a terminal device, the transceiver 903 may be an input/output interface, a pin, a circuit, or the like on the chip.

Alternatively, the memory 902 may be integrated in the processor 901. If the memory 902 and the processor 901 are devices independent of each other, the memory 902 is connected to the processor 901, for example, the memory 902 may communicate with the processor 901 by using the bus. The transceiver 903 and the processor 901 may communicate with each other by using the bus, or the transceiver 903 may be directly connected to the processor 901.

The memory 902 is configured to store an operation program, code, or an instruction for sequence-based signal processing. In one embodiment, the memory 902 includes an operating system and an application program, and is configured to store an operation program, code, or an instruction for sequence-based signal processing.

When needing to perform an operation related to sequence-based signal processing, the processor 901 or a hardware device may invoke and execute the operation program, code, or instruction stored in the memory 902, to complete a sequence-based signal processing process performed by the network device in FIG. 1 to FIG. 5. For a specific process, refer to the foregoing corresponding part of the embodiments of this application. Details are not described herein again.

It may be understood that FIG. 9 shows merely a simplified design of the signal processing apparatus 900. In actual application, the signal processing apparatus 900 may include any quantities of interfaces, processors, memories, and the like, and all signal processing apparatuses 900 that can implement the embodiments of this application fall within the protection scope of the embodiments of this application.

Figure 10:
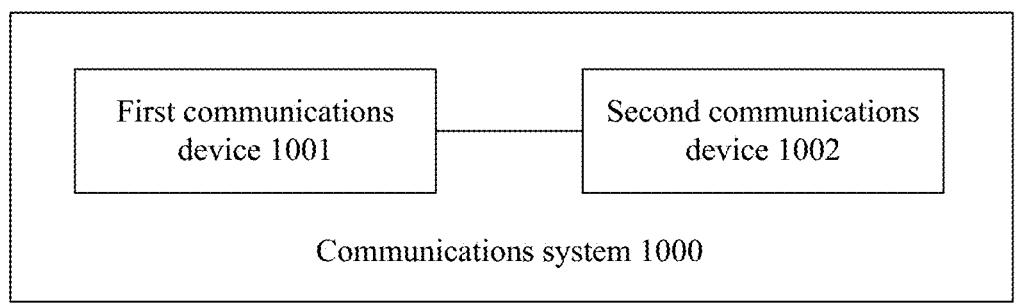
FIG. 10 is a schematic structural diagram of a communications system according to an embodiment of this application.

FIG. 10 is a communications system 1000 according to an embodiment of this application. The communications system 1000 includes a first communications device 1001 and a second communications device 1002. The first communications device 1001 is a device on a transmitter side, and the second communications device 1002 is a device on a terminal side.

The first communications device 1001 is configured to: determine a sequence $\{f_n\}$ including N elements, map the N elements in the sequence $\{f_n\}$ to N subcarriers respectively, to generate a first signal, and send the first signal to the second communications device 1002.

The second communications device 1002 is configured to: receive the first signal that is sent by the first communications device and that is on the N subcarriers, obtain the N elements in the sequence $\{f_n\}$, and process the first signal based on the N elements in the sequence $\{f_n\}$.

In the foregoing communications system disclosed in this embodiment of this application, a quantity of first communications devices 1001 and a quantity of second communications devices 1002 are not limited. The first communications device 1001 may be specifically the communications devices disclosed in FIG. 6 and FIG. 7. In one embodiment, the first communications device 1001 may be configured to perform a corresponding operation performed by the terminal devices in FIG. 1 to FIG. 5 in the embodiments of this application. The second communications device 1002 may be specifically the communications devices disclosed in FIG. 8 and FIG. 9. In one embodiment, the second communications device 1002 may be configured to perform a corresponding operation performed by the network devices in FIG. 1 to FIG. 5 in the embodiments of this application. For a specific process and an execution principle, refer to the foregoing descriptions. Details are not described herein again.

Persons skilled in the art should be aware that in the foregoing one or more examples, functions described in this application may be implemented by using hardware, software, firmware, or any combination thereof. When being implemented by using software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another place. The storage medium may be any available medium accessible to a general purpose computer or a special-purpose computer.

The embodiments in this specification are all described in a progressive manner. For same or similar parts in the embodiments, refer to these embodiments, and each embodiment focuses on a difference from other embodiments. Especially, apparatus and system embodiments are basically similar to a method embodiment, and therefore are briefly described; for related parts, refer to descriptions in the method embodiment.

Finally, it should be noted that the foregoing embodiments are merely intended for exemplarily describing the technical solutions of this application without limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A signal processing method, comprising:
determining a sequence $\{f_n\}$ comprising N elements, wherein $f_n$ is an element in the sequence $\{f_n\}$, the sequence $\{f_n\}$ comprises the element $f_n = A \cdot x_n \cdot e^{2\pi j \cdot a \cdot n}$, wherein a value of n ranges from 0 to N−1, A is a non-zero complex number, a is a real number, $x_n = u \cdot e^{\rho_M \pi \cdot j \cdot s_n / M}$ is an element in the sequence $\{f_n\}$, u is a non-zero complex number, M is 4, 12, or 16, $\rho_M$ is a real number, $\rho_M$ is 1 or −1 when M is 4, $\rho_M$ is 2 or −2 when M is 12 or 16, and wherein a sequence $\{s_n\}$ comprising an element $s_n$ is selected from a set of sequences comprising a first sequence set, an equivalent sequence of sequences in the first sequence set, a second sequence set, an equivalent sequence of sequences in the second sequence set, a third sequence set, and an equivalent sequence of sequences in the third sequence set, wherein when the M is 4, the first sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1}, {1, 3, −1, 1, −3, −1, −3, 3, −3, −3, −1, −1}, {−3, 3, −1, 3, −1, 3, 3, −1, −1, −1, −1, −1}, {1, 3, −1, 3, −1, 3, 3, −1, −1, −1, −1, −1}, {3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −1, 3, −1, −1}, {−3, 1, −1, −1, 3, 1, 3, −1, −1, 1, −1, −1}, {1, −3, −1, −1, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −, −1}, and {3, −1, 3, 3, 3, 3, −1, −1, −}, wherein the second sequence set comprises a sequence set 2A and a sequence set 2B, wherein when the M is 12, the sequence set 2A comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 3, 4, 5, 3, 0, 7, 0, 4, 8, 8}, {0, 0, 9, 8, 7, 9, 0, 5, 0, 8, 4, 4}, {0, 0, 4, 6, 10, 11, 5, 1, 3, 1, 2, 0}, {0, 0, 0, 4, 4, 6, 0, 4, 1, 11, 6, 2}, {0, 0, 6, 3, 1, 8, 8, 10, 6, 10, 5, 10}, {0, 0, 3, 6, 10, 2, 9, 5, 3, 3, 4, 4}, {0, 0, 4, 3, 9, 8, 3, 6, 2, 5, 4, 6}, {0, 0, 1, 5, 5, 7, 1, 5, 2, 0, 7, 3}, {0, 0, 10, 9, 9, 6, 9, 1, 11, 5, 3, 10}, {0, 0, 8, 7, 6, 2, 4, 7, 4, 9, 7, 1}, {0, 0, 1, 4, 6, 9, 4, 10, 8, 7, 5, 6}, {0, 0, 9, 7, 6, 2, 4, 7, 4, 9, 6, 0}, {0, 0, 6, 7, 0, 1, 8, 4, 7, 5, 5, 5}, {0, 0, 4, 8, 0, 4, 0, 8, 7, 8, 9, 10}, {0, 0, 10, 9, 8, 10, 1, 6, 2, 10, 6, 7}, {0, 0, 4, 1, 7, 5, 10, 0, 8, 9, 7, 9}, {0, 0, 5, 0, 7, 1, 2, 8, 8, 8, 7, 9}, {0, 0, 7, 0, 5, 11, 10, 4, 4, 4, 5, 3}, {0, 0, 8, 8, 7, 7, 10, 2, 9, 5, 1, 11}, {0, 0, 9, 8, 7, 8, 11, 4, 0, 8, 3, 3}, {0, 0, 3, 4, 5, 4, 1, 8, 0, 4, 9, 9}, {0, 0, 4, 0, 6, 4, 9, 11, 7, 7, 6, 8}, {0, 0, 7, 5, 4, 11, 0, 3, 11, 4, 1, 5}, {0, 0, 8, 8, 8, 4, 7, 10, 7, 1, 0, 5}, {0, 0, 4, 0, 5, 2, 6, 7, 3, 3, 0, 0}, {0, 0, 7, 6, 5, 0, 1, 4, 0, 4, 2, 6}, {0, 0, 3, 6, 9, 0, 7, 2, 0, 0, 0, 0}, {0, 0, 1, 2, 4, 3, 8, 2, 2, 10, 10, 7}, {0, 0, 11, 1, 1, 0, 4, 9, 7, 2, 3, 10}, {0, 0, 4, 8, 11, 4, 1, 6, 5, 4, 3, 10}, {0, 0, 8, 4, 1, 8, 11, 6, 7, 8, 9, 2}, {0, 0, 2, 2, 5, 4, 9, 3, 4, 0, 0, 10}, {0, 0, 3, 10, 3, 0, 4, 5, 0, 11, 9, 10}, {0, 0, 11, 0, 1, 11, 3, 8, 7, 2, 2, 10}, {0, 0, 2, 5, 8, 11, 6, 1, 11, 10, 10, 10}, {0, 0, 4, 7, 10, 2, 10, 5, 4, 4, 3, 4}, {0, 0, 6, 6, 8, 7, 6, 0, 4, 10, 7, 2}, {0, 0, 5, 3, 11, 10, 4, 8, 5, 7, 7, 10}, {0, 0, 4, 7, 10, 4, 0, 7, 7, 6, 6, 8}, {0, 0, 8, 7, 5, 6, 9, 1, 9, 4, 10, 10}, {0, 0, 4, 5, 7, 6, 3, 11, 3, 8, 2, 2}, {0, 0, 8, 4, 4, 11, 0, 3, 0, 5, 1, 6}, {0, 0, 5, 5, 7, 6, 5, 11, 3, 9, 6, 1}, {0, 0, 3, 3, 4, 3, 0, 7, 0, 3, 8, 8}, {0, 0, 9, 8, 6, 7, 10, 2, 10, 5, 0, 0}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 6, 0, 4, 10, 8, 4, 5, 6, 6, 10}, {0, 0, 7, 3, 1, 6, 6, 7, 2, 5, 1, 4}, {0, 0, 4, 1, 7, 5, 11, 1, 9, 10, 9, 11}, {0, 0, 4, 1, 10, 4, 3, 4, 10, 1, 9, 0}, {0, 0, 4, 0, 6, 4, 8, 10, 6, 6, 4, 6}, {0, 0, 0, 10, 8, 6, 0, 6, 9, 11, 0, 1}, {0, 0, 4, 2, 11, 2, 1, 7, 9, 5, 10, 0}, {0, 0, 8, 10, 1, 10, 11, 5, 3, 7, 2, 0}, {0, 0, 6, 4, 2, 0, 1, 4, 10, 5, 0, 7}, {0, 0, 4, 6, 11, 4, 10, 7, 5, 5, 6, 7}, {0, 0, 11, 0, 1, 4, 9, 3, 0, 9, 7, 7}, {0, 0, 1, 0, 11, 8, 3, 9, 0, 3, 5, 5}, {0, 0, 4, 4, 6, 10, 2, 9, 5, 4, 4, 5, 5}, {0, 0, 7, 1, 9, 3, 5, 9, 8, 7, 6, 3}, {0, 0, 5, 9, 1, 6, 3, 10, 10, 10, 10, 0}, {0, 0, 2, 3, 6, 6, 11, 6, 7, 4, 4, 1}, {0, 0, 3, 5, 8, 8, 2, 9, 10, 7, 8, 6}, {0, 0, 10, 0, 11, 9, 1, 5, 3, 9, 10, 5}, {0, 0, 5, 10, 3, 9, 7, 3, 4, 5, 6, 9}, {0, 0, 4, 8, 1, 6, 2, 11, 10, 0, 2, 3}, {0, 0, 8, 4, 11, 6, 10, 1, 2, 0, 10, 9}, {0, 0, 4, 1, 9, 3, 1, 2, 8, 10, 6, 8}, {0, 0, 3, 11, 4, 1, 6, 7, 2, 2, 0, 1}, {0, 0, 5, 6, 7, 3, 2, 7, 3, 6, 0, 7}, {0, 0, 7, 6, 5, 9, 10, 5, 9, 6, 0, 5}, {0, 0, 7, 5, 2, 2, 4, 7, 2, 8, 2, 1}, {0, 0, 2, 5, 8, 11, 6, 1, 11, 11, 10, 11}, {0, 0, 4, 8, 1, 6, 3, 11, 11, 0, 0, 2}, {0, 0, 7, 1, 7, 0, 1, 4, 2, 0, 10, 7}, {0, 0, 8, 1, 7, 3, 2, 1, 4, 6, 11, 0}, {0, 0, 10, 7, 4, 1, 6, 11, 1, 1, 1, 2}, {0, 0, 4, 7, 10, 3, 11, 6, 6, 5, 5, 6}, {0, 0, 7, 6, 3, 3, 5, 8, 3, 9, 3, 2}, {0, 0, 9, 10, 2, 3, 4, 0, 6, 1, 1, 9}, {0, 0, 5, 4, 2, 11, 0, 3, 9, 4, 11, 6}, {0, 0, 4, 8, 11, 4, 1, 6, 5, 4, 3, 11}, {0, 0, 8, 4, 1, 8, 11, 6, 7, 8, 9, 1}, {0, 0, 7, 4, 1, 11, 0, 2, 7, 1, 7, 3}, {0, 0, 10, 10, 10, 7, 10, 2, 0, 6, 5, 0}, {0, 0, 0, 9, 9, 7, 1, 8, 11, 1, 4, 3}, {0, 0, 0, 3, 3, 5, 11, 4, 1, 11, 8, 9}, {0, 0, 0, 6, 9, 4, 6, 5, 11, 8, 4, 1}, {0, 0, 7, 8, 11, 11, 11, 6, 11, 6, 4, 0}, {0, 0, 5, 11, 5, 8, 8, 1, 11, 9, 8, 10}, {0, 0, 3, 5, 6, 9, 4, 7, 4, 2, 10, 7}, {0, 0, 6, 4, 3, 10, 11, 1, 9, 2, 10, 3}, {0, 0, 6, 5, 0, 0, 8, 0, 9, 0, 1, 4}, {0, 0, 0, 10, 9, 7, 1, 8, 11, 1, 4, 4}, {0, 0, 8, 7, 5, 6, 9, 1, 9, 4, 11, 10}, {0, 0, 1, 3, 3, 4, 10, 1, 9, 6, 1, 8}, {0, 0, 1, 3, 5, 7, 1, 7, 4, 3, 2, 1}, {0, 0, 1, 10, 0, 9, 0, 5, 4, 11, 9, 5}, {0, 0, 5, 8, 1, 6, 2, 11, 11, 0, 2, 2}, {0, 0, 7, 4, 11, 6, 10, 1, 1, 0, 10, 10}, {0, 0, 6, 11, 4, 8, 8, 10, 7, 4, 1, 9}, {0, 0, 11, 9, 9, 7, 1, 8, 11, 1, 4, 4}, {0, 0, 3, 1, 9, 5, 4, 6, 11, 4, 10, 3}, {0, 0, 3, 7, 10, 2, 10, 5, 4, 3, 3, 4}, {0, 0, 0, 1, 1, 0, 4, 9, 7, 2, 2, 9}, {0, 0, 8, 8, 7, 4, 6, 10, 7, 1, 11, 5}, {0, 0, 5, 9, 1, 5, 1, 9, 8, 9, 10, 11}, {0, 0, 11, 1, 3, 10, 11, 6, 3, 7, 4, 10}, {0, 0, 11, 0, 2, 3, 8, 2, 10, 9, 6, 6}, {0, 0, 10, 0, 9, 11, 7, 1, 1, 5, 7, 9}, {0, 0, 8, 8, 11, 11, 11, 6, 11, 5, 4, 11}, {0, 0, 11, 10, 0, 9, 1, 5, 4, 11, 10, 5}, {0, 0, 9, 2, 10, 6, 5, 5, 8, 0, 5, 7}, {0, 0, 8, 6, 4, 5, 7, 11, 5, 0, 7, 7}, {0, 0, 2, 4, 6, 8, 4, 4, 0, 6, 1, 6}, {0, 0, 2, 3, 5, 4, 9, 3, 3, 11, 0, 8}, {0, 0, 6, 9, 0, 5, 2, 7, 6, 5, 4, 11}, {0, 0, 6, 3, 0, 7, 10, 5, 6, 7, 8, 1}, {0, 0, 6, 4, 11, 10, 5, 8, 5, 7, 8, 11}, {0, 0, 6, 4, 2, 10, 10, 1, 9, 2, 9, 2}, {0, 0, 4, 9, 0, 5, 2, 9, 9, 9, 9, 0}, {0, 0, 3, 7, 10, 2, 10, 5, 4, 4, 4, 5}, {0, 0, 9, 8, 7, 6, 11, 9, 2, 6, 10, 4}, {0, 0, 3, 4, 5, 6, 1, 3, 10, 6, 2, 8}, {0, 0, 3, 5, 7, 9, 5, 8, 4, 1, 10, 6}, {0, 0, 1, 10, 8, 6, 0, 6, 9, 10, 0, 11}, {0, 0, 11, 2, 4, 6, 0, 6, 3, 2, 0, 1}, {0, 0, 2, 4, 5, 9, 3, 9, 7, 5, 4, 5}, {0, 0, 10, 6, 4, 0, 4, 10, 11, 0, 1, 0}, {0, 0, 2, 6, 8, 0, 8, 2, 1, 0, 11, 0}, {0, 0, 4, 5, 7, 6, 4, 11, 5, 9, 3, 3}, {0, 0, 0, 8, 5, 3, 8, 1, 4, 3, 5, 3}, {0, 0, 0, 4, 7, 9, 4, 11, 8, 9, 7, 9}, {0, 0, 7, 6, 5, 4, 6, 10, 5, 1, 9, 4}, {0, 0, 4, 8, 0, 4, 0, 8, 7, 8, 9, 9}, {0, 0, 8, 4, 0, 8, 0, 4, 5, 4, 3, 3}, {0, 0, 0, 0, 1, 11, 3, 8, 7, 2, 2, 9}, {0, 0, 5, 2, 0, 6, 5, 7, 2, 5, 1, 3}, {0, 0, 5, 11, 5, 8, 8, 10, 6, 4, 0, 9}, {0, 0, 8, 1, 5, 0, 4, 3, 10, 10, 0, 0}, {0, 0, 6, 6, 8, 8, 6, 0, 4, 10, 9, 4}, {0, 0, 4, 2, 1, 10, 11, 2, 7, 3, 10, 5}, {0, 0, 8, 7, 5, 6, 8, 0, 7, 2, 9, 8}, {0, 0, 5, 3, 11, 8, 8, 10, 4, 9, 4, 9}, {0, 0, 7, 5, 3, 10, 11, 1, 9, 1, 10, 2}, {0, 0, 3, 6, 8, 0, 8, 0, 10, 8, 6, 1}, {0, 0, 3, 10, 6, 11, 8, 9, 2, 3, 11, 11}, {0, 0, 11, 0, 0, 2, 7, 0, 9, 6, 2, 3}, {0, 0, 1, 0, 0, 10, 5, 0, 3, 6, 10, 9}, {0, 0, 7, 10, 4, 10, 7, 5, 6, 8, 11, 11}, {0, 0, 4, 8, 1, 5, 4, 6, 3, 11, 9, 4}, {0, 0, 1, 1, 4, 2, 7, 1, 1, 10, 8, 6}, {0, 0, 3, 8, 1, 3, 2, 6, 3, 0, 10, 10}, {0, 0, 4, 7, 10, 2, 10, 4, 3, 2, 1, 2}, {0, 0, 10, 10, 9, 11, 3, 8, 5, 1, 9, 9}, and {0, 0, 2, 2, 3, 1, 9, 4, 7, 11, 3, 3}, wherein when the M is 16, the sequence set 2B comprises:
{9, 8, 11, 14, 1, 5, 14, 6, 3, 1, 0, 0}, {13, 12, 14, 1, 4, 7, 0, 8, 4, 3, 0, 0}, {14, 5, 11, 2, 9, 13, 9, 6, 10, 10, 0, 0}, {10, 12, 1, 3, 10, 10, 4, 14, 2, 15, 0, 0}, {12, 9, 12, 6, 12, 7, 12, 13, 5, 4, 0, 0}, {13, 12, 0, 2, 4, 8, 1, 8, 5, 3, 0, 0}, {13, 15, 6, 10, 1, 4, 14, 10, 14, 13, 0, 0}, {9, 8, 2, 0, 13, 14, 1, 6, 15, 8, 0, 0}, {7, 8, 14, 0, 3, 2, 15, 10, 1, 8, 0, 0}, {11, 11, 15, 3, 8, 13, 7, 1, 15, 15, 0, 0}, {7, 3, 6, 14, 7, 11, 6, 4, 9, 9, 0, 0}, {12, 12, 7, 6, 5, 7, 11, 2, 11, 6, 0, 0}, {4, 4, 9, 10, 11, 9, 5, 14, 5, 10, 0, 0}, {13, 14, 9, 8, 6, 8, 12, 2, 12, 6, 0, 0}, {3, 2, 7, 8, 10, 8, 4, 14, 4, 10, 0, 0}, {2, 10, 14, 4, 12, 15, 10, 7, 11, 11, 0, 0}, {4, 3, 4, 6, 8, 11, 3, 10, 6, 3, 0, 0}, {9, 6, 9, 4, 10, 5, 11, 12, 4, 4, 0, 0}, {2, 14, 0, 9, 15, 9, 14, 14, 5, 4, 0, 0}, {7, 6, 1, 15, 12, 13, 0, 5, 14, 7, 0, 0}, {13, 13, 9, 8, 6, 8, 12, 2, 12, 6, 0, 0}, {3, 3, 7, 8, 10, 8, 4, 14, 4, 10, 0, 0}, {6, 5, 8, 11, 15, 3, 12, 5, 2, 1, 0, 0}, {7, 15, 4, 13, 5, 9, 6, 3, 8, 8, 0, 0}, {13, 13, 1, 5, 10, 14, 8, 2, 15, 0, 0, 0}, {10, 9, 5, 5, 15, 0, 7, 14, 11, 15, 0, 0}, {13, 12, 6, 7, 1, 0, 8, 14, 12, 14, 0, 0}, {0, 6, 10, 13, 5, 6, 0, 11, 15, 13, 0, 0}, {11, 11, 13, 0, 3, 6, 15, 7, 4, 2, 0, 0}, {6, 2, 4, 13, 2, 12, 0, 0, 7, 5, 0, 0}, {6, 9, 3, 10, 0, 8, 6, 15, 15, 1, 0, 0}, {13, 4, 15, 11, 6, 1, 5, 13, 14, 15, 0, 0}, {8, 1, 6, 14, 6, 10, 6, 4, 9, 9, 0, 0}, {15, 15, 0, 2, 5, 8, 0, 8, 4, 2, 0, 0}, {13, 2, 9, 0, 8, 12, 8, 5, 10, 10, 0, 0}, {2, 2, 13, 15, 10, 11, 3, 11, 9, 13, 0, 0}, {9, 0, 6, 14, 6, 10, 7, 4, 9, 9, 0, 0}, {1, 10, 6, 3, 15, 11, 0, 9, 12, 14, 0, 0}, {13, 2, 11, 3, 10, 3, 2, 12, 13, 15, 0, 0}, {6, 11, 10, 0, 9, 15, 4, 2, 14, 12, 0, 0}, {6, 6, 1, 15, 12, 13, 0, 5, 14, 7, 0, 0}, {8, 3, 4, 14, 14, 6, 13, 11, 14, 0, 0}, {7, 8, 4, 4, 3, 5, 9, 0, 10, 6, 0, 0}, {1, 6, 10, 13, 5, 6, 0, 11, 15, 13, 0, 0}, {1, 4, 0, 1, 0, 2, 7, 14, 9, 5, 0, 0}, {15, 8, 3, 8, 1, 11, 14, 0, 11, 10, 0, 0}, {1, 8, 13, 8, 15, 5, 2, 0, 5, 6, 0, 0}, {9, 15, 10, 4, 0, 8, 12, 2, 1, 1, 0, 0}, {7, 9, 4, 5, 3, 5, 10, 0, 12, 6, 0, 0}, {0, 15, 10, 9, 7, 9, 13, 3, 13, 7, 0, 0}, {0, 1, 6, 7, 9, 7, 3, 13, 3, 9, 0, 0}, {7, 10, 15, 1, 8, 9, 2, 13, 1, 15, 0, 0}, {9, 11, 1, 3, 9, 10, 4, 14, 2, 15, 0, 0}, {9, 1, 5, 9, 1, 3, 13, 9, 13, 12, 0, 0}, {12, 2, 7, 10, 2, 4, 14, 10, 14, 13, 0, 0}, {10, 8, 11, 14, 1, 5, 14, 6, 3, 1, 0, 0}, {7, 12, 1, 7, 14, 1, 12, 8, 12, 11, 0, 0}, {9, 8, 11, 13, 1, 5, 13, 6, 2, 1, 0, 0}, {6, 6, 6, 9, 10, 12, 4, 11, 6, 4, 0, 0}, {10, 10, 10, 7, 6, 4, 12, 5, 10, 12, 0, 0}, {12, 3, 3, 10, 4, 11, 0, 15, 12, 11, 0, 0}, {6, 6, 10, 11, 1, 0, 9, 2, 5, 1, 0, 0}, {10, 13, 1, 3, 10, 10, 4, 14, 2, 15, 0, 0}, {9, 8, 11, 14, 1, 5, 14, 6, 3, 2, 0, 0}, {6, 11, 15, 1, 8, 9, 2, 13, 1, 15, 0, 0}, {1, 8, 2, 9, 1, 5, 9, 7, 2, 15, 0, 0}, {12, 11, 14, 0, 3, 7, 15, 7, 3, 1, 0, 0}, {9, 7, 11, 13, 0, 5, 14, 6, 4, 2, 0, 0}, {11, 1, 2, 9, 3, 10, 0, 15, 12, 11, 0, 0}, {7, 7, 1, 2, 13, 14, 5, 13, 10, 15, 0, 0}, {0, 0, 5, 7, 13, 13, 6, 0, 3, 0, 0, 0}, {13, 3, 9, 0, 8, 12, 8, 5, 10, 10, 0, 0}, {5, 10, 15, 1, 8, 9, 2, 13, 0, 14, 0, 0}, {2, 5, 11, 13, 5, 7, 1, 12, 0, 15, 0, 0}, {0, 14, 1, 10, 3, 8, 3, 2, 7, 7, 0, 0}, {4, 5, 9, 10, 0, 15, 8, 1, 4, 0, 0, 0}, {10, 6, 10, 0, 5, 15, 2, 1, 8, 5, 0, 0}, {4, 0, 2, 11, 1, 11, 15, 15, 6, 5, 0, 0}, {10, 1, 6, 14, 6, 10, 6, 4, 9, 9, 0, 0}, {9, 5, 9, 0, 9, 12, 7, 5, 10, 9, 0, 0}, {15, 0, 10, 9, 7, 9, 13, 3, 13, 7, 0, 0}, {1, 0, 6, 7, 9, 7, 3, 13, 3, 9, 0, 0}, {14, 4, 11, 2, 9, 13, 9, 6, 10, 10, 0, 0}, {5, 4, 0, 14, 11, 12, 15, 4, 14, 7, 0, 0}, {11, 2, 7, 15, 7, 11, 7, 4, 9, 9, 0, 0}, {13, 6, 0, 13, 4, 14, 0, 9, 10, 11, 0, 0}, {4, 12, 15, 6, 13, 0, 11, 7, 11, 10, 0, 0}, {7, 3, 7, 14, 7, 11, 6, 4, 9, 9, 0, 0}, {9, 1, 6, 13, 6, 10, 6, 4, 9, 10, 0, 0}, {11, 8, 11, 4, 11, 6, 11, 12, 4, 3, 0, 0}, {14, 11, 14, 7, 13, 8, 13, 13, 5, 4, 0, 0}, {4, 14, 0, 6, 14, 1, 11, 8, 12, 11, 0, 0}, {6, 8, 9, 14, 7, 13, 5, 3, 14, 13, 0, 0}, {1, 0, 4, 8, 12, 0, 10, 3, 1, 0, 0, 0}, {9, 9, 14, 2, 7, 12, 6, 0, 15, 15, 0, 0}, {15, 15, 2, 4, 6, 9, 2, 9, 5, 3, 0, 0}, {4, 0, 3, 11, 1, 11, 15, 15, 6, 4, 0, 0}, {5, 5, 9, 12, 15, 3, 12, 5, 2, 1, 0, 0}, {15, 12, 15, 8, 14, 9, 13, 14, 6, 4, 0, 0}, {9, 13, 3, 8, 15, 2, 13, 9, 13, 12, 0, 0}, {12, 0, 4, 6, 12, 12, 5, 15, 2, 15, 0, 0}, {14, 12, 15, 2, 4, 8, 1, 8, 5, 3, 0, 0}, {5, 6, 3, 3, 1, 4, 9, 15, 11, 5, 0, 0}, {8, 8, 4, 4, 2, 5, 10, 0, 12, 6, 0, 0}, {8, 8, 12, 12, 14, 11, 6, 0, 4, 10, 0, 0}, {2, 13, 3, 14, 7, 4, 2, 5, 11, 0, 0, 0}, {14, 3, 13, 2, 9, 12, 14, 11, 5, 0, 0, 0}, {4, 10, 10, 0, 9, 15, 4, 2, 14, 13, 0, 0}, {9, 1, 6, 14, 6, 10, 6, 4, 9, 9, 0, 0}, {6, 10, 10, 0, 9, 15, 4, 2, 14, 12, 0, 0}, {1, 10, 14, 4, 12, 15, 10, 7, 11, 11, 0, 0}, {13, 2, 15, 4, 13, 2, 7, 5, 0, 13, 0, 0}, {5, 9, 6, 8, 9, 12, 2, 10, 6, 3, 0, 0}, {2, 2, 7, 8, 10, 8, 4, 13, 4, 9, 0, 0}, {12, 10, 13, 0, 2, 7, 0, 7, 5, 3, 0, 0}, {9, 6, 9, 0, 5, 15, 2, 1, 9, 6, 0, 0}, {15, 13, 7, 7, 1, 1, 9, 15, 12, 15, 0, 0}, {7, 10, 3, 10, 0, 8, 6, 15, 15, 1, 0, 0}, {13, 15, 4, 6, 12, 12, 5, 15, 2, 15, 0, 0}, {7, 10, 3, 10, 0, 8, 7, 0, 15, 1, 0, 0}, {14, 9, 12, 3, 12, 12, 6, 10, 9, 15, 0, 0}, {14, 15, 1, 4, 12, 2, 8, 5, 0, 14, 0, 0}, {4, 6, 11, 15, 6, 7, 1, 12, 0, 14, 0, 0}, {2, 1, 6, 9, 13, 1, 10, 3, 0, 0, 0, 0}, {11, 3, 15, 11, 6, 1, 5, 13, 15, 0, 0, 0}, {13, 11, 2, 11, 7, 0, 5, 9, 7, 7, 0, 0}, {3, 5, 14, 5, 9, 0, 11, 7, 9, 9, 0, 0}, {4, 8, 12, 14, 6, 7, 1, 12, 1, 15, 0, 0}, {4, 7, 11, 15, 6, 7, 1, 12, 0, 14, 0, 0}, {1, 14, 0, 9, 15, 9, 14, 14, 5, 4, 0, 0}, {0, 11, 14, 7, 14, 8, 12, 13, 4, 3, 0, 0}, {9, 9, 13, 13, 14, 11, 7, 0, 6, 11, 0, 0}, {7, 7, 3, 3, 2, 5, 9, 0, 10, 5, 0, 0}, {3, 8, 5, 15, 9, 5, 7, 3, 7, 12, 0, 0}, {13, 8, 11, 1, 7, 11, 9, 13, 9, 4, 0, 0}, {0, 0, 11, 10, 8, 10, 13, 3, 12, 6, 0, 0}, {0, 0, 5, 6, 8, 6, 3, 13, 4, 10, 0, 0}, {5, 4, 7, 9, 13, 2, 10, 4, 1, 0, 0, 0}, {5, 12, 14, 1, 8, 9, 2, 13, 0, 14, 0, 0}, {7, 10, 3, 10, 0, 8, 6, 15, 15, 0, 0, 0}, {11, 3, 4, 11, 1, 4, 14, 10, 13, 12, 0, 0}, {7, 4, 7, 14, 7, 11, 6, 4, 9, 9, 0, 0}, {15, 14, 15, 1, 3, 8, 0, 8, 5, 2, 0, 0}, {0, 9, 12, 3, 11, 14, 9, 6, 10, 10, 0, 0}, {12, 1, 13, 6, 15, 10, 11, 6, 9, 13, 0, 0}, {2, 13, 3, 9, 0, 5, 4, 9, 6, 3, 0, 0}, {13, 12, 10, 6, 2, 14, 4, 11, 14, 15, 0, 0}, {13, 9, 12, 6, 12, 7, 12, 13, 5, 4, 0, 0}, {2, 7, 15, 7, 13, 6, 5, 14, 14, 0, 0, 0}, {3, 10, 7, 4, 0, 12, 1, 10, 12, 14, 0, 0}, {10, 9, 4, 15, 10, 5, 10, 0, 1, 1, 0, 0}, {3, 14, 2, 7, 15, 1, 11, 8, 12, 10, 0, 0}, {14, 15, 11, 10, 7, 9, 13, 2, 13, 6, 0, 0}, {10, 7, 8, 10, 11, 14, 6, 12, 8, 5, 0, 0}, {10, 0, 6, 14, 6, 10, 6, 4, 9, 9, 0, 0}, {5, 15, 4, 13, 5, 9, 5, 3, 8, 8, 0, 0}, {5, 4, 4, 6, 8, 11, 2, 10, 5, 3, 0, 0}, {15, 15, 5, 6, 8, 6, 3, 12, 4, 9, 0, 0}, {1, 1, 11, 10, 8, 10, 13, 4, 12, 7, 0, 0}, {13, 11, 5, 6, 0, 0, 8, 14, 12, 15, 0, 0}, {7, 13, 8, 0, 7, 7, 12, 8, 8, 2, 0, 0}, {10, 12, 2, 4, 10, 10, 4, 14, 2, 15, 0, 0}, {5, 5, 9, 9, 11, 9, 5, 15, 5, 10, 0, 0}, {11, 11, 7, 7, 5, 7, 11, 1, 11, 6, 0, 0}, {5, 15, 3, 12, 5, 9, 5, 3, 8, 8, 0, 0}, {13, 4, 13, 5, 13, 5, 5, 14, 14, 0, 0, 0}, {14, 2, 9, 0, 8, 12, 8, 5, 10, 10, 0, 0}, {6, 5, 10, 12, 15, 4, 13, 5, 3, 1, 0, 0}, {15, 13, 15, 2, 4, 8, 1, 8, 5, 2, 0, 0}, {11, 14, 4, 9, 0, 3, 13, 9, 14, 13, 0, 0}, {15, 14, 15, 0, 3, 8, 15, 8, 4, 1, 0, 0}, {4, 4, 7, 10, 14, 2, 11, 4, 1, 0, 0, 0}, {8, 3, 5, 13, 3, 13, 0, 0, 7, 5, 0, 0}, {0, 4, 13, 5, 12, 5, 4, 13, 14, 0, 0, 0}, {13, 4, 10, 5, 12, 3, 0, 15, 4, 5, 0, 0}, {3, 12, 6, 11, 4, 13, 0, 1, 12, 11, 0, 0}, {5, 5, 14, 10, 3, 12, 1, 5, 5, 3, 0, 0}, {, 11, 2, 6, 13, 4, 15, 11, 11, 13, 0, 0}, {8, 7, 7, 9, 10, 13, 4, 11, 6, 3, 0, 0}, {3, 2, 5, 8, 12, 1, 9, 3, 0, 0, 0, 0}, {10, 6, 8, 0, 5, 15, 2, 1, 8, 6, 0, 0}, {2, 14, 0, 6, 11, 14, 11, 15, 10, 5, 0, 0}, {14, 2, 0, 10, 5, 2, 5, 1, 6, 11, 0, 0}, {11, 7, 11, 4, 11, 6, 11, 12, 4, 3, 0, 0}, {11, 1, 7, 1, 6, 13, 12, 3, 0, 15, 0, 0}, {15, 13, 2, 1, 2, 15, 9, 2, 6, 11, 0, 0}, {9, 11, 0, 2, 9, 10, 4, 14, 2, 0, 0, 0}, {13, 5, 9, 0, 9, 12, 8, 5, 10, 10, 0, 0}, {9, 8, 10, 13, 1, 4, 13, 6, 2, 2, 0, 0}, {2, 3, 7, 8, 10, 8, 4, 14, 4, 10, 0, 0}, {14, 13, 9, 8, 6, 8, 12, 2, 12, 6, 0, 0}, {0, 1, 5, 7, 13, 13, 6, 0, 3, 0, 0, 0}, {0, 5, 3, 8, 0, 5, 8, 5, 0, 13, 0, 0}, {1, 12, 15, 5, 13, 0, 10, 7, 11, 10, 0, 0}, {6, 3, 6, 14, 7, 11, 6, 4, 9, 9, 0, 0}, {13, 12, 0, 0, 1, 14, 8, 1, 5, 10, 0, 0}, {1, 9, 13, 4, 12, 15, 10, 7, 11, 10, 0, 0}, {15, 4, 13, 5, 12, 5, 4, 13, 14, 0, 0, 0}, {9, 12, 7, 0, 8, 1, 1, 11, 12, 14, 0, 0}, {11, 6, 8, 0, 5, 15, 2, 1, 8, 6, 0, 0}, {1, 14, 1, 10, 3, 8, 3, 2, 7, 7, 0, 0}, {13, 3, 12, 4, 12, 4, 4, 13, 14, 15, 0, 0}, {6, 12, 11, 1, 10, 0, 4, 2, 14, 12, 0, 0}, {13, 12, 15, 2, 4, 8, 1, 8, 5, 3, 0, 0}, {2, 5, 11, 14, 5, 7, 1, 12, 0, 14, 0, 0}, {1, 13, 15, 8, 14, 8, 13, 13, 4, 3, 0, 0}, {12, 3, 8, 0, 8, 12, 8, 5, 10, 10, 0, 0}, {1, 13, 9, 6, 14, 9, 12, 6, 8, 11, 0, 0}, {9, 5, 7, 15, 4, 14, 1, 1, 8, 5, 0, 0}, {13, 14, 9, 9, 7, 8, 12, 2, 12, 7, 0, 0}, {15, 12, 15, 1, 4, 8, 1, 8, 5, 3, 0, 0}, and {2, 14, 2, 10, 0, 10, 14, 14, 6, 4, 0, 0}, wherein the third sequence set comprises a sequence set 3A and a sequence set 3B, wherein when the M is 4, the sequence set 3A comprises:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {3, −3, 1, 1, 3, −, −1, 3, 1, 3, 3, 3, 1, −3, −1, 3, 1}, {−3, 1, 1, −3, −3, 3, −1, −1, 3, −3, 3, 3, −3, 1, −1, 3, −3}, {−3, 1, 3, −3, 1, 3, −1, 3, 1, 1, 3, −3, −3, −1, 1, −1, −3, −3}, {1, −3, 3, 1, −3, 3, −1, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 3, 1, 3, 3, −3, 1, −1, 3, 3, 1, 3, −1, 1, −3, −3}, {−, 1, 3, 3, −3, 3, 3, 1, −3, −1, 3, 3, −3, 3, −1, −3, 1, 1}, {1, 3, 3, 3, 1, 3, 3, −3, 1, −1, 3, 3, 1, 3, −, −1, −3, −3}, {−3, 3, 3, −3, 3, 3, 1, −3, −1, 3, 3, −3, 3, −1, −1, 1, 1}, {3, −1, 1, −3, −1, −1, −1, −3, −1, −1, 3, 3, 1, −3, −1, −3, 3, 1}, {3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −1, 3, −1, −1, 3, 3, 3, −1, 3, −1, 3, −1}, {−1, 3, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, −1, −1, −3, 1, 3, 3, 3, −3, 1, −3, 1, −3}, {−3, 1, −1, −3, 3, −1, −1, 1, 3, −3, 3, 3, 1, −3, 1, −3, 1}, {3, −3, −1, 1, 3, 3, −3, 3, −1, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, −3, −1, 3, 3, 1, −3, −3, 3, 3}, {3, −3, −3, 1, −3, 1, 1, −1, 3, 3, −3, 1, 1, 3, 3, 1}, {−3, 1, −1, 1, −1, −3, −3, 3, −1, 3, 3, 3, −3, −1, 3, −3, −1, 1}, {1, −3, −1, −3, −1, 1, 1, 3, −1, 1, 3, 3, 3, 1,

−1, 3, 1, −1, −3}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1, −1, −3}, {3, −1, 1, 3, 1, −1, 1, 1, 1, −1, 3, 3, −3, 1, −1, −1, 3, −3}, {3, −1, −3, 3, −3, −1, −3, −3, −3, −1, 3, 3, 1, −3, 1, 3, 1}, {3, 1, 3, −1, 3, −3, −1, −3, 3, 3, 3, −3, −1, 1, −3, −1, 1}, {3, −3, 3, −1, 3, 1, 3, −1, 1, 3, 3, 3, 1, −1, −3, 1, −1, −3}, {−1, −1, −1, 3, 3, −1, 3, −1, −1, 3, 3, 3, 3, 3, −1, −1}, {−1, −1, −1, 3, 3, −1, 3, −1, −1, 3, 3, 1, 3, 3, 3, −1, −1}, {−1, 1, 3, −3, −1, 1, −3, −3, 3, −1, 3, 3, 3, 3, −3, −3, −1, 1, −3}, {−1, −3, 3, 1, −1, −3, 1, 1, 3, −1, 3, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, 3, −1, 3, 3, −3, −3, −1, −3, −1, 1}, {1, −3, −1, 1, 3, 3, −3, 3, 1, 3, 3, 1, −1, −3, 3, −3, 1}, {−3, 1, −1, −3, 3, 3, 1, 3, 1, −3, 3, 3, −3, −1, 1, 3, 1, −3}, {3, −1, 1, −3, −1, 3, −3, 3, 1, −3, 3, 3, 3, −3, −1, −1, 1, −3}, {3, 3, −1, 3, −1, 1, 3, −3, 1, 3, 3, 3, 1, −1, −1, −3, 1}, {1, −3, −3, 1, −3, 1, −3, 1, 3, 3, 3, −1, −1, 3, −3, −3, 3}, {−3, 1, 1, −3, 1, −3, 1, −3, 3, 3, 3, 3, −1, −1, 3, 1, 1, 3}, {−1, −1, −1, 3, 3, −1, 3, −3, 3, −1, 3, 3, −1, −1, −1, −1, 3, 3}, {−1, −1, −1, 3, 3, −1, 3, 1, 3, −1, 3, 3, −1, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, 3, −3, 1, −3, 3}, {1, −3, 1, −1, −1, −1, 1, −1, 3, −3, −1, −1, 1, −3, −3}, {−3, 1, −3, −1, −1, −1, −1, −3, −1, −1, 3, 1, 3, 1, −3, −1, −3, 1, 1}, {−3, 1, −3, 3, −1, −1, 3, −1, −3, −3, 3, 3, −1, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, −3, 3, 3, 3, −3, −3, −1, −3, 3, 3}, {3, −3, −1, −3, 1, −1, 3, −1, 1, 3, 3, 3, 1, 1, −1, 1, 3, 3}, {−3, 3, −1, 3, −1, −1, 1, −1, −1, −1, 3, 3, −1, −3, −1, 1, −3, 3}, {1, 3, −1, 3, −1, −1, −3, −1, −1, −1, 3, 3, −1, 1, −1, −3, 1, 3}, {1, 1, −1, 1, −3, −1, 1, −1, −1, 3, 3, −1, 3, 1, −3, −3, −1}, {−3, −3, −1, −3, 1, −1, 3, −1, −1, 3, 3, −1, 3, −3, 1, 1, −1}, {−3, −1, 3, 1, −1, 3, 3, −1, 3, 3, 3, −1, 1, −1, 3, −1, 3}, {1, −1, 3, −3, −1, 3, 3, −1, 1, −3, 3, 3, 1, 3, 3, 1, 3}, {−1, 1, 3, 3, −3, 3, −1, −1, 1, −3, 3, 3, 3, 1, 3}, {−1, −3, 3, 3, 1, 3, −1, −1, −3, 1, 3, 3, 3, 3, −3, −3, 3}, {3, −1, 3, −1, −3, 1, −3, 3, 1, 1, 3, 3, 3, −1, 1, −3, 1, 3}, {3, −3, 1, −1, 1, −3, 1, 3, −3, 3, 3, 3, −1, −3, 1, −3, 3}, {1, 3, −1, −1, 3, −1, −3, 3, 1, 3, 3, −3, 1, −3, 3, −3}, {−3, 3, −1, −1, 3, 1, −1, 1, 3, −3, 3, 3, 3, 1, −3, 1, 3, 1}, {1, 3, −3, 3, 3, 1, 3, 1, 1, −1, 3, −3, 1, −3, −3, −1, 1}, {−3, 1, 3, 3, −3, −3, −3, −3, 1, −3, 3, 3, 1, 3, 1, 1, 1, −3}, {−1, 3, −1, 3, 3, −1, −1, 3, 3, 3, −1, −1, 3, −1, −1}, {−3, 3, −3, 1, −3, −1, 3, 3, 1, 1, 3, 3, −1, −3, 1, −3, 3, −3}, {1, 3, 1, −3, 1, −1, 3, 3, −3, −3, 3, 3, −, 1, −3, 1, 3, 1}, {−3, −1, 3, 3, 1, −3, −1, −3, 3, 1, 3, 3, 3, −1, 3, 3, −3, −1}, {1, −1, 3, −3, 1, −1, 1, 3, −3, 3, 3, 3, −1, 3, 3, 1, −1}, {3, 1, −1, 1, −1, −3, 3, 1, −1, 3, 3, −3, −3, −3, 1, 3, 3}, {3, −3, −1, −3, −1, 1, −3, 3, −1, 3, 3, 1, 1, 1, −3, 3, 3}, {−1, 3, 1, −1, −1, 3, −1, −3, 1, 3, 3, −3, 3, −3, −3, −1, −3}, {−1, 3, −3, −1, −1, 3, −1, 1, 1, −3, 3, 3, 1, 3, 1, 1, −1, 1}, {−1, 1, 3, −1, −1, 3, −1, −1, 3, 3, 3, −1, 3, −1, 3, −1, 1}, {−1, −3, 3, −1, −1, 3, −1, −1, 3, 3, 3, −1, 3, −1, 3, −1, −3}, {−1, −3, −1, −3, −1, 1, 1, 3, −1, 3, 3, 1, 1, −1, −3, 1, −3}, and {−1, 1, −1, 1, −1, −3, −3, 3, 3, −1, 3, 3, −3, −3, −1, 1, −3, 1, and wherein when the M is 4, the sequence set 3B comprises:

{−3, −3, −3, 1, 1, −3, −3, 1, 1, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, −3, −3, 1, 1, 1, 1}, {1, 1, −3, 1, −3, −3, 1, 1, −3, 1, 1, −3, 1, 1, −3, −3, −3, 3, 1, 1}, {1, −3, −3, −3, 1, 1, −3, −3, 1, 1, −3, −3, −3, −3, 1, −3, 1, −3, 1, 1}, {3, 3, −3,

−3, 1, 3, 3, −3, −3, 3, −1, 3, −1, 3, 3, 1, 1, −3, −1, −1, −3, −3, 1, 1}, {−1, −1, −3, −3, 1, −1, −1, −3, −3, −1, 3, −1, 3, −1, −1, 1, 1, −3, 3, 3, −3, −3, 1, 1}, {3, 3, −1, −3, 1, 3, 1, 1, −1, 3, 3, −3, −3, 3, −3, 1, 3, 3, −1, −3, 1, 3, 1, 1}, {−1, −1, 3, −3, 1, −1, 1, 1, 3, −1, −1, −3, −3, −1, −3, −1, −1, 1, 3, −3, 1, −1, 1, 1}, {−1, 1, −1, 1, −3, −3, 1, 1, 3, 1, 3, 1, 1, −3, 3, 1, −1, 1, −1, 1, −3, −3, 1, 1}, {3, 1, 3, 1, −3, −3, 1, 1, −1, 1, −1, 1, 1, −3, −3, 1, 3, 1, 3, 1, −3, −3, 1, 1}, {1, 3, 3, −1, 1, −1, 1, 1, 3, −1, 3, 1, −1, −3, −3, 1, 3, 3, −1, 1, −1, 1, 1}, {1, −1, −1, 3, 1, 3, 1, 1, 1, −1, 3, −1, 1, 3, −3, −3, 1, −1, −1, 3, 1, 3, 1, 1}, {1, 1, −1, −1, 3, 3, 1, 1, −3, −1, 3, −1, 3, 1, 3, 3, −1, −1, 1, 1, −1, −1, 1, 1}, {1, 1, 3, 3, −1, −1, 1, 1, −3, 3, −1, 3, −1, 1, −1, −1, 3, 3, 1, 1, 3, 3, 1, 1}, {−3, −3, 3, −3, −1, −3, 1, 1, 1, −3, −1, −3, 3, −3, −3, 3, 1, −3, −3, 3, −3, −1, −3, 1, 1}, {−3, −3, −1, −3, 3, −3, 1, 1, 1, −3, 3, −3, −1, −3, −3, 1, −3, −3, −1, −3, 3, −3, 1, 1}, {3, 1, −3, −1, 3, −1, 1, 1, 3, −3, −3, 3, 3, 3, 1, −3, 3, 1, −3, −1, 3, −1, 1, 1}, {−1, 1, −3, 3, −1, 3, 1, 1, −1, −3, −3, −1, −1, 1, −3, −1, 1, −3, 3, −1, 3, 1, 1}, {3, −3, −3, −1, −3, 1, −3, −1, 3, −1, 3, 3, −3, −1, −1, −3, −3, 3, 1, −3, 3, 1, 1}, {−1, −3, −3, −3, 1, −3, 3, −1, 3, −1, −1, −3, 3, 3, −3, −3, −1, 1, −3, −1, 1, 1, 1}, {3, −3, −1, 1, 3, −1, 1, 3, −3, 3, 1, 1, 1, 1, −3, 1, −3, 3, 3, −1, 3, 1, 1, 1}, {−1, −3, 3, −1, 3, 1, 3, −1, −1, 1, 1, 1, 1, −3, 1, −3, −1, 3, −1, 1, 1, 1}, {−1, −1, −1, −3, 3, 3, 3, 3, 1, −3, 3, −3, 3, 1, −3, −1, 3, 3, −3, −1, −3, 1, 1}, {3, 3, −3, −3, −1, −1, −1, −1, 1, −3, −3, −1, 3, 1, −3, −1, 3, −1, −1, 3, −3, 1, 3, −1, −1, 3, −3, 1, 1}, {1, 3, 3, −1, 3, −3, −1, −3, 3, −1, −3, 1, 1, 3, 3, 1, 1, −1, −1, 3, 3, 1, 1}, {1, −1, −1, 3, −1, −3, 3, −3, 3, −1, 3, 1, 1, −1, −1, 1, 1, 3, 3, −1, −1, 1, 1}, {−1, 3, −3, −3, 1, −3, 3, −3, 3, −3, 1, −3, −3, 3, −3, 1, 1}, {3, −1, −3, 1, −3, −1, −3, −3, 1, −3, −3, −1, 3, 3, 3, −3, −3, 1, 1, 1}, {−1, 3, 3, −3, −1, −3, 1, 1, −1, −1, −1, −3, −1, 1, −3, 1, −1, 3, 3, −3, −1, −3, 1, 1}, {3, −1, −1, −3, 3, −3, 1, 1, 3, 3, 3, −3, 3, 1, −3, 1, 3, −1, −1, −3, 3, −3, 1, 1}, {−3, 1, −1, 3, 1, 1, 1, 1, −3, 1, 3, −1, 1, 1, −3, −3, −3, −1, 3, 1, 1, 1, 1}, {−3, 1, 3, −1, 1, 1, 1, 1, −3, 1, −1, 3, 1, 1, −3, −3, −3, 1, 3, −1, 1, 1, 1, 1}, {1, −3, −1, 3, −3, 3, −3, 1, 3, −1, 1, 1, 3, 1, −3, 3, 1, −3, −3, 3, 1, 1}, {1, −3, 3, −1, −3, −1, −3, 1, −1, 3, 1, 1, −1, 1, −3, −1, 1, 1, −3, −3, −3, −1, 1, 1}, {−3, 1, −1, −3, −3, 3, 1, −3, 1, 3, −1, 3, −1, −3, −3, −3, −3, −1, −3, −3, −3, 1, −3, −3, −3, 1, 1}, {−3, 1, 3, 1, −3, 3, −3, 1, 1, −1, 1, −1, 3, −3, −3, −1, −1, −3, 1, 1}, {1, 3, −3, −1, 1, −3, 3, 1, −1, −3, −3, 1, −3, −1, 3, −1, 1, −1, 3, 3, 3, 1, 1}, {1, −1, −3, 1, −3, 3, −3, −3, −1, 3, 1, 1, 1, −1, −3, 3, −1, 3, 3, −3, −1, 1, 1}, {−1, 1, −1, −1, 3, −3, 3, −3, −3, −1, 1, 1, 1, −1, −3, 1, 1, 1, 3, 3, −1, 1, 1}, {3, 1, 3, 3, −1, 3, −1, −3, 3, 3, 1, −1, 3, 1, 1, 1, 3, 3, −1, 1, 1, −1, −1, −3, −3, −3, 1, 1}, {1, −1, −3, −1, 3, −1, 3, 1, −1, 1, −3, 1, −1, 1, 1, 3, −3, −1, −3, −3, −3, 1, 1}, {1, 3, −3, 3, −1, 3, −1, 1, 3, 1, 1, −1, −3, −3, −3, −3, 1, 1}, (−3, −1, −1, 3, −3, 1, 1, 3, −3, 1, 1, 1, 3, 3, 1, −3, 1, −1, −3, −3, 3, 3, 1, 1}, {−3, 3, 3, −1, −3, 1, 1, −1, −3, 1, 1, 1, −1, −1, 1, −3, 1, 3, −3, −3, −1, −1, 1, 1}, {3, −1, −3, −3, 1, 1, −3, 1, −3, −3, −3, 3, −3, 3, 1, −3, −3, −1, −3, 1, 1, 1}, {−1, 3, −3, −3, 1, 1, 3, −1, 3, −1, −3, −3, −3, −1, −3, −1, 1, −3, −3, 3, 1, 1}, {−3, −1, 3, 3, 1, 1, −1, 3, −3, 1, −3, −3, 3, −3, 3, −1, −1, 3, −1, 3, 1, 1}, {−3, 3, −1, −1, 1, 1, 3, −1, −3, 1, −3, −3, −3, −1, −3, −1, 1, 1, −3, 1, 1, 1}, {1, −3, 1, 1, 1, 3, 1, −1, 1, −3, 3, −1, −1, 1, 3, 1, 1, −3, 1, 1, 1}, {1, −3, 1, 1, 1, 3, 1, −3, −3, −3, 1, 1, 1, 1, −3, 1, 3, 1, 1}, {1, 3, 3, 3, 1, −3, 1, 1, 1, −3, 1, −3, 3, 1, 1, 1, 1, −3, 3, 3, 3, 1, 1}, {1, −3, 1, 1, 1, 3, 1, 1}, {−1, −1, −1, −3, −1, −3, 3, −3, 3, 3, 3, −1, −3, 1, 3, −3, 3, −3, −1, −1, −3, −3, 1, 1}, {3, 3, 3, −3, 3, −3, −1, −3, −1, −1, −3, −3, 1, 1}, {−3, −3, −3, 1, −3, 1, 1, −3, 1, −3, 1, 1, 1, 1, −3, −3, 1, 1, −3, −3, 1, 1, 1, 1}, {−1, −3, −3, 3, −1, −1, 1, −1, 1, −3, −1, −1, 1, −3, 1, 3, −1, −3, 3, 3, −1, −1, 1, 1}, {3, −3, −3, −1, 3, 3, 1, 1, 3, 1, −3, 3, 3, −1, 1, −3, −3, −3, −1, 3, 3, 1, 1}, {−1, 3, −3, 3, 3, 1, 1, 1, 1, −1, −3, 1, −1, 1, 1, 3, −3, 1, 3, −1, −3, −3, 1, 1}, {3, −1, −3, −1, −1, 1, 1, 1, 1, 3, −3, 1, 3, 1, 1, −1, −3, 1, −1, 3, −1, −3, −3, 1, 1}, {1, 1, −3, 1, −3, −3, −3, 1, −3, 1, 1, −3, 1, 1, 1, 1, −3, −3, 1, 1, 1, 1}, {−1, 3, 3, −3, 3, 3, −3, −1, 3, −1, −1, 3, −1, −3, −1, 3, 3, 3, −1, −1, −1, 3, 1, 1}, {3, −1, −1, −3, −1, −1, −3, 3, −1, 3, 3, −1, 3, −3, 3, −1, −1, −1, 3, 3, 3, −1, 1, 1}, {3, −1, 1, −3, −1, −1, 1, −3, 1, −1, −3, 1, −1, 1, −3, −3, −3, 1, 1, 1, 1, 1}, {−1, 3, 1, −3, 3, 3, 1, −3, 3, 1, 3, 1, −3, −3, −3, 3, 1, 1, 1, 1, 1}, {1, −1, 1, −3, −1, 1, −3, 1, −1, −3, 1, 1, −3, −3, −3, −3, −3, −3, −1, 1, 1}, {1, 3, 1, −3, −3, 1, −3, 1, −3, 1, 1, −3, −3, −3, −3, −3, −3, −3, 3, 1, 1}, {−1, −1, 1, 1, 1, −3, 3, 3, −1, −1, −1, 1, −3, −1, 1, −1, −3, 1, −3, 3, 1, 3, 1, 1}, {3, 3, 1, 1, 1, −3, −1, −1, 3, 3, 3, 1, −3, 3, 1, 3, −3, 1, −3, −1, 1, −1, 1, 1}, {1, −3, 1, 3, −1, 1, 3, 3, 3, −1, 1, 1, −3, 3, 3, −3, −3, 3, 3, −3, 3, −1, 1, −3, −1, −1, 1, 1}, {3, 1, 1, 3, 3, −1, 1, 1, 1, 3, 3, −3, 1, −1, 1, −1, 1, 1}, {1, −3, 1, 3, −1, −1, 1, 1, 3, −1, −3, 3, 1, 1, 1, 1, 1, 1, 1}, {1, −3, 1, −3, 3, −3, 3, −3, 3, −3, −3, −3, −3, −3, 1, 1, −3, 1, 1, 1}, {−1, 3, 1, −1, 1, 3, 1, 1, −1, 3, 1, −3, −1, 3, 3, 3, −1, −3, −1, 1, 3, 1, 1}, {3, −1, 1, 3, 1, −1, −1, 1, −3, 3, −1, −1, −1, −3, −3, −1, −1, −1, −1, 3, −3, 3, 1, −1, 1, 1}, {−3, −1, −3, 1, −3, −1, 1, −3, −1, −1, 1, −1, −1, −3, 3, 1, 3, 1, 3, 1, 1}, {−3, 3, 3, 1, −3, 1, 1, 1, 3, 3, 1, −3, −1, 3, 3, 3, 1, 1}, {−3, 3, −3, −3, 3, 3, −3, −1, 3, −1, −3, −1, −3, −1, −1, 1, 1}, {1, −3, −3, 1, −1, −1, 1, 1, −3, −1, −3, 1, 3, −3, 1, 3, −3, 3, 3, 3, −3, 1, 1}, {1, −3, −3, 3, −1, −1, −1, 1, −3, −3, 3, 3, 3, 3, 3, −3, 1, 1}, {3, −1, 1, −3, −1, 3, 3, 3, −1, 1, 3, 3, 3, 1, 1}, {−1, 1, −3, −1, 1, 3, 1, 1, 1, 1, −3, −3, −1, −1, 1, 1}, {1, −3, 1, 3, 3, 1, 1, −3, 1, −3, 1, −1, −1, 1, 1, 1, −3, −3, 1, 3, 3, 1, 1}, {3, −1, −1, −3, −3, 1, 1, 3, −1, 1, 3, −1, −3, −3, −1, −1, 3, 1, −1, −1, −1, 1, 1}, {−1, 3, 3, −3, −3, 1, 1, −1, 3, −1, 3, −3, 3, 3, 3, −1, 1, 3, 3, 3, 1, 1}, {−1, 1, −3, 1, −1, −3, 1, −1, −1, −3, −3, −1, −1, 1, −3, 3, 3, −3, 1, 1}, {3, 1, −3, 1, −3, 1, −3, −3, 1, 3, 3, −3, −3, 3, 1, −3, −1, −1, −3, 1, 1}, (3, 3, 1, −3, −1, −3, 1, −1, 1, −3, −3, 1, −3, 1, 1, −1, −1, 1, 1, 1, 1}, {−1, −1, 1, −3, 3, 1, 3, 1, 3, −1, −3, 3, 1, −3, 1, 3, 1, 1, 1, 1, 1}, {−1, 1, 3, 1, 3, −1, −3, −1, −1, 1, 3, −1, −3, −1, −1, −1, −3, −3, 3, 1, 1}, {3, 1, −1, 1, −1, −3, −1, 3, 3, 3, 1, −1, −3, −1, 3, 3, 3, −3, −3, −3, −3, −3, −3, −3, −3, 1, 1}, {1, −1, −3, −3, 1, 3, 3, 1, −1, −3, −1, −3, 1, 3, −3, 3, 3, 3, −3, 1, 1}, {1, 3, −3, −3, 1, 3, −1, −1, 3, −3, 3, −1, −1, −1, −1, −1, −3, 1, 1}, {3, −1, −3, −3, 3, 3, −3, −3, 3, 3, 1, −3, 1, −3, −3, 3, −1, −1, 1, 3, −3, −1, 1, 1}, {−1, −3, −3, −3, −1, −3, −1, −1, −1, 1, 3, 1, −3, −3, −1, 1, −1, −3, −1, 3, 3, 1, −1, −3, 3, 1, 1},

{3, −3, −3, 1, −3, 1, 1, −3, 1, −1, 3, −3, −3, −3, 3, −1, −1, −3, 3, 3, −3, −1, 1, 1}, {−1, −3, −3, 1, −3, 1, 1, −3, 1, 3, −1, −3, −3, −3, −1, 3, 3, −3, −1, −1, −3, 3, 1, 1}, {1, 3, 3, 1, −3, 3, 1, 3, 3, 3, −3, −3, 1, 3, 1, −1, −1, 3, −3, 1, −3, 3, 1, 1}, {1, −1, −1, 1, −3, −1, 1, −1, −1, −1, −3, −3, 1, −1, 1, 3, 3, −1, −3, 1, −3, −1, 1, 1}, {−3, −3, −1, 3, −3, −1, −1, 3, −3, −1, 3, 1, −1, −3, −1, 3, 1, 3, 3, 3, 1, 1, 1, 1}, {−3, −3, 3, −1, −3, 3, 3, −1, −3, 3, −1, 1, 3, −3, 3, −1, 1, −1, −1, −1, 1, 1, 1, 1}, {3, 3, 3, −1, 1, 3, 3, 3, 1, −3, −1, −3, 1, −3, −3, 1, 3, 3, 1, −3, −3, 1, 1}, {−1, −1, −1, 3, 1, −1, −1, −1, −1, 1, −3, 3, −3, 1, −3, −3, 1, −1, −1, 1, −3, −3, 1, 1}, {−3, −3, −1, 3, −3, −1, 1, −3, −1, 3, −1, −3, 1, 1, 3, 3, 1, 1, −1, −3, 3, 1, 1}, {−3, −3, 3, −1, −3, 3, 1, −3, 3, −1, 3, −3, 1, 1, −1, −1, −1, 1, 1, 3, −3, −1, 1, 1}, {3, 1, 1, 1, −1, 1, 1, −1, −3, 1, 1, 3, −1, 1, −1, 3, 3, 3, −3, −1, −3, −1, 1, 1}, {−1, 1, 1, 1, 3, 1, 1, 3, −3, 1, 1, −1, 3, 1, 3, −1, −1, −1, −3, 3, −3, 3, 1, 1}, {1, 1, 1, −1, −1, 1, −1, −3, −3, 1, −3, 3, −1, 1, −3, −3, 3, −3, −1, −1, −1, 1, 1, 1}, {1, 1, 1, 3, 3, 1, 3, −3, −3, 1, −3, −1, 3, 1, −3, −3, −1, −3, 3, 3, 3, 1, 1, 1}, {1, 1, 3, 1, 1, −1, 1, −1, 1, −1, 3, −1, 1, 3, −3, 3, 1, −1, −3, −3, −3, −3, 1, 1}, {1, 1, −1, 1, 1, 3, 1, 3, 1, 3, −1, 3, 1, −1, −3, −1, 1, 3, −3, −3, −3, −3, 1, 1}, {1, 3, −3, −3, −3, −1, 3, 3, 1, 3, −3, 3, −1, 1, −1, −3, −1, −1, 3, 1, −1, 1, 1}, {1, −1, −3, −3, −1, −3, 3, −1, −1, −1, −3, 1, 1, −1, −1, −3, −1, 3, 3, −1, 1, 3, 1, 1}, {−1, −3, 1, 3, −3, 3, 3, −1, 1, 3, 1, 1}, {−1, −3, 1, −3, −1, 3, 1, −3, 1, 1, 1, 1, −3, −3, 3, 1, 1}, {3, 3, −1, 3, 3, −3, 1, −1, −3, 3, −1, 1, −3, 1, 1, 1, 1, 1, −3, −3, −1, 1, 1, 1}, {3, −3, −1, 1, −1, 3, 1, 1, 3, 1, 3, 1, −1, −1, −3, 1, 3, −3, −1, 1, −1, 3, 1, 1}, {−1, −3, 3, 1, 3, −1, 1, 1, −1, 1, −1, 1, 3, 3, −3, 1, −1, −3, 3, 1, −1, 1, 1}, {3, −1, 3, −1, −3, 1, −3, −3, −1, 1, −1, 1, 3, −1, −3, 3, 3, 3, 1, 1, 3, 3, 1, 1}, {−1, 3, −1, 3, −3, 1, −3, −3, 3, 1, 3, 1, −1, 3, −3, −1, −1, −1, 1, 1, −1, −1, 1, 1}, {−3, 3, −1, 3, 3, −1, −3, 3, −1, 1, 3, 1, 1, −1, 3, −3, 3, 1, 3, 3, −3, 1, 1, 1}, {−3, −1, 3, −1, −1, 3, −3, −1, 3, 1, −1, 1, 1, 3, −1, −3, −1, 1, −1, −1, −3, 1, 1, 1}, {3, −1, 3, −1, −3, 1, −1, −3, 1, −3, −1, −1, −1, −3, 3, 3, 1, 1, 1}, {−1, 3, −1, 3, −3, 1, 3, −3, 1, −3, −1, −1, −1, 1, 1, 1, 1}, {−1, −3, −1, 3, −1, −1, 3, 1, 3, −1, 3, 1, −1, 1, 3, −3, 3, 1, 1, 1, 1}, {3, −3, 3, −1, 3, 3, −1, 1, −1, 3, −1, 1, 3, 1, −1, −3, −1, 1, 1, 1, 3, 3, 1, 1}, {1, −1, −3, 3, 3, −3, 3, −3, 3, 3, 1, −3, −1, 3, −3, 1, 1}, {1, 3, −3, −1, −1, 3, 1, 1, −3, 3, −3, 3, 3, 1, −3, 1, 3, −3, −1, −1, 3, 1, 1}, {1, −1, −3, 3, 3, −1, 1, 1, −3, −1, −3, −1, −1, −1, 1, −3, 1, −1, −3, 3, 3, −1, 1, 1}, {3, −1, −3, 1, 3, −1, 1, 3, 3, −3, 3, −1, −3, −3, 3, 3, 3, −3, 1, 1}, {−1, 3, −3, 1, 3, −3, 1, −1, 3, 1, −1, −1, −3, −1, 3, −3, −3, −1, −1, −1, −3, 1, 1}, {−3, −3, 1, 3, 1, −1, 1, −3, −3, −3, 1, 3, 1, −1, 1, 1, 3, 1, 1}, {−3, −3, 1, −1, 3, 1, −3, −3, −3, 1, 3, 1, −1, 1, 1, −3, 1, 1, −1, 1, 3, 1, 1}, {−1, 1, 3, 3, 1, −3, 3, −3, 3, −1, −1, 1, 3, 1, 1, −1, 1, −1, −3, −1, −3, 1, 1}, {3, 1, −1, 1, −3, −1, −3, 1, 3, 3, 1, −1, 1, 3, 1, 3, 3, −3, −1, −3, 3, −3, 3, 1, 1, 1, 3, 1, 3, 3, −1, −1, −3, 1, 1}, {−3, 1, 1, 3, 3, 1, −3, −3, 1, 3, −1, 3, 3, 3, −3, −1, −3, 3, −3, 3, 1, 1, 1, 1}, {−3, 1, 1, −1, −1, 1, −3, −3, −3, 1, 3, 1, 1}, {1, 3, 3, −1, 1, −1, −3, 3, 1, 3, −1, −3, 1, 3, −3, 3, 3, −3, 3, −3, −1, −1, 1, 1}, {1, −1, −3, 1, 3, −3, −1,

1, −1, 3, −3, 1, −1, −3, −1, −1, −3, −1, −3, 3, 3, 1, 1}, {−3, −3, −3, −3, 1, 1, −1, 1, −3, 1, 3, 1, −1, −3, −1, −1, 1, −3, −3, 1, 1, −3, 1, 1}, {−3, −3, −3, −3, 1, 1, 3, 1, −3, 1, −1, 1, 3, −3, 3, 3, 1, −3, −3, 1, 1, −3, 1, 1}, {−1, 3, 1, 1, −1, 3, 3, 1, 3, −3, −3, −1, 1, −3, 1, −1, −3, −1, −3, −3, 3, 3, 1, 1}, {3, −1, 1, 1, 3, −1, −1, 1, −1, −3, −3, 3, 1, −3, 1, 3, −3, 3, −3, −3, −1, −1, 1, 1}, {3, −3, −1, 3, 3, 3, −1, −1, −3, 1, 3, 1, −3, −1, −1, −3, −1, −1, −3, 1, 1, −3, 1, 1}, {−1, −3, 3, −1, −1, −1, 3, 3, −3, 1, −1, 1, −3, 3, 3, −3, 3, 3, −3, 1, 1, −3, 1, 1}, {−1, 1, 1, −1, −3, −3, 1, 1, 3, 1, 1, 3, 1, −3, 1, −3, −1, 1, 1, −1, −3, −3, 1, 1}, {3, 1, 1, 3, −3, −3, 1, 1, −1, 1, 1, −1, 1, −3, 1, −3, 3, 1, 1, 3, −3, −3, 1, 1}, {3, 1, −3, 3, 1, 1, −3, −3, −1, 1, −1, −3, 1, 3, −1, 1, −1, −1, −3, −1, −1, 1, 1, 1}, {−1, 1, −3, −1, 1, 1, −3, −3, 3, 1, 3, −3, 1, 3, 3, −3, 3, 3, 1, 1, 1}, {1, −3, −3, 1, 3, 3, 1, 3, 1, 1, −3, 1, 1, −3, −3, −3, 1, −1, 1, −1, −3, −1, 1, 1}, {1, −3, −3, 1, −1, −1, 1, −1, 1, 1, −3, 1, 1, −3, −3, −3, 1, 1, 3, −3, 3, 1, 1}, {3, −3, −1, 3, −1, −3, 1, 1, 3, −3, 3, −1, −1, −3, −3, −3, 3, −3, −1, 3, −1, −3, 1, 1}, {−1, −3, 3, −1, 3, −3, 1, 1, −1, −3, −1, 3, 3, −3, −3, −3, −1, −3, −1, 3, −3, 1, 1}, {−3, 1, −3, −1, −1, 3, −1, −1, −1, −3, −1, −1, 1, −3, 3, 3, −1, 3, −1, −1, −3, 3, 1, 1}, {−3, 1, −3, 3, 3, −1, 3, 3, −3, 3, 3, 1, −1, −1, −1, −1, −1, 1, 3, −3, 3, 3, 1, 1}, {−3, 3, −1, −1, 3, 1, 1, −3, 3, 3, −3, −1, 1, 1}, {−3, −1, −3, 3, −1, 3, −1, 1, 1, −3, −3, 3, 1, 3, −3, 3, 3, −3, −1, 1, 1}, {−1, −3, −3, −1, −1, 3, 1, 1, −1, 1, −3, 3, −1, −1, −3, −1, −3, −3, 1, 1}, {3, −3, −3, 3, 3, −1, 1, 1, 3, 1, −3, −1, 3, 3, 1, −3, 3, −3, −3, 3, 3, −1, 1, 1}, {3, −1, −1, −3, −3, −3, 1, 3, −1, 1, −3, −3, −3, −1, −1, −3, 3, −1, −3, 1, 3, 1, 1}, {−1, 3, 3, −3, −3, −3, 1, −1, 3, 1, −3, −3, −3, 3, 3, −1, 1, 1}, {3, −1, −1, 1, 1, 3, 1, 1, −1, −1, 3, 1, −3, 3, −3, 1, 3, −1, −1, 1, 1, 3, 1, 1}, {−1, 3, 3, 1, 1, −1, 1, 1, 3, 3, 1, 1, −1, 1, −1, 3, 3, 1, 1, 1, 1}, {1, 3, 1, 1, 3, −1, 3, 3, 1, −3, 1, −3, −1, −1, −3, −3, 1, 1, 3, 3, −3, −1, 1, 1}, and {1, −1, 1, 1, −1, 3, −1, −1, 1, −3, 1, −3, 3, 3, −3, −3, 1, 1, −1, −1, −3, 3, 1, 1}; and sending a first signal generated based on the sequence {f$_n$}, wherein the sequence {f$_n$} is mapped to N subcarriers.

2. The signal processing method according to claim 1, wherein the N elements in the sequence {f$_n$} are mapped, respectively, to N subcarriers selected from N consecutive subcarriers or N equally spaced subcarriers.

3. The signal processing method according to claim 1, wherein sending a signal generated based on the sequence {f$_n$} comprises:
sending the signal generated based on the sequence {f$_n$} when frequency shaping is performed on the sequence {f$_n$}, or when π/2−BPSK modulation is performed on a data channel.

4. The signal processing method according to claim 1, wherein the first signal comprises one of a reference signal or a signal used to carry communication information.

5. The signal processing method according to claim 1, wherein the sequence {x$_n$} comprising the element x$_n$ is determined from a first set of sequences, at least K sequences in the first set of sequences comprise the element $x_n = u \cdot e^{j M \pi \cdot s_n / M}$ of the sequence {x$_n$}, wherein K is a positive integer greater than or equal to 2, and the sequence {s$_n$} comprising the element s$_n$ corresponding to each of the at least K sequences is selected from a sequence comprising a fourth sequence set and an equivalent sequence of sequences of the fourth sequence set, wherein when the M is 4, the fourth sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1},
{1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1}, {1, 3, −1, 1, −3, −1, −3, 3, −3, −3, −1, −1}, {3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −1, −3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −1, 3, −1, −1}, {−3, 1, −1, −1, 3, 1, 3, −1, −1, 1, −1, −1}, {1, −3, −1, −1, 3, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, 3, −1, −1, −1}.

6. The signal processing method according to claim 1, wherein the sequence {$x_n$} comprising the element $x_n$ is determined from a first set of sequences, at least K sequences in the first set of sequences comprise the element $x_n = u \cdot e^{jM\pi \cdot j \cdot s_n/M}$ of the sequence {$x_n$}, wherein K is a positive integer greater than or equal to 2, and the sequence {$s_n$} comprising the element $s_n$ corresponding to each of the at least K sequences is selected from a sequence comprising a fifth sequence set and an equivalent sequence of sequences in the fifth sequence set, wherein the fifth sequence set comprises a sequence set 5A, a sequence set 5B, a sequence set 5C, and a sequence set 5D, wherein when the M is 12, the sequence set 5A comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 8, 10, 1, 10, 11, 5, 3, 7, 2, 0}, {0, 0, 6, 0, 11, 1, 3, 10, 11, 6, 3, 7, 4, 10}, {0, 0, 9, 2, 10, 6, 5, 5, 8, 0, 5, 7}, {0, 0, 3, 4, 5, 6, 1, 3, 10, 6, 2, 8}, {0, 0, 5, 11, 5, 8, 8, 10, 6, 4, 0, 9}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 8, 2, 9, 10, 2, 10, 4}, {0, 0, 7, 7, 0, 1, 7, 3, 6, 4, 3, 3}, {0, 0, 10, 1, 1, 1, 8, 8, 1, 7, 2, 1}, {0, 0, 9, 7, 10, 6, 5, 9, 11, 8, 1, 3}, {0, 0, 5, 6, 8, 7, 4, 0, 4, 9, 3, 5}, {0, 0, 3, 9, 0, 0, 1, 9, 5, 4, 9, 3}, {0, 0, 7, 5, 4, 3, 7, 4, 10, 1, 4, 9}, {0, 0, 0, 10, 1, 8, 2, 2, 8, 8, 10, 1}, {0, 0, 0, 2, 11, 4, 10, 10, 4, 4, 2, 11}, {0, 0, 6, 4, 0, 11, 1, 3, 10, 3, 8, 6}, {0, 0, 8, 6, 6, 1, 0, 4, 0, 2, 3, 4}, {0, 0, 5, 4, 0, 1, 2, 8, 3, 8, 10, 7}, {0, 0, 7, 8, 0, 11, 10, 4, 9, 4, 2, 5}, {0, 0, 2, 10, 9, 8, 2, 9, 0, 1, 5, 2}, {0, 0, 4, 5, 10, 6, 0, 0, 0, 9, 10, 2}, {0, 0, 5, 6, 0, 1, 4, 1, 4, 0, 8, 8}, {0, 0, 7, 10, 6, 9, 6, 5, 10, 10, 1, 5}, {0, 0, 10, 11, 10, 0, 3, 10, 7, 3, 6, 0}, {0, 0, 4, 9, 1, 10, 1, 0, 7, 6, 2, 4}, {0, 0, 8, 10, 3, 9, 7, 0, 1, 0, 0, 7}, {0, 0, 8, 1, 4, 1, 4, 4, 11, 10, 3, 7}, {0, 0, 1, 6, 10, 3, 5, 3, 10, 7, 0, 9}, {0, 0, 11, 7, 5, 7, 7, 1, 7, 9, 5, 0}, {0, 0, 6, 0, 2, 7, 1, 11, 0, 10, 5, 3}, {0, 0, 4, 9, 11, 5, 6, 4, 8, 5, 11, 7}, {0, 0, 8, 5, 9, 3, 2, 11, 2, 4, 3, 8}, {0, 0, 8, 1, 6, 3, 10, 0, 2, 0, 0, 6}, {0, 0, 6, 11, 3, 10, 9, 11, 11, 6, 3, 2}, {0, 0, 5, 3, 8, 6, 4, 5, 10, 2, 9, 3}, {0, 0, 6, 2, 10, 3, 4, 2, 3, 9, 10, 1}, {0, 0, 5, 0, 11, 8, 3, 6, 6, 9, 5, 8}, {0, 0, 7, 1, 0, 5, 2, 3, 10, 11, 11, 4}, {0, 0, 11, 8, 4, 11, 5, 8, 11, 11, 10, 9}, {0, 0, 0, 5, 10, 1, 9, 5, 3, 5, 5, 11}, {0, 0, 7, 1, 6, 6, 1, 2, 0, 4, 2, 4}, and {0, 0, 6, 1, 0, 7, 11, 2, 1, 3, 10, 7}, when the M is 12, the sequence set 5B comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 6, 0, 8, 2, 4, 8, 7, 6, 6, 2}, {0, 0, 8, 10, 1, 10, 11, 5, 3, 7, 2, 0}, {0, 0, 3, 4, 5, 6, 1, 3, 10, 6, 2, 8}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 8, 2, 9, 10, 2, 10, 4}, {0, 0, 10, 1, 1, 1, 8, 8, 1, 7, 2, 1}, {0, 0, 9, 7, 10, 6, 5, 9, 11, 8, 1, 3}, {0, 0, 11, 1, 10, 0, 8, 3, 3, 7, 9, 11}, {0, 0, 4, 7, 11, 1, 11, 11, 6, 1, 8, 3}, {0, 0, 3, 9, 0, 0, 1, 9, 5, 4, 9, 3}, {0, 0, 0, 10, 1, 8, 2, 2, 8, 8, 10, 1}, {0, 0, 0, 2, 11, 4, 10, 10, 4, 4, 2, 11}, {0, 0, 10, 3, 0, 5, 3, 4, 10, 0, 4, 8}, {0, 0, 7, 8, 0, 0, 10, 4, 9, 5, 4, 5}, {0, 0, 9, 10, 9, 11, 2, 9, 6, 2, 6, 11}, {0, 0, 4, 5, 10, 6, 0, 0, 0, 9, 10, 2}, {0, 0, 5, 6, 0, 1, 4, 1, 4, 0, 8, 8}, {0, 0, 2, 6, 11, 8, 11, 8, 7, 1, 1, 8}, {0, 0, 4, 2, 10, 11, 11, 5, 0, 3, 6, 3}, {0, 0, 0, 7, 1, 4, 11, 10, 1, 0, 7, 6}, {0, 0, 3, 0, 10, 9, 4, 10, 2, 3, 5, 4}, {0, 0, 7, 3, 7, 2, 11, 10, 0, 2, 9, 11}, {0, 0, 0, 9, 8, 11, 0, 6, 1, 4, 0, 8}, {0, 0, 8, 5, 9, 3, 2, 11, 2, 4, 3, 8}, {0, 0, 2, 6, 8, 2, 3, 0, 5, 2, 7, 5}, {0, 0, 3, 7, 2, 6, 8, 8, 5, 2, 7, 4}, {0, 0, 0, 5, 10, 1, 9, 5, 3, 5, 5, 11}, and {0, 0, 5, 7, 11, 5, 1, 11, 11, 0, 3, 0}, when the M is 16, the sequence set 5C comprises:
{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {10, 9, 5, 5, 15, 0, 7, 14, 11, 15, 0, 0}, {6, 9, 3, 10, 0, 8, 6, 15, 15, 1, 0, 0}, {13, 4, 15, 11, 6, 1, 5, 13, 14, 15, 0, 0}, {6, 11, 10, 0, 9, 15, 4, 2, 14, 12, 0, 0}, {15, 8, 3, 8, 1, 11, 14, 0, 11, 10, 0, 0}, {13, 6, 0, 13, 4, 14, 0, 9, 10, 11, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {3, 9, 6, 14, 5, 6, 11, 7, 8, 3, 0, 0}, {10, 8, 4, 15, 10, 5, 10, 0, 1, 1, 0, 0}, {5, 3, 12, 8, 9, 2, 14, 1, 2, 11, 0, 0}, {10, 10, 4, 4, 12, 13, 4, 15, 4, 0, 0, 0}, {11, 11, 6, 13, 3, 13, 1, 1, 11, 10, 0, 0}, {13, 7, 10, 11, 2, 8, 11, 7, 0, 15, 0, 0}, {12, 0, 6, 15, 8, 8, 0, 15, 1, 13, 0, 0}, {11, 9, 4, 9, 1, 10, 7, 5, 8, 11, 0, 0}, {8, 11, 11, 0, 6, 11, 10, 4, 15, 1, 0, 0}, {1, 7, 3, 7, 12, 15, 7, 2, 15, 0, 0, 0}, {3, 13, 1, 9, 2, 11, 11, 1, 3, 1, 0, 0}, {5, 0, 4, 2, 7, 6, 13, 6, 7, 2, 0, 0}, {13, 13, 14, 2, 5, 6, 1, 3, 12, 5, 0, 0}, {3, 2, 1, 14, 0, 5, 7, 1, 10, 3, 0, 0}, {5, 11, 8, 11, 8, 2, 14, 2, 6, 14, 0, 0}, {0, 5, 3, 15, 13, 4, 4, 8, 2, 7, 0, 0}, {14, 8, 7, 1, 2, 9, 15, 12, 1, 1, 0, 0}, {4, 6, 12, 10, 8, 12, 14, 8, 3, 8, 0, 0}, {14, 12, 11, 4, 14, 9, 11, 6, 9, 12, 0, 0}, {14, 7, 15, 3, 9, 5, 14, 15, 0, 12, 0, 0}, {1, 7, 13, 9, 1, 14, 4, 6, 2, 3, 0, 0}, {1, 5, 3, 2, 11, 6, 3, 7, 14, 0, 0, 0}, {0, 12, 2, 0, 2, 13, 8, 13, 0, 6, 0, 0}, {3, 15, 8, 6, 0, 12, 14, 14, 4, 11, 0, 0}, {5, 5, 13, 13, 6, 7, 11, 7, 12, 5, 0, 0}, {11, 13, 2, 12, 7, 14, 10, 11, 2, 3, 0, 0}, {14, 1, 10, 4, 1, 10, 1, 5, 5, 5, 0, 0}, {9, 15, 1, 7, 6, 1, 12, 0, 11, 14, 0, 0}, {3, 15, 10, 14, 4, 12, 10, 12, 12, 5, 0, 0}, {10, 15, 8, 3, 12, 15, 6, 3, 3, 5, 0, 0}, {8, 6, 9, 4, 4, 3, 9, 9, 2, 9, 0, 0}, {7, 8, 15, 0, 12, 14, 2, 11, 6, 14, 0, 0}, {2, 11, 15, 4, 2, 3, 11, 0, 13, 8, 0, 0}, {14, 5, 1, 12, 14, 13, 5, 0, 3, 8, 0, 0}, {11, 10, 0, 9, 12, 2, 12, 8, 9, 9, 0, 0}, {0, 12, 6, 4, 12, 11, 6, 10, 6, 12, 0, 0}, {5, 8, 5, 15, 15, 2, 1, 11, 3, 7, 0, 0}, {3, 13, 0, 2, 4, 12, 12, 5, 15, 3, 0, 0}, {13, 3, 0, 14, 12, 4, 4, 11, 1, 13, 0, 0}, {9, 3, 5, 5, 0, 13, 6, 12, 0, 14, 0, 0}, {13, 14, 8, 5, 6, 14, 14, 3, 14, 2, 0, 0}, {13, 7, 10, 11, 8, 14, 12, 4, 7, 1, 0, 0}, {7, 15, 13, 3, 1, 6, 11, 4, 2, 0, 0, 0}, {15, 5, 12, 3, 14, 15, 12, 3, 3, 9, 0, 0}, {12, 4, 6, 7, 13, 1, 12, 3, 1, 14, 0, 0}, {3, 3, 12, 2, 1, 11, 8, 13, 2, 14, 0, 0}, {13, 13, 4, 14, 15, 5, 8, 3, 14, 2, 0, 0}, {5, 11, 0, 2, 1, 4, 1, 12, 5, 8, 0, 0}, {11, 5, 0, 14, 15, 12, 15, 4, 11, 8, 0, 0}, {7, 3, 9, 9, 6, 0, 14, 3, 11, 15, 0, 0}, {9, 4, 7, 12, 1, 2, 14, 6, 2, 5, 0, 0}, {13, 7, 14, 8, 14, 2, 3, 1, 14, 8, 0, 0}, {7, 2, 12, 0, 0, 8, 14, 12, 12, 5, 0, 0}, {11, 10, 15, 10, 13, 14, 2, 10, 6, 4, 0, 0}, {2, 9, 8, 8, 2, 14, 3, 12, 14, 2, 0, 0}, {3, 8, 3, 1, 5, 3, 8, 12, 6, 4, 0, 0}, {2, 13, 11, 1, 13, 3, 15, 1, 9, 10, 0, 0}, {8, 2, 9, 12, 6, 11, 2, 1, 6, 4, 0, 0}, and {15, 6, 12, 15, 4, 2, 8, 7, 3, 4, 0, 0}, and when the M is 16, the sequence set 5D comprises:
{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {6, 9, 3, 10, 0, 8, 6, 15, 15, 1, 0, 0}, {13, 4, 15, 11, 6, 1, 5, 13, 14, 15, 0, 0}, {15, 8, 3, 8, 1, 11, 14, 0, 11, 10, 0, 0}, {11, 1, 2, 9, 3, 10, 0, 15, 12, 11, 0, 0}, {13, 6, 0, 13, 4, 14, 0, 9, 10, 11, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {14, 6, 0, 14, 7, 7, 14, 2, 15, 2, 0, 0}, {3, 9, 6, 14, 5, 6, 11, 7, 8, 3, 0, 0}, {5, 3, 12, 8, 9, 2, 14, 1, 2, 11, 0, 0}, {10, 10, 4, 4, 12, 13, 4, 15, 4, 0, 0}, {3, 11, 3, 14, 10, 12, 6, 8, 13, 11, 0, 0}, {1, 7, 3, 7, 12, 15, 7, 2, 15, 0, 0, 0}, {12, 9, 4, 9, 1, 10, 7, 5, 8, 11, 0, 0}, {4, 14, 1, 9, 2, 12, 11, 1, 3, 2, 0, 0}, {5, 0, 4, 2, 7, 6, 13, 6, 7, 2, 0, 0}, {13, 14, 12, 14, 2, 6, 3, 11, 4, 4, 0, 0}, {5, 11, 8, 11, 8, 2, 14, 2, 6, 14, 0, 0}, {11, 5, 8, 5, 8, 14, 2, 14, 10, 2, 0, 0}, {14, 8, 7, 1, 2, 9, 15, 12, 1, 1, 0, 0}, {10, 13, 7, 10, 9, 15, 4, 0, 14, 8, 0, 0}, {0, 3, 15, 3, 0, 2, 12, 5, 5, 10, 0, 0}, {13, 7, 13, 11, 6, 0, 1, 0, 5, 12, 0, 0}, {11, 13, 2, 12, 7, 14, 10, 11, 2, 3, 0, 0}, {15, 2, 12, 8, 13, 6, 0, 0, 4, 4, 0, 0}, {2, 14, 13, 7, 5, 1, 5, 2, 8, 12, 0, 0}, {1, 4, 3, 9, 4, 14, 6, 8, 1, 2, 0, 0}, {2, 8, 3, 0, 1, 15, 7, 2, 5, 10, 0, 0}, {7, 6, 15, 11, 5, 13, 3, 6, 6, 4, 0, 0}, {2, 11, 15, 4, 2, 3, 11, 0, 13, 8, 0, 0}, {15, 12, 3, 6, 7, 15, 0, 11, 1, 14, 0, 0}, {0, 12, 6, 4, 12, 11, 6, 10, 6, 12, 0, 0}, {13, 3, 0, 14, 12, 4, 4, 11, 1, 13, 0, 0}, {12, 2, 8, 9, 2, 4, 9, 6, 10, 5, 0, 0}, {5, 15, 2, 3, 6, 13, 13, 6, 0, 3, 0, 0}, {8, 6, 2, 12, 13, 2, 8, 1, 14, 0, 0, 0}, {14, 9, 2, 6, 10, 1, 15, 0, 14, 6, 0, 0}, {11, 1, 14, 12, 10, 1, 3, 5, 15, 6, 0, 0}, {7, 8, 5, 11, 10, 12, 4, 4, 14, 4, 0, 0}, {14, 0, 9, 5, 3, 11, 15, 14, 0, 10, 0, 0}, {4, 14, 0, 1, 8, 13, 9, 1, 0, 13, 0, 0}, {10, 12, 5, 12, 12, 7, 4, 11, 0, 14, 0, 0}, {5, 11, 11, 9, 0, 11, 0, 5, 5, 0, 0, 0}, {1, 1, 6, 6, 8, 15, 3, 15, 12, 3, 0, 0}, {8, 0, 14, 3, 1, 6, 11, 4, 2, 15, 0, 0}, {8, 2, 5, 7, 0, 5, 10, 7, 0, 0, 0, 0}, {13, 7, 10, 15, 2, 2, 0, 11, 3, 11, 0, 0}, {5, 7, 2, 15, 5, 2, 10, 13, 8, 10, 0, 0}, and {1, 10, 2, 13, 8, 12, 3, 1, 1, 5, 0, 0}.

7. The signal processing method according to claim 1, wherein the sequence $\{x_n\}$ comprising the element $x_n$ is determined from a first set of sequences, at least K sequences in the first set of sequences comprise the element $x_n = u \cdot e^{j M \pi \cdot s_n / M}$ of the sequence $\{x_n\}$, wherein K is a positive integer greater than or equal to 2, and the sequence $\{s_n\}$ comprising the element $s_n$ corresponding to each of the at least K sequences is selected from a sequence comprising a sixth sequence set and an equivalent sequence of sequences of the sixth sequence set, wherein the sixth sequence set comprises a sequence set 6A, a sequence set 6B, a sequence set 6C, and a sequence set 6D, wherein when the M is 4, the sequence set 6A comprises:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, −1, 3, 3, −3, −3, −1, 1, −3, 1}, {−1, −3, 1, −3, −1, 1, 1, 3, 3, −1, 3, 3, 1, 1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {1, −3, −3, 1, 1, 3, −1, −1, 3, 1, 3, 3, 3, 1, −3, −1, 3, 1}, {−3, 1, 1, −3, −3, 3, −1, −1, 3, −3, 3, 3, 3, −3, 1, −1, 3, −3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 3, 1, 3, 3, −3, 1, −1, 3, 3, 1, 3, −1, 1, −3, −3}, {−1, 1, 3, 3, −3, 3, 3, 1, −3, −1, 3, 3, −3, 3, −1, −3, 1, 1}, {3, −1, 1, −3, −1, −1, −1, −3, −1, −1, 3, 3, 1, −3, −1, −3, 3, 1}, {3, −1, −3, 1, −1, −1, −1, 1, −1, −1, 3, 3, −3, 1, −1, 1, 3, −3}, {−1, −3, 3, −1, −1, 3, 3, −1, 3, 3, 3, 3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −1, 3, −1, −1, 3, 3, 3, 3, −1, 3, −1, 3, −1}, {−1, 3, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −1, −3, 3}, {1, −3, −1, 1, 3, −1, −1, −3, 1, 1, 3, 3, 3, 1, −1, −3, 3, −1, −1, −3, 1}, {−3, 1, −1, −3, −3, 3, 1, 3, −1, 1, −3, −1, 1, −3, 1}, {3, −3, −1, 1, 3, 3, −3, 3, −1, −3, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, 1, −3, −3, −1, 3, 3, 1, −3, −3, 3, 3}, {3, −1, −3, 1, −3, 1, 1, 1, −1, 3, 3, −3, 1, 1, 3, 3, 1}, {−3, 1, −1, 1, −3, −3, 3, −1, 3, 3, 3, −1, 3, −3, −1, 1}, {1, −3, −1, −3, −1, 1, 1, 3, −1, 3, 3, 3, 1, −1, 3, 1, −1, −3}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1}, {−1, −3}, {3, −1, 1, 3, 1, −1, 1, 1, −1, 3, 3, −3, 1, −1, −1, 3, −3}, {3, −1, −3, 3, −3, −1, −3, −3, −3, −1, 3, 3, 1, −3, −1, −1, 3, 1}, {3, 1, 3, −1, 3, −3, 3, −1, −3, 3, 3, −3, −1, 1, −3, −1, 1}, {3, −3, 3, −1, 3, 1, 3, −1, 1, 3, 3, 1, −1, −3, 1, −1, −3}, {−1, −1, −1, 3, 3, −1, 3, −1, −1, 3, 3, −3, −3, −1, 1, 3, 3, 3, 3, −3, −3, −1, −3}, {−1, 1, 3, −3, −1, 1, −3, −3, 3, −1, 3, 3, 3, 3, −3, −3, −1, −3}, {−1, −3, 3, 1, −1, −3, 1, 1, 3, −1, 3, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, 3, −1, 3, 3, −3, −3, −1, −3, −1, 1}, {1, −3, −1, 1, 3, −3, −3, 3, 1, 3, 3, 1, −1, 3, −3, −1, 3, 1}, {−3, 1, −1, −3, 3, 3, 1, 3, −1, 1, −3, −1, 1, −3}, {3, −1, 1, −3, −1, 3, −3, 3, 1, −3, 3, 3, −3, −1, −1, −3}, {3, −1, −3, 1, −3, 1, 3, −3, 1, 3, 3, 3, 1, −1, −1, −3}, {3, −1, −3, 1, −3, 1, 3, −3, 1, 3, 3, 3, 1, −1, −1, −3}, {3, −1, −3, 1, −3, 3, −3, 1, 3, 3, 3, 1, −1, −1, −3}, {1, −3, −3, 1, −3, 1, −3, 3, 3, 3, −1, −1, 3, −3, −3}, {−3, 1, 1, −3, 1, −3, 1, −3, 3, 3, 3, −1, −1, 3, 1, 1, 3}, {−1, −1, −1, 3, 3, −1, 3, −3, 3, −1, 3, 3, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3}, {−3, 3, −1, −3, 3, −1, 1, 1, −3, −3, 3, 3, −3, 3, 3}, {−3, 1, −3, 3, −1, −1, 3, −1, −3, −3, 3, 3, −3, −1, −3, −3}, {3, 3, −3, −1, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, −1, −3, 3, 3, 3, −3, −3, −1, −3, 3, 3}, {3, −3, −1, −3, 1, −1, 3, 1, 3, 3, 3, 1, 1, −1, 1, 3, 3}, {−3, 3, −1, 3, −1, −1, −1, 3, 3, −1, −1, 1, −3, 3}, {1, 3, −1, 3, −1, −1, −3, −1, −1, −1, 3, 3, −1, 1, −3, −1, 1, 3}, {1, 1, −1, 1, −3, −3, −1, −1, 3, 3, −1, 3, 1, −3, −3, −1}, {−3, −3, −1, −3, 1, −1, −3, −1, −1, 3, 3, −1, 3, −3, 1, 1, −1}, {−3, −1, 3, 1, −1, 3, 3, −1, 3, 3, 3, 3, −1, 1, −1, 3, −1, 3}, {1, −1, 3, −3, −1, 3, −1, −1, 1, 3, 3, 1, 3, 3, 3, 1, 1, 3}, {−1, −3, 3, 1, 3, −1, −1, −3, 1, 3, 3, −3, 3, 3, −3, 3}, {3, −1, 3, −1, −3, 1, −3, 3, 1, 1, 3, 3, 3,

−1, 1, −3, 1, 3}, {3, −1, 3, −1, 1, −3, 1, 3, −3, −3, 3, 3, 3, −1, −3, 1, −3, 3}, {1, 3, −3, 3, 3, 1, 3, 1, 1, −1, 3, 3, −3, 1, −3, −3, −1, 1}, {−3, 3, 1, 3, 3, −3, 3, −3, −3, −1, 3, 3, 1, −3, 3, 1, 1, −1, −3}, {−1, 3, 3, −1, 3, 3, −1, −1, 3, 3, 3, −1, 3, −1, 3, −1, −1}, {3, 1, −1, 1, −1, −3, 3, 1, 3, −1, 3, 3, −3, −3, −3, 1, 3, 3}, {3, −3, −1, −3, −1, 1, 3, −3, 3, −1, 3, 3, 1, 1, 1, −3, 3, 3}, {−1, 3, 1, −1, −1, 3, −1, −3, −3, 1, 3, 3, −3, 3, −3, −3, −1, −3}, and {−1, 3, −3, −1, −1, 3, −1, 1, 1, −3, 3, 3, 1, 3, 1, 1, −1, 1}, when the M is 4, the sequence set 6B comprises: {3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {3, −1, 1, −3, −1, −1, −1, −3, −1, −1, 3, 3, 1, −3, −1, −3, 3, 1}, {3, −1, −3, 1, −1, −1, −1, 1, −1, −1, 3, 3, −3, 1, −1, 1, 3, −3}, {1, −3, −1, 1, 3, −1, −1, −3, 3, 1, 3, 3, 3, −3, 1, −3, 1, −3}, {−3, 1, −1, −3, −1, −1, 1, 3, −3, 3, 3, 1, −3, 1, −1, 1}, {3, 1, −3, −3, 3, 1, 1, −3, −3, 3, 3, −3, 1, 3, −1, −1, 1}, {3, −3, 1, 1, 3, −3, −3, 1, 3, 1, 3, 3, 1, −3, 3, −1, −1, −3}, {−1, −1, −1, 3, 3, −1, 3, −1, −1, 3, 3, −3, 3, 3, −1, −1}, {−1, 1, 3, −3, −1, 1, −3, −3, 3, −1, 3, 3, 3, −3, −3, −1, −3}, {−1, −3, 3, 1, −1, −3, 1, 1, 3, −1, 3, 3, 3, 1, 1, −1, 1}, {1, −3, −3, 1, −3, 1, −3, 1, 3, 3, 3, −1, −1, 3, −3, −3, 3}, {−3, 1, 1, −3, 1, −3, 1, −3, 3, 3, 3, −1, −1, 3, 1, 1, 3}, {−1, −1, −1, 3, 3, −1, 3, −3, 3, −1, 3, 3, −1, −1, −1, −1, 3, 3}, {1, 1, −1, 1, −3, −1, 1, −1, −1, 3, 3, 3, −1, 3, 1, −3, −3, −1}, {−3, −3, −1, −3, 1, −1, −3, −1, −1, 3, 3, 3, −1, 3, −3, 1, 1, −1}, {1, 3, −3, 3, 3, 1, 3, 1, 1, −1, 3, 3, −3, 1, −3, −3, −1, 1}, {−3, 3, 1, 3, 3, −3, 3, −3, −3, −1, 3, 3, 1, −3, 1, 1, −1, −3}, {−3, −1, 3, 3, 1, −3, −1, −3, 3, 1, 3, 3, 3, −1, 3, 3, −3, −1}, {1, −1, 3, 3, −3, 1, −1, 1, 3, −3, 3, 3, 3, −1, 3, 3, 1, −1}, and {3, 1, −1, 1, −1, −3, 3, 1, 3, −1, 3, 3, −3, −3, −3, 1, 3, 3}, when the M is 4, the sequence set 6C comprises: {−3, −3, −3, 1, 1, −3, 3, 1, 1, −3, −3, −3, −3, −3, 1, −3, 1, −3, −3, 1, −3, 1, 1, 1}, {−3, 1, 1, 1, 1, −3, 1, −3, 1, −3, −3, −3, 3, 1, 1, −3, −3, 1, −3, −3, 1, 1, 1, 1}, {1, 1, −3, 1, −3, 1, −3, 1, 1, −3, 1, 1, 1, −3, 1, 1, 1, −3, −3, −3, 1, 1}, {1, −3, −3, −3, 1, 1, −3, −3, 1, 1, −3, −3, −3, −3, −3, 1, −3, 1, −3, −3, 1, −3, 1, 1}, {3, 3, −3, −3, 1, 3, 3, −3, −3, 3, −1, 3, 3, 1, 1, −3, −1, −1, −3, −3, 1, 1}, {−1, −1, −3, −3, 1, −1, −1, −3, −3, −1, 3, −1, 3, −1, −1, 1, 1, −3, 3, 3, −3, −3, 1, 1}, {3, 3, −1, −3, 1, 3, 1, 1, −1, 3, 3, −3, −3, −3, 1, 3, 3, −1, −3, 1, 3, 1, 1}, {−1, −1, 3, −3, 1, −1, 1, 1, 3, −1, −1, −3, −3, −1, 3, −1, 1, −1, −3, 1, −3, 1, −1, 1, 1}, {1, 3, 3, −1, 1, −1, 1, 1, 3, −1, 3, 1, −3, −3, 1, 3, 3, −1, 1, −1, 1, 1}, {1, −1, −1, 3, 1, 3, 1, 1, −1, 3, −1, 1, 3, −3, −1, −1, 3, 1, 3, 1, 1}, {1, 1, −1, −3, 3, 1, 1, −3, −1, 3, −1, 3, 3, −1, −1, 1, 1, −1, −1, 1, 1}, {1, 1, 3, 3, −1, −1, 1, 1, −3, 3, −1, 3, 1, 1, 3, 3, 1, 1}, {3, −3, −3, −1, −3, 1, −3, 1, 3, −3, 3, 3, 3, −1, −1, −3, −3, 3, 3, 1, 3, 1, 1, 1}, {−1, −3, −3, 3, −3, 1, −1, 3, −1, 3, −1, −1, −3, 3, −3, −3, −3, −1, −3, −1, 1, 1, 1}, {3, −3, 3, 3, 1, −3, 1, 1, 1, −3, −3, 3, −3, 3, −3, 1, 3, −1, 1, 1}, {−1, −3, 3, 1, −1, 3, 1, 1, −1, 1, 1, 1, −3, 1, −3, −1, −1, 3, 1, 1, 1, 1}, {−1, −1, −3, 3, 3, 3, 3, 1, 3, −3, −3, 3, −1, 1, −3, 3, −1, 3, 3, −1, −3, 1, 1}, {3, 3, −3, −3, −1, −1, −1, −1, 1, −1, −3, −3, −1, 3, 1, −3, −1, 3, −1, −1, 3, −3, 1, 1}, {−1, 3, −3, −3, 1, −3, 3, −3, 3, 1, −3, −3, 3, −1, −1, −1, 3, −3, 3, 3, 3, −1}, {1, 1}, {3, −1, −3, −3, 1, −3, −1, −3, −1, −3, −3, −3, 1, 1, −1, −1, −1, 1, 1}, {−1, 3, 3, −1, −3, −1, −1, 1, 3, 1, −3, −3, −1, −3, 1, 1}, {3, −1, −1, −3, 3, −3, 1, 1, 3, 3, 3, −3, 3, 1, −3, 1, −1, −1, −3, 3, −3, 1, 1}, {−1, 1, −1, −1, 3, −1, 3, −3, −3, −1, −3, 1, 1, −3, 1, 1, 1, −1, −1, 3, 3, −1, 1, 1}, {3, 1, 3, 3, −1, 3, −1, −3, −3, 3, 1, 1, −3, 1, 1, 1, 3, 3, −1, −1, 3, 1, 1}, {−3, −1, −1, 3, −3, 1, 1, 3, −3, 1, 1, 1, 3, 3, 1, −3, 1, −1, −3, −3, 3, 3, 1, 1}, {−3, 3, 3, −1, −3, 1, 1, −1, −3, 1, 1, 1, 1, −1, 1, 1}, {−3, −1, 3, 3, 1, 1, −1, 3, −3, 1, −3, −3, −3, 3, −3, −3, 1, −1, 3, 3, −3, −3, 1, 1}, {−3, 3, −1, −1, 1, 1, 3, −1, −3, 1, −3, −3, −3, −3, 1, 3, −1, −1, −3, −3, 1, 3, −1, −1, −3, −3, 1, 3, −1, −1, −3, −3, 1, −1}, {1, 1, −3, 1, −3, −3, −3, 1, −3, 1, 1, −3, 1, 1, 1, 1, −3, −3, 1, 1, 1, 1}, {−1, 3, 3, −3, 3, 3, −3, −1, 3, −1, −1, 3, −1, −3, −1, −3, −1, 3, 3, −1, −1, −1, 3}, {3, −1, 1, −3, −1, −1, 1, −3, −1, 1, −1, −3, 1, −1, 1, −3, −3, −3, −3, 1, 1, 1, 1, 1}, {−1, 3, 1, −3, 3, 3, 1, −3, 3, 1, 3, 1, −3, −3, −3, 1, 1, 1, 1}, {−1, 1, 1, 1, −3, 3, 3, −1, −1, 1, −3, −1, 1, −1, −3, 1, −3, 3, 1, 3, 1, 1, −1, 3, 3, 1}, {3, 3, 1, 3, 1, 1, −3, −1, −1, 3, 3, 1, −3, 3, 1, 3, −1, −3, −1, 1, −1, 1, 1}, {1, −3, 3, −1, −1, 3, 3, −3, −3, −3, −3, −1, 1, −3, 1, 1}, {1, −3, 1, −1, 3, 3, −1, −1, −3, 1, 1, −3, −1, −1, 1, −3, 1, −1, −1, 1, 1, −3, 1, 1, 1, −3, 1, 3, 1, 1}, {1, 3, 3, −1, 1, −1, −3, 3, 1, −3, −3, −3, 3, 1, 1, −3, 3, 3, −3, −1, 1, 3, 1, 1}, {3, −1, −1, 3, 3, 3, 3, 1, −3, 3, 1, −1, 1, 1}, {1, −3, −1, 1, −1, −3, 1, −3, −3, 1, −1, −1, −3, 1, −1, −3, −1, 1, 1, −3, 1, 3, 3, −3, 1, 1}, {−3, 1, 3, 3, 1, 1, 1, 3, 1, 3, 1, 1}, {−3, −3, 1, 3, 1, −1, 1, 1, −3, −3, −3, 1, −1, 1, 1}, {1, 3, 1, 3, −1, −3, 1, 1, −3, 1, 1, 3, 1, 1, 1, 1}, {3, −1, −3, −3, 3, −3, 3, 3, 3, 1, −3, −1, 3, −3, −3, −1, 1, 3, −3, −1, 1, 1}, {−1, 3, −3, −3, −1, 3, −1, −1, −1, 1, −3, 1, −3, −3, −1, 3, 3, 1, −3, 3, 1, 1}, {3, 3, 3, −1, 1, 3, 3, 3, 1, −3, −1, −3, 1, −3, 1, 3, 3, 1, −3, −3, 1, 1}, {−1, −1, −1, 3, 1, −1, −1, −1, 1, −3, 3, −3, 1, −3, 1, −3, −3, 1, −1, 1, 1}, {−3, −3, 3, −1, −3, 3, 1, −3, −3, 1, −3, 1, 1, −1, −1, −1, 1, 1, −3, −1, 1, 1}, {1, 3, 1, 1, −1, 1, −1, 1, −3, −1, 1, 3, −3, 3, 1, −1, −3, −3, −3, 1, 1}, {1, 1, −1, 1, 1, 3, 1, 3, 1, −3, 1, 3, 1, −1, −1, 1, 3, −3, −3, −3, 1, 1}, {−1, 1, 3, 3, 1, −3, 3, −3, 3, −1, −1, 1, 3, 1, 1, −1, −1, −1, 3, 3, −3, 1, 1}, {3, 1, −1, −1, 1, −3, −1, −3, −1, 3, 3, 1, −1, 1, 1, 3, 1, 3, 3, −1, −1}, {−3, 1, 1}, {1, 3, 3, −1, 1, −1, −3, 1, 3, −1, −3, 1, 3, 3, 3, −3, 3, −3, −1, −1, 1, 1}, {1, −1, −1, 3, 1, 3, −3, −1, 1, −3, −1, 3, −1, −1, −3, −1, −3, 3, 3, 1, 1}, {1, −3, −3, 1, 3, 3, 1, 3, 1, 1, −3, 1, 1, −3, −3, −3, −3, 1, 1}, {−1, −1, 1, −1, −3, −1, 1, 1, 1, 1, 1}, and {1, −3, −3, 1, −1, −1, 1, −1, 1, 1, −3, 1, 1, −3, −3, −3, 1, 3, 1, 3, −3, 3, 1, 1}, and when the M is 4, the sequence set 6D comprises:
{−3, −3, −3, 1, 1, −3, −3, 1, 1, −3, −3, −3, −3, −3, 1, −3, 1, −3, −3, 1, −3, 1, 1, 1}, {1, 1, −3, 1, −3, −3, −3, −3, 1, −3, 1, 1, 1, −3, 1, 1, 1, 1, −3, −3, 1, 1, 1, 1}, {1, 3, 1, −3, −3, 1, −3, 1, −3, 1, −3, −3, 1, 1, −3, −3, −3, −3, −3, −3, −3, 3, 1, 1}, {1, −3, −3, −3, 1, 1, −3, −3, −3, 1, −3, −3, −3, −3, 1, −3, 1, 1, −3, −3, 1, −3, 1, 1}, {−1, −1, −1, −3, −1, −3, 3, −3, 3, 3, −1, −3, 1, 3, −3, 3, −3, −1, −1, −3, −3, 1, 1}, {1, 3, −3, −3, 3, −3, −3, −3, 1, −3, −3, 3, −1, 3, 3, −3, 1, −1, −1, −1, 3, 3, 1, 1}, {1, −1, −1, 3, 1, 3, 1, 1, 1, −1, 3, −1, 1, 3, −3, −3, 1, −1, −1, 3, 1, 3, 1, 1}, {−1, 3, 3, 3, 1, 3, 3, −3, 3, −1, −1, 1, −3, −3, 3, −1, 3, −3, 1, −1, −3, −3, 1, 1}, {−1, 3, −3, −3, 1, −3, 3, −3, −3, 1, −3, −3, 3, −1, −1, −1, 3, −3, 3, 3, −1, 1, 1}, {3, 1, 3, −1, 3, −3, −1, −1, −1, 1, 3, −3, 3, 1, 3, 1, −1, 3, 3, 1, 1, 3, 1, 1}, {3, −1, −3, −3, 1, −3, −1, −3, −3, 1, −3, −3, −1, 3, 3, 3, −1, −3, −1, −1, −1, 3, 1, 1}, {−1, −3, −3, 3, −3, 1, −3, 3, −1, 3, −1, −1, −3, 3, 3, −3, −3, −1, 1, −3, −1, 1, 1, 1}, {−3, 1, 3, −1, −3, −3, 1, 1, −3, 1, −1, 3, −3, −3, −3, −3, −3, 1, 3, −1, −3, −3, 1, 1}, {3, 3, 1, 1, 1, −3, −1, −1, 3, 3, 3, 1, −3, 3, 1, 3, −3, 1, −3, −1, 1, −1, 1, 1}, {−3, −1, 3, 3, 1, 1, −1, 3, −3, 1, −3, −3, −3, 3, −3, −3, 1, −1, 3, 3, −3, −3, 1, 1}, {1, −3, 1, −3, 1, 1, −3, 1, 1, 1, −3, 1, 1, 1, 1, −3, −3, −3, −3, 1, 1, −3, 1, 1}, {−3, 3, −1, −1, 1, 1, 3, −1, −3, 1, 3, −3, −3, −3, −1, −1, −3, 1, −1, 3, 3, −1, 1, 1, 1}, {−1, −1, 1, 1, −1, −3, 3, 3, −1, −1, −1, −1, −3, −1, 1, 1, −1, −3, 1, −3, 3, 1, 3, 1, 1}, {3, −1, −1, −1, 1, −1, −1, −3, −1, 3, 3, 1, −3, −3, −1, −3, −1, −3, 1, 3, −3, −3, 1, 1}, {−1, 3, 3, −3, −1, 3, 1, −1, −1, −1, −3, −1, 1, −3, 1, −3, 3, −3, −1, −3, 1, 1, 1}, {3, 3, 3, −3, 3, −3, −1, −3, −1, −3, −1, −1, −3, −1, −3, 3, 3, −3, −3, 1, 1, 1}, {3, −3, −3, −1, −3, 1, −3, −1, 3, 3, −3, −1, −1, −3, −3, 3, 1, −3, 3, 1, 1, 1}, {−3, 3, 3, −1, −3, 1, 1, −1, −3, 1, 1, 1, −1, −1, 1, −3, 1, 3, −3, −3, −1, −1, 1, 1}, {−1, 3, 1, −1, 1, 3, 1, 1, −1, 3, 1, −3, −1, 3, 3, 3, 3, −1, −3, −1, 1, 3, 1, 1}, {3, −1, −1, −3, 3, −3, 1, 1, 3, 3, 3, −3, 3, 1, −3, 1, 3, −1, −1, −3, 3, −3, 1, 1}, {1, −1, −1, 3, −1, −3, 3, −3, 3, −1, 3, −3, 1, 1, −1, −1, 1, 1, 3, 3, −1, −1, 1, 1}, {1, −1, −3, 1, −3, −1, 3, −3, 1, 3, 3, 1, −3, 3, −1, 1, −1, −3, −3, −3, 1, 1, 1, 1}, {−3, 1, 1, 1, −3, 1, −3, 1, −3, −3, −3, 1, 1, −3, 1, −3, −3, 1, 1, 1, 1, −3, 1, 1}, {−3, 1, −3, −3, 3, 3, −3, −1, −1, −1, −1, −3, 1, 3, −1, −3, 3, −1, 1, 3, 3, −1, 1, 1}, {3, −1, 1, 3, 1, −1, 1, 1, 3, −1, 1, −3, 3, −1, −1, −1, −1, 3, −3, 3, 1, −1, 1, 1}, {1, −3, 1, 1, −3, 1, 1, 1, −3, −3, −3, 1, 1, −3, 1, −3, −3, −3, −1, −3, −3, 1, 1, 1}, {−3, 1, −3, −3, −1, −3, 1, 3, 3, 3, 3, −3, 1, −1, 3, −3, −3, −1, 3, 1, −1, −1, 3, 1, 1}, {3, 3, −3, −1, 3, 3, −3, −3, −1, 3, −1, 3, 3, 1, 1, −3, −1, −1, −3, −3, −1, −1, 1, 1}, {−1, −1, −3, −3, 1, −1, −1, −3, −3, −1, 3, −1, 3, −1, −1, 1, 1, −3, 3, 3, −3, −3, 1, 1, 1}, {1, −1, −3, 1, −3, 3, −1, −3, 1, 1, −1, −1, 1, −3, 1, 3, 1, 3, −3, −3, −3, 1, 1, 1}, {3, −3, −1, 1, 3, −1, 1, 3, −3, 1, 1, 1, 1, −3, 1, −3, 3, 3, −1, −3, 1, 1, 1, 1}, {−1, 3, 1, −3, 3, 3, 1, −3, 3, 1, 3, −3, 1, 3, 1, −3, −3, −3, −3, 1, 1, 1, 1, 1}, {3, −1, −1, −3, −1, −1, −3, 3, −1, 3, 3, −1, −1, −1, 3, 3, 3, −1, 1, 1}, (3, −1, 1, −3, −1, −1, 1, −3, −1, 1, −1, −3, 1, −1, 1, −3, −3, −3, −3, 1, 1, 1, 1, 1}, {−1, −1, 3, −3, 1, −1, 1, 3, −1, −1, −3, −1, −3, 1, −1, 1, 3, −1, −1, −3, 1, 1, 1}, {1, −3, 1, −1, 3, 3, −1, −1, −3, 1, 1, −3, −1, −1, −3, −1, −3, 1, −3, 1, 1, 1}, {1, 1, −3, 1, −3, −3, 1, −3, 1, 1, −3, 1, 1, 1, −3, −3, −3, −3, 3, 1, 1}, {−1, 1, −1, −1, 3, −1, 3, −3, −3, −1, −3, 1, 1, −3, 1, 1, 1, −1, −1, 3, 3, −1, 1, 1}, {1, −3, 1, 3, −1, −1, 3, 3, −3, −3, 3, 3, −3, −1, −3, 1, 1}, {3, 1, 3, 3, −3, 1, −3, −3, −3, −3, −3, −3, 1, 1, 1, 1, 1, 3, 3, −1, −1, 3, 1, 1}, and {−1, −3, −3, 3, −1, −1, 1, 1, −1, 1, −3, −1, −1, 3, 1, −3, −1, −3, −3, 3, −1, −1, 1, 1}.

8. The signal processing method according to claim 1, wherein an equivalent sequence of the sequence {$s_n$} is an equivalent sequence {$q_n$}, wherein when the M is 4, in the equivalent sequence element {$q_n$}, element $q_n=s_n+u_n$ (mod8), and in a sequence {$u_n$} comprising element $u_n$, $u_n=f+g·n(mod8)$, f $\in${0,2,4,6}, and g $\in${0,2,4,6}, and wherein when the M is 12 or 16, in the equivalent sequence {$q_n$}, element $q_n=s_n+u_n(modM)$, and in a sequence {$u_n$} comprising element $u_n$, $u_n=f+g·n(modM)$, f $\in${0, 1, 2, . . . M−1}, and g $\in${0, 1, 2, . . . , M−1}.

9. A signal processing apparatus, comprising:
a processing unit, configured to determine a sequence {$f_n$} comprising N elements, wherein $f_n$ an element in the sequence {$f_n$}, the sequence {$f_n$} comprises the element $f_n=A·x_n·e^{2\pi j·a·n}$, wherein a value of n ranges from 0 to N−1, A is a non-zero complex number, a is a real number, $x_n=u·e^{\rho_M \pi j·s_n/M}$ is an element in the sequence {$x_n$}, is a non-zero complex number, M is 4, 12, or 16, $\rho_M$ is a real number, $\rho_M$ is 1 or −1 when M is 4, $\rho_M$ is 2 or −2 when M is 12 or 16, and wherein a sequence {$s_n$} comprising an element $s_n$ is selected from a set of sequences comprising a first sequence set, an equivalent sequence of sequences in the first sequence set, a second sequence set, an equivalent sequence of sequences in the second sequence set, a third sequence set, and an equivalent sequence of sequences in the third sequence set, wherein
when the M is 4, the first sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1, −1}, {1, 3, −1, 1, −3, −1, −3, 3, −3, −3, −1, −1}, {−3, 3, −1, 3, −1, 3, 3, −1, −1, −1, −1, −1}, {1, 3, −1, 3, −1, 3, 3, −1, −1, −1, −1, −1}, {3, −1, 3, 3, −1, 3, 3, 3, −1, −1, −1, −1, −1}, {−1, 3, 1, −1, −3, 1, 3, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −3, −3, −1, −1, −3, 1, −3, −3, −1, −1, −3, 1, −3, −3, −1, −1, −3, 1, −1, 1, −1, −1}, {1, 3, −3, −1, −1, 1, 1, −1, 1, 1, −1, −1}, {1, 3, −3, −1, −3, −3, −1, −1, −3, −1, −1}, {−3, 3, 1, −3, −1, 1, 3, 1, −1, 3, −1, −1}, {3, −1, 1, −1, 1, 3, 3, 1, −1, 3, −1, −1}, {−3, 1, −1, −1, 3, 1, 3, −1, −1, 1, −1, −1}, {1, −3, −1, −1, −3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, 3, −1, −1, −1},
wherein the second sequence set comprises a sequence set 2A and a sequence set 2B,
wherein when the M is 12, the sequence set 2A comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 3, 4, 5, 3, 0, 7, 0, 4, 8, 8}, {0, 0, 9, 8, 7, 9, 0, 5, 0, 8, 4, 4}, {0, 0, 4, 6, 10, 11, 5, 1, 3, 1, 2, 0}, {0, 0, 0, 4, 4, 6, 0, 4, 1, 11, 6, 2}, {0, 0, 6, 3, 1, 8, 8, 10, 6, 10, 5, 10}, {0, 0, 3, 6, 10, 2, 9, 5, 3, 3, 4, 4}, {0, 0, 4, 3, 9, 8, 3, 6, 2, 5, 4, 6}, {0, 0, 1, 5, 5, 7, 1, 5, 2, 0, 7, 3}, {0, 0, 10, 9, 9, 6, 9, 1, 11, 5, 3, 10}, {0, 0, 8, 7, 6, 2, 4, 7, 4, 9, 7, 1}, {0, 0, 1, 4, 6, 9, 4, 10, 8, 7, 5, 6}, {0, 0, 9, 7, 6, 2, 4, 7, 4, 9, 6, 0}, {0, 0, 6, 7, 0, 1, 8, 4, 7, 5, 5, 5}, {0, 0, 4, 8, 0, 4, 0, 8, 7, 8, 9, 10}, {0, 0, 10, 9, 8, 10, 1, 6, 2, 10, 6, 7}, {0, 0, 4, 1, 7, 5, 10, 0, 8, 9, 7, 9}, {0, 0, 5, 0, 7, 1, 2, 8, 8, 8, 7, 9}, {0, 0, 7, 0, 5, 11, 10, 4, 4, 4, 5, 3}, {0, 0, 8, 8, 7, 7, 10, 2, 9, 5, 1, 11}, {0, 0, 9, 8, 7, 8, 11, 4, 0, 8, 3, 3}, {0, 0, 3, 4, 5, 4, 1, 8, 0, 4, 9, 9}, {0, 0, 4, 0, 6, 4, 9, 11, 7, 7, 6, 8}, {0, 0, 7, 5, 4, 11, 0, 3, 11, 4, 1, 5}, {0, 0, 8, 8, 8, 4, 7, 10, 7, 1, 0, 5}, {0, 0, 4, 0, 5, 2, 6, 7, 3, 3, 0, 0}, {0, 0, 7, 6, 5, 0, 1, 4, 0, 4, 2, 6}, {0, 0, 3, 6, 9, 0, 7, 2, 0, 0, 0, 0}, {0, 0, 1, 2, 4, 3, 8, 2, 2, 10, 10, 7}, {0, 0, 11, 1, 1, 0, 4, 9, 7, 2, 3, 10}, {0, 0, 4, 8, 11, 4, 1, 6, 5, 4, 3, 10}, {0, 0, 8, 4, 1, 8, 11, 6, 7, 8, 9, 2}, {0, 0, 2, 2, 5, 4, 9, 3, 4, 0, 0, 10}, {0, 0, 3, 10, 3, 0, 4, 5, 0, 11, 9, 10}, {0, 0, 11, 0, 1, 11, 3, 8, 7, 2, 2, 10}, {0, 0, 2, 5, 8, 11, 6, 1, 11, 10, 10, 10}, {0, 0, 4, 7, 10, 2, 10, 5, 4, 4, 3, 4}, {0, 0, 6, 6, 8, 7, 6, 0, 4, 10, 7, 2}, {0, 0, 5, 3, 11, 10, 4, 8, 5, 7, 7, 10}, {0, 0, 4, 7, 10, 4, 0, 7, 7, 6, 6, 8}, {0, 0, 8, 7, 5, 6, 9, 1, 9, 4, 10, 10}, {0, 0, 4, 5, 7, 6, 3, 11, 3, 8, 2, 2}, {0, 0, 8, 4, 4, 11, 0, 3, 0, 5, 1, 6}, {0, 0, 5, 5, 7, 6, 5, 11, 3, 9, 6, 1}, {0, 0, 3, 3, 4, 3, 0, 7, 0, 3, 8, 8}, {0, 0, 9, 8, 6, 7, 10, 2, 10, 5, 0, 0}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 6, 0, 4, 10, 8, 4, 5, 6, 6, 10}, {0, 0, 7, 3, 1, 6, 6, 7, 2, 5, 1, 4}, {0, 0, 4, 1, 7, 5, 11, 1, 9, 10, 9, 11}, {0, 0, 4, 1, 10, 4, 3, 4, 10, 1, 9, 0}, {0, 0, 4, 0, 6, 4, 8, 10, 6, 6, 4, 6}, {0, 0, 1, 2}, {0, 0, 4, 2, 11, 2, 1, 7, 9, 0, 10, 8, 6, 0, 6, 9, 11, 0, 1}, {0, 0, 4, 2, 11, 2, 1, 7, 9, 5, 10, 0}, {0, 0, 8, 10, 1, 10, 11, 5, 3, 7, 2, 0}, {0, 0, 6, 4, 2, 0, 1, 4, 10, 5, 0, 7}, {0, 0, 4, 6, 11, 4, 10, 7, 5, 5, 6, 7}, {0, 0, 11, 0, 1, 4, 9, 3, 0, 9, 7, 7}, {0, 0, 1, 0, 11, 8, 3, 9, 0, 3, 5, 5}, {0, 0, 4, 6, 10, 2, 9, 5, 4, 4, 5, 5}, {0, 0, 7, 1, 9, 3, 5, 9, 8, 7, 6, 3}, {0, 0, 5, 9, 1, 6, 3, 10, 10, 10, 10, 0}, {0, 0, 2, 3, 6, 6, 11, 6, 7, 4, 4, 1}, {0, 0, 3, 5, 8, 8, 2, 9, 10, 7, 8, 6}, {0, 0, 10, 0, 11, 9, 1, 5, 3, 9, 10, 5}, {0, 0, 5, 10, 3, 9, 7, 3, 4, 5, 6, 9}, {0, 0, 4, 8, 1, 6, 2, 11, 10, 0, 2, 3}, {0, 0, 8, 4, 11, 6, 10, 1, 2, 0, 10, 9}, {0, 0, 4, 1, 9, 3, 1, 2, 8, 10, 6, 8}, {0, 0, 3, 11, 4, 1, 6, 7, 2, 2, 0, 1}, {0, 0, 5, 6, 7, 3, 2, 7, 3, 6, 0, 7}, {0, 0, 7, 6, 5, 9, 10, 5, 9, 6, 0, 5}, {0, 0, 7, 5, 2, 2, 4, 7, 2, 8, 2, 1}, {0, 0, 2, 5, 8, 11, 6, 1, 11, 11, 10, 11}, {0, 0, 4, 8, 1, 6, 3, 11, 11, 0, 0, 2}, {0, 0, 7, 1, 7, 0, 1, 4, 2, 0, 10, 7}, {0, 0, 8, 1, 7, 3, 2, 1, 4, 6, 11, 0}, {0, 0, 10, 7, 4, 1, 6, 11, 1, 1, 1, 2}, {0, 0, 4, 7, 10, 3, 11, 6, 6, 5, 5, 6}, {0, 0, 7, 6, 3, 3, 5, 8, 3, 9, 3, 2}, {0, 0, 9, 10, 2, 3, 4, 0, 6, 1, 1, 9}, {0, 0, 5, 4, 2, 11, 0, 3, 9, 4, 11, 6}, {0, 0, 4, 8, 11, 4, 1, 6, 5, 4, 3, 11}, {0, 0, 8, 4, 1, 8, 11, 6, 7, 8, 9, 1}, {0, 0, 7, 4, 1, 11, 0, 2, 7, 1, 7, 3}, {0, 0, 10, 10, 10, 7, 10, 2, 0, 6, 5, 0}, {0, 0, 0, 9, 9, 7, 1, 8, 11, 1, 4, 3}, {0, 0, 0, 3, 3, 5, 11, 4, 1, 11, 8, 9}, {0, 0, 0, 6, 9, 4, 6, 5, 11, 8, 4, 1}, {0, 0, 7, 8, 11, 11, 11, 6, 11, 6, 4, 0}, {0, 0, 5, 11, 5, 8, 8, 1, 11, 9, 8, 10}, {0, 0, 3, 5, 6, 9, 4, 7, 4, 2, 10, 7}, {0, 0, 6, 4, 3, 10, 11, 1, 9, 2, 10, 3}, {0, 0, 6, 5, 0, 0, 8, 0, 9, 0, 1, 4}, {0, 0, 0, 10, 9, 7, 1, 8, 11, 1, 4, 4}, {0, 0, 8, 7, 5, 6, 9, 1, 9, 4, 11, 10}, {0, 0, 1, 3, 3, 4, 10, 1, 9, 6, 1, 8}, {0, 0, 1, 3, 5, 7, 1, 7, 4, 3, 2, 1}, {0, 0, 1, 10, 0, 9, 0, 5, 4, 11, 9, 5}, {0, 0, 5, 8, 1, 6, 2, 11, 11, 0, 2, 2}, {0, 0, 7, 4, 11, 6, 10, 1, 1, 0, 10, 10}, {0, 0, 6, 11, 4, 8, 8, 10, 7, 4, 1, 9}, {0, 0, 11, 9, 9, 7, 1, 8, 11, 1, 4, 4}, {0, 0, 3, 1, 9, 5, 4, 6, 11, 4, 10, 3}, {0, 0, 3, 7, 10, 2, 10, 5, 4, 3, 3, 4}, {0, 0, 0, 1, 1, 0, 4, 9, 7, 2, 2, 9}, {0, 0, 8, 8, 7, 4, 6, 10, 7, 1, 11, 5}, {0, 0, 5, 9, 1, 5, 1, 9, 8, 9, 10, 11}, {0, 0, 11, 1, 3, 10, 11, 6, 3, 7, 4, 10}, {0, 0, 11, 0, 2, 3, 8, 2, 10, 9, 6, 6}, {0, 0, 10, 0, 9, 11, 7, 1, 1, 5, 7, 9}, {0, 0, 8, 8, 11, 11, 11, 6, 11, 5, 4, 11}, {0, 0, 11, 10, 0, 9, 1, 5, 4, 11, 10, 5}, {0, 0, 9, 2, 10, 6, 5, 5, 8, 0, 5, 7}, {0, 0, 8, 6, 4, 5, 7, 11, 5, 0, 7, 7}, {0, 0, 2, 4, 6, 8, 4, 4, 0, 6, 1, 6}, {0, 0, 2, 3, 5, 4, 9, 3, 3, 11, 0, 8}, {0, 0, 6, 9, 0, 5, 2, 7, 6, 5, 4, 11}, {0, 0, 6, 3, 0, 7, 10, 5, 6, 7, 8, 1}, {0, 0, 6, 4, 11, 10, 5, 8, 5, 7, 8, 11}, {0, 0, 6, 4, 2, 10, 10, 1, 9, 2, 9, 2}, {0, 0, 4, 9, 0, 5, 2, 9, 9, 9, 9, 0}, {0, 0, 3, 7, 10, 2, 10, 5, 4, 4, 4, 5}, {0, 0, 9, 8, 7, 6, 11, 9, 2, 6, 10, 4}, {0, 0, 3, 4, 5, 6, 1, 3, 10, 6, 2, 8}, {0, 0, 3, 5, 7, 9, 5, 8, 4, 1, 10, 6}, {0, 0, 1, 10, 8, 6, 0, 6, 9, 10, 0, 11}, {0, 0, 11, 2, 4, 6, 0, 6, 3, 2, 0, 1}, {0, 0, 2, 4, 5, 9, 3, 9, 7, 5, 4, 5}, {0, 0, 10, 6, 4, 0, 4, 10, 11, 0, 1, 0}, {0, 0, 2, 6, 8, 0, 8, 2, 1, 0, 11, 0}, {0, 0, 4, 5, 7, 6, 4, 11, 5, 9, 3, 3}, {0, 0, 0, 8, 5, 3, 8, 1, 4, 3, 5, 3}, {0, 0, 0, 4, 7, 9, 4, 11, 8, 9, 7, 9}, {0, 0, 7, 6, 5, 4, 6, 10, 5, 1, 9, 4}, {0, 0, 4, 8, 0, 4, 0, 8, 7, 8, 9, 9}, {0, 0, 8, 4, 0, 8, 0, 4, 5, 4, 3, 3}, {0, 0, 0, 0, 1, 11, 3, 8, 7, 2, 2, 9}, {0, 0, 5, 2, 0, 6, 5, 7, 2, 5, 1, 3}, {0, 0, 5, 11, 5, 8, 8, 10, 6, 4, 0, 9}, {0, 0, 8, 1, 5, 0, 4, 3, 10, 10, 0, 0}, {0, 0, 6, 6, 8, 8, 6, 0, 4, 10, 9, 4}, {0, 0, 4, 2, 1, 10, 11, 2, 7, 3, 10, 5}, {0, 0, 8, 7, 5, 6, 8, 0, 7, 2, 9, 8}, {0, 0, 5, 3, 11, 8, 8, 10, 4, 9, 4, 9}, {0, 0, 7, 5, 3, 10, 11, 1, 9, 1, 10, 2}, {0, 0, 3, 6, 8, 0, 8, 0, 10, 8, 6, 1}, {0, 0, 3, 10, 6, 11, 8, 9, 2, 3, 11, 11}, {0, 0, 11, 0, 0, 2, 7, 0, 9, 6, 2, 3}, {0, 0, 1, 0, 0, 10, 5, 0, 3, 6, 10, 9}, {0, 0, 7, 10, 4, 10, 7, 5, 6, 8, 11, 11}, {0, 0, 4, 8, 1, 5, 4, 6, 3, 11, 9, 4}, {0, 0, 1, 1, 4, 2, 7, 1, 1, 10, 8, 6}, {0, 0, 3, 8, 1, 3, 2, 6, 3, 0, 10, 10}, {0, 0, 4, 7, 10, 2, 10, 4, 3, 2, 1, 2}, {0, 0, 10, 10, 9, 11, 3, 8, 5, 1, 9, 9}, and {0, 0, 2, 2, 3, 1, 9, 4, 7, 11, 3, 3}, wherein when the M is 16, the sequence set 2B comprises: {9, 8, 11, 14, 1, 5, 14, 6, 3, 1, 0, 0}, {13, 12, 14, 1, 4, 7, 0, 8, 4, 3, 0, 0}, {14, 5, 11, 2, 9, 13, 9, 6, 10, 10, 0, 0}, {10, 12, 1, 3, 10, 10, 4, 14, 2, 15, 0, 0}, {12, 9, 12, 6, 12, 7, 12, 13, 5, 4, 0, 0}, {13, 12, 0, 2, 4, 8, 1, 8, 5, 3, 0, 0}, {13, 15, 6, 10, 1, 4, 14, 10, 14, 13, 0, 0}, {9, 8, 2, 0, 13, 14, 1, 6, 15, 8, 0, 0}, {7, 8, 14, 0, 3, 2, 15, 10, 1, 8, 0, 0}, {11, 11, 15, 3, 8, 13, 7, 1, 15, 15, 0, 0}, {7, 3, 6, 14, 7, 11, 6, 4, 9, 9, 0, 0}, {12, 12, 7, 6, 5, 7, 11, 2, 11, 6, 0, 0}, {4, 4, 9, 10, 11, 9, 5, 14, 5, 10, 0, 0}, {13, 14, 9, 8, 6, 8, 12, 2, 12, 6, 0, 0}, {3, 2, 7, 8, 10, 8, 4, 14, 4, 10, 0, 0}, {2, 10, 14, 4, 12, 15, 10, 7, 11, 11, 0, 0}, {4, 3, 4, 6, 8, 11, 3, 10, 6, 3, 0, 0}, {9, 6, 9, 4, 10, 5, 11, 12, 4, 4, 0, 0}, {2, 14, 0, 9, 15, 9, 14, 14, 5, 4, 0, 0}, {7, 6, 1, 15, 12, 13, 0, 5, 14, 7, 0, 0}, {13, 13, 9, 8, 6, 8, 12, 2, 12, 6, 0, 0}, {3, 3, 7, 8, 10, 8, 4, 14, 4, 10, 0, 0}, {6, 5, 8, 11, 15, 3, 12, 5, 2, 1, 0, 0}, {7, 15, 4, 13, 5, 9, 6, 3, 8, 8, 0, 0}, {13, 13, 1, 5, 10, 14, 8, 2, 15, 0, 0, 0}, {10, 9, 5, 5, 15, 0, 7, 14, 11, 15, 0, 0}, {13, 12, 6, 7, 1, 0, 8, 14, 12, 14, 0, 0}, {0, 6, 10, 13, 5, 6, 0, 11, 15, 13, 0, 0}, {11, 11, 13, 0, 3, 6, 15, 7, 4, 2, 0, 0}, {6, 2, 4, 13, 2, 12, 0, 0, 7, 5, 0, 0}, {6, 9, 3, 10, 0, 8, 6, 15, 15, 1, 0, 0}, {13, 4, 15, 11, 6, 1, 5, 13, 14, 15, 0, 0}, {8, 1, 6, 14, 6, 10, 6, 4, 9, 9, 0, 0}, {15, 15, 0, 2, 5, 8, 0, 8, 4, 2, 0, 0}, {13, 2, 9, 0, 8, 12, 8, 5, 10, 10, 0, 0}, {2, 2, 13, 15, 10, 11, 3, 11, 9, 13, 0, 0}, {9, 0, 6, 14, 6, 10, 7, 4, 9, 9, 0, 0}, {1, 10, 6, 3, 15, 11, 0, 9, 12, 14, 0, 0}, {13, 2, 11, 3, 10, 3, 2, 12, 13, 15, 0, 0}, {6, 11, 10, 0, 9, 15, 4, 2, 14, 12, 0, 0}, {6, 6, 1, 15, 12, 13, 0, 5, 14, 7, 0, 0}, {8, 8, 3, 4, 14, 14, 6, 13, 11, 14, 0, 0}, {7, 8, 4, 4, 3, 5, 9, 0, 10, 6, 0, 0}, {1, 6, 10, 13, 5, 6, 0, 11, 15, 13, 0, 0}, {1, 4, 0, 1, 0, 2, 7, 14, 9, 5, 0, 0}, {15, 8, 3, 8, 1, 11, 14, 0, 11, 10, 0, 0}, {1, 8, 13, 8, 15, 5, 2, 0, 5, 6, 0, 0}, {9, 15, 10, 4, 0, 8, 12, 2, 1, 1, 0, 0}, {7, 9, 4, 5, 3, 5, 10, 0, 12, 6, 0, 0}, {0, 15, 10, 9, 7, 9, 13, 3, 13, 7, 0, 0}, {0, 1, 6, 7, 9, 7, 3, 13, 3, 9, 0, 0}, {7, 10, 15, 1, 8, 9, 2, 13, 1, 15, 0, 0}, {9, 11, 1, 3, 9, 10, 4, 14, 2, 15, 0, 0}, {9, 1, 5, 9, 1, 3, 13, 9, 13, 12, 0, 0}, {12, 2, 7, 10, 2, 4, 14, 10, 14, 13, 0, 0}, {10, 8, 11, 14, 1, 5, 14, 6, 3, 1, 0, 0}, {7, 12, 1, 7, 14, 1, 12, 8, 12, 11, 0, 0}, {9, 8, 11, 13, 1, 5, 13, 6, 2, 1, 0, 0}, {6, 6, 6, 9, 10, 12, 4, 11, 6, 4, 0, 0}, {10, 10, 10, 7, 6, 4, 12, 5, 10, 12, 0, 0}, {12, 3, 3, 10, 4, 11, 0, 15, 12, 11, 0, 0}, {6, 6, 10, 11, 1, 0, 9, 2, 5, 1, 0, 0}, {10, 13, 1, 3, 10, 10, 4, 14, 2, 15, 0, 0}, {9, 8, 11, 14, 1, 5, 14, 6, 3, 2, 0, 0}, {6, 11, 15, 1, 8, 9, 2, 13, 1, 15, 0, 0}, {1, 8, 2, 9, 1, 5, 9, 7, 2, 15, 0, 0}, {12, 11, 14, 0, 3, 7, 15, 7, 3, 1, 0, 0}, {9, 7, 11, 13, 0, 5, 14, 6, 4, 2, 0, 0}, {11, 1, 2, 9, 3, 10, 0, 15, 12, 11, 0, 0}, {7, 7, 1, 2, 13, 14, 5, 13, 10, 15, 0, 0}, {0, 0, 5, 7, 13, 13, 6, 0, 3, 0, 0, 0}, {13, 3, 9, 0, 8, 12, 8, 5, 10, 10, 0, 0}, {5, 10, 15, 1, 8, 9, 2, 13, 0, 14, 0, 0}, {2, 5, 11, 13, 5, 7, 1, 12, 0, 15, 0, 0}, {0, 14, 1, 10, 3, 8, 3, 2, 7, 7, 0, 0}, {4, 5, 9, 10, 0, 15, 8, 1, 4, 0, 0, 0}, {10, 6, 10, 0, 5, 15, 2, 1, 8, 5, 0, 0}, {4, 0, 2, 11, 1, 11, 15, 15, 6, 5, 0, 0}, {10, 1, 6, 14, 6, 10, 6, 4, 9, 9, 0, 0}, {9, 5, 9, 0, 9, 12, 7, 5, 10, 9, 0, 0}, {15, 0, 10, 9, 7, 9, 13, 3, 13, 7, 0, 0}, {1, 0, 6, 7, 9, 7, 3, 13, 3, 9, 0, 0}, {14, 4, 11, 2, 9, 13, 9, 6, 10, 10, 0, 0}, {5, 4, 0, 14, 11, 12, 15, 4, 14, 7, 0, 0}, {11, 2, 7, 15, 7, 11, 7, 4, 9, 9, 0, 0}, {13, 6, 0, 13, 4, 14, 0, 9, 10, 11, 0, 0}, {4, 12, 15, 6, 13, 0, 11, 7, 11, 10, 0, 0}, {7, 3, 7, 14, 7, 11, 6, 4, 9, 9, 0, 0}, {9, 1, 6, 13, 6, 10, 6, 4, 9, 10, 0, 0}, {11, 8, 11, 4, 11, 6, 11, 12, 4, 3, 0, 0}, {14, 11, 14, 7, 13, 8, 13, 13, 5, 4, 0, 0}, {4, 14, 0, 6, 14, 1, 11, 8, 12, 11, 0, 0}, {6, 8, 9, 14, 7, 13, 5, 3, 14, 13, 0, 0}, {1, 0, 4, 8, 12, 0, 10, 3, 1, 0, 0, 0}, {9, 9, 14, 2, 7, 12, 6, 0, 15, 15, 0, 0}, {15, 15, 2, 4, 6, 9, 2, 9, 5, 3, 0, 0}, {4, 0, 3, 11, 1, 11, 15, 15, 6, 4, 0, 0}, {5, 5, 9, 12, 15, 3, 12, 5, 2, 1, 0, 0}, {15, 12, 15, 8, 14, 9, 13, 14, 6, 4, 0, 0}, {9, 13, 3, 8, 15, 2, 13, 9, 13, 12, 0, 0}, {12, 0, 4, 6, 12, 12, 5, 15, 2, 15, 0, 0}, {14, 12, 15, 2, 4, 8, 1, 8, 5, 3, 0, 0}, {5, 6, 3, 3, 1, 4, 9, 15, 11, 5, 0, 0}, {8, 8, 4, 4, 2, 5, 10, 0, 12, 6, 0, 0}, {8, 8, 12, 12, 14, 11, 6, 0, 4, 10, 0, 0}, {2, 13, 3, 14, 7, 4, 2, 5, 11, 0, 0, 0}, {14, 3, 13, 2, 9, 12, 14, 11, 5, 0, 0, 0}, {4, 10, 10, 0, 9, 15, 4, 2, 14, 13, 0, 0}, {9, 1, 6, 14, 6, 10, 6, 4, 9, 9, 0, 0}, {6, 10, 10, 0, 9, 15, 4, 2, 14, 12, 0, 0}, {1, 10, 14, 4, 12, 15, 10, 7, 11, 11, 0, 0}, {13, 2, 15, 4, 13, 2, 7, 5, 0, 13, 0, 0}, {5, 9, 6, 8, 9, 12, 2, 10, 6, 3, 0, 0}, {2, 2, 7, 8, 10, 8, 4, 13, 4, 9, 0, 0}, {12, 10, 13, 0, 2, 7, 0, 7, 5, 3, 0, 0}, {9, 6, 9, 0, 5, 15, 2, 1, 9, 6, 0, 0}, {15, 13, 7, 7, 1, 1, 9, 15, 12, 15, 0, 0}, {7, 10, 3, 10, 0, 8, 6, 15, 15, 1, 0, 0}, {13, 15, 4, 6, 12, 12, 5, 15, 2, 15, 0, 0}, {7, 10, 3, 10, 0, 8, 7, 0, 15, 1, 0, 0}, {14, 9, 12, 3, 12, 12, 6, 10, 9, 15, 0, 0}, {14, 15, 1, 4, 12, 2, 8, 5, 0, 14, 0, 0}, {4, 6, 11, 15, 6, 7, 1, 12, 0, 14, 0, 0}, {11, 3, 15, 11, 6, 1, 5, 13, 15, 0, 0, 0}, {2, 1, 6, 9, 13, 1, 10, 3, 0, 0, 0, 0}, {13, 11, 2, 11, 7, 0, 5, 9, 7, 7, 0, 0}, {3, 5, 14, 5, 9, 0, 11, 7, 9, 9, 0, 0}, {4, 8, 12, 14, 6, 7, 1, 12, 1, 15, 0, 0}, {4, 7, 11, 15, 6, 7, 1, 12, 0, 14, 0, 0}, {1, 14, 0, 9, 15, 9, 14, 14, 5, 4, 0, 0}, {0, 11, 14, 7, 14, 8, 12, 13, 4, 3, 0, 0}, {9, 9, 13, 13, 14, 11, 7, 0, 6, 11, 0, 0}, {7, 7, 3, 3, 2, 5, 9, 0, 10, 5, 0, 0}, {3, 8, 5, 15, 9, 5, 7, 3, 7, 12, 0, 0}, {13, 8, 11, 1, 7, 11, 9, 13, 9, 4, 0, 0}, {0, 0, 11, 10, 8, 10, 13, 3, 12, 6, 0, 0}, {0, 0, 5, 6, 8, 6, 3, 13, 4, 10, 0, 0}, {5, 4, 7, 9, 13, 2, 10, 4, 1, 0, 0, 0}, {5, 12, 14, 1, 8, 9, 2, 13, 0, 14, 0, 0}, {7, 10, 3, 10, 0, 8, 6, 15, 15, 0, 0, 0}, {11, 3, 4, 11, 1, 4, 14, 10, 13, 12, 0, 0}, {7, 4, 7, 14, 7, 11, 6, 4, 9, 9, 0, 0}, {15, 14, 15, 1, 3, 8, 0, 8, 5, 2, 0, 0}, {0, 9, 12, 3, 11, 14, 9, 6, 10, 10, 0, 0}, {12, 1, 13, 6, 15, 10, 11, 6, 9, 13, 0, 0}, {2, 13, 3, 9, 0, 5, 4, 9, 6, 3, 0, 0}, {13, 12, 10, 6, 2, 14, 4, 11, 14, 15, 0, 0}, {13, 9, 12, 6, 12, 7, 12, 13, 5, 4, 0}, {2, 7, 15, 7, 13, 6, 5, 14, 14, 0, 0}, {3, 10, 7, 4, 0, 12, 1, 10, 12, 14, 0, 0}, {10, 9, 4, 15, 10, 5, 10, 0, 1, 1, 0, 0}, {3, 14, 2, 7, 15, 1, 11, 8, 12, 10, 0, 0}, {14, 15, 11, 10, 7, 9, 13, 2, 13, 6, 0, 0}, {10, 7, 8, 10, 11, 14, 6, 12, 8, 5, 0, 0}, {10, 0, 6, 14, 6, 10, 6, 4, 9, 9, 0, 0}, {5, 15, 4, 13, 5, 9, 5, 3, 8, 8, 0, 0}, {5, 4, 4, 6, 8, 11, 2, 10, 5, 3, 0, 0}, {15, 15, 5, 6, 8, 6, 3, 12, 4, 9, 0, 0}, {1, 1, 11, 10, 8, 10, 13, 4, 12, 7, 0, 0}, {13, 11, 5, 6, 0, 0, 8, 14, 12, 15, 0, 0}, {7, 13, 8, 0, 7, 7, 12, 8, 8, 2, 0, 0}, {10, 12, 2, 4, 10, 10, 4, 14, 2, 15, 0, 0}, {5, 5, 9, 9, 11, 9, 5, 15, 5, 10, 0, 0}, {11, 11, 7, 7, 5, 7, 11, 1, 11, 6, 0, 0}, {5, 15, 3, 12, 5, 9, 5, 3, 8, 8, 0, 0}, {13, 4, 13, 5, 13, 5, 5, 14, 14, 0, 0, 0}, {14, 2, 9, 0, 8, 12, 8, 5, 10, 10, 0, 0}, {6, 5, 10, 12, 15, 4, 13, 5, 3, 1, 0, 0}, {15, 13, 15, 2, 4, 8, 1, 8, 5, 2, 0, 0}, {11, 14, 4, 9, 0, 3, 13, 9, 14, 13, 0, 0}, {15, 14, 15, 0, 3, 8, 15, 8, 4, 1, 0, 0}, {4, 4, 7, 10, 14, 2, 11, 4, 1, 0, 0, 0}, {8, 3, 5, 13, 3, 13, 0, 0, 7, 5, 0, 0}, {0, 4, 13, 5, 12, 5, 4, 13, 14, 0, 0, 0}, {13, 4, 10, 5, 12, 3, 0, 15, 4, 5, 0, 0}, {3, 12, 6, 11, 4, 13, 0, 1, 12, 11, 0, 0}, {5, 5, 14, 10, 3, 12, 1, 5, 5, 3, 0, 0}, {11, 11, 2, 6, 13, 4, 15, 11, 11, 13, 0, 0}, {8, 7, 7, 9, 10, 13, 4, 11, 6, 3, 0, 0}, {3, 2, 5, 8, 12, 1, 9, 3, 0, 0, 0, 0}, {10, 6, 8, 0, 5, 15, 2, 1, 8, 6, 0, 0}, {2, 14, 0, 6, 11, 14, 11, 15, 10, 5, 0, 0}, {14, 2, 0, 10, 5, 2, 5, 1, 6, 11, 0, 0}, {11, 7, 11, 4, 11, 6, 11, 12, 4, 3, 0, 0}, {11, 1, 7, 1, 6, 13, 12, 3, 0, 15, 0, 0}, {15, 13, 2, 1, 2, 15, 9, 2, 6, 11, 0, 0}, {9, 11, 0, 2, 9, 10, 4, 14, 2, 0, 0, 0}, {13, 5, 9, 0, 9, 12, 8, 5, 10, 10, 0, 0}, {9, 8, 10, 13, 1, 4, 13, 6, 2, 2, 0, 0}, {2, 3, 7, 8, 10, 8, 4, 14, 4, 10, 0, 0}, {14, 13, 9, 8, 6, 8, 12, 2, 12, 6, 0, 0}, {0, 1, 5, 7, 13, 13, 6, 0, 3, 0, 0, 0}, {0, 5, 3, 8, 0, 5, 8, 5, 3, 0, 0, 0}, {1, 12, 15, 5, 13, 0, 10, 7, 11, 10, 0, 0}, {6, 3, 6, 14, 7, 11, 6, 4, 9, 9, 0, 0}, {13, 12, 0, 0, 1, 14, 8, 1, 5, 10, 0, 0}, {1, 9, 13, 4, 12, 15, 10, 7, 11, 10, 0, 0}, {15, 4, 13, 5, 12, 5, 4, 13, 14, 0, 0, 0}, {9, 12, 7, 0, 8, 1, 1, 11, 12, 14, 0, 0}, {11, 6, 8, 0, 5, 15, 2, 1, 8, 6, 0, 0}, {1, 14, 1, 10, 3, 8, 3, 2, 7, 7, 0, 0}, {13, 3, 12, 4, 12, 4, 4, 13, 14, 15, 0, 0}, {6, 12, 11, 1, 10, 0, 4, 2, 14, 12, 0, 0}, {13, 12, 15, 2, 4, 8, 1, 8, 5, 3, 0, 0}, {2, 5, 11, 14, 5, 7, 1, 12, 0, 14, 0, 0}, {1, 13, 15, 8, 14, 8, 13, 13, 4, 3, 0, 0}, {12, 3, 8, 0, 8, 12, 8, 5, 10, 10, 0, 0}, {1, 13, 9, 6, 14, 9, 12, 6, 8, 11, 0, 0}, {9, 5, 7, 15, 4, 14, 1, 1, 8, 5, 0, 0}, {13, 14, 9, 9, 7, 8, 12, 2, 12, 7, 0, 0}, {15, 12, 15, 1, 4, 8, 1, 8, 5, 3, 0, 0}, and {2, 14, 2, 10, 0, 10, 14, 14, 6, 4, 0, 0},
wherein the third sequence set comprises a sequence set 3A and a sequence set 3B, wherein when the M is 4, the sequence set 3A comprises:
{3, −3, 1, 1, −1, −3, −3, 3, −3, 1, 3, 3, −3, 3, −1, −3, −1}, {3, 1, −3, −3, −1, 1, 1, 3, 1, −3, 3, 3, 1, 3, −1, 1, 3, −1}, {−1, 1, 3, −1, −1, 3, −1, −1, 3, 3, 3, −1, 3, −1, 3, −1, 3}, {−1, 1, −3, 1, −1, −3, −3, 3, −1, 3, 3, −3, −3, −1, 1, −3, 1}, {−1, −3, 1, −3, −1, 1, 1, 3, −1, 3, 3, 3, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, −1, 1, 3, −3, 1, 3}, {1, −3, −3, 1, 1, 3, −1, −1, 3, 1, 3, 3, 3, 1, −3, −1, 3, 1}, {−3, 1, 1, −3, −3, 3, −1, −1, 3, −3, 3, 3, 3, −3, 1, −1, 3, −3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 1, 3, 3, −3, 1, −1, 3, 3, 1, 3, −1, 1, −3, −3}, {−1, 1, 3, 3, −3, 3, 3, 1, −3, −1, 3, 3, −3, 3, −1, −3, 1, 1}, {1, 3, 3, 3, 1, 3, 3, −3, 1, −1, 3, 3, 1, 3, −1, −1, −3, −3}, {−3, 3, 3, 3, −3, 3, 3, 1, −3, −1, 3, 3, −3, 3, −1, −1, 1, 1}, {3, −1, 1, −3, −1, −1, −1, −3, −1, −1, 3, 3, 1, −3, −1, −3, 3, 1}, {3, −1, −3, 1, −1, −1, −1, 1, −1, 3, 3, −3, 1, −1, 1, 3, −3}, {−1, −3, 3, −1, −1, 3, 3, −1, 3, 3, 3, 3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, −1, −1, −3, 3, 1, 3, 3, 3, −3, 1, −3, 1, −3}, {−3, 1, −1, −3, 3, −1, −1, 1, 3, −3, 3, 3, 3, 1, −3, 1, −3, 1}, {3, −3, −1, 1, 3, 3, −3, 3, −1, −3, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, 1, −3, −3, −3, −1, 3, 3, 1, −3, −3, 3, 3, −3}, {3, −1, 3, −3, 1, −3, 1, 1, 1, −1, 3, 3, −3, 1, 1, 3, 3, 1}, {−3, 1, −1, 1, −1, −3, −3, 3, −1, 3, 3, 3, −3, −1, 3, −3, −1, 1}, {1, −3, −1, −3, −1, 1, 1, 3, −1, 3, 3, 3, 1, −1, 3, 1, −1, −3}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1, −1, −3}, {3, −1, 1, 3, 1, −1, 1, 1, 1, −1, 3, 3, −3, 1, −1, −1, 3, −3}, {3, −1, −3, 3, −3, −1, −3, −3, −3, −1, 3, 3, 1, −3, −1, −1, 3, 1}, {3, 1, 3, −1, 3, −3, 3, −1, −3, 3, 3, 3, −3, −1, 1, −3, −1, 1}, {3, −3, 3, −1, 3, 1, 3, −1, 1, 3, 3, 3, 1, −1, −3, 1, −1, −3}, {−1, −1, −1, 3, 3, −1, 3, −1, −1, 3, 3, 3, −3, 3, 3, 3, −1, −1}, {−1, −1, −1, 3, 3, −1, 3, −1, −1, 3, 3, 1, 3, 3, 3, −1, −1}, {−1, 1, 3, −3, −1, 1, −3, −3, 3, −1, 3, 3, 3, 3, −3, −3, −1, −3}, {−1, −3, 3, 1, −1, −3, 1, 1, 3, −1, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, 3, 1, 3, 3, −3, −3, −1, −3, −1, 1}, {1, −3, −1, 1, 3, 3, −3, 3, −3, 1, 3, 3, 1, −1, −3, 3, −3, 1}, {−3, 1, −1, −3, 3, 3, 1, 3, 1, −3, 3, 3, −3, −1, 1, 3, −3, 3}, {3, −1, 1, −3, −1, 3, −3, 3, 1, −3, 3, 3, −3, −1, −1, 1, −3}, {3, −1, −3, 1, −1, 3, 1, 3, −3, 1, 3, 3, 3, 1, −1, −1, −3, 1}, {1, −3, −3, 1, −3, 1, −3, 1, 3, 3, 3, 3, −1, 1, −3, −3, −3}, {−3, 1, 1, −3, 1, −3, 1, −3, 3, 3, 3, 3, −1, −1, 3, 1, 1, 3}, {−1, −1, −1, 3, 3, −1, 3, −3, 3, −1, 3, 3, −1, −1, −1, −1, 3, 3}, {−1, −1, −1, 3, 3, −1, 3, 1, 3, −1, 3, 3, −1, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, 3, −3, 1, −3, 3}, {1, −3, 1, −1, −1, −1, −1, 1, −1, −1, 3, 3, −3, 1, −1, 1, −3, −3}, {−3, 1, −3, −1, −1, −1, −1, −3, −1, −1, 3, 3, 1, −3, −1, −3, 1, 1}, {−3, 1, −3, 3, −1, −3, 3, −1, −3, 3, 3, 3, −1, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, −3, 3, 3, 3, −3, −3, −1, −3, 3, 3}, {3, −3, −1, −3, 1, −1, 3, −1, 1, 3, 3, 3, 1, 1, −1, 1, 3, 3}, {−3, 3, −1, 3, −1, −1, 1, −1, −1, −1, 3, 3, −1, −3, −1, 1, −3, 3}, {1, 3, −1, 3, −1, −1, −3, −1, −1, −1, 3, 3, −1, 1, −1, −3, 1, 3}, {1, 1, −1, 1, −3, −1, 1, −1, −1, 3, 3, 3, −1, 3, 1, −3, −3, −1}, {−3, −1, −1, −3, 3, 3, −1, 3, −3, 3, 1, 1, −1}, {−3, −1, 3, 1, 3, −1, −3, −1, 3, 1, 3, 1, −1, −1, −1, −1, 1, 3}, {1, −1, 3, −1, 3, 3, 3, −1, −3, −1, 3, −1, 3}, {−3, −1, 3, 3, −3, 3, 1, −3, 3, 3, 3, 1, 3}, {−1, 1, 3, 3, −3, 3, −1, −1, 1, −3, 3, 1, 3, 3, 3, 1, 3}, {−1, −3, 3, 3, 1, 3, −1, −1, −3, 1, 3, −3, 3, 3, 3, −3, 3}, {3, −1, 3, −1, −3, 1, −3, 3, 1, 1, 3, 3, −1, −1, −3, 1, 3}, {3, −1, 3, −1, 1, −3, 1, −3, −3, 3, 3, −1, −3, 1, −3, 3}, {1, 3, −1, −1, 3, −3, −1, −3, 3, 1, 3, 3, −3, 1, −3, 3, −3}, {−3, 3, −1, −1, 3, 1, −1, 1, 3, −3, 3, 3, 3, 1, −3, 1, 3, 1}, {1, 3, −3, 3, 3, 1, 3, 1, 1, −1, 3, 3, −3, 1, −3, −3, −1, 1}, {−3, 3, 1, 3, 3, −3, 3, −3, −3, −1, 3, 3, 1, −3, 1, 1, −1, −3}, {−1, 3, 3, −1, 3, 3, −1, −1, 3, 3, 3, −1, 3, −1, 3, −1, −1}, {−3, 3, −3, 1, −3, −1, 3, 3, 1, 1, 3, −1, −3, 1, −3, 3, −3}, {1, 3, 1, −3, 1, −1, 3, −3, −3, 3, 3, 1, −1, −3, 1, 3, 1}, {−3, −1, 3, 3, 1, −3, −1, −3, 3, 1, 3, 3, −1, 3, 3, −3, −1}, {1, −1, 3, 3, −3, 1, −1, 1, 3, −3, 3, 3, 3, −1, 3, 3, 1, −1}, {3, 1, −1, 1, −1, −3, 3, 1, −3, 1, 3, 3, −3, −3, −1, −1, 3, 3}, {3, −3, −1, −3, −1, 1, 3, −3, 3, 3, 3, −3, 3, 1, 1, −3, 3, 3}, {−1, 3, 1, −1, −3, 3, −1, −3, −3, 1, 3, 3, −3, −3, −3, −3, −1, −3}, {−1, −3, −1, −1, 3, −1, 3, 3, 1, 1, −1, 1, −1, −1, 1}, {−1, −3, −1, −3, −1, 1, 1, 3, 3, −1, 3, 3, 1, 1, −1, −3, 1, −3},
and {−1, 1, −1, 1, −1, −3, −3, 3, 3, −1, 3, 3, −3, −3, −1, 1, −3, 1}, and wherein when the M is 4, the sequence set 3B comprises {−3, −3, −3, 1, 1, −3, −3, 1, 1, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, 1, 1, 1}, {1, 1, −3, 1, −3, −3, 1, −3, 1, 1, 3, 1, 1, 1, −3, 1, 1, 1, −3, −3, −3, 1, 1}, {1, −3, −3, −3, 1, 1, −3, −3, 1, 1, −3, −3, −3, −3, 1, −3, 1, −3, −3, 1, −3, 1, 1}, {3, 3, −3, −3, 1, 3, 3, −3, −3, 3, −1, 3, 3, 1, 1, −3, −1, −1, −3, −3, 1, 1}, {−1, −1, −3, −3, 1, −1, −1, −3, −3, −1, 3, −1, −1, 1, 1, −3, 3, 3, −3, −3, 1, 1}, {3, 3, −1, −3, 1, 3, 1, 1, −1, 3, 3, −3, −3, 3, −3, 1, 3, 1, 1}, {−1, −1, 3, −3, 1, −1, 1, 1, 3, −1, −1, −3, −3, −1, 3, −3, 1, −1, 1, 1}, {−1, 1, −1, 1, −3, −3, 1, 1, 3, 1, 3, 1, 1, −3, −3, 1, −1, 1, 1, −3, −3, 1, 1}, {3, 1, 3, 1, −3, −3, 1, 1, −1, 1, −1, 1, 1, −3, −3, 1, 3, 1, 1}, {1, 3, 3, −1, 1, −1, 1, 1, 3, −1, 1, −1, −3, −3, 1, 1, −1, 1, 1}, {1, −1, −1, 3, 1, 3, 1, 1, 1, −1, 3, −1, 1, 3, 1, 3, 1, 1}, {1, 1, −1, −1, 3, 3, 1, 1, −3, −1, 3, −1, 3, 1, 3, 3, −1, −1, 1, 1, −1, −1, 1, 1}, {1, 1, 3, 3, −1, −1, 1, 1, −3, 3, −1, 1, −1, −1, −1, 3, 3, 1, 1, 3, 3, 1, 1}, {−3, −3, 3, −3, −1, 3, 1, 1, −1, −3, −3, −3, −3, 1, −1, −3, 3, 1, 1}, {−3, −3, −1, 3, 3, 3, 1, 1, −3, −3, −3, −3, −1, −3, −3, −1, −3, 3, 1, 1}, {3, 1, −3, −1, 3, −1, 1, 1, 3, −3, −3, 3, 3, 1, −3, 3, 1, −1, 3, −1, 1, 1}, {−1, 1, −3, 3, −1, 3, 1, 1, −1, −3, −3, −1, −1, 1, −3, −1, 1, −3, 3, −1, 3, 1, 1}, {3, −3, −3, −1, −3, 1, −3, −1, 3, 3, −3, −3, −1, −1, −3, −3, 3, 1, −3, 3, 1, 1}, {−1, −3, −3, 3, −1, 3, 3, 1, −1, 3, 3, −3, −1, −3, 3, 1, 1}, {−3, −3, 3, −3, 1, 3, 1, 1, 1, −3, 1, −3, 3, 3, −1, 1, 3, 1, 1}, {−1, −3, −3, 3, −3, 1, −3, 3, −1, 3, 1, 1, 1, −3, −1, 1, 1, 1}, {3, −3, −1, 1, 3, −1, 1, 3, −3, 1, 1, 1, 1, −3, −1, −1, 3, 3, −1, −3, 1, 1, 1, 1}, {−1, −3, 3, 1, −1, 3, −1, −1, 3, 3, −3, −1, 3, 1, 1, 1, 1}, {−1, −1, −3, 3, 3, 3, 3, 1, 3, −3, −3, 3, −1, 1, −3, 3, −1, 3, 3, −1, −3, 1, 1}, {3, 3, −3, −3, −1, −1, −1, 1, −1, −3, −3, 1, −3, −1, 3, −1, 3, −1, −1, 3, −3, 1, 1}, {1, 3, 3, −1, 3, −3, −1, −3, 1, −1, −3, 1, 1, 3, 3, 1, 1, −1, −1, 3, 3, 1, 1}, {1, −1, −1, 3, −1, −3, 3, 3, −3, 1, 3, −3, 3, 1, 1, −1, −1, 1, 1, 3, 3, −1, −1, 1, 1}, {−1, 3, −3, −3, 1, −3, −3, −3, 1, −3, 3, −1, −1, 3, −3, 3, 3, −1, 1, 1}, {3, −1, −3, −3, 1, −3, −1, −3, 1, −3, −3, 1, 3, 3, −1, −3, −1, −1, −1, −3, 1, 1}, {−1, 1, −3, −3, −1, 1, 1, −1, 1, 1, −3, −1, −3, −1, 3, 1, 1}, {−3, −1, −3, −3, −1, −3, 3, −3, 3, 1, 1, 3, 3, −3, 3, 1, −3, 3, −3, 1, 1}, {−3, 1, −1, 3, 1, 1, 1, 1, −3, 1, 3, 1, 1, 1, −3, −3, −3, 1, −1, 3, 1, 1, 1, 1}, {−3, 1, 3, −1, 1, 1, 1, 1, −3, 1, −1, 3, 1, 1, −3, −3, −3, 1, 3, −1, 1, 1, 1, 1}, {1, −3, −1, 3, −3, −3, 1, 3, −1, 1, 1, 3, 1, −3, 3, 1, 1, −3, −3, −3, 3, 1, 1}, {1, −3, 3, −1, −3, −1, −3, 1, −1, 3, 1, 1, −1, 1, −3, −3, −3, −1, 1, 1}, {−3, 1, −1, 3, −3, −3, 1, −3, 1, 3, −1, 1, −3, −3, −3, 1, −1, 3, −3, −3, 1, 1}, {−3, 1, 3, −1, −3, −3, 1, −3, 1, −1, −3, −3, −3, 1, 3, −1, −3, −3, 1, 1}, {1, 3, −3, 1, −3, −1, 3, 1, 1, 1, −3, −1, −3, −3, 1, 1, 1}, {1, −1, −3, 1, −3, −1, 3, 1, 3, −3, −3, 1, 1, −3, −3, −3, 1, 1}, {−1, 1, −1, 1, −3, 1, 3, −3, −3, −1, 3, 1, 1, −3, 1, 1, −1, −1, 1, 1}, {3, 1, 3, 3, −1, 3, −1, −3, 3, −3, 1, 1, 1, 3, 3, −1, 3, 1, 1}, {1, −1, −3, −1, 3, −1, 3, −1, 1, −3, 1, 1, −1, 1, 1, 3, −1, −3, −3, −3, 1, 1}, {1, 3, −3, 3, −1, 3, 1, 1, 3, 1, −3, 1, 1, 3, 1, 1, −1, −3, −3, −3, 1, 1}, {−3, −1, −1, −3, −1, 1, 1, 3, −3, 1, 1, 3, 3, 1, −3, 1, −3, −1, −3, 3, 3, 1, 1}, {−3, 3, 3, −1, −3, 1, 1, −1, −3, 1, 1, 1, −1, −1, 1, −3, 1, 3, −3, −3, −1, −1, 1, 1}, {3, −1, −3, −3, 1, 1, −1, 3, −3, 1, −3, −3, −3, 3, −3, 3, 1, −3, −3, −1, −3, 1, 1, 1}, {−1, 3, −3, −3, 1, 1, 3, −1, −3, 1, −3, −3, −3, −1, −3, −1, 1, −3, −3, 3, −3, 1, 1, 1}, {−3, −1, 3, 3, 1, 1, −3, 1, −3, −3, −3, 3, −3, −3, 1, −1, 3, 3, −3, −3, 3, 1, 1}, {−3, 3, −1, −1, 1, 1, 3, −1, −3, 1, −3, −3, −3, −1, −3, −1, 3, −1, −1, −3, −3, 1, 1}, {1, 1, 1, −3, 1, 1, 3, 1, −1, 1, −3, −3, −3, 1, −1, 1, 3, 1, 1, −3, 1, 1, 1}, {1, −3, 1, 1, −3, 1, 1, −1, 1, 3, 1, −3, −3, −3, 1, 3, 1, −1, 1, 1, −3, 1, 1, 1}, {1, −3, −3, −3, 1, 1, −3, −3, −3, 1, −3, −3, −3, −3, 1, −3, 1, 1, −3, −3, 1, −3, 1, 1}, {−1, −1, −1, −3, −1, −3, 3, 3, 3, 3, −1, −3, 1, 3, −3, 3, −3, −1, −1, −3, −3, 1, 1}, {3, 3, 3, −3, 3, −3, −1, −3, −1, −1, −1, 3, −3, 1, −1, −3, −1, −3, 3, 3, −3, −3, 1, 1}, {−3, −3, −3, 1, −3, 1, 1, −3, 1, −3, 1, 1, 1, 1, −3, −3, 1, 1, −3, −3, 1, 1, 1}, {−1, −3, −3, 3, −1, −1, 1, 1, −1, 1, −3, −1, −1, 3, 1, −3, −1, −3, −3, −1, −1, 1, 1}, {3, −3, −3, −1, 3, 3, 1, 1, 3, 1, −3, 3, 3, −1, 1, −3, 3, −3, −3, −1, 3, 3, 1, 1}, {−1, 3, −3, 3, 3, 1, 1, 1, −1, −3, 1, −1, 1, 1, 3, −3, 1, 3, −1, −3, −3, 1, 1}, {3, −1, −3, −1, −1, 1, 1, 1, 1, 3, −3, 1, 3, 1, 1, −1, −3, 1, −1, 3, −3, −3, 1, 1}, {1, 1, −3, 1, −3, −3, −3, 1, −3, 1, 1, 1, −3, 1, 1, 1, 1, −3, −3, 1, 1, 1}, {−1, 3, −3, −3, 3, 3, −3, −1, 3, −1, −1, 3, −1, −3, −1, 3, 3, −1, −1, −3, 3, 1, 1}, {3, −1, −1, −3, −1, −1, −3, 3, −1, 3, 3, −1, 3, −3, 3, −1, −1, −1, 3, 3, 3, −1, −1, 1}, {3, −1, 1, −3, −1, 1, −1, 1, −1, −3, −3, −3, 1, 1, 1, 1}, {−1, 3, 1, −3, 3, 3, 1, −3, 3, 1, 3, −3, 1, 3, −3, −3, −3, 1, 1, 1, 1}, {1, −1, 1, −3, −3, 1, −3, 1, −3, −3, 1, 1, −3, −3, −3, −3, −3, −3, −1, 1, 1}, {1, 3, 1, −3, −3, 1, −3, 1, −3, −3, 1, 1, −3, −3, −3, −3, −3, −3, 3, 3, 1, 1}, {−1, −1, 1, 1, 1, −3, 3, 3, −1, −1, −1, 1, −3, −1, 1, −1, −3, 1, −3, 3, 1, 3, 1, 1}, {3, 3, 1, 1, 1, −3, −1, −1, 3, 3, 3, 1, −3, 3, 1, 3, −3, 1, −3, −1, 1, −1, 1, 1}, {1, −3, 1, 3, −1, −1, 3, 3, 3, −1, 1, 1, −3, 3, −3, 3, −3, 3, −1, 1, −3, 1, 1}, {1, −3, 1, −1, 3, 3, −1, −1, −1, 3, 1, 1, −3, −1, −1, −3, −1, −3, −1, 3, 1, −3, 1, 1}, {3, −1, −1, −1, 1, −1, −1, −3, −1, 3, 3, 1, −3, −3, −1, 3, −1, −3, 1, 3, −3, −3, 1, 1}, {−1, 3, 3, 1, 3, 3, −3, 3, −1, −1, 1, −3, −3, 3, −1, 3, −3, 1, −1, −3, 3, 1, 1}, {1, 3, −3, −3, 3, −3, −3, −3, 1, −3, −3, 3, −1, 3, 3, −3, 1, −1, −1, −1, 3, 3, 1, 1}, {1, −1, −3, −3, −1, −3, −3, −3, 1, −3, −3, −1, 3, −1, −1, −3, 1, 3, 3, 3, −1, −1, 1, 1}, {−3, 1, −3, −3, 3, −3, 3, −1, −1, −1, −1, −3, 1, 3, −1, −3, 3, −1, 1, 3, 3, −1, 1, 1}, {−3, 1, −3, −3, −1, −3, −1, 3, 3, 3, 3, −3, 1, −1, 3, −1, 3, 1, −1, −1, 3, 1, 1}, {3, 1, 3, −1, −3, 3, 3, 1, −1, 3, 3, 1, 1}, {−1, 1, −1, 3, −1, 3, 3, 3, 3, −1, −1, 1, −1, 1, 3, −1, −1, 1, 1, −1, 1, 1}, {1, 1, −1, −1, 3, 3, −1, 1, 3, −3, 3, 1, 3, 1, −3, −1, −3, 1, −1, 1, 1, 1, 1}, {1, 1, 3, 3, −1, −1, 3, 1, −3, −1, 1, −1, 1, −3, 3, −3, −3, 1, 3, 1, 1, 1}, {1, −3, 1, −3, 1, 1, −3, 1, 1, 1, −3, 1, 1, 1, 1, −3, −3, −3, −3, 1, 1, −3, 1, 1}, {−1, 3, 1, −1, 3, 1, 1, −1, 3, 1, −3, −1, 3, 3, 3, 3, −1, −3, −1, 1, 3, 1, 1}, {3, −1, 1, 3, 1, −1, 1, 3, −1, 1, −3, −1, −1, −1, −1, 3, −3, 3, −1, 1, 1, 1}, {−3, −1, −3, 1, −3, −1, 1, 3, −1, 1, 1, 1, 3, 3, 1, −1, −1, −3, 1, −3, 3, 1, 1}, {−3, 3, −3, 1, −3, −1, 3, 1, 1, 1, −1, −1, 1, 3, 3, −3, −1, −3, −1, 1, 1}, {1, −3, −3, 1, −1, −1, 1, 1, −3, 1, −3, 1, 3, 3, 1, 1, −3, −3, 1, −1, −1, 1, 1}, {1, −3, −3, 1, 3, 3, 1, −3, 1, −3, 3, 1, −1, −1, 1, 1, −3, −3, 1, 3, 3, 1, 1}, {3, −1, −1, −3, −3, −3, 1, 3, −1, 1, 3, −3, −1, −1, −1, 3, 1, −1, −1, −1, 1, 1}, {−1, 3, 3, −3, −3, 3, 1, −1, 3, 1, −3, 3, 3, −3, −1, 1, 3, 3, 3, 1, 1}, {−1, 1, −3, 1, −1, −3, 1, −3, −3, −1, −3, −3, −1, −1, 1, −3, 1, 3, −3, −3, 1, 1}, {3, 1, −3, 1, 3, −3, 1, 3, 1, −3, −3, 3, 3, 3, 3, 1, −3, 1, −1, −1, −3, 1, 1}, (3, 3, 1, −3, 1, −1, −1, −3, 1, 1}, 1, −1, 1, −1, 3, −3, −3, 1, 1, −3, 1, 1, −1, 1, 1, 1, 1}, {−1, −1, 1, −3, 3, −3, 1, 3, 1, 3, −1, −3, −3, 1, 1, −3, 1, 1, 3, 1, 1, 1, 1, 1}, {−1, 1, 3, 1, 3, −3, −1, 3, −1, −1, −1, 1, 3, −1, −3, 1, −1, −1, −3, −3, −3, 3, 1, 1}, {3, 1, −1, 1, −1, −3, 3, −1, 1, 3, 3, 3, 1, −1, −3, 1, 3, 3, −3, −3, −3, −1, 1, 1}, {1, −1, −3, −3, 3, 1, −1, −3, 3, 1, −1, −1, −3, 1, 3}, {1, 3, −3, −3, 1, 3, 1, 3, 3, 1, 3, 1, −1, −1, 3, −3, 1, −3, 3, 1, 1}, {3, −1, −3, −3, −3, −3, 3, 3, 3, 1, −3, 1, −3, −3, 3, −1, −1, 1, 3, −3, −1, 1, 1}, {−1, 3, −3, −3, −3, −1, −3, −1, −1, −1, 1, −3, 1, −3, −3, −1, 3, 3, 1, −1, −3, 3, 1, 1}, {3, −3, −3, 1, 3, 1, −3, 1, −1, 3, −3, 3, −3, −3, 3, −1, −1, −3, 3, 3, −3, −1, 1, 1}, {−1, −3, −3, 1, −3, 1, 1, −3, 1, 3, −1, −3, −3, −3, −1, 3, 3, −3, −1, −1, −3, 3, 1, 1}, {1, 3, 3, 1, −3, 3, 1, 3, 3, 3, −3, 1, 3, 1, −1, −1, 3, −3, 1, −3, 3, 1, 1}, {1, −1, −1, 1, −3, −1, 1, −1, −1, −1, −3, −3, 1, −1, 1, 3, 3, −1, −3, 1, −3, −1, 1, 1}, {−3, −3, −1, 3, −3, −1, −1, 3, −1, 3, 1, −3, −1, 3, 1, 3, 3, 1, 1, 1, 1}, {−3, −3, 3, −1, −3, 3, 3, −1, −3, 3, −1, 3, −3, 3, −1, 1, −1, −1, −1, 1, 1, 1, 1}, {3, 3, 3, −1, 1, 3, 3, 3, 3, 1, −3, −1, −3, 1, −3, −3, 1, 3, 3, 1, −3, −3, 1}, {−1, −1, −1, 3, 1, −1, −1, −1, −1, 1, −3, 3, −3, 1, −3, −3, 1, −1, −1, 1, −3, −3, 1}, {−3, −3, −1, 3, −3, −1, 1, −3, −1, 3, −1, −3, 1, 1, 3, 3, 1, 1, −1, −3, 3, 1, 1}, {−3, −3, 3, −1, −3, 3, 1, −3, −1, 3, −1, 3, 1, 1, −1, −3, 3, 1, 1}, {−3, −3, 3, −1, −3, 3, 1, −3, 1, −3, −1, −3, 1, 1, −1, −1, −1, −1, 1, 1, 3, −3, 1, 1, 1, 1, 1, 3}, {1, 1, 1, −1, 1, 1, 1, 1, 1, 1, −3, 3, −3, −1, −3, −1, 1, 1, 1, 1, 1, 3}, {−1, 1, 1, 3, 1, 1, 3, −3, −1, 1, 1, 3, −3, 1, 1, −1, −1, −1, 3}, {1, 1, 1, −1, −1, 1, −1, −3, 1, −3, 3, −1, 1, −3, 3, −3, −3, −1, −1, −1, 1, 1, 1}, {1, 1, 1, 3, 3, 1, 3, −3, −3, 1, −3, −1, 3, 1, −3, −3, −1, −3, 3, 3, 1, 1}, {1, 1, 3, 1, 1, −1, 1, −1, 1, −1, 3, −1, 1, 3, −3, 1, −1, −3, −3, −3, −3, 1, 1}, {1, 1, −1, 1, 1, 3, 1, 3, 1, −1, 3, 1, −1, −3, −1, 1, 3, −3, −3, −3, −3, 1, 1}, {1, 3, −3, −3, 3, −3, −1, 3, 3, 1, 3, −3, 3, −1, 1, −1, −3, −1, −1, 3, 1, −1, 1, 1}, {1, −1, −3, −3, −1, −3, −1, −1, 1, −1, −3, −1, 3, 1, −3, −3, 3, −1, 1, 3, 1, 1}, {−1, −1, 3, −1, −1, −3, 1, 3, −3, −1, 3, 1, 1, 1, 1, −3, −3, 3, 1, 1}, {3, 3, −1, 3, 3, −3, 1, −1, −3, −1, 3, −1, −3, 1, 1, 1, 1, −3, −3, −1, 1, 1, 1}, {3, −3, −1, 1, −1, 3, 1, 1, 3, 1, −1, −1, −3, 1, 3, −3, −1, 1, −1, 3, 1, 1}, {−1, −3, 3, 1, 3, −1, 1, 1, −1, 1, 1, 3, 3, −1, −1, −3, 3, 1, 1}, {3, −1, 3, −1, −3, 1, −3, −3, −1, 1, −1, 3, −1, −3, 3, 3, 3, 1, 1, 3, 3, 1, 1, 1}, {−1, 3, −1, 3, −3, 1, −3, −3, 3, 1, 3, 1, −3, −3, −1, −1, −1, 1, 1, −1, −1, 1, 1}, {−3, 3, −1, 3, 3, −1, 1, 3, 1, 1, −1, −3, 3, −1, −1, −3, 1, 1, 1, 1, 1, 1}, {−3, −1, 3, −1, −3, 3, 1, −1, 3, −1, −1, −1, −3, 1, 1, 1, 1}, {−1, −3, −1, −1, 1, 3, −1, 3, 1, −1, 3, −3, 1, 1}, {−1, −3, −3, −1, −1, 1, 3, −1, 3, −1, 1, 3, −3, 3, −1, −1, 1, 1}, {3, −3, 3, −1, 3, −1, 1, −1, 3, −1, 1, 3, 1, −1, −3, −1, 1, 1, 3, 3, 1, 1}, {1, −1, −3, 3, 3, −3, −3, 3, 1, −3, −1, −3, 1, 3, −3, 1, 3, −3, 1, 1}, {1, 3, −3, −1, −1, −3, −1, −3, −1, −1, −3, 3, −3, 1, −1, −3, 1, −3, −1, 1, 1}, {1, −3, 1, 3, −3, −1, 1, 1, 1, 1, −1, −3, 3, 1, −3, 1, −3, −1, 1, 1}, {1, −3, 1, −1, −3, 3, 1, 1, 1, 1, 3, −1, 1, −3, 1, −3, 1, −1, −3, 3, 1, 1}, {1, 3, −1, 3, −1, 1, 3, −1, 3, −3, −3, 1, 1, −1, 1, 1, −1, −1, 1, 1, 1, 1}, {1, −1, 3, −3, 3, 1, −1, 3, −1, −3, −1, 3, −1, 3, −1, −1, 3, 1, 3, 1, 1, 1}, {1, 3, −3, −1, −1, 3, 1, 1, −3, 3, −3, 3, 3, 1, −3, 1, 3, −3, −1, −1, 3, 1, 3}, {1, −1, −3, 3, 3, −1, 1, 1, −3, −1, −3, −1, −1, 1, −3, 1, −3, 3, 3, −1, 1, 1}, (3, −1, −3, 1, −1, 1, 3, −1, 1, 3, −3, −1, −3, −3, 3, 3, 1, 1}, {−1, 3, −3, 1, 3, −3, 1, −1, 3, 1, −1, −1, −3, −1, 3, −3, −3, −1, −1, −1, −3, 1, 1}, {−3, −3, 1, 3, 1, −1, 1, −3, −3, −3, 1, −1, 1, 3, 1, 1, −3, 1, 1, 3, 1, −1, 1, 1}, {−3, −3, 1, −1, 1, 3, 1, −3, −3, −3, 1, 3, 1, −1, 1, 1, −3, 1, 1, −1, 1, 3, 1, 1}, {−1, 1, 3, 3, 1, −3, 3, −3, 3, −1, −1, 1, 3, 1, 1, −1, 1, −1, −1, 3, 3, −3, 1, 1}, (3, 1, −1, −1, 1, −3, −1, −3, −1, 3, 3, 1, −1, 1, 1, 3, 3, −1, −1, −3, 1, 1}, {−3, 1, 1, 3, 3, 1, −3, −3, 1, 3, −1, 3, 3, 3, −3, −1, −3, 3, −3, 3, 1, 1, 1, 1}, {−3, 1, 1, −1, −1, 1, −3, −3, 1, −1, 3, −1, −1, −1, −3, 3, −3, −1, −3, −1, 1, 1, 1, 1}, {1, 3, 3, −1, 1, −1, −3, 3, 1, 3, −1, −3, 1, 3, −3, 3, 3, −3, 3, −3, −1, −1, 1, 1}, {1, −1, −1, 3, 1, 3, −3, −1, 1, −1, 3, −3, 1, −1, −3, −1, −1, −3, −1, −3, 3, 3, 1, 1}, {−3, −3, −3, −3, 1, 1, −1, 1, −3, 1, 3, 1, −1, −3, −1, −1, 1, −3, −3, 1, 1, −3, 1, 1}, {−3, −3, −3, −3, 1, 1, 3, 1, −3, 1, −1, 1, 3, −3, 3, 3, 1, −3, −3, 1, 1, −3, 1, 1}, {−1, 3, 1, 1, −1, 3, 3, 1, 3, −3, −3, −1, 1, −3, 1, −1, −3, −1, −3, −3, 3, 3, 1, 1}, {3, −1, 1, 1, 3, −1, −1, 1, −1, −3, −3, 3, 1, −3, 1, 3, −3, 3, −3, −3, −1, −1, 1, 1}, {3, −3, −1, 3, 3, 3, −1, −1, −3, 1, 3, 1, −3, −1, −1, −3, −1, −1, −3, 1, 1, −3, 1, 1}, {−1, −3, 3, −1, −1, −1, 3, 3, −3, 1, −1, 1, −3, 3, 3, −3, 3, 3, −3, 1, 1, −3, 1, 1}, {−1, 1, 1, −1, −3, −3, 1, 1, 3, 1, 1, 3, 1, −3, 1, −3, −1, 1, 1, −1, −3, −3, 1, 1}, {3, 1, 1, 3, −3, −3, 1, 1, −1, 1, 1, −1, 1, −3, 1, −3, 3, 1, 1, 3, −3, −3, 1, 1}, {3, 1, −3, 3, 1, 1, −3, −3, −1, 1, −1, −3, 1, 3, −1, 1, −1, −1, −3, −1, −1, 1, 1, 1}, {−1, 1, −3, −1, 1, 1, −3, −3, −3, 1, 3, 1, −3, 3, 3, −3, 1, 1, 1, 1}, {1, −3, −3, 1, 3, 3, 1, 3, 1, 1, −3, 1, 1, −3, −3, 1, −1, 1, −1, −3, −1, 1, 1}, {1, −3, −3, 1, −1, −1, 1, −1, 1, 1, −3, 1, 1, −3, −3, −3, 1, 3, 1, 3, −3, 3, 1, 1}, {3, −3, −1, 3, −1, −3, 1, 1, 3, −3, −3, −1, −1, −3, −3, −3, 3, −3, −1, 3, −1, −3, 1, 1}, {−1, −3, 3, −1, 3, −3, 1, 1, −1, −3, −1, 3, 3, −3, −3, −3, −1, −3, 3, −1, 3, −3, 1, 1}, {−3, 1, −3, −1, −1, 3, −1, −1, −1, −3, −1, −1, 1, −3, 3, 3, −1, 3, −1, −1, −3, 3, 1, 1}, {−3, 1, −3, 3, 3, −1, 3, 3, 3, −3, 3, 3, 1, −3, −1, −1, 3, −1, 3, 3, −3, −1, 1, 1}, {−3, 3, −3, −1, 3, 1, 1, −3, 1, −3, −3, −1, 1, −1, −3, −1, −1, −3, 3, 1, 1, −3, −1, −1, −3, 3, 1, 1}, {−3, −3, −1, 3, −1, 3, 1, 1, −3, 1, −3, −3, −1, 1, −1, −3, −1, −1, −3, 3, 1, 1}, {−3, −1, −3, 3, 1, 3, −3, −3, −1, 1, −1, 3, 1, 3, −1, 3, −1, 1, 1, −3, −1, −3, −3, 3, 1, 1}, {−1, −3, −3, −1, −1, 3, 1, 1, 3, 1, 1, −3, 1, 1, −3, −3, −3, −1, −3, 1, 3, −1, −3, −1, −3, −3, 1, 1}, {3, −3, −3, 3, 3, −1, 1, 1, 3, 1, −3, −1, 1, −3, −3, −1, −1, −3, 3, −1, −3, 1, 3, 3, 1, 1}, {3, −1, −1, −3, −3, −3, 1, 3, −1, 1, −3, −3, −3, −1, −1, −3, 3, −1, −3, 1, 3, 3, 1, 1}, {−1, 3, 3, −3, −3, −3, 1, −1, 3, 1, −3, −3, −3, −3, 3, −1, 3, −1, 1, 1}, {3, 3, −3, −1, 3, −3, 1, −1, −1, 1, 1}, (3, −1, −1, 1, 1, 3, 1, 1, −1, −1, 3, 1, −3, 3, −3, 1, 3, −1, −1, 1, 1, 3, 1, 1}, {−1, 3, 3, 1, 1, −1, 1, 1, 3, 3, −1, −3, −1, −3, −1, −1, −3, 1, −3, −1, 3, 3, −3, 1, 1, 3, 3, 3, 1, 1, −1, 1, 1}, and {1, −1, 1, 1, −1, 3, −1, −1, 1, −3, 1, −3, 3, 3, −3,−3, 1, 1,−1,−1,−3, 3, 1, 1}; and a sending unit, configured to send a first signal generated based on the sequence $\{f_n\}$, wherein the sequence $\{f_n\}$ is mapped to N subcarriers.

10. The signal processing apparatus according to claim 9, wherein the N elements in the sequence $\{f_n\}$ are mapped, respectively, to N subcarriers selected from N consecutive subcarriers or N equally spaced subcarriers.

11. The signal processing apparatus according to claim 9, wherein the sending unit is further configured to send the signal generated based on the sequence $\{f_n\}$ when frequency shaping is performed on the sequence $\{f_n\}$, or when τ/2-BPSK modulation is performed on a data channel.

12. The signal processing apparatus according to claim 9, wherein the first signal comprises one of a reference signal or a signal used to carry communication information.

13. The signal processing apparatus according to claim 9, wherein the sequence $\{x_n\}$ comprising the element $x_n$ is determined from a first set of sequences, at least K sequences in the first set of sequences comprise the element $x_n = u \cdot e^{j\pi \tau \cdot s_n / M}$ of the sequence $\{x_n\}$, wherein K is a positive integer greater than or equal to 2, and the sequence $\{s_n\}$ comprising the element $s_n$ corresponding to each of the at least K sequences is selected from a sequence comprising a fourth sequence set and an equivalent sequence of sequences in the fourth sequence set, wherein when the M is 4, the fourth sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, {−3, 3, −1, −3, 1, −1, 1, 3, 1, 1, −1, −1}, {1, 3, −1, 1, −3, −1, −3, 3, −3, −3, −1, −1}, {3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, 1, −1, −1}, {−3, 3, −3, −3, −3, −1, 3, −3, 3, 1, −1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1, −1}, {1, 1, −3, −3, −1, −1, 1, 3, 1, −1, −1, −1}, {−3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, −3, −1, −3, 3, 3, −1, −3, −1, −1}, {−3, 1, −1, −1, 3, 1, 3, 1, 3, −1, −1}, {−3, 1, −1, −1, 3, 1, 3, 1, 3, −1, −1}, {1, −1, 1, −1, 3, −1, 1, 3, 3, 1, −1, −1}, {−3, 1, 3, −1, −3, 3, 1, 3, 3, −1, −1}, {1, −3, 3, −1, 3, 1, 3, −3, 3, 3, −1, −1}, and {3, −1, 3, 3, −1, 3, 3, 3, 3,−1,−1,−1}.

14. The signal processing apparatus according claim 9, wherein the sequence $\{x_n\}$ comprising the element $x_n$ is determined from a first set of sequences, the at least K sequences in the first set of sequences comprise the element $x_n = u \cdot e^{j\pi \tau \cdot s_n / M}$ of the sequence $\{x_n\}$, wherein K is a positive integer greater than or equal to 2, and the sequence $\{s_n\}$ comprising the element $s_n$ corresponding to each of the at least K sequences is selected from a sequence comprising a fifth sequence set and an equivalent sequence of sequences in the fifth sequence set, wherein the fifth sequence set comprises a sequence set 5A, a sequence set 5B, a sequence set 5C, and a sequence set 5D, wherein when the M is 12, the sequence set 5A comprises:

{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 8, 10, 1, 10, 11, 5, 3, 7, 2, 0}, {0, 0, 11, 1, 3, 10, 11, 6, 3, 7, 4, 10}, {0, 0, 9, 2, 10, 6, 5, 5, 8, 0, 5, 7}, {0, 0, 3, 4, 5, 6, 1, 3, 10, 6, 2, 8}, {0, 0, 5, 11, 5, 8, 8, 10, 6, 4, 0, 9}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 8, 2, 9, 10, 2, 10, 4}, {0, 0, 7, 7, 0, 1, 7, 3, 6, 4, 3, 3}, {0, 0, 10, 1, 1, 1, 8, 8, 1, 7, 2, 1}, {0, 0, 9, 7, 10, 6, 5, 9, 11, 8, 1, 3}, {0, 0, 5, 6, 8, 7, 4, 0, 4, 9, 3, 5}, {0, 0, 3, 9, 0, 0, 1, 9, 5, 4, 9, 3}, {0, 0, 7, 5, 4, 3, 7, 4, 10, 1, 4, 9}, {0, 0, 0, 10, 1, 8, 2, 2, 8, 8, 10, 1}, {0, 0, 0, 2, 11, 4, 10, 10, 4, 4, 2, 11}, {0, 0, 6, 4, 0, 11, 1, 3, 10, 3, 8, 6}, {0, 0, 8, 6, 6, 1, 0, 4, 0, 2, 3, 4}, {0, 0, 5, 4, 0, 1, 2, 8, 3, 8, 10, 7}, {0, 0, 7, 8, 0, 11, 10, 4, 9, 4, 2, 5}, {0, 0, 2, 10, 9, 8, 2, 9, 0, 1, 5, 2}, {0, 0, 4, 5, 10, 6, 0, 0, 0, 9, 10, 2}, {0, 0, 5, 6, 0, 1, 4, 1, 4, 0, 8, 8}, {0, 0, 7, 10, 6, 9, 6, 5, 10, 10, 1, 5}, {0, 0, 10, 11, 10, 0, 3, 10, 7, 3, 6, 0}, {0, 0, 4, 9, 1, 10, 1, 0, 7, 6, 2, 4}, {0, 0, 8, 10, 3, 9, 7, 0, 1, 0, 0, 7}, {0, 0, 8, 1, 4, 1, 4, 4, 11, 10, 3, 7}, {0, 0, 1, 6, 10, 3, 5, 3, 10, 7, 0, 9}, {0, 0, 11, 7, 5, 7, 7, 1, 7, 9, 5, 0}, {0, 0, 6, 0, 2, 7, 1, 11, 0, 10, 5, 3}, {0, 0, 4, 9, 11, 5, 6, 4, 8, 5, 11, 7}, {0, 0, 8, 5, 9, 3, 2, 11, 2, 4, 3, 8}, {0, 0, 8, 1, 6, 3, 10, 0, 2, 0, 0, 6}, {0, 0, 6, 11, 3, 10, 9, 11, 11, 6, 3, 2}, {0, 0, 5, 3, 8, 6, 4, 5, 10, 2, 9, 3}, {0, 0, 6, 2, 10, 3, 4, 2, 3, 9, 10, 1}, {0, 0, 5, 0, 11, 8, 3, 6, 6, 9, 5, 8}, {0, 0, 7, 1, 0, 5, 2, 3, 10, 11, 11, 4}, {0, 0, 11, 8, 4, 11, 5, 8, 11, 11, 10, 9}, {0, 0, 0, 5, 10, 1, 9, 5, 3, 5, 5, 11}, {0, 0, 7, 1, 6, 6, 1, 2, 0, 4, 2, 4}, and {0, 0, 6, 1, 0, 7, 11, 2, 1, 3, 10, 7}, when the M is 12, the sequence set 5B comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 4, 4, 6, 0, 4, 1, 11, 6, 2}, {0, 0, 4, 3, 9, 8, 3, 6, 2, 5, 4, 6}, {0, 0, 5, 0, 7, 1, 2, 8, 8, 8, 7, 9}, {0, 0, 0, 10, 0, 6, 8, 6, 0, 10, 6, 0}, {0, 0, 6, 0, 8, 2, 4, 8, 7, 6, 6, 2}, {0, 0, 8, 10, 1, 10, 11, 5, 3, 7, 2, 0}, {0, 0, 3, 4, 5, 6, 1, 3, 10, 6, 2, 8}, {0, 0, 8, 1, 5, 0, 4, 3, 10, 10, 0, 0}, {0, 0, 4, 2, 1, 10, 11, 2, 7, 3, 10, 5}, {0, 0, 0, 8, 8, 2, 9, 10, 2, 10, 4}, {0, 0, 10, 1, 1, 1, 8, 8, 1, 7, 2, 1}, {0, 0, 9, 7, 10, 6, 5, 9, 11, 8, 1, 3}, {0, 0, 11, 1, 10, 0, 8, 3, 3, 7, 9, 11}, {0, 0, 4, 7, 11, 1, 11, 11, 6, 1, 8, 3}, {0, 0, 3, 9, 0, 0, 1, 9, 5, 4, 9, 3}, {0, 0, 0, 10, 1, 8, 2, 2, 8, 8, 10, 1}, {0, 0, 0, 2, 11, 4, 10, 10, 4, 4, 2, 11}, {0, 0, 10, 3, 0, 5, 3, 4, 10, 0, 4, 8}, {0, 0, 7, 8, 0, 0, 10, 4, 9, 5, 4, 5}, {0, 0, 9, 10, 9, 11, 2, 9, 6, 2, 6, 11}, {0, 0, 4, 5, 10, 6, 0, 0, 0, 9, 10, 2}, {0, 0, 5, 6, 0, 1, 4, 1, 4, 0, 8, 8}, {0, 0, 2, 6, 11, 8, 11, 8, 7, 1, 1, 8}, {0, 0, 4, 2, 10, 11, 11, 5, 0, 3, 6, 3}, {0, 0, 0, 7, 1, 4, 11, 10, 1, 0, 7, 6}, {0, 0, 3, 0, 10, 9, 4, 10, 2, 3, 5, 4}, {0, 0, 7, 3, 7, 2, 11, 10, 0, 2, 9, 11}, {0, 0, 0, 9, 8, 11, 0, 6, 1, 4, 0, 8}, {0, 0, 8, 5, 9, 3, 2, 11, 2, 4, 3, 8}, {0, 0, 2, 6, 8, 2, 3, 0, 5, 2, 7, 5}, {0, 0, 3, 7, 2, 6, 8, 8, 5, 2, 7, 4}, {0, 0, 0, 5, 10, 1, 9, 5, 3, 5, 5, 11}, and {0, 0, 5, 7, 11, 5, 1, 11, 11, 0, 3, 0}, when the M is 16, the sequence set 5C comprises:
{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {10, 9, 5, 5, 15, 0, 7, 14, 11, 15, 0, 0}, {6, 9, 3, 10, 0, 8, 6, 15, 15, 1, 0, 0}, {13, 4, 15, 11, 6, 1, 5, 13, 14, 15, 0, 0}, {6, 11, 10, 0, 9, 15, 4, 2, 14, 12, 0, 0}, {15, 8, 3, 8, 1, 11, 14, 0, 11, 10, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {3, 9, 6, 14, 5, 6, 11, 7, 8, 3, 0, 0}, {10, 8, 4, 15, 10, 5, 10, 0, 1, 1, 0, 0}, {5, 3, 12, 8, 9, 2, 14, 1, 2, 11, 0, 0}, {10, 10, 4, 4, 12, 13, 4, 15, 4, 0, 0, 0}, {11, 11, 6, 13, 3, 13, 1, 1, 11, 10, 0, 0}, {13, 7, 10, 11, 2, 8, 11, 7, 0, 15, 0, 0}, {12, 0, 6, 15, 8, 8, 0, 15, 1, 13, 0, 0}, {11, 9, 4, 9, 1, 10, 7, 5, 8, 11, 0, 0}, {8, 11, 11, 0, 6, 11, 10, 4, 15, 1, 0, 0}, {1, 7, 3, 7, 12, 15, 7, 2, 15, 0, 0, 0}, {3, 13, 1, 9, 2, 11, 11, 1, 3, 1, 0, 0}, {5, 0, 4, 2, 7, 6, 13, 6, 7, 2, 0, 0}, {13, 13, 14, 2, 5, 6, 1, 3, 12, 5, 0, 0}, {3, 2, 1, 14, 0, 5, 7, 1, 10, 3, 0, 0}, {5, 11, 8, 11, 8, 2, 14, 2, 6, 14, 0, 0}, {0, 5, 3, 15, 13, 4, 4, 8, 2, 7, 0, 0}, {14, 8, 7, 1, 2, 9, 15, 12, 1, 1, 0, 0}, {4, 6, 12, 10, 8, 12, 14, 8, 3, 8, 0, 0}, {14, 12, 11, 4, 14, 9, 11, 6, 9, 12, 0, 0}, {14, 7, 15, 3, 9, 5, 14, 15, 0, 12, 0, 0}, {1, 7, 13, 9, 1, 14, 4, 6, 2, 3, 0, 0}, {1, 5, 3, 2, 11, 6, 3, 7, 14, 0, 0, 0}, {0, 12, 2, 0, 2, 13, 8, 13, 0, 6, 0, 0}, {3, 15, 8, 6, 0, 12, 14, 14, 4, 11, 0, 0}, {5, 5, 13, 13, 6, 7, 11, 7, 12, 5, 0, 0}, {11, 13, 2, 12, 7, 14, 10, 11, 2, 3, 0, 0}, {14, 1, 10, 4, 1, 10, 1, 5, 5, 5, 0, 0}, {9, 15, 1, 7, 6, 1, 12, 0, 11, 14, 0, 0}, {3, 15, 10, 14, 4, 12, 10, 12, 12, 5, 0, 0}, {10, 15, 8, 3, 12, 15, 6, 3, 3, 5, 0, 0}, {8, 6, 9, 4, 4, 3, 9, 9, 2, 9, 0, 0}, {7, 8, 15, 0, 12, 14, 2, 11, 6, 14, 0, 0}, {2, 11, 15, 4, 2, 3, 11, 0, 13, 8, 0, 0}, {14, 5, 1, 12, 14, 13, 5, 0, 3, 8, 0, 0}, {11, 10, 0, 9, 12, 2, 12, 8, 9, 9, 0, 0}, {0, 12, 6, 4, 12, 11, 6, 10, 6, 12, 0, 0}, {5, 8, 5, 15, 15, 2, 1, 11, 3, 7, 0, 0}, {3, 13, 0, 2, 4, 12, 12, 5, 15, 3, 0, 0}, {13, 3, 0, 14, 12, 4, 4, 11, 1, 13, 0, 0}, {9, 3, 5, 5, 0, 13, 6, 12, 0, 14, 0, 0}, {13, 14, 8, 5, 6, 14, 14, 3, 14, 2, 0, 0}, {13, 7, 10, 11, 8, 14, 12, 4, 7, 1, 0, 0}, {7, 15, 13, 3, 1, 6, 11, 4, 2, 0, 0, 0}, {15, 5, 12, 3, 14, 15, 12, 3, 3, 9, 0, 0}, {12, 4, 6, 7, 13, 1, 12, 3, 1, 14, 0, 0}, {3, 3, 12, 2, 1, 11, 8, 13, 2, 14, 0, 0}, {13, 13, 4, 14, 15, 5, 8, 3, 14, 2, 0, 0}, {5, 11, 0, 2, 1, 4, 1, 12, 5, 8, 0, 0}, {11, 5, 0, 14, 15, 12, 15, 4, 11, 8, 0, 0}, {7, 3, 9, 9, 6, 0, 14, 3, 11, 15, 0, 0}, {9, 4, 7, 12, 1, 2, 14, 6, 2, 5, 0, 0}, {13, 7, 14, 8, 14, 2, 3, 1, 14, 8, 0, 0}, {7, 2, 12, 0, 0, 8, 14, 12, 12, 5, 0, 0}, {11, 10, 15, 10, 13, 14, 2, 10, 6, 4, 0, 0}, {2, 9, 8, 8, 2, 14, 3, 12, 14, 2, 0, 0}, {3, 8, 3, 1, 5, 3, 8, 12, 6, 4, 0, 0}, {2, 13, 11, 1, 13, 3, 15, 1, 9, 10, 0, 0}, {8, 2, 9, 12, 6, 11, 2, 1, 6, 4, 0, 0}, and {15, 6, 12, 15, 4, 2, 8, 7, 3, 4, 0, 0}, and when the M is 16, the sequence set 5D comprises:
{9, 8, 11, 14, 1, 5, 14, 6, 3, 1, 0, 0}, {14, 5, 11, 2, 9, 13, 9, 6, 10, 10, 0, 0}, {12, 9, 12, 6, 12, 7, 12, 13, 5, 4, 0, 0}, {7, 8, 14, 0, 3, 2, 15, 10, 1, 8, 0, 0}, {6, 9, 3, 10, 0, 8, 6, 15, 15, 1, 0, 0}, {13, 4, 15, 11, 6, 1, 5, 13, 14, 15, 0, 0}, {15, 8, 3, 8, 1, 11, 14, 0, 11, 10, 0, 0}, {11, 1, 2, 9, 3, 10, 0, 15, 12, 11, 0, 0}, {13, 6, 0, 13, 4, 14, 0, 9, 10, 11, 0, 0}, {2, 13, 3, 14, 7, 4, 2, 5, 11, 0, 0, 0}, {14, 9, 12, 3, 12, 12, 6, 10, 9, 15, 0, 0}, {13, 8, 11, 1, 7, 11, 9, 13, 9, 4, 0, 0}, {14, 6, 0, 14, 7, 7, 14, 2, 15, 2, 0, 0}, {3, 9, 6, 14, 5, 6, 11, 7, 8, 3, 0, 0}, {5, 3, 12, 8, 9, 2, 14, 1, 2, 11, 0, 0}, {10, 10, 4, 4, 12, 13, 4, 15, 4, 0, 0, 0}, {3, 11, 3, 14, 10, 12, 6, 8, 13, 11, 0, 0}, {1, 7, 3, 7, 12, 15, 7, 2, 15, 0, 0, 0}, {12, 9, 4, 9, 1, 10, 7, 5, 8, 11, 0, 0}, {4, 14, 1, 9, 2, 12, 11, 1, 3, 2, 0, 0}, {5, 0, 4, 2, 7, 6, 13, 6, 7, 2, 0, 0}, {13, 14, 12, 14, 2, 6, 3, 11, 4, 4, 0, 0}, {5, 11, 8, 11, 8, 2, 14, 2, 6, 14, 0, 0}, {11, 5, 8, 5, 8, 14, 2, 14, 10, 2, 0, 0}, {14, 8, 7, 1, 2, 9, 15, 12, 1, 1, 0, 0}, {10, 13, 7, 10, 9, 15, 4, 0, 14, 8, 0, 0}, {0, 3, 15, 3, 0, 2, 12, 5, 5, 10, 0, 0}, {13, 7, 13, 11, 6, 0, 1, 0, 5, 12, 0, 0}, {11, 13, 2, 12, 7, 14, 10, 11, 2, 3, 0, 0}, {15, 2, 12, 8, 13, 6, 0, 0, 4, 4, 0, 0}, {2, 14, 13, 7, 5, 1, 5, 2, 8, 12, 0, 0}, {1, 4, 3, 9, 4, 14, 6, 8, 1, 2, 0, 0}, {2, 8, 3, 0, 1, 15, 7, 2, 5, 10, 0, 0}, {7, 6, 15, 11, 5, 13, 3, 6, 6, 4, 0, 0}, {2, 11, 15, 4, 2, 3, 11, 0, 13, 8, 0, 0}, {15, 12, 3, 6, 7, 15, 0, 11, 1, 14, 0, 0}, {0, 12, 6, 4, 12, 11, 6, 10, 6, 12, 0, 0}, {13, 3, 0, 14, 12, 4, 4, 11, 1, 13, 0, 0}, {12, 2, 8, 9, 2, 4, 9, 6, 10, 5, 0, 0}, {5, 15, 2, 3, 6, 13, 13, 6, 0, 3, 0, 0}, {8, 6, 2, 12, 13, 2, 8, 1, 14, 0, 0, 0}, {14, 9, 2, 6, 10, 1, 15, 0, 14, 6, 0, 0}, {11, 1, 14, 12, 10, 1, 3, 5, 15, 6, 0, 0}, {7, 8, 5, 11, 10, 12, 4, 4, 14, 4, 0, 0}, {14, 0, 9, 5, 3, 11, 15, 14, 0, 10, 0, 0}, {4, 14, 0, 1, 8, 13, 9, 1, 0, 13, 0, 0}, {10, 12, 5, 12, 12, 7, 4, 11, 0, 14, 0, 0}, {5, 11, 11, 9, 0, 11, 0, 5, 5, 0, 0, 0}, {1, 1, 6, 6, 8, 15, 3, 15, 12, 3, 0, 0}, {8, 0, 14, 3, 1, 6, 11, 4, 2, 15, 0, 0}, {8, 2, 5, 7, 0, 5, 10, 7, 0, 0, 0, 0}, {13, 7, 10, 15, 2, 2, 0, 11, 3, 11, 0, 0}, {5, 7, 2, 15, 5, 2, 10, 13, 8, 10, 0, 0}, and {1, 10, 2, 13, 8, 12, 3, 1, 1, 5, 0, 0}.

15. The signal processing apparatus according to claim 9, wherein the sequence $\{x_n\}$ comprising the element $x_n$ is determined from a first set of sequences, at least K sequences in the first set of sequences comprise the element $x_n = u \cdot e^{\rho_M \sigma \cdot j \cdot s_n / M}$ of the sequence $\{x_n\}$, wherein K is a positive integer greater than or equal to 2, and the sequence $\{s_n\}$ comprising the element $s_n$ corresponding to each of the at least K sequences is selected from a sequence comprising a sixth sequence set and an equivalent sequence of sequences in the sixth sequence set, wherein the sixth sequence set comprises a sequence set 6A, a sequence set 6B, a sequence set 6C, and a sequence set 6D, wherein when the M is 4, the sequence set 6A comprises:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {1, −3, −3, 1, 1, 3, −1, −1, 3, 1, 3, 3, 3, 1, −3, −1, 3, 1}, {−3, 1, 1, −3, −3, 3, −1, −1, 3, −3, 3, 3, 3, −3, 1, −1, 3, −3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 3, 1, 3, 3, −3, 1, −1, 3, 3, 1, 3, −1, 1, −3, −3}, {−1, 1, 3, 3, −3, 3, 3, 1, −3, −1, 3, 3, −3, 3, −1, −3, 1, 1}, {3, −1, 1, −3, −1, −1, −1, −3, −1, −1, 3, 3, 1, −3, −1, −3, 3}, {3, −1, −3, 1, −1, −1, 1, −1, −3, −1, 3, −3, −1, −1, 1, 3, −3}, {−1, −3, 3, −1, −1, 3, −1, 3, 3, 3, 3, −1, −3, −1, 3, 3}, {−1, 1, 3, −1, −1, 3, 3, −1, 3, 3, 3, 3, −1, 1, −1, 3, 3}, {−1, −1, 3, 3, −1, −1, 3, −1, −1, 3, 3, 3, 3, −1, 3, −1, 3, −1}, {−1, 3, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, −1, −1, −3, 3, 1, 3, 3, 3, −3, 1, −3, 1, −3}, {−3, 1, −1, −3, 3, −1, −1, 1, 3, −3, 3, 3, 3, 1, −3, 1, −3, 1}, {3, −3, −1, 1, 3, −3, 3, −1, −3, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, 1, −3, −3, −3, −1, 3, 3, 1, −3, −3, 3, 3, −3}, {3, −1, 3, −3, 1, −3, 1, 1, 1, −1, 3, 3, −3, 1, 1, 3, 3, 1}, {−3, 1, −1, 1, −1, −3, −3, 3, −1, 3, 3, 3, −1, 3, −3, −1, 1}, {1, −3, −1, −3, −1, 1, 1, 3, −1, 3, 3, 3, 1, −1, 3, 1, −1, −3}, {3, 1, −3, −3, 3, 1, 1, −3, 3, −3, 3, 3, 3, −3, 1, 3, −1, −1, 1}, {3, −3, 1, 3, −3, −3, 1, 3, 1, 3, 3, 1, −3, 3, −1, −1, −3}, {3, −1, 1, 3, 1, −1, 1, 1, 1, −1, 3, 3, −3, 1, −1, −1, 3, −3}, {3, −1, −3, 3, −3, −1, −3, −3, −3, −1, 3, 3, 1, −3, −1, −1, 3, 1}, {3, 1, 3, −1, 3, −3, 3, −1, −3, 3, 3, 3, −3, −1, 1, −3, −1, 1}, {3, −3, −1, 1, −3, −1, 1, 3, 1, 3, −1, 1, 3, 3, 1, −1, −3, 1, −1, −3}, {−1, −1, −1, 3, −3, −1, 3, −1, 3, −1, 3, 3, −3, 3, 3, 3, −1, −1}, {−1, 1, 3, −3, −1, 1, −3, −3, 3, −1, 3, 3, 3, −3, −3, −1, −3}, {−1, −3, 3, 1, −1, −3, 1, 1, 3, −1, 3, 1, 1, 3, −1, 3, 3, 3, 1, 1, −1, 1}, {1, −1, 3, 1, −3, −1, 1, 1, 3, −1, 3, 3, 1, 1, −1, 1, −1, −3}, {−3, −1, 3, −3, 1, −1, −3, −3, 3, −1, 3, −3, −3, −3, −1, −1, 1}, {1, −3, −1, 1, 3, −3, 3, −3, 1, 3, 3, 1, −1, −3, 3, −3, 1}, {−3, 1, −1, −3, 3, 3, 1, 3, −3, 3, 3, −3, −1, 1, 3, 1, −3}, {3, −1, 1, −3, −1, 3, −3, 3, 3, 3, −1, −1, 1, −3}, {3, −1, −3, 1, −1, 3, 1, 3, −3, 1, 3, 3, 3, 1, −1, −1, −3, 1}, {1, −3, −3, 1, −3, 1, −3, 1, 3, 3, 3, −1, −1, 3, −3, −3, 3}, {−3, 1, 1, −3, 1, −3, 1, −3, 3, 3, 3, 3, −1, −1, 3, 1, 1, 3}, {−1, −1, −1, 3, 3, −1, 3, −3, 3, −1, 3, 3, −1, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, 3, −3, −3, −1, −3, 3}, {−3, 1, −3, 3, −1, −1, 3, −1, −3, −3, 3, 3, −3, −1, −3, −1, 1, 1}, {1, −3, 1, 3, −1, −1, 3, −1, 1, 1, 3, 3, 1, −1, −1, −3, −3}, {3, 1, −1, 1, −3, −1, 3, −1, 3, 3, 3, 3, −3, −1, −3, 3, 3}, {3, −3, −1, −3, 1, −1, 3, 1, 1, −1, −3, 3, 3, 1, 1, −1, 1, 3, 3, 1, 3, −1, −1, 1, 1, 1, −3, 3}, {−3, 3, −1, −3, −1, 1, 1, −1, 1, −1, 1, 3, 3, −1, −3, −1, 1}, {1, 3, −1, 3, −1, −1, −3, −1, −1, −1, 3, 3, −1, 1, −1, 1, 3},

1, −1, 1, −3, −1, 1, −1, −1, 3, 3, 3, −1, 3, 1, −3, −3, −1}, {−3, −3, −1, −3, 1, −1, −3, −1, −1, 3, 3, 3, −1, 3, −3, 1, 1, −1}, {−3, −1, 3, 1, −1, 3, 3, −1, 3, 3, 3, 3, −1, 1, −1, 3, −1, 3}, {1, −1, 3, −3, −1, 3, 3, −1, 3, 3, 3, −1, −3, −1, 3, −1, 3}, {−1, 1, 3, 3, −1, −1, 1, 1, −3, 3, 3, 1}, {−1, −3, 3, 3, 1, 3, −1, −1, −3, 1, 3, 3, −3, 3}, {3, −1, 3, −1, −3, 1, −3, 3, 1, 1, 3, 3, −1, 1, −3, 1, 3}, {3, −1, 3, −1, 1, −3, 1, 3, −3, −3, 3, 3, −1, −3, 1, −3, 3}, {1, 3, −3, 3, 3, 1, 3, 1, 1, −1, 3, 3, −3, 1, −3, −3, −1, 1}, {−3, 3, 1, 3, 3, −3, 3, −3, −3, −1, 3, 3, 1, −3, 1, 1, −1, −3}, {−1, 3, 3, −1, 3, 3, −1, −1, 3, 3, 3, −1, 3, −1, 3, −1, −1}, {3, 1, −1, 1, −1, −3, 3, 1, 3, −1, 3, 3, −3, −3, −3, 1, 3, 3}, {3, −3, −1, −3, −1, 1, 3, −3, 3, −1, 3, 3, 1, 1, 1, −3, 3, 3}, {−1, 3, 1, −1, −1, 3, −1, −3, −3, 1, 3, 3, −3, 3, −3, −3, −1, −3}, and {−1, 3, −3, −1, −1, 3,−1, 1, 1,−3, 3, 3, 1, 3, 1, 1,−1, 1}, when the M is 4, the sequence set 6B:

{3, −3, 1, 1, −1, −3, −3, 3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {−3, 1, 3, −3, 1, 3, −1, 3, 1, 1, 3, 3, 1, 1, −3, −3, 1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, −1, −1, −3, 3}, {3, −1, 1, −3, −1, −1, −3, −1, −1, 3, 3, 1, −3, −1, −3, 3, 1}, {3, −1, −3, 1, −1, −1, 1, −1, −1, 3, 3, −3, 1, −1, 1, 3, −3}, {1, −3, −1, 1, 3, −1, −1, −3, 3, 1, 3, 3, 3, −3, 1, −3, 1, −3}, {−3, 1, −1, −3, 3, −1, −1, 1, 3, −3, 3, 3, 3, 1, −3, 1, −3, 1}, {3, 1, −3, −3, 3, 1, 1, −3, 3, −3, 3, 3, −3, 1, 3, −1, −1}, {3, −3, 1, 1, 3, −3, −3, 1, 3, 1, 3, 3, 1, −3, 3, −1, −1, −3}, {−1, −1, −1, 3, 3, −1, 3, −1, −1, 3, 3, 3, −3, 3, 3, −1, −1}, {−1, 1, 3, −3, −1, 1, −3, −3, 3, −1, 3, 3, 3, 3, −3, −3, −1, −3}, {−1, −3, 3, 1, −1, −3, 1, 1, 3, −1, 3, 3, 3, 3, 1, 1, −1, 1}, {1, −3, −3, 1, −3, 1, −3, 1, 3, 3, 3, 3, −1, −1, 3, 1, 1, 3}, {−3, 1, 1, −3, 1, −3, 1, −3, 3, 3, 3, 3, −1, −1, 3, 1, 1, 3}, {−1, −1, −1, 3, 3, −1, 3, −3, 3, −1, 3, 3, −1, −1, −1, −1, 3, 3}, {1, 1, −1, 1, −3, −1, 1, −1, −3, 3, 3, 3, −1, 3, 1, −3, −3, −1}, {−3, −3, −1, −3, 1, −1, −3, −1, −1, 3, 3, 3, −1, 3, −3, 1, 1, −1}, {1, −3, −3, 3, 1, 1, −1, 3, −3, −3, 3, −1, 3, −3, −1, −1, −3}, {−3, −1, 3, 3, 1, −3, −1, −3, 1, 3, 3, −1, 1, −1, −3}, {1, −1, 3, 3, −3, 1, −1, 1, 3, −3, 3, 3, −1, 3, 3}, and {3, 1, −1, 1, −1,−3, 3, 1, 3,−1, 3, 3,−3,−3,−3, 1, 3, 3}, when the M is 4, the sequence set 6C comprises:

{−3, −3, −3, 1, 1, −3, −3, 1, 1, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, −3, 1, 1, 1, 1}, {1, 1, −3, 1, −3, −3, 1, −3, 1, 1, −3, 1, 1, 1, −3, −3, −3, 3, 1, 1}, {1, −3, −3, −3, 1, 1, −3, −3, 1, 1, −3, −3, −3, 1, −3, 1, −3, 1, 1}, {3, 3, −3, −3, 1, 3, 3, −3, 3, 3, −1, 3, −1, 3, 3, 1, 1, −3, −1, −1, −3, −3, 1, 1}, {−1, −1, −3, −3, 1, −1, −1, −3, −3, −1, 3, −1, 3, −1, −1, 1, 1, −3, 3, 3, −3, −3, 1, 1}, {3, 3, −1, −3, 1, 3, 1, 1, −1, 3, 3, −3, −3, 3, −3, 1, 3, 1, 1}, {−1, −1, 3, −3, 1, −1, 1, 1, 3, −1, −1, −3, −3, −1, 3, −1, −1, 1, 1, 1}, {1, 3, 3, −1, 1, −1, 1, 1, −3, 1, 3, 3, −1, 3, 1, −1, −3, −3, 1, 3, 1, 1, 3, 1}, {1, 1, −1, −1, 3, 3, 1, 1, −3, −1, 3, −1, 3, 3, −1, −1, 1, 1, 1, 1}, {1, 1, 3, 3, −1, −1, 1, 1, −3, 3, −1, 3, −1, 1, −1, −1, 3, 3, 1, 1, 3, 3, 1, 1}, {3, −3, −3, −1, −3, 1, −3, −1, 3, −1, 3, 3, −3, −1, −1, −3, −3, 3, 1, −3, 3, 1, 1, 1}, {−1, −3, −3, 3, −3, 1, −3, 3, −1, 3, −1, −1, −3, 3, 3, −3, −3, −1, 1, −3, −1, 1, 1, 1}, {3, −3, −1, 1, 3, −1, 1, 3, −3, 1, 1, 1, 1, −3, 1, −3, 3, 3, −1, −3, 1, 1, 1, 1}, {−1, −3, 3, 1, −1, 3, 1, −1, −3, 1, 1, 1, −3, 1, −3, −1, −1, 3, −3, 1, 1, 1, 1}, {−1, −1, −3, −3, 3, 3, 3, 3, 1, 3, −3, −3, 3, −1, 1, −3, 3, −3, 1, 3, 3, −1, −3, 1, 1}, {3, 3, −3, −3, −1, −1, −1, −1, 1, −1, −3, −3, −1, 3, 1, −3, −1, 3, −1, −1, 3, −3, 1, 1}, {−1, 3, −3, −3, 1, −3, 3, −3, −3, 1, −3, −3, 3, −1, −1, −1, 3, −3, 3, 3, 3, −1, 1, 1}, {3, −1, −3, −3, 1, −3, −1, −3, −3, 1, −3, −3, −1, 3, 3, 3, −1, −3, −1, −1, −1, 3, 1, 1}, {−1, 3, −3, −1, −3, 1, 1, −1, −1, −1, −3, −1, 1, −3, 1, −1, 3, 3, −3, −1, −3, 1, 1}, {3, −1, −1, −3, 3, −3, 1, 1, 3, 3, 3, −3, 3, 1, −3, 1, 3, −1, −1, −3, 3, −3, 1, 1}, {−1, 1, −1, −1, 3, −1, 3, −3, −3, −1, −3, 1, 1, −3, 1, 1, 1, −1, −1, 3, 3, −1, 1, 1}, {3, 1, 3, 3, −1, 3, −1, −3, −3, 3, −3, 1, 1, 1, 3, 3, −1, −1, 3, 1, 1}, {−3, −1, −1, 3, −3, 1, 1, 3, −3, 1, 1, 1, 3, 3, 1, −3, 1, −1, −3, −3, 3, 3, 1, 1}, {−3, 3, 3, −1, −3, 1, 1, −1, −3, 1, 1, 1, −1, −1, 1, −3, 1, 3, −3, −3, −1, −1, 1, 1}, {−3, −1, 3, 3, 1, 1, −1, 3, −3, 1, −3, −3, −3, 3, −3, −3, 1, −1, 3, −3, −3, 1, 1}, {−3, 3, −1, −1, 1, 1, 3, −1, −3, 1, −3, −3, −3, −1, −3, 1, 3, −1, −1, −3, −3, 3, 1, 1}, {1, 1, −3, 1, −3, −3, 3, −3, 1, 1, 1, 1, −3, −3, 1, 1, 1, 1}, {−1, 3, −3, 3, −3, 1, 1, −3, −3, −1, 3, −1, −1, −3, −1, −3, −1, 3, 3, −1, −1, −1, 3, 1, 1}, {3, −1, 1, −3, −1, −1, 1, −3, −1, 1, −1, −3, 1, −1, 1, −3, −3, −3, −3, 1, 1, 1, 1, 1}, {−1, −3, 3, 1, −3, 3, 3, 1, −3, 3, 1, 3, −3, 1, 3, 1, −3, −3, −3, 1, 1, 1, 1, 1}, {−1, −1, 1, 1, 1, −3, 3, 3, −1, −1, −1, 1, −3, −1, 1, −1, −3, 3, 1, 3, 1, 1}, {3, 3, 1, 1, 1, −3, −1, −1, 3, 3, 3, 1, −3, 1, 3, −3, 1, −3, −1, 1, −1, 1, 1}, {1, −3, 1, 3, −1, −1, 3, 3, 3, −1, 1, 1, −3, 3, 3, −3, 3, −3, 1, −1, 3, 1}, {1, −3, 1, −1, 3, 3, −1, −1, −1, 3, 1, 1, −3, −1, −1, −3, −1, −3, −1, 3, 1, −3, 1, 1}, {3, −1, −1, −1, 1, −1, −1, −3, −1, 3, 3, 1, −3, −3, −1, 3, −1, −3, 1, 3, −3, −3, 1, 1}, {−1, 3, 3, 3, 1, 3, 3, −3, 3, −1, −1, 1, −3, −3, 3, 1, −1, −3, −3, 1, 1}, {−3, 1, −3, −3, 3, −3, 3, −1, −1, −1, −1, −3, 1, 3, −1, −3, −3, −1, 1, 3, 3, −1, 1, 1}, {−3, 1, −3, −3, −1, −3, −1, 3, 3, 3, −3, 1, −1, 3, −3, −1, 3, 1, −1, −1, 3, 1, 1}, {3, 1, 3, −1, 3, −3, −1, −1, −1, 1, −3, 3, 1, 3, 1, −1, 3, 3, 1, 1, 3, 1, 1}, {−1, 1, −1, 3, −1, −3, 3, 3, 3, 1, −1, −3, −1, 1, −1, 1, −1, 1, 1, −1, 1, 1}, {1, −3, 1, −3, 1, 1, 1, 1, −3, 1, 1, 1, −3, −3, −3, −3, 1, 1, 1, 1}, {−1, 3, 1, 1, −1, −1, 3, 1, 1, 1, 1, −3, −3, −3, −3, 3, 1, 1, 1, 1}, {3, −1, 1, 3, 1, −1, 1, 1, 3, −1, 1, −3, −1, −1, −3, 3, −3, 3, 1, −1, 1, 1}, {−1, 1, −3, 1, −1, −3, 1, −3, −3, 1, −1, −1, −3, −1, −1, 1, −3, 1, 3, 3, −3, 1, 1}, {3, 1, −3, 1, −3, −1, −3, 1, 3, 3, −3, −3, 3, 1, −3, 1, −1, −1, −3, 1, 1}, {3, 3, 1, −3, −1, −3, 1, −1, 1, −1, −3, −3, 1, 1, −3, 1, 1, −1, 1, 1, 1, 1}, {−1, −1, 1, −3, 3, −3, 1, 3, 1, 3, −1, −3, −3, 1, 1, −3, 1, 1, 3, 1, 1, 1, 1}, {3, −1, −3, −3, 3, −3, 3, 3, 3, 1, −3, 1, −3, −3, −1, −1, 1, 3, −3, −1, 1, 1}, {−1, 3, −3, −3, −3, −1, −3, −1, −1, 1, −3, 1, −3, −3, −1, 3, 3, 1, −3, 3, 1, 1}, {3, 3, 3, −1, 1, 3, 3, 3, 1, −3, −1, −3, 1, −3, −3, 1, 3, 3, 1, −3, −3, 1, 1}, {−1, −1, −1, 3, 1, −1, −1, −1, −1, 1, −3, 3, −3, 1, −3, −3, 1, −1, −1, 1, −3, −3, 1, 1}, {−3, −3, −1, 3, −3, −1, 1, −3, −1, −3, −1, 1, 3, 3, 1, 1, −1, −3, 3, 1, 1}, {−3, −3, 3, −1, −3, 3, 1, −3, 3, −1, 3, −3, 1, −1, −1, −1, 1, 1, 3, −3, −1, 1, 1}, {1, 1, 3, 1, 1, −1, 1, −1, 1, −1, 1, 3, −3, 3, 1, −1, −3, −3, −3, 1, 1}, {1, 1, −1, 1, 1, 3, 1, 3, 1, 3, −1, 3, 1, −1, −3, −1, 1, 3, −3, −3, −3, −3, −3, 1, 1}, {−1, 1, 3, 3, 1, −3, 3, 3, 3, −1, −1, 1, 3, 1, 1, −1, 1, −1, −1, 3, 3, −3, −1, 1}, {3, 1, −1, −1, 1, −3, −1, −3, −1, −3, −1, 3, 3, 1, −1, 1, 1, 3, 1, 3, −1, −3, 1, 3, 1, 3, −1, −1}, {−3, 1, 1}, {1, 3, 3, −1, 1, −1, −3, 3, 1, 3, −1, −3, 1, 3, −3, 3, 3, −3, 3, −3, −1, −1, 1, 1}, {1, −1, −1, 3, 1, 3, −3, −1, 1, −1, 3, −3, 1, −1, −1, −3, −1, −3, 3, 3, 1, 1}, {1, −3, −3, 1, 3, 3, 1, 3, 1, 1, −3, 1, 1, −3, −3, −3, −3, −3, −3, 1, 1, 1}, {1, −1, 1, −1, −3, −1, 1, 1}, and {1, −3, −3, 1, −1, −1, 1, −1, 1, 1, −3, 1, 1, −3, −3, −3, 1, 3, 1, 3, −3, 3, 1, 1}, and when the M is 4, the sequence set 6D comprises:

{−3, −3, −3, 1, 1, −3, −3, 1, 1, −3, −3, −3, −3, 1, −3, 1, −3, −3, 1, −3, 1, 1, 1}, {1, 1, −3, 1, −3, −3, −3, −3, 1, −3, 1, 1, 1, −3, 1, 1, 1, 1, −3, −3, 1, 1, 1, 1}, {1, 3, 1, −3, −3, 1, −3, 1, −3, 1, −3, −3, −3, −3, −3, −3, 3, 1, 1}, {1, −3, −3, −3, 1, 1, −3, −3, −3, −3, −3, −3, −3, 1, −3, 1, 1, −3, −3, 1, −3, 1, 1}, {−1, −1, −1, −3, −1, −3, 3, −3, 3, 3, 3, −1, −3, 1, 3, −3, 3, −3, −1, −1, −3, −3, 1, 1}, {1, 3, −3, −3, 3, −3, −3, 3, 1, −3, −3, 3, −1, 3, 3, −3, 1, −1, −1, −1, 3, 3, 1, 1}, {1, −1, −1, 3, 1, 3, 1, 1, 1, −1, 3, −1, 1, 3, −3, −3, 1, −1, −1, 3, 1, 3, 1, 1}, {−1, 3, 3, 3, 1, 3, 3, −3, 3, −1, −1, 1, −3, −3, 3, −1, 3, −3, 1, −1, −3, −3, 1, 1}, {−1, 3, −3, −3, 1, −3, 3, −3, −3, 1, −3, −3, 3, −1, −1, −1, 3, −3, 3, 3, 3, −1, 1, 1}, {3, 1, 3, −1, 3, −3, −1, −1, −1, 1, 3, −3, 3, 1, 3, 1, 1, 3, 1, 1}, {3, −1, −3, −3, 1, −3, −1, −3, −3, 1, −3, −3, −1, 3, 3, 3, −1, −3, −1, −1, −1, 3, 1, 1}, {−1, −3, −3, −3, −3, −1, 3, −1, −1, 1, 3, 3, 3, −3, −1, −3, −3, 3, −1, 1, 1}, {−3, 1, 3, −1, −3, −3, 1, 1, −3, 1, 3, −3, −3, −3, −3, −3, 1, 3, −1, −3, 1, 1}, {3, 3, 1, 1, 1, −3, −1, −1, 3, 3, 1, 3, −3, 1, −3, −1, 1, −1, 1}, {−3, −1, 3, 3, 1, 1, −1, 3, −3, 1, −3, −3, −3, 1, −3, 3, −3, −3, 1, −1, 3, −3, 1, 1}, {1, −3, 1, −3, 1, 1, −3, 1, 1, −3, 1, 1, 1, −3, −3, −3, 1, 1, −3, 1, 1}, {−3, 3, −1, −1, 1, 1, 3, −1, −3, 1, −3, −3, −3, −1, −3, 1, 3, −1, −1, −3, −3, 3, 1, 1}, {−1, −1, 1, 1, 1, −3, 3, 3, −1, −1, −1, 1, −3, −1, 1, −1, −3, 3, 1, 3, 1, 1}, {3, −1, −1, −3, 3, −3, 1, 3, 3, 3, −3, 3, 1, −3, 1, 3, −1, −1, −3, 3, −3, 1, 1}, {3, −1, −1, −1, −1, −3, −1, 3, 3, −1, −3, 1, 3, −3, −3, −1, −1, −3, −3, 1, 1}, {−1, −1, 1, 1, 1, −3, 3, 3, −1, −1, −1, 1, −3, −1, 1, −1, −3, 3, 1, 3, 1, 1}, {3, −1, −1, −3, 3, −3, 3, 1, 3, −1, −1, −3, −1, −3, −3, 1, 1}, {1, −1, −1, 3, −1, −3, 3, 1, −1, −1, −1, 1, 3, 3, −1, −1, 1, 1}, {1, 3, −3, 1, −3, −1, 3, −1, 1, 3, 3, 1, −3, 3, −1, −3, −3, −3, 1, 1, 1}, {−3, 1, 1, 1, −3, 1, −3, −3, −3, 1, 1, −3, −1, 1, 1, 1}, {−3, 1, −3, −3, 3, −3, 3, −1, −1, 1, −3, 1, 3, −1, −3, −3, −1, 1, 3, 3, −1, 1, 1}, {3, −1, 1, 3, 1, −1, 1, 1, 3, −1, 1, −3, −1, −1, −3, 3, −3, 3, 1, −1, 1, 1}, {3, −1, −3, −3, 3, −3, 3, 3, 3, 1, −3, 1, −3, −3, −1, −1, 1, 3, −3, −1, 1, 1}, {−1, −1, −3, −3, 1, −1, −1, −3, −3, −1, 3, −1, −1, 1, 1, −3, 3, −3, −3, −3, 1, 1}, {1, −1, −3, 1, −3, 3, −1, −3, 1, 1, −1, −1, 1, −3, 1, 3, 1, −3, −3, −3, 1, 1, 1}, {3, −3, −1, 1, 3, −1, 1, 3, −3, 1, 1, 1, 1, −3, 1, −3, 3, 3, −1, −3, 1, 1, 1, 1}, {−1, 3, 1, −3, 3, 3, 1, −3, 3, 1, 3, −3, 1, 3, 1, −3, −3, −3, 1, 1, 1, 1, 1}, {3, 1, 3, 3, −1, 3, −1, −3, −3, 3, −3, 1, 1, 1, 3, 3, −1, −1, 3, 1, 1, 1, 1, 1}, {−1, −1, −3, −1, −1, −3, −1, 3, 1, −3, −3, −3, 1, 1, 1, 1}, {−1, −1, 3, −3, −1, −3, 1, 1, −1, −1, 1, −3, −1, 3, 1, 3, −3, −3, −3, 1, 1, 1}, {1, −3, −1, 3, 1, 1, 1, 3, 1, −1, −3, −1, −3, 1, 1}, {1, −3, −1, 1, 3, −1, 1, 3, −3, 1, 1, 1, 1, −3, 3, −3, −3, −3, 1, 1, 1, 1, 1}, {3, −1, −1, −3, −1, −1, −3, −1, 3, 3, −1, −3, 1, 3, −3, −3, −1, 3, 1, 1}, {−1, −1, 3, −3, −1, −3, 1, 3, −1, −3, 3, 3, 3, 1, 1, 1, 1}, {1, −3, −1, 3, 3, −1, −1, −1, 3, 1, 1, −3, −1, −1}, {−3, −1, −1, −3, −1, −3, −1, 3, 1, −3, 1, 1}, {1, 1, −3, 1,

−3, −3, 1, −3, 1, 1, −3, 1, 1, 1, −3, 1, 1, 1, −3, −3, −3, −3, 1, 1}, {−1, 1, −1, −1, 3, −1, 3, −3, −3, −1, −3, 1, 1, −3, 1, 1, 1, −1, −1, 3, 3, −1, 1, 1}, {1, −3, 1, 3, −1, −1, 3, 3, 3, −1, 1, 1, −3, 3, 3, −3, 3, −3, 3, −1, 1, −3, 1, 1}, {3, 1, 3, 3, −1, 3, −1, −3, −3, 3, −3, 1, 1, −3, 1, 1, 3, 3, −1, −1, 3, 1, 1}, and {−1, −3, −3, 3, −1, −1, 1, 1, −1, 1, −3, −1, −1, 3, 1, −3, −1, −3, −3, 3, −1, −1, 1, 1}.

16. The signal processing apparatus according to claim 9, wherein an equivalent sequence of the sequence $\{s_n\}$ is an equivalent sequence $\{q_n\}$, wherein when the M is 4, in the equivalent sequence $\{q_n\}$, element $q_n = s_n + u_n \pmod 8$, and in a sequence $\{u_n\}$ comprising element $u_n$, $u_n = f + g \cdot n \pmod 8$, $f \in \{0,2,4,6\}$, and $f \in \{0,2,4,6\}$, and wherein when M is 12 or 16, in the equivalent sequence $\{q_n\}$, element $q_n = s_n + u_n \pmod M$, and in a sequence $\{u_n\}$ comprising $u_n$, $u_n = f + g \cdot n \pmod M$, $f \in \{0, 1, 2, \ldots M-1\}$, and $g \in \{0, 1, 2, \ldots M-1\}$.

17. A signal processing method, comprising:
receiving a first signal carried on N subcarriers;
obtaining N elements in a sequence $\{f_n\}$, wherein $f_n$ is an element in the sequence $\{f_n\}$, the sequence $\{f_n\}$ comprises the element $f_n = A \cdot x_n \cdot e^{2\pi \cdot j \cdot a \cdot n}$, wherein a value of n ranges from 0 to N−1, A is a non-zero complex number, a is a real number, $x_n = u \cdot e^{\rho_M \sigma \cdot j \cdot s_n / M}$ is an element in the sequence, u is a non-zero complex number, M is 4, 12, or 16, $\beta_M$ is a real number, $\beta_M$ is 1 or −1 when M is 4, $\beta_M$ is 2 or −2 when M is 12 or 16, and wherein a sequence $\{s_n\}$ comprising an element $s_n$ is selected from a set of sequences comprising a first sequence set, an equivalent sequence of sequences in the first sequence set, a second sequence set, an equivalent sequence of sequences in the second sequence set, a third sequence set, and an equivalent sequence of sequences in the third sequence set, wherein
when the M is 4, the first sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, (−3, 3, −1, −3, 1, −1, 1, 3, 1, 1, −1, −1}, {1, 3, −1, 1, −3, −1, −3, 3, −3, −3, −1, −1}, (−3, 3, −1, 3, −1, 3, 3, −1, −1, −1, −1, −1}, {1, 3, −1, 3, −1, 3, 3, −1, −1, −1, −1, −1}, {3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 3, −1, −3, −1, −1}, {3, −3, −3, −3, −3, 3, 1, −1, −1}, {3, 1, 1, −3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −1, −3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −3, −1, −1}, {−3, 1, −1, −1, 3, 1, 3, −1, −1, 1, −1, −1}, {1, −3, −1, −1, 3, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, 3, −1, −1, −1},
wherein the second sequence set comprises a sequence set 2A and a sequence set 2B,
wherein when the M is 12, the sequence set 2A comprises:
{0, 0, 6, 7, 10, 10, 10, 5, 10, 4, 2, 11}, {0, 0, 11, 0, 1, 11, 3, 8, 7, 2, 2, 9}, {0, 0, 2, 5, 8, 0, 7, 2, 0, 11, 11, 0}, {0, 0, 3, 4, 5, 3, 0, 7, 0, 4, 8, 8}, {0, 0, 9, 8, 7, 7, 9, 0, 5, 0, 8, 4, 4}, {0, 0, 4, 6, 10, 11, 5, 1, 3, 1, 2, 0}, {0, 0, 0, 4, 4, 6, 0, 4, 1, 11, 6, 2}, {0, 0, 6, 3, 1, 8, 8, 10, 6, 10, 5, 10}, {0, 0, 3, 6, 10, 2, 9, 5, 3, 3, 4, 4}, {0, 0, 4, 3, 9, 8, 3, 6, 2, 5, 4, 6}, {0, 0, 1, 5, 5, 7, 1, 5, 2, 0, 7, 3}, {0, 0, 10, 9, 9, 6, 9, 1, 11, 5, 3, 10}, {0, 0, 8, 7, 6, 2, 4, 7, 4, 9, 7, 1}, {0, 0, 1, 4, 6, 9, 4, 10, 8, 7, 5, 6}, {0, 0, 9, 7, 6, 2, 4, 7, 4, 9, 6, 0}, {0, 0, 6, 7, 0, 1, 8, 4, 7, 5, 5, 5}, {0, 0, 4, 8, 0, 4, 0, 8, 7, 8, 9, 10}, {0, 0, 10, 9, 8, 10, 1, 6, 2, 10, 6, 7}, {0, 0, 4, 1, 7, 5, 10, 0, 8, 9, 7, 9}, {0, 0, 5, 0, 7, 1, 2, 8, 8, 8, 7, 9}, {0, 0, 7, 0, 5, 11, 10, 4, 4, 4, 5, 3}, {0, 0, 8, 8, 7, 7, 10, 2, 9, 5, 1, 11}, {0, 0, 9, 8, 7, 8, 11, 4, 0, 8, 3, 3}, {0, 0, 3, 4, 5, 4, 1, 8, 0, 4, 9, 9}, {0, 0, 4, 0, 6, 4, 9, 11, 7, 7, 6, 8}, {0, 0, 7, 5, 4, 11, 0, 3, 11, 4, 1, 5}, {0, 0, 8, 8, 8, 4, 7, 10, 7, 1, 0, 5}, {0, 0, 4, 0, 5, 2, 6, 7, 3, 3, 0, 0}, {0, 0, 7, 6, 5, 0, 1, 4, 0, 4, 2, 6}, {0, 0, 3, 6, 9, 0, 7, 2, 0, 0, 0, 0}, {0, 0, 1, 2, 4, 3, 8, 2, 2, 10, 10, 7}, {0, 0, 11, 1, 1, 0, 4, 9, 7, 2, 3, 10}, {0, 0, 4, 8, 11, 4, 1, 6, 5, 4, 3, 10}, {0, 0, 8, 4, 1, 8, 11, 6, 7, 8, 9, 2}, {0, 0, 2, 2, 5, 4, 9, 3, 4, 0, 0, 10}, {0, 0, 3, 10, 3, 0, 4, 5, 0, 11, 9, 10}, {0, 0, 11, 0, 1, 11, 3, 8, 7, 2, 2, 10}, {0, 0, 2, 5, 8, 11, 6, 1, 11, 10, 10, 10}, {0, 0, 4, 7, 10, 2, 10, 5, 4, 4, 3, 4}, {0, 0, 6, 6, 8, 7, 6, 0, 4, 10, 7, 2}, {0, 0, 5, 3, 11, 10, 4, 8, 5, 7, 7, 10}, {0, 0, 4, 7, 10, 4, 0, 7, 7, 6, 6, 8}, {0, 0, 8, 7, 5, 6, 9, 1, 9, 4, 10, 10}, {0, 0, 4, 5, 7, 6, 3, 11, 3, 8, 2, 2}, {0, 0, 8, 4, 4, 11, 0, 3, 0, 5, 1, 6}, {0, 0, 5, 5, 7, 6, 5, 11, 3, 9, 6, 1}, {0, 0, 3, 3, 4, 3, 0, 7, 0, 3, 8, 8}, {0, 0, 9, 8, 6, 7, 10, 2, 10, 5, 0, 0}, {0, 0, 0, 10, 0, 6, 8, 6, 0, 10, 6, 0}, {0, 0, 8, 10, 7, 8, 3, 9, 8, 0, 2, 2}, {0, 0, 6, 0, 8, 2, 4, 8, 7, 6, 6, 2}, {0, 0, 6, 0, 4, 10, 8, 4, 5, 6, 6, 10}, {0, 0, 7, 3, 1, 6, 6, 7, 2, 5, 1, 4}, {0, 0, 4, 1, 7, 5, 11, 1, 9, 10, 9, 11}, {0, 0, 4, 1, 10, 4, 3, 4, 10, 1, 9, 0}, {0, 0, 4, 0, 6, 4, 8, 10, 6, 6, 4, 6}, {0, 0, 0, 10, 8, 6, 0, 6, 9, 11, 0, 1}, {0, 0, 4, 2, 11, 2, 1, 7, 9, 5, 10, 0}, {0, 0, 8, 10, 1, 10, 11, 5, 3, 7, 2, 0}, {0, 0, 6, 4, 2, 0, 1, 4, 10, 5, 0, 7}, {0, 0, 4, 6, 11, 4, 10, 7, 5, 5, 6, 7}, {0, 0, 11, 0, 1, 4, 9, 3, 0, 9, 7, 7}, {0, 0, 1, 0, 11, 8, 3, 9, 0, 3, 5, 5}, {0, 0, 4, 6, 10, 2, 9, 5, 4, 4, 5, 5}, {0, 0, 7, 1, 9, 3, 5, 9, 8, 7, 6, 3}, {0, 0, 5, 9, 1, 6, 3, 10, 10, 10, 10, 0}, {0, 0, 2, 3, 6, 6, 11, 6, 7, 4, 4, 1}, {0, 0, 3, 5, 8, 8, 2, 9, 10, 7, 8, 6}, {0, 0, 10, 0, 11, 9, 1, 5, 3, 9, 10, 5}, {0, 0, 5, 10, 3, 9, 7, 3, 4, 5, 6, 9}, {0, 0, 4, 8, 1, 6, 2, 11, 10, 0, 2, 3}, {0, 0, 8, 4, 11, 6, 10, 1, 2, 0, 10, 9}, {0, 0, 4, 1, 9, 3, 1, 2, 8, 10, 6, 8}, {0, 0, 3, 11, 4, 1, 6, 7, 2, 2, 0, 1}, {0, 0, 5, 6, 7, 3, 2, 7, 3, 6, 0, 7}, {0, 0, 7, 6, 5, 9, 10, 5, 9, 6, 0, 5}, {0, 0, 7, 5, 2, 2, 4, 7, 2, 8, 2, 1}, {0, 0, 2, 5, 8, 11, 6, 1, 11, 11, 10, 11}, {0, 0, 4, 8, 1, 6, 3, 11, 11, 0, 0, 2}, {0, 0, 7, 1, 7, 0, 1, 4, 2, 0, 10, 7}, {0, 0, 8, 1, 7, 3, 2, 1, 4, 6, 11, 0}, {0, 0, 10, 7, 4, 1, 6, 11, 1, 1, 1, 2}, {0, 0, 4, 7, 10, 3, 11, 6, 6, 5, 5, 6}, {0, 0, 7, 6, 3, 3, 5, 8, 3, 9, 3, 2}, {0, 0, 9, 10, 2, 3, 4, 0, 6, 1, 1, 9}, {0, 0, 5, 4, 2, 11, 0, 3, 9, 4, 11, 6}, {0, 0, 4, 8, 11, 4, 1, 6, 5, 4, 3, 11}, {0, 0, 8, 4, 1, 8, 11, 6, 7, 8, 9, 1}, {0, 0, 7, 4, 1, 11, 0, 2, 7, 1, 7, 3}, {0, 0, 10, 10, 10, 7, 10, 2, 0, 6, 5, 0}, {0, 0, 0, 9, 9, 7, 1, 8, 11, 1, 4, 3}, {0, 0, 0, 3, 3, 5, 11, 4, 1, 11, 8, 9}, {0, 0, 0, 6, 9, 4, 6, 5, 11, 8, 4, 1}, {0, 0, 7, 8, 11, 11, 11, 6, 11, 6, 4, 0}, {0, 0, 5, 11, 5, 8, 8, 1, 11, 9, 8, 10}, {0, 0, 3, 5, 6, 9, 4, 7, 4, 2, 10, 7}, {0, 0, 6, 4, 3, 10, 11, 1, 9, 2, 10, 3}, {0, 0, 6, 5, 0, 0, 8, 0, 9, 0, 1, 4}, {0, 0, 0, 10, 9, 7, 1, 8, 11, 1, 4, 4}, {0, 0, 8, 7, 5, 6, 9, 1, 9, 4, 11, 10}, {0, 0, 1, 3, 3, 4, 10, 1, 9, 6, 1, 8}, {0, 0, 1, 3, 5, 7, 1, 7, 4, 3, 2, 1}, {0, 0, 1, 10, 0, 9, 0, 5, 4, 11, 9, 5}, {0, 0, 5, 8, 1, 6, 2, 11, 11, 0, 2, 2}, {0, 0, 7, 4, 11, 6, 10, 1, 1, 0, 10, 10}, {0, 0, 6, 11, 4, 8, 8, 10, 7, 4, 1, 9}, {0, 0, 11, 9, 9, 7, 1, 8, 11, 1, 4, 4}, {0, 0, 3, 1, 9, 5, 4, 6, 11, 4, 10, 3}, {0, 0, 3, 7, 10, 2, 10, 5, 4, 3, 3, 4}, {0, 0, 0, 1, 1, 0, 4, 9, 7, 2, 2, 9}, {0, 0, 8, 8, 7, 4, 6, 10, 7, 1, 11, 5}, {0, 0, 5, 9, 1, 5, 1, 9, 8, 9, 10, 11}, {0, 0, 11, 1, 3, 10, 11, 6, 3, 7, 4, 10}, {0, 0, 11, 0, 2, 3, 8, 2, 10, 9, 6, 6}, {0, 0, 10, 0, 9, 11, 7, 1, 1, 5, 7, 9}, {0, 0, 8, 8, 11, 11, 11, 6, 11, 5, 4, 11}, {0, 0, 11, 10, 0, 9, 1, 5, 4, 11, 10, 5}, {0, 0, 9, 2, 10, 6, 5, 5, 8, 0, 5, 7}, {0, 0, 8, 6, 4, 5, 7, 11, 5, 0, 7, 7}, {0, 0, 2, 4, 6, 8, 4, 4, 0, 6, 1, 6}, {0, 0, 2, 3, 5, 4, 9, 3, 3, 11, 0, 8}, {0, 0, 6, 9, 0, 5, 2, 7, 6, 5, 4, 11}, {0, 0, 6, 3, 0, 7, 10, 5, 6, 7, 8, 1}, {0, 0, 6, 4, 11, 10, 5, 8, 5, 7, 8, 11}, {0, 0, 6, 4, 2, 10, 10, 1, 9, 2, 9, 2}, {0, 0, 4, 9, 0, 5, 2, 9, 9, 9, 9, 0}, {0, 0, 3, 7, 10, 2, 10, 5, 4, 4, 4, 5}, {0, 0, 9, 8, 7, 6, 11, 9, 2, 6, 10, 4}, {0, 0, 3, 4, 5, 6, 1, 3, 10, 6, 2, 8}, {0, 0, 3, 5, 7, 9, 5, 8, 4, 1, 10, 6}, {0, 0, 1, 10, 8, 6, 0, 6, 9, 10, 0, 11}, {0, 0, 11, 2, 4, 6, 0, 6, 3, 2, 0, 1}, {0, 0, 2, 4, 5, 9, 3, 9, 7, 5, 4, 5}, {0, 0, 10, 6, 4, 0, 4, 10, 11, 0, 1, 0}, {0, 0, 2, 6, 8, 0, 8, 2, 1, 0, 11, 0}, {0, 0, 4, 5, 7, 6, 4, 11, 5, 9, 3, 3}, {0, 0, 0, 8, 5, 3, 8, 1, 4, 3, 5, 3}, {0, 0, 0, 4, 7, 9, 4, 11, 8, 9, 7, 9}, {0, 0, 7, 6, 5, 4, 6, 10, 5, 1, 9, 4}, {0, 0, 4, 8, 0, 4, 0, 8, 7, 8, 9, 9}, {0, 0, 8, 4, 0, 8, 0, 4, 5, 4, 3, 3}, {0, 0, 0, 0, 1, 11, 3, 8, 7, 2, 2, 9}, {0, 0, 5, 2, 0, 6, 5, 7, 2, 5, 1, 3}, {0, 0, 5, 11, 5, 8, 8, 10, 6, 4, 0, 9}, {0, 0, 8, 1, 5, 0, 4, 3, 10, 10, 0, 0}, {0, 0, 6, 6, 8, 8, 6, 0, 4, 10, 9, 4}, {0, 0, 4, 2, 1, 10, 11, 2, 7, 3, 10, 5}, {0, 0, 8, 7, 5, 6, 8, 0, 7, 2, 9, 8}, {0, 0, 5, 3, 11, 8, 8, 10, 4, 9, 4, 9}, {0, 0, 7, 5, 3, 10, 11, 1, 9, 1, 10, 2}, {0, 0, 3, 6, 8, 0, 8, 0, 10, 8, 6, 1}, {0, 0, 3, 10, 6, 11, 8, 9, 2, 3, 11, 11}, {0, 0, 11, 0, 0, 2, 7, 0, 9, 6, 2, 3}, {0, 0, 1, 0, 0, 10, 5, 0, 3, 6, 10, 9}, {0, 0, 7, 10, 4, 10, 7, 5, 6, 8, 11, 11}, {0, 0, 4, 8, 1, 5, 4, 6, 3, 11, 9, 4}, {0, 0, 1, 1, 4, 2, 7, 1, 1, 10, 8, 6}, {0, 0, 3, 8, 1, 3, 2, 6, 3, 0, 10, 10}, {0, 0, 4, 7, 10, 2, 10, 4, 3, 2, 1, 2}, {0, 0, 10, 10, 9, 11, 3, 8, 5, 1, 9, 9}, and {0, 0, 2, 2, 3, 1, 9, 4, 7, 11, 3, 3}, wherein when the M is 16, the sequence set 2B comprises: {9, 8, 11, 14, 1, 5, 14, 6, 3, 1, 0, 0}, {13, 12, 14, 1, 4, 7, 0, 8, 4, 3, 0, 0}, {14, 5, 11, 2, 9, 13, 9, 6, 10, 10, 0, 0}, {10, 12, 1, 3, 10, 10, 4, 14, 2, 15, 0, 0}, {12, 9, 12, 6, 12, 7, 12, 13, 5, 4, 0, 0}, {13, 12, 0, 2, 4, 8, 1, 8, 5, 3, 0, 0}, {13, 15, 6, 10, 1, 4, 14, 10, 14, 13, 0, 0}, {9, 8, 2, 0, 13, 14, 1, 6, 15, 8, 0, 0}, {7, 8, 14, 0, 3, 2, 15, 10, 1, 8, 0, 0}, {11, 11, 15, 3, 8, 13, 7, 1, 15, 15, 0, 0}, {7, 3, 6, 14, 7, 11, 6, 4, 9, 9, 0, 0}, {12, 12, 7, 6, 5, 7, 11, 2, 11, 6, 0, 0}, {4, 4, 9, 10, 11, 9, 5, 14, 5, 10, 0, 0}, {13, 14, 9, 8, 6, 8, 12, 2, 12, 6, 0, 0}, {3, 2, 7, 8, 10, 8, 4, 14, 4, 10, 0, 0}, {2, 10, 14, 4, 12, 15, 10, 7, 11, 11, 0, 0}, {4, 3, 4, 6, 8, 11, 3, 10, 6, 3, 0, 0}, {9, 6, 9, 4, 10, 5, 11, 12, 4, 4, 0, 0}, {2, 14, 0, 9, 15, 9, 14, 14, 5, 4, 0, 0}, {7, 6, 1, 15, 12, 13, 0, 5, 14, 7, 0, 0}, {13, 13, 9, 8, 6, 8, 12, 2, 12, 6, 0, 0}, {3, 3, 7, 8, 10, 8, 4, 14, 4, 10, 0, 0}, {6, 5, 8, 11, 15, 3, 12, 5, 2, 1, 0, 0}, {7, 15, 4, 13, 5, 9, 6, 3, 8, 8, 0, 0}, {13, 13, 1, 5, 10, 14, 8, 2, 15, 0, 0, 0}, {10, 9, 5, 5, 15, 0, 7, 14, 11, 15, 0, 0}, {13, 12, 6, 7, 1, 0, 8, 14, 12, 14, 0, 0}, {0, 6, 10, 13, 5, 6, 0, 11, 15, 13, 0, 0}, {11, 11, 13, 0, 3, 6, 15, 7, 4, 2, 0, 0}, {6, 2, 4, 13, 2, 12, 0, 0, 7, 5, 0, 0}, {6, 9, 3, 10, 0, 8, 6, 15, 15, 1, 0, 0}, {13, 4, 15, 11, 6, 1, 5, 13, 14, 15, 0, 0}, {8, 1, 6, 14, 6, 10, 6, 4, 9, 9, 0, 0}, {15, 15, 0, 2, 5, 8, 0, 8, 4, 2, 0, 0}, {13, 2, 9, 0, 8, 12, 8, 5, 10, 10, 0, 0}, {2, 2, 13, 15, 10, 11, 3, 11, 9, 13, 0, 0}, {9, 0, 6, 14, 6, 10, 7, 4, 9, 9, 0, 0}, {1, 10, 6, 3, 15, 11, 0, 9, 12, 14, 0, 0}, {13, 2, 11, 3, 10, 3, 2, 12, 13, 15, 0, 0}, {6, 11, 10, 0, 9, 15, 4, 2, 14, 12, 0, 0}, {6, 6, 1, 15, 12, 13, 0, 5, 14, 7, 0, 0}, {8, 8, 3, 4, 14, 14, 6, 13, 11, 14, 0, 0}, {7, 8, 4, 4, 3, 5, 9, 0, 10, 6, 0, 0}, {1, 6, 10, 13, 5, 6, 0, 11, 15, 13, 0, 0}, {1, 4, 0, 1, 0, 2, 7, 14, 9, 5, 0, 0}, {15, 8, 3, 8, 1, 11, 14, 0, 11, 10, 0, 0}, {1, 8, 13, 8, 15, 5, 2, 0, 5, 6, 0, 0}, {9, 15, 10, 4, 0, 8, 12, 2, 1, 1, 0, 0}, {7, 9, 4, 5, 3, 5, 10, 0, 12, 6, 0, 0}, {0, 15, 10, 9, 7, 9, 13, 3, 13, 7, 0, 0}, {0, 1, 6, 7, 9, 7, 3, 13, 3, 9, 0, 0}, {7, 10, 15, 1, 8, 9, 2, 13, 1, 15, 0, 0}, {9, 11, 1, 3, 9, 10, 4, 14, 2, 15, 0, 0}, {9, 1, 5, 9, 1, 3, 13, 9, 13, 12, 0, 0}, {12, 2, 7, 10, 2, 4, 14, 10, 14, 13, 0, 0}, {10, 8, 11, 14, 1, 5, 14, 6, 3, 1, 0, 0}, {7, 12, 1, 7, 14, 1, 12, 8, 12, 11, 0, 0}, {9, 8, 11, 13, 1, 5, 13, 6, 2, 1, 0, 0}, {6, 6, 6, 9, 10, 12, 4, 11, 6, 4, 0, 0}, {10, 10, 10, 7, 6, 4, 12, 5, 10, 12, 0, 0}, {12, 3, 3, 10, 4, 11, 0, 15, 12, 11, 0, 0}, {6, 6, 10, 11, 1, 0, 9, 2, 5, 1, 0, 0}, {10, 13, 1, 3, 10, 10, 4, 14, 2, 15, 0, 0}, {9, 8, 11, 14, 1, 5, 14, 6, 3, 2, 0, 0}, {6, 11, 15, 1, 8, 9, 2, 13, 1, 15, 0, 0}, {1, 8, 2, 9, 1, 5, 9, 7, 2, 15, 0, 0}, {12, 11, 14, 0, 3, 7, 15, 7, 3, 1, 0, 0}, {9, 7, 11, 13, 0, 5, 14, 6, 4, 2, 0, 0}, {11, 1, 2, 9, 3, 10, 0, 15, 12, 11, 0, 0}, {7, 7, 1, 2, 13, 14, 5, 13, 10, 15, 0, 0}, {0, 0, 5, 7, 13, 13, 6, 0, 3, 0, 0, 0}, {13, 3, 9, 0, 8, 12, 8, 5, 10, 10, 0, 0}, {5, 10, 15, 1, 8, 9, 2, 13, 0, 14, 0, 0}, {2, 5, 11, 13, 5, 7, 1, 12, 0, 15, 0, 0}, {0, 14, 1, 10, 3, 8, 3, 2, 7, 7, 0, 0}, {4, 5, 9, 10, 0, 15, 8, 1, 4, 0, 0, 0}, {10, 6, 10, 0, 5, 15, 2, 1, 8, 5, 0, 0}, {4, 0, 2, 11, 1, 11, 15, 15, 6, 5, 0, 0}, {10, 1, 6, 14, 6, 10, 6, 4, 9, 9, 0, 0}, {9, 5, 9, 0, 9, 12, 7, 5, 10, 9, 0, 0}, {15, 0, 10, 9, 7, 9, 13, 3, 13, 7, 0, 0}, {1, 0, 6, 7, 9, 7, 3, 13, 3, 9, 0, 0}, {14, 4, 11, 2, 9, 13, 9, 6, 10, 10, 0, 0}, {5, 4, 0, 14, 11, 12, 15, 4, 14, 7, 0, 0}, {11, 2, 7, 15, 7, 11, 7, 4, 9, 9, 0, 0}, {13, 6, 0, 13, 4, 14, 0, 9, 10, 11, 0, 0}, {4, 12, 15, 6, 13, 0, 11, 7, 11, 10, 0, 0}, {7, 3, 7, 14, 7, 11, 6, 4, 9, 9, 0, 0}, {9, 1, 6, 13, 6, 10, 6, 4, 9, 10, 0, 0}, {11, 8, 11, 4, 11, 6, 11, 12, 4, 3, 0, 0}, {14, 11, 14, 7, 13, 8, 13, 13, 5, 4, 0, 0}, {4, 14, 0, 6, 14, 1, 11, 8, 12, 11, 0, 0}, {6, 8, 9, 14, 7, 13, 5, 3, 14, 13, 0, 0}, {1, 0, 4, 8, 12, 0, 10, 3, 1, 0, 0, 0}, {9, 9, 14, 2, 7, 12, 6, 0, 15, 15, 0, 0}, {15, 15, 2, 4, 6, 9, 2, 9, 5, 3, 0, 0}, {4, 0, 3, 11, 1, 11, 15, 15, 6, 4, 0, 0}, {5, 5, 9, 12, 15, 3, 12, 5, 2, 1, 0, 0}, {15, 12, 15, 8, 14, 9, 13, 14, 6, 4, 0, 0}, {9, 13, 3, 8, 15, 2, 13, 9, 13, 12, 0, 0}, {12, 0, 4, 6, 12, 12, 5, 15, 2, 15, 0, 0}, {14, 12, 15, 2, 4, 8, 1, 8, 5, 3, 0, 0}, {5, 6, 3, 3, 1, 4, 9, 15, 11, 5, 0, 0}, {8, 8, 4, 4, 2, 5, 10, 0, 12, 6, 0, 0}, {8, 8, 12, 12, 14, 11, 6, 0, 4, 10, 0, 0}, {2, 13, 3, 14, 7, 4, 2, 5, 11, 0, 0, 0}, {14, 3, 13, 2, 9, 12, 14, 11, 5, 0, 0, 0}, {4, 10, 10, 0, 9, 15, 4, 2, 14, 13, 0, 0}, {9, 1, 6, 14, 6, 10, 6, 4, 9, 9, 0, 0}, {6, 10, 10, 0, 9, 15, 4, 2, 14, 12, 0, 0}, {1, 10, 14, 4, 12, 15, 10, 7, 11, 11, 0, 0}, {13, 2, 15, 4, 13, 2, 7, 5, 0, 13, 0, 0}, {5, 9, 6, 8, 9, 12, 2, 10, 6, 3, 0, 0}, {2, 2, 7, 8, 10, 8, 4, 13, 4, 9, 0, 0}, {12, 10, 13, 0, 2, 7, 0, 7, 5, 3, 0, 0}, {9, 6, 9, 0, 5, 15, 2, 1, 9, 6, 0, 0}, {15, 13, 7, 7, 1, 1, 9, 15, 12, 15, 0, 0}, {7, 10, 3, 10, 0, 8, 6, 15, 15, 1, 0, 0}, {13, 15, 4, 6, 12, 12, 5, 15, 2, 15, 0, 0}, {7, 10, 3, 10, 0, 8, 7, 0, 15, 1, 0, 0}, {14, 9, 12, 3, 12, 12, 6, 10, 9, 15, 0, 0}, {14, 15, 1, 4, 12, 2, 8, 5, 0, 14, 0, 0}, {4, 6, 11, 15, 6, 7, 1, 12, 0, 14, 0, 0}, {2, 1, 6, 9, 13, 1, 10, 3, 0, 0, 0, 0}, {11, 3, 15, 11, 6, 1, 5, 13, 15, 0, 0, 0}, {13, 11, 2, 11, 7, 0, 5, 9, 7, 7, 0, 0}, {3, 5, 14, 5, 9, 0, 11, 7, 9, 9, 0, 0}, {4, 8, 12, 14, 6, 7, 1, 12, 1, 15, 0, 0}, {4, 7, 11, 15, 6, 7, 1, 12, 0, 14, 0, 0}, {1, 14, 0, 9, 15, 9, 14, 14, 5, 4, 0, 0}, {0, 11, 14, 7, 14, 8, 12, 13, 4, 3, 0, 0}, {9, 9, 13, 13, 14, 11, 7, 0, 6, 11, 0, 0}, {7, 7, 3, 3, 2, 5, 9, 0, 10, 5, 0, 0}, {3, 8, 5, 15, 9, 5, 7, 3, 7, 12, 0, 0}, {13, 8, 11, 1, 7, 11, 9, 13, 9, 4, 0, 0}, {0, 0, 11, 10, 8, 10, 13, 3, 12, 6, 0, 0}, {0, 0, 5, 6, 8, 6, 3, 13, 4, 10, 0, 0}, {5, 4, 7, 9, 13, 2, 10, 4, 1, 0, 0, 0}, {5, 12, 14, 1, 8, 9, 2, 13, 0, 14, 0, 0}, {7, 10, 3, 10, 0, 8, 6, 15, 15, 0, 0, 0}, {11, 3, 4, 11, 1, 4, 14, 10, 13, 12, 0, 0}, {7, 4, 7, 14, 7, 11, 6, 4, 9, 9, 0, 0}, {15, 14, 15, 1, 3, 8, 0, 8, 5, 2, 0, 0}, {0, 9, 12, 3, 11, 14, 9, 6, 10, 10, 0, 0}, {12, 1, 13, 6, 15, 10, 11, 6, 9, 13, 0, 0}, {2, 13, 3, 9, 0, 5, 4, 9, 6, 3, 0, 0}, {13, 12, 10, 6, 2, 14, 4, 11, 14, 15, 0, 0}, {13, 9, 12, 6, 12, 7, 12, 13, 5, 4, 0, 0}, {2, 7, 15, 7, 13, 6, 5, 14, 14, 0, 0, 0}, {3, 10, 7, 4, 0, 12, 1, 10, 12, 14, 0, 0}, {10, 9, 4, 15, 10, 5, 10, 0, 1, 1, 0, 0}, {3, 14, 2, 7, 15, 1, 11, 8, 12, 10, 0, 0}, {14, 15, 11, 10, 7, 9, 13, 2, 13, 6, 0, 0}, {10, 7, 8, 10, 11, 14, 6, 12, 8, 5, 0, 0}, {10, 0, 6, 14, 6, 10, 6, 4, 9, 9, 0, 0}, {5, 15, 4, 13, 5, 9, 5, 3, 8, 8, 0, 0}, {5, 4, 4, 6, 8, 11, 2, 10, 5, 3, 0, 0}, {15, 15, 5, 6, 8, 6, 3, 12, 4, 9, 0, 0}, {1, 1, 11, 10, 8, 10, 13, 4, 12, 7, 0, 0}, {13, 11, 5, 6, 0, 0, 8, 14, 12, 15, 0, 0}, {7, 13, 8, 0, 7, 7, 12, 8, 8, 2, 0, 0}, {10, 12, 2, 4, 10, 10, 4, 14, 2, 15, 0, 0}, {5, 5, 9, 9, 11, 9, 5, 15, 5, 10, 0, 0}, {11, 11, 7, 7, 5, 7, 11, 1, 11, 6, 0, 0}, {5, 15, 3, 12, 5, 9, 5, 3, 8, 8, 0, 0}, {13, 4, 13, 5, 13, 5, 5, 14, 14, 0, 0, 0}, {14, 2, 9, 0, 8, 12, 8, 5, 10, 10, 0, 0}, {6, 5, 10, 12, 15, 4, 13, 5, 3, 1, 0, 0}, {15, 13, 15, 2, 4, 8, 1, 8, 5, 2, 0, 0}, {11, 14, 4, 9, 0, 3, 13, 9, 14, 13, 0, 0}, {15, 14, 15, 0, 3, 8, 15, 8, 4, 1, 0, 0}, {4, 4, 7, 10, 14, 2, 11, 4, 1, 0, 0, 0}, {8, 3, 5, 13, 3, 13, 0, 0, 7, 5, 0, 0}, {0, 4, 13, 5, 12, 5, 4, 13, 14, 0, 0, 0}, {13, 4, 10, 5, 12, 3, 0, 15, 4, 5, 0, 0}, {3, 12, 6, 11, 4, 13, 0, 1, 12, 11, 0, 0}, {5, 5, 14, 10, 3, 12, 1, 5, 5, 3, 0, 0}, {11, 11, 2, 6, 13, 4, 15, 11, 11, 13, 0, 0}, {8, 7, 7, 9, 10, 13, 4, 11, 6, 3, 0, 0}, {3, 2, 5, 8, 12, 1, 9, 3, 0, 0, 0, 0}, {10, 6, 8, 0, 5, 15, 2, 1, 8, 6, 0, 0}, {2, 14, 0, 6, 11, 14, 11, 15, 10, 5, 0, 0}, {14, 2, 0, 10, 5, 2, 5, 1, 6, 11, 0, 0}, {11, 7, 11, 4, 11, 6, 11, 12, 4, 3, 0, 0}, {11, 1, 7, 1, 6, 13, 12, 3, 0, 15, 0, 0}, {15, 13, 2, 1, 2, 15, 9, 2, 6, 11, 0, 0}, {9, 11, 0, 2, 9, 10, 4, 14, 2, 0, 0, 0}, {13, 5, 9, 0, 9, 12, 8, 5, 10, 10, 0, 0}, {9, 8, 10, 13, 1, 4, 13, 6, 2, 2, 0, 0}, {2, 3, 7, 8, 10, 8, 4, 14, 4, 10, 0, 0}, {14, 13, 9, 8, 6, 8, 12, 2, 12, 6, 0, 0}, {0, 1, 5, 7, 13, 13, 6, 0, 3, 0, 0, 0}, {0, 5, 3, 8, 0, 5, 8, 5, 0, 13, 0, 0}, {1, 12, 15, 5, 13, 0, 10, 7, 11, 10, 0, 0}, {6, 3, 6, 14, 7, 11, 6, 4, 9, 9, 0, 0}, {13, 12, 0, 0, 1, 14, 8, 1, 5, 10, 0, 0}, {1, 9, 13, 4, 12, 15, 10, 7, 11, 10, 0, 0}, {15, 4, 13, 5, 12, 5, 4, 13, 14, 0, 0, 0}, {9, 12, 7, 0, 8, 1, 1, 11, 12, 14, 0, 0}, {11, 6, 8, 0, 5, 15, 2, 1, 8, 6, 0, 0}, {1, 14, 1, 10, 3, 8, 3, 2, 7, 7, 0, 0}, {13, 3, 12, 4, 12, 4, 4, 13, 14, 15, 0, 0}, {6, 12, 11, 1, 10, 0, 4, 2, 14, 12, 0, 0}, {13, 12, 15, 2, 4, 8, 1, 8, 5, 3, 0, 0}, {2, 5, 11, 14, 5, 7, 1, 12, 0, 14, 0, 0}, {1, 13, 15, 8, 14, 8, 13, 13, 4, 3, 0, 0}, {12, 3, 8, 0, 8, 12, 8, 5, 10, 10, 0, 0}, {1, 13, 9, 6, 14, 9, 12, 6, 8, 11, 0, 0}, {9, 5, 7, 15, 4, 14, 1, 1, 8, 5, 0, 0}, {13, 14, 9, 9, 7, 8, 12, 2, 12, 7, 0, 0}, {15, 12, 15, 1, 4, 8, 1, 8, 5, 3, 0, 0}, and {2, 14, 2, 10, 0, 10, 14, 14, 6, 4, 0, 0}, wherein the third sequence set comprises a set 3A and a sequence set 3B, wherein when the M is 4, the sequence set 3A comprises:

{3, −3, 1, 1, −1, −3, −3, −3, 1, 3, 3, −3, 3, −1, −3, 3, −1}, {3, 1, −3, −3, −1, 1, 1, 3, 1, −3, 3, 3, 1, 3, −1, 1, 3, −1}, {−1, −1, 3, −1, −1, 3, −1, −1, 3, 3, 3, 3, −1, 3, −1, 3, −1, 3}, {−1, 1, −3, 1, −1, −3, −3, 3, 3, −1, 3, 3, −3, −3, −1, 1, −3, 1}, {−1, −3, 1, −3, −1, 1, 1, 3, 3, −1, 3, 3, 1, 1, −1, −3, 1, −3}, {−3, 1, −3, −1, −1, 1, −3, −1, 3, 3, 3, 3, −1, −3, 3, 1, −3, 3}, {1, −3, 1, −1, −1, −3, 1, −1, 3, 3, 3, 3, −1, 1, 3, −3, 1, 3}, {1, −3, −3, 1, 1, 3, −1, −1, 3, 1, 3, 3, 3, 1, −3, −1, 3, 1}, {−3, 1, 1, −3, −3, 3, −1, −1, 3, −3, 3, 3, 3, −3, 1, −1, 3, −3}, {−3, 1, 3, −3, 1, 3, −1, 3, 1, 1, 3, 3, −3, 1, −1, −3, −3, 3}, {1, −3, 3, 1, −3, 3, −1, 3, −3, −3, 3, 3, 1, −3, −1, 1, 1, 3}, {1, −1, −3, 3, −1, 1, 3, −1, 3, 1, 3, 3, 3, 1, −1, −1, 1, 3}, {−3, −1, 1, 3, −1, −3, 3, −1, 3, −3, 3, 3, 3, −3, −1, −1, −3, 3}, {−1, −3, 3, 1, 3, 3, −3, 1, −1, 3, 3, 1, −1, 1, −3, −3}, {−1, 1, 3, 3, −3, 3, 3, 1, −3, −1, 3, 3, −3, −1, −3, 1, 1}, {1, 3, 3, 3, 1, 3, 3, −3, 1, −1, 3, 3, 1, −3, −1, −1, −3, −3}, {−3, 3, 3, −3, 3, 1, −3, −1, 3, −3, 3, −3, −1, 1, 1, 1}, {3, −1, 1, −3, −1, −1, −1, −3, −1, 3, 3, 1, −3, −1, −3, 3, 1}, {3, −1, −3, 1, −1, −1, −1, 1, −1, 1, 3, 3, −3, 1, −1, 1, 3, −3}, {−1, −3, 3, −1, −1, 3, 3, −1, 3, 3, 3, 3, −1, −3, −1, 3, 3, 3}, {−1, 1, 3, −1, −1, 3, 3, −1, 3, 3, 3, 3, −1, 1, −1, 3, 3, 3}, {−1, −1, 3, 3, −1, −1, 3, −1, −1, 3, 3, 3, 3, −1, 3, −1, 3, −1}, {−1, 3, −3, −1, −3, 1, −1, 3, −1, 1, 3, 3, 3, 1, 1, −1, 1, 3}, {−1, 3, 1, −1, 1, −3, −1, 3, −1, −3, 3, 3, 3, −3, −3, −1, −3, 3}, {1, −3, −1, 1, 3, −1, −1, −3, 3, 1, 3, 3, −3, 1, −3, 1, −3}, {−3, 1, −1, −3, 3, −1, −1, 1, 3, −3, 3, 3, 3, 1, −3, 1, −3, 1}, {3, −3, −1, 1, 3, 3, −3, 3, −1, −3, 3, 3, 1, 3, −1, 1, −3, −1}, {3, 1, −1, −3, 3, 3, 1, 3, −1, 1, 3, 3, −3, 3, −1, −3, 1, −1}, {3, −1, 3, 1, −3, 1, −3, −3, −3, −1, 3, 3, 1, −3, −3, 3, 3, −3}, {3, −1, 3, −3, 1, −3, 1, 1, 1, −1, 3, 3, −3, 1, 1, 3, 3, 1}, {−3, 1, −1, 1, −1, −3, −3, 3, −1, 3, 3, 3, −3, −1, 3, −3, −1, 1}, {1, −3, −1, −3, −1, 1, 1, 3, −1, 3, 3, 3, 1, −1, 3, 1, −3}, {3, 1, −3, −3, 3, 1, 1, −3, 3, −3, 3, 3, −3, 1, 3, −1, −1, 1}, {3, −3, 1, 1, 3, −3, −3, 1, 3, 1, 3, 3, 1, −3, 3, −1, −1, −3}, {3, −1, 1, 3, 1, −1, 1, 1, 1, −1, 3, 3, −3, 1, −1, −1, 3, −3}, {3, −1, −3, 3, −3, −1, −3, −3, −3, −1, 3, 3, 1, −3, −1, −1, 3, 1}, {3, 1, 3, −1, 3, −3, 3, −1, −3, 3, 3, 3, −3, −1, 1, −3, −1, 1}, {3, −3, 3, −1, 3, 1, 3, −1, 1, 3, 3, 3, 1, −1, −3, 1, −1, −3}, {−1, −1, −1, 3, 3, −1, 3, −1, −1, 3, 3, 3, −3, 3, 3, −1, −1}, {−1, −1, −1, 3, 3, −1, 3, −1, −1, 3, 3, 1, 3, 3, 3, −1, −1}, {−1, 1, 3, −3, −1, 1, −3, −3, 3, −1, 3, 3, 3, −3, −3, −1, −3}, {−1, −3, 3, 1, −1, −3, 1, −1, 3, −1, 3, 3, 1, 1, −1, −1, −3}, {−3, −1, 3, −3, 1, −1, −3, −3, −1, 3, 3, −3, −3, −1, −3, −1, 1}, {1, −3, −1, 1, 3, 3, −3, −3, 1, 3, 3, 1, −1, −3, 3, −3, 1}, {−3, 1, −1, −3, 3, 3, 1, 3, 1, −3, 3, 3, −3, −1, 1, 3, 1, −3}, {3, −1, 1, −3, −1, 3, −3, 3, 1, −3, 3, 3, 3, −3, −1, −1, 1, −3}, {3, −1, −3, 1, −1, 3, 1, 3, −3, 3, 3, 1, −1, −1, −3, 1}, {1, −3, −3, 1, −1, −3, 1, 3, 3, 3, 3, −1, −1, 3, −3, −3, 3}, {−3, 1, 1, −3, 1, −3, 1, −3, 3, 3, 3, 3, −1, −1, 3, 1, 1, 3}, {−1, −1, −1, 3, −1, 3, 3, −1, 3, 3, −1, −1, −1, −1, 3, 3}, {−1, −1, −1, 3, 3, −1, 3, 1, 3, −1, 3, 3, −1, −1, −1, −1, 3, 3}, {1, 3, −1, 1, 3, −1, −3, −3, 1, 1, 3, 3, 1, 3, 1, −3, 1, 3}, {−3, 3, −1, −3, 3, −1, 1, 1, −3, −3, 3, 3, −3, −3, 1, −3, 3}, {1, −3, 1, −1, −1, −1, −1, 1, −1, −1, 3, 3, −1, 1, 1, −3, −3}, {−3, 1, −3, −1, −1, −1, −1, −3, −1, −1, 3, 3, 1, −3, −1, −3, 1, 1}, {−3, 1, −3, 3, −1, −1, 3, −1, −3, 3, 3, −3, −1, −3, −1, 1, 1}, {1, −3, 1, 3, −1, −1, 3, −1, 1, 1, 3, 3, 1, −1, 1, −1, −3, −3}, {3, 1, −1, 1, −3, −1, 3, −1, −3, 3, 3, −3, −3, −1, −3, 3, 3}, {3, −3, −1, −3, 1, −1, 3, −1, 1, 3, 3, 3, 1, −1, 1, 1, 3}, {−3, 1, −1, 3, −1, 1, 1, −1, −1, −1, −3, 3, 1, 3}, {1, −3, 1, 3, −1, −1, 3, 3, −1, 3, 1, −1, −1, −1, −1, −1, 3}, {1, 1, 3, −1, −1, 3, 3, −1, −3, 1, 1}, {−3, −3, −1, −3, 1, −1, −3, −1, −1, 3, 3, 3, −1, −3, 1, 1, −1}, {−3, −1, 3, 1, −1, 3, −1, 3, 3, 3, 3, −1, 1, −1, 3, −1, 3}, {1, −1, 3, −3, −1, 3, 3, 3, 3, −1, −3, 1, 3, −1, 3, 3, −3, −3, −1, −1, 1, −3, 3, 1, 3, 3, 3, 1, 3}, {−1, −3, 3, 1, 3, −1, −1, 1, 3, 3, −3, 3, 3, 3, −3, 3}, {3, −1, 3, −1, −3, 1, −3, 3, 1, 1, 3, 3, −1, 1, −3, 1, 3}, {3, −1, 3, −1, 1, −3, 1, −3, −3, 3, 3, 3, −1, −3, 1, −3, 3}, {1, 3, −1, −1, 3, −1, −3, 3, 1, 3, 3, −3, 1, −3, 3, −3}, {−3, 3, −1, −1, 3, 1, −1, 1, 3, −3, 3, 3, 1, −3, 1, 3, 1}, {1, 3, −3, 3, 3, 1, 3, 1, 1, −1, 3, 3, −1, −3, −1, 1}, {−3, 3, 1, 3, 3, −3, −3, −3, −1, 3, 3, 1, −3, 1, 1, −1, −3}, {−1, 3, 3, −1, 3, 3, −1, −1, 3, 3, 3, −1, 3, −1, −1, −1}, {−3, 3, −3, 1, −3, −1, 3, 3, 1, 1, 3, 3, −1, 3, −1, −3, −3}, {1, 3, 1, −3, 1, −1, 3, −3, −3, 3, 3, −1, 1, −3, 1, 3, 1}, {−3, −1, 3, 3, 1, −3, −1, −3, 3, 1, 3, 3, −1, 1, 3, 3, −3, −1}, {1, −1, 3, −3, 1, −1, 1, 3, −3, 3, 3, −1, 3, 3, 1, −1, −3}, {3, 1, −1, 1, −1, −3, 3, 1, −1, 3, 3, 3, −3, −3, −3, 1, 3, 3}, {3, −3, −1, −3, −1, 1, 3, −3, 3, −1, 3, 3, 1, 1, 1, −3, 3, 3}, {−1, 3, 1, −1, −1, 3, −1,

−3, −3, 1, 3, 3, −3, 3, −3, −3, −1, −3}, {−1, 3, −3, −1, −1, 3, −1, 1, 1, −3, 3, 3, 1, 3, 1, 1, −1, 1}, {−1, 1, 3, −1, −1, 3, −1, −1, 3, 3, 3, 3, −1, 3, −1, 3, −1, 1}, {−1, −3, 3, −1, −1, 3, −1, −1, 3, 3, 3, 3, −1, 3, −1, 3, −1, −3}, {−1, −3, −1, −3, −1, 1, 1, 3, 3, −1, 3, 3, 1, 1, −1, −3, 1, −3}, and {−1, 1, −1, 1, −1, −3, −3, 3, 3, −1, 3, 3,−3,−3,−1, 1,−3, 1}, and wherein when the M is 4, the sequence set 3B comprises:
{−3, −3, −3, 1, 1, −3, −3, 1, 1, −3, −3, −3, −3, −3, 1, −3, 1, −3, −3, 1, −3, 1, 1, 1}, {−3, 1, 1, 1, 1, −3, 1, −3, 1, −3, −3, −3, −3, 1, 1, −3, −3, 1, −3, −3, 1, 1, 1, 1}, {1, 1, −3, 1, −3, −3, 1, −3, 1, 1, −3, 1, 1, 1, −3, 1, 1, 1, −3, −3, −3, −3, 1, 1}, {1, −3, −3, −3, 1, 1, −3, −3, 1, 1, −3, −3, −3, −3, −3, 1, −3, 1, −3, −3, 1, −3, 1, 1}, {3, 3, −3, −3, 1, 3, 3, −3, −3, 3, −1, 3, −1, 3, 3, 1, 1, −3, −1, −1, −3, −3, 1, 1}, {−1, −1, −3, −3, 1, −1, −1, −3, −3, −1, 3, −1, 3, −1, −1, 1, 1, −3, 3, 3, −3, −3, 1, 1}, {3, 3, −1, −3, 1, 3, 1, 1, −1, 3, 3, −3, −3, 3, −3, 1, 3, 3, −1, −3, 1, 3, 1, 1}, {−1, −1, 3, −3, 1, −1, 1, 1, 3, −1, −1, −3, −3, −1, −3, 1, −1, −1, 3, −3, 1, −1, 1, 1}, {−1, 1, −1, 1, −3, −3, 1, 1, 3, 1, 3, 1, 1, −3, −3, 1, −1, 1, −1, 1, −3, −3, 1, 1}, {3, 1, 3, 1, −3, −3, 1, 1, −1, 1, −1, 1, 1, −3, −3, 1, 3, 1, 3, 1, −3, −3, 1, 1}, {1, 3, 3, −1, 1, −1, 1, 1, 3, −1, 3, 1, −1, −3, −3, 1, 3, 3, −1, 1, −1, 1, 1}, {1, −1, −1, 3, 1, 3, 1, 1, 1, −1, 3, −1, 1, −1, −1, 1, −1, 3, 1, 3, 1, 1}, {1, 1, −1, −1, 3, 3, 1, 1, −3, −1, 3, −1, 3, 3, −1, −1, 1, 1, −1, −1, 1, 1}, {1, 1, 3, 3, −1, −1, 1, 1, −3, 3, −1, 3, −1, 1, −1, 3, 3, 1, 1, 3, 3, 1, 1}, {−3, −3, 3, −3, −1, −3, 1, 1, −3, −1, −3, 3, −3, −1, 3, −1, 3, 1, −3}, {−3, −3, −1, −3, 3, −3, 1, 1, −3, 3, −3, −1, −3, −3, 1, −3, −3, −1, −3, 3, −3, 1, 1}, {3, 1, −3, −1, 3, −1, 1, 1, 3, −3, −3, 3, 3, 3, 1, −3, 3, 1, −3, −1, 3, −1, 1, 1}, {−1, 1, 1, −3, 3, −1, 3, 1, 1, −1, −3, −3, −1, −1, −1, 1, −3, −1, 1, −3, 3, −1, 3, 1, 1}, {3, −3, −3, −1, −3, 1, −3, −1, 3, 3, −3, −1, −1, −3, −3, 3, 1, −3, 3, 1, 1, 1}, {−1, −3, −3, 3, −3, 1, −3, 3, −1, 3, −1, −1, −3, 3, 3, −3, −3, −1, 1, −3, −1, 1, 1, 1}, {3, −3, −1, 1, 3, −1, 1, 3, −3, 1, 1, 1, 1, −3, 1, −3, 3, 3, −1, −3, 1, 1, 1, 1}, {−1, −3, 3, 1, −1, 3, 1, −1, −3, 1, 1, 1, 1, −3, 1, −3, −1, −1, 3, −3, 1, 1, 1, 1}, {−1, −1, −3, −3, 3, 3, 3, 3, 1, 3, −3, −3, 3, −1, 1, −3, 3, −1, 3, 3, −1, −3, 1, 1}, {3, 3, −3, −3, −1, −1, −1, −1, −1, −3, −3, −1, 3, 1, −3, −1, 3, −1, −1, 3, −3, 1, 1}, {1, 3, 3, −1, 3, −3, −1, −3, −1, 3, −1, −3, 1, 1, 3, 3, 1, 1, −1, −1, 3, 3, 1, 1}, {1, −1, −1, 3, −1, −3, −3, −3, −3, 1, 1, −1, −1, 1, 1, 3, 3, −1, −1, 1, 1}, {−1, 3, −3, −1, −3, 3, −3, −3, −3, −3, 1, −3, −3, −3, 1, −1, 3, −3, 3, 3, −1, 1, 1}, {3, −1, −3, −1, −3, −1, −3, −3, 1, −3, −1, −3, −3, 1, −3, −1, 3, 3, −1, −3, −1, −1, −1, 3, 1, 1}, {−1, 3, 3, −3, −1, −3, 1, 1, −1, −1, −1, −3, −1, 1, −3, 1, −3, 3, −3, −1, −3, 1, 1}, {3, −1, −1, −3, 3, −3, 1, 1, 3, 3, −3, 3, 1, −3, 1, 3, −1, −1, −3, 3, −3, 1, 1}, {−3, 1, −1, 3, 1, 1, 1, 1, −3, 1, 3, −1, 1, 1, −3, −3, −3, 1, −1, 3, 1, 1, 1, 1}, {−3, 1, 3, −1, 1, 1, 1, 1, −3, 1, −1, 3, 1, 1, −3, −3, −3, 1, 3, −1, 1, 1, 1, 1}, {1, −3, −1, 3, −3, 3, −3, 1, 3, −1, 1, 1, 3, 1, −3, 3, 1, 1, −3, −3, −3, 3, 1, 1}, {1, −3, 3, −1, −3, −1, −3, 1, −1, 3, 1, 1, −1, 1, −3, −1, 1, 1, −3, −3, −3, −1, 1, 1}, {−3, 1, −3, −3, −3, 1, 1, −3, 1, −3, 1, 3, −1, −3, −3, −3, −3, 1, −1, −3, −3, −1, 1, 1}, {−3, 1, 3, −1, −3, −3, 1, 1, −3, 1, −1, −3, −3, −3, −3, −3, −3, 1, 3, −1, −3, −3, 1, 1}, {1, 3, −3, 1, −3, −1, 3, −3, 1, 1, 3, 3, 1, −3, 3, −1, 1, −1, −3, −3, −3, 1, 1, 1}, {1, −1, −3, 1, −3, 3, 1, −1, −3, 1, 1, −1, −1, 1, −3, 1, 3, −3, −3, −3, 1, 1, 1}, {−1, 1, −1, −1, 3, −1, 3, −3, −3, −1, −3, 1, 1, −3, 1, 1, 1, −1, −1, 3, −3, 1, 1, 1}, {3, 1, 3, 3, −1, −3, −3, 3, −3, 1, 1, 1, 3, 3, −1, −1, 3, 1, 1}, {1, −1, −3, −1, 3, −1, 3, 1, −1, 1, −3, 1, 1, −1, 1, 1, 3, −3, −1, −3, −3, −3, 1, 1}, {1, 3, −3, 3, −1, 3, −1, 1, 3, 1, −3, 1, 1, 3, 1, 1, −1, −3, 3, −3, −3, −3, 1, 1}, (−3, −1, −1, 3, −3, 1, 1, 3, −3, 1, 1, 1, 3, 3, 1, −3, 1, −1, −3, −3, 3, 3, 1, 1}, {−3, 3, 3, −1, −3, 1, 1, −1, −3, 1, 1, 1, −1, −1, −1, 3, 1, 3, −3, −3, −1, −1, 1, 1}, {3, −1, −3, −3, 3, 1, −1, 3, −3, −3, −3, −3, 3, 3, 1, −3, −1, 3, 1, 1}, {−1, 3, −3, −3, 1, 1, 3, −1, −3, 1, −3, −3, −3, −1, −3, −1, 1, −3, −3, 3, −3, 1, 1, 1}, {−3, −1, 3, 3, 1, 1, −1, 3, −3, 1, −3, −3, −3, 3, −3, −3, 1, −1, 3, 3, −3, −3, −3, 1}, {−3, 3, −1, −1, 1, 1, 3, −1, 3, 1, −3, −3, −1, −3, −3, 1, 3, −1, −1, −3, −3, 1, 1}, {1, −3, 1, 1, −3, 1, 1, 3, 1, −1, −1, −3, −3, −3, 1, −1, 3, 1, 1, −3, 1, 1, 1, 1}, {1, −3, 1, 1, −3, 1, 1, −1, 1, 3, 1, −3, −3, −3, 1, 3, 1, −1, 1, 1, −3, 1, 1, 1, 1}, {1, −3, −3, −3, 1, 1, −3, −3, −3, 1, −3, −3, −3, −3, 1, −3, 1, 1, −3, −3, 1, −3, 1, −3, 1, 1}, {−1, −1, −1, −3, −1, −3, 3, −3, 3, 3, 3, −1, −3, 1, 3, −3, 3, −3, −1, −1, −3, −3, 1, 1}, {3, 3, 3, −3, 3, −3, −1, −3, −1, −1, −1, 3, −3, 1, −1, −3, −1, −3, 3, 3, −3, −3, 3, 1, 1}, {−3, −3, −3, 1, −3, 1, 1, −3, 1, −3, 1, 1, 1, 1, −3, −3, 1, 1, −3, −3, 1, 1, 1}, {−1, −3, −3, 3, −1, −1, 1, 1, −1, 1, −3, −1, −1, 3, 1, −3, −1, −3, 3, −1, −1, 1, 1}, {3, −3, −3, −1, 3, 3, 1, 1, 3, 1, −3, 3, 3, −1, 1, −3, 3, −3, −3, −1, 3, 3, 1, 1}, {−1, 3, −3, 3, 3, 1, 1, 1, 1, −1, 3, 1, −1, 1, 1, 3, −3, 1, 3, −1, −3, −3, 1, 1}, {3, −1, −3, −1, −1, 1, 1, 1, 1, 3, −3, 1, 3, 1, 1, −1, 3, −1, −3, −1, −3, 3, −3, −3, 1, 1}, {1, 1, −3, 1, −3, −3, −3, 3, 1, −1, −1, −3, 3, 1, 1, 1, 1, −3, −3, 1, 1, 1, 1}, {−1, 3, 3, −3, 3, 3, −3, −1, 3, −1, −1, 3, −1, −3, −1, 3, 3, 3, −1, −1, −1, 3, 1, 1}, {3, −1, −1, −3, −1, −1, −3, 3, −1, 3, −3, 3, 3, −1, −1, −1, 3, 3, −1, 1, 1}, {3, −1, 1, −3, −1, −1, 1, −3, −1, 1, −3, 1, −1, 1, −3, −3, −3, 1, 1, 1, 1, 1}, {−1, 3, 1, −3, 3, 3, 1, −3, 3, 1, 3, 1, −3, −3, −3, −3, 1, 1, 1, 1, 1}, {1, −1, 1, −3, −3, 1, −3, 1, −3, −3, 1, 1, −3, −3, −3, −3, −3, −3, 1, 1}, {1, 3, 1, −3, −3, 1, −3, 1, −3, −3, 1, 1, −3, −3, −3, −3, −3, −3, 3, 3, 1, 1}, {−1, −1, 1, 1, 1, −3, 3, 3, −1, −1, −1, 1, −3, −1, 1, −3, 1, 3, 3, 1, 1}, {3, 3, 1, 1, 1, −3, −1, −1, 3, 3, 3, 1, −3, 3, 1, −3, −1, 1, −1, 1, 1}, {1, −3, 1, 3, −1, −1, 3, 3, 3, −1, 1, 1, −3, 3, 3, −3, 3, −3, −1, 1, −3, 1, 1}, {1, −3, 1, −1, 3, 3, −1, −1, −1, 3, 1, 1, −3, −1, −1, −3, −1, −3, 1, −3, 1, 1}, {3, −1, −1, −1, 1, −1, −1, −3, −1, 3, 3, 1, −3, −3, −1, −3, −1, 3, −3, −3, 1, 1}, {−1, 3, 3, 3, 1, 3, 3, −3, 3, −1, −1, 1, −3, −3, 3, −1, 3, −3, 1, −1, −3, −3, 1, 1}, {1, 3, −3, −3, 3, −3, −3, −3, 1, 3, 3, −3, 1, −1, −1, 3, 3, 1, 1}, {1, −1, −3, −1, 3, −3, −3, −1, −3, 3, −3, −1, 1, 1, 1, 1, 1, 1, 1, 1}, {−3, 1, −3, −3, −1, −3, −1, 3, 3, 3, −3, 1, −1, 3, −3, −1, 3, 1, −1, −3, 1, 1}, {3, 1, 3, −1, 3, −3, −1, −1, −1, 1, 3, −3, 1, 3, 1, −1, 3, 3, 1, 1, 3, 1, 1}, {−1, 1, −1, 3, −1, −3, 3, 3, 3, 1, −1, −3, −1, 1, −1, 1, 3, −1, −1, 1, 1, −1, 1, 1}, {1, 1, −1, −1, 3, −1, 1, 3, −3, 3, 1, 1, 3, 1, −3, −1, −3, 1, −1, 1, 1, 1, 1}, {1, 1, 3, 3, −1, 3, 1, −3, −1, −3, −1, 1, −1, 1, −3, 3, −3, 1, 3, 3, 1, 1}, {1, −3, 1, −3, 1, 1, −3, 1, 1, −3, 1, 1, 1, −3, −3, −3, 1, 1, −3, 1, 1}, {−1, 3, 1, −1, 1, 3, 1, −1, 3, 1, −3, −1, 3, 3, 3, −1, −3, −1, 1, 3, 1, 1}, {3, −1, 1, 3, 1, −1, 1, 1, 3, −1, 1, −3, 3, −1, −1, −1, −1, 3, −3, 3, 1, −1, 1, 1}, {−3, −1, −3, 1, −3, 3, −1, 3, −1, 1, 1, 1, 3, 3, 1, −1, −3, 1, −3, 3, 1, 1}, {−3, 3, −3, 1, −3, −1, 3, 1, −1, 3, 1, 1, 1, −1, −1, 1, 3, 3, −3, 1, −3, 1, 1}, {1, −3, −3, 1, −1, 1, 1, −3, 1, −3, 1, 3, 3, 1, 1, 1, −3, 3, −1, −1, 1, 1}, {1, −3, −3, 1, 3, 3, 1, 1, −3, 1, −3, 1, −1, −1, 1, 1, 1, −3, −3, 1, 3, 3, 1, 1}, {3, −1, −1, −3, −3, −3, 1, 3, −1, 1, 3, −1, −3, −1, −1, −1, 3, 1, −1, −1, −1, 1, 1}, {−1, 3, 3, −3, −3, −3, 1, 1, −1, 3, 1, −1, 3, −3, 3, 3, 3, −1, 1, 3, 3, 3, 1, 1}, {−1, 1, −3, 1, −1, −3, 1, −3, −3, 1, −1, −1, −3, −3, −1, −1, 1, −3, 1, 3, 3, −3, 1, 1}, {3, 1, −3, 1, 3, −3, 1, −3, −3, 1, 3, 3, −3, −3, 3, 3, 1, −3, 1, −1, −1, −3, 1, 1}, (3, 3, 1, −3, −1, −3, 1, −1, 1, −1, 3, −3, −3, 1, 1, −3, 1, 1, −1, 1, 1, 1, 1, 1}, {−1, −1, 1, −3, 3, −3, 1, 3, 1, 3, −3, −3, 1, 1, −3, 1, 1, 3, 1, 1, 1, 1, 1}, {−1, 1, 3, 1, 3, −3, −1, 3, −1, −1, 1, 1, 3, −1, −3, 1, −1, −1, −3, −3, −3, 3, 1, 1}, {3, 1, −1, 1, −1, −3, −1, 3, 3, 3, 1, −1, 3, −3, 1, 3, 3, −3, −3, −3, −1, 1, 1}, {1, −1, −3, −3, 1, −1, 3, 3, 1, −1, −3, −1, −3, 1, 3, −3, 1, 3, 3, 3, 3, −3, 1, 1}, {1, 3, −3, −3, 1, 3, −1, −1, 1, 3, −3, 3, −3, 1, −1, −3, 1, −1, −1, −1, −1, −3, 1, 1}, {3, −1, −3, −3, −3, 3, −3, 3, 3, 3, 1, −3, 1, −3, −3, 3, −1, −1, 1, 3, −3, −1, 1, 1}, {−1, 3, −3, −3, −3, −1, −3, −1, −1, −1, 1, −3, 1, −3, −3, −1, 3, 3, 1, −1, −3, 3, 1, 1}, {3, −3, −3, 1, −3, 1, 1, −3, 1, −1, 3, −3, −3, −3, 3, −1, −1, −3, 3, 3, −3, −1, 1, 1}, {−1, −3, −3, 1, −3, 1, 1, −3, 1, 3, −1, −3, −3, −3, −1, 3, 3, −3, −1, −1, −3, 3, 1, 1}, {1, 3, 3, 1, −3, 3, 1, 3, 3, 3, −3, −3, 1, 3, 1, −1, −1, 3, −3, 1, −3, 3, 1, 1}, {1, −1, −1, 1, −3, −1, 1, −1, −1, −1, −3, −3, 1, −1, 1, 3, 3, −1, −3, 1, −3, −1, 1, 1}, {−3, −3, −1, 3, −3, −1, −1, 3, −3, −1, 3, 1, −1, −3, −1, 3, 1, 3, 3, 3, 1, 1, 1, 1}, {−3, −3, 3, −1, −3, 3, 3, −1, −3, 3, −1, 1, 3, −3, 3, −1, 1, −1, −1, −1, 1, 1, 1, 1}, {3, 3, 3, −1, 1, 3, 3, 3, 3, 1, −3, −1, −3, 1, −3, −3, 1, 3, 3, 1, −3, −3, 1}, {−1, −1, −1, 3, 1, −1, −1, −1, −1, 1, −3, 3, −1, 3, −3, −1, −1, 1, −3, −3, 1, 1}, {−3, −3, −1, 3, −3, −1, 1, 3, 3, 3, 1, 1, −1, −3, 3, 1, 1}, {−3, −3, 3, −1, −3, 3, 1, −3, 3, −1, 3, −3, 1, 1, −1, −1, −1, 1, 1, 3, −3, −1, 1, 1}, {3, 1, 1, 1, −1, 1, 1, −1, −3, 1, 1, 3, −1, 1, −1, 3, 3, −3, −1, −3, −1, 1, 1}, {−1, 1, 1, 3, 1, 1, 3, −3, 1, 1, −1, 3, 1, 3, −1, −1, −1, −3, 3, −3, 3, 1, 1}, {1, 1, 1, −1, −1, 1, −1, −3, −3, 1, −3, 3, −1, 1, −3, −3, 3, −3, −1, −1, 1, 1, 1}, {1, 1, 1, 3, 3, 1, 3, −3, −3, 1, −3, −1, 3, 1, −3, −3, −1, −3, 3, 3, 1, 1, 1}, {1, 3, 1, 1, −1, 1, −1, 1, −1, 3, −1, 1, 3, −3, 3, 1, −1, −3, −3, −3, −3, 1, 1}, {1, 1, −1, 1, 1, 3, 1, 3, 1, 3, −1, 3, 1, −1, −3, −1, 1, 3, −3, −3, −3, −3, 1, 1}, {1, 3, −3, −3, 3, −3, −1, 3, 3, 1, 3, −3, 3, −1, 1, −1, −3, −1, −1, 3, 1, −1, 1, 1}, {1, −1, −3, −3, −1, −3, 3, −1, −1, 1, −3, −1, 3, 1, 3, −3, 3, 3, −1, 1, 3, 1, 1}, {−1, −1, 3, −1, −1, −3, 1, 3, −3, 1, 1, 1, 1, −3, −3, 3, 1, 1}, {3, −1, 3, 3, −3, 1, −1, −3, 3, −1, 1, −3, 1, 1, 1, 1, −3, −3, −1, 1, 1, 1}, {3, −3, −1, 1, −1, 3, 1, 1, 3, 1, 3, 1, −1, −1, −3, 1, 3, −3, −1, 1, −1, 3, 1, 1}, {−1, −3, 3, 3, 1, 1, −1, 1, −1, 1, 1, −1, 3, 3, −1, 1, −1, −3, 3, 1, −1, 1, 1}, {3, −1, 3, −1, −3, 1, −3, −3, −3, 1, 3, 3, 1, 1, 3, 3, 1, 1}, {−1, 3, −1, 3, −3, 1, 3, −3, 1, −3, 3, −1, −3, −3, 3, 3, 3, −3, −1, −1, 1, 1, 1, 1}, {−1, −3, −1, 3, −1, −1, 3, 1, −3, 1, 3, −3, 3, 1, 1, 1, −1, −1, 1, 1}, {3, −3, 3, −1, 3, 3, −1, 1, −1, 3, −1, 1, 3, 1, −1, −3, −1, 1, 1}, {1, −1, −3, 3, 3, −3, 3, −3, 3, 3, 1, −3, −3, −1, 1, 3, −3, 1, 1}, {1, 3, −3, −1, −1, −3, −1, −3, −1, 1, −3, 3, −3, 1, −1, −1, 3, 1, −1, −3, 1, 1}, {1, −3, 1, 3, −3, −1, 1, 1, 1, 1, 1, −1, −3, 3, 1, −3, 1, 3, −3, −1, 1, 1}, {1, −3, 1, −1, −3, 3, 1, 1, 1, 1, 3, −3, −1, 1, −3, 1, −3, 1, 1}, {1, 3, −1, −3, −1, 1, 3, −1, 3, −3, −3, 1, 1, −1, 1, 1, −1, −1, 1, 1, 1, 1}, {1, −1, 3, −3, 3, 1, −1, 3, −1, 3, −1, −3, −3, 3, 1, 1, 1, 3, 3, 1, 1, 1, 1, 1}, {1, 3, −3, −1, −1, 3, 1, 1, −3, 3, −3, 3, 3, 1, 1, 1, 1, 3, 1, 1, 1, 1, 1, 1}, {1, 3, −3, −1, −1, 3, 1, 1, −3, 3, 3, 3, 3, 1, −3, 1, 3, −3, −1, −1, 1, 1, 1, 1, 1, 1}, {1, 3, −3, −1, −1, 3, 1, −3, 3, 3, −1, 1, 1}, (3, −1, −3, 1, −1, −3, 1, 3, −1, 1, 3, 3, −3, 3, −1, −3, −3, 3, 3, 3, −3, 1, 1}, {−1, 3, −3, 1, 3, −3, 1, −1, 3, 1, −1, −1, −3, −1, 3, −3, −3, −1, −1, −1, −1, −3, 1, 1}, {−3, −3, 1, 3, 1, 1, −3, −3, −3, 1, −1, −3, 1, −3, −3, 3, 1, 1, −3, 1, 1, −3, 1, 1}, {−3, −3, 1, −1, 1, 3, 1, −3, −3, 3, 1, 3, 1, −1, 1, 1, −3, 1, 1, −1, 1, 3, 1, 1}, {−1, 1, 3, 3, 1, −3, 3, −3, 3, −1, −1, 1, 3, 1, 1, −1, 1, −1, −1, 3, 3, −3, 1, 1}, (3, 1, −1, −1, 1, −3, −1, −3, −1, 3, 3, 1, −1, 1, 1, 3, 1, 3, 3, −1, −1, −3, 1, 1}, {−3, 1, 1, 3, 3, 1, −3, −3, 1, 3, −1, 3, 3, 3, −3, −1, −3, 3, −3, 3, 1, 1, 1, 1}, {−3, 1, 1, −1, −1, 1, −3, −3, 1, −1, 3, −1, −1, −1, −3, 3, −3, −1, −3, −1, 1, 1, 1, 1}, {1, 3, 3, −1, 1, −1, −3, 3, 1, 3, −1, −3, 1, 3, −3, 3, 3, −3, 3, −3, −1, −1, 1, 1}, {1, −1, −1, 3, 1, 3, −3, −1, 1, −1, 3, −3, 1, −1, −3, −1, −1, −3, −1, −3, 3, 3, 1, 1}, {−3, −3, −3, −3, 1, 1, −1, 1, −3, 1, 3, 1, −3, −1, −1, 1, −3, −3, 1, 1, −3, 1, 1}, {−3, −3, −3, −3, 1, 1, 3, 1, −3, 1, −1, 1, 3, −3, 3, 1, −3, 3, 1, 1, −3, 1, 1}, {−1, 3, 1, 1, −1, 3, 3, 1, 3, 1, 3, −3, −3, −1, 1, −3, 1, −1, −3, −1, −3, −1, 1, 1}, {3, −1, 1, 1, 3, −1, −1, 1, −1, −3, −3, 3, 1, −3, 3, −3, −3, −1, −1, 1, 1}, {3, −3, −1, 3, 3, 3, −1, −1, −3, 1, 3, 1, −3, −1, −1, −3, −1, −1, −3, 1, 1, −3, 1, 1}, {−1, −3, 3, −1, −1, −1, 3, 3, −3, 1, −1, 1, −3, 3, 3, −3, 3, 3, −3, 1, 1, −3, 1, 1}, {−1, 1, 1, −1, −3, −3, 1, 3, 1, 1, 3, −1, 3, −1, −1, 1, 1, −1, −3, −3, 1, 1}, {3, 1, 1, 3, −3, −3, 1, 1, −1, 1, −1, 1, −1, 1, 3, 1, 1, 3, −3, −3, 1, 1}, {3, 1, −3, 3, 1, 1, −3, −3, −1, 1, −3, −3, −3, −1, 3, −1, −3, −3, −1, −1, 1, 1, 1, 1}, {−1, 1, −3, 1, 3, −1, 1, −1, −1, −3, −1, −1, 1, 1, 1}, {1, −3, −3, 1, 3, 3, 1, 3, 1, 1, −3, 1, 1, −3, −3, −3, 1, −1, 1, −1, −3, −1, 1, 1}, {1, −3, −3, 1, −1, −1, 1, −1, 1, 1, −3, 1, 1, −3, −3, −3, 1, 3, 1, 3, −3, 3, 1, 1}, {3, −3, −1, 3, −1, −3, 1, 1, 3, −3, 3, −1, −1, −3, −3, −3, 3, −3, −1, 3, −1, −3, 1, 1}, {−1, −3, 3, −1, 3, −3, 1, 1, −1, −3, −1, 3, 3, −3, −3, −3, −1, −3, 3, −1, 3, −3, 1, 1}, {−3, 1, −3, −1, −1, 3, −1, −1, −1, −3, −1, −1, 1, −3, 3, −1, 3, −1, −1, −3, 3, 1, 1}, {−3, 1, −3, 3, 3, −1, 3, 3, −3, 3, 3, 1, −3, −1, −1, 3, −1, 3, 3, −3, −1, 1, 1}, {−3, 3, −3, −1, 3, 1, 1, −3, 1, −3, −3, −1, 1, −1, −3, −1, −1, −1, −3, 3, 1, 1}, {−3, −1, −3, 3, −1, 3, 1, 1, −3, 1, −3, −3, 3, 1, 3, −3, 3, 3, 3, −3, −1, 1, 1}, {−1, −3, −3, −1, −1, 3, 1, 1, −1, 1, −3, −1, −3, −3, −1, −1, 3, 1, 1}, {3, −3, −3, 3, 3, −1, 1, 1, 3, 1, −3, −1, 3, 3, 1, −3, 3, −3, −3, −3, 3, 3, −1, 1, 1}, {3, −1, −1, −3, −3, −3, 1, −3, −3, −3, −1, −1, −3, −1, −3, 1, 3, 1}, {−1, 3, 3, −3, −3, −3, −1, 3, 1, 1, −3, −3, −3, 3, 3, 1, 1, 1, −1, 1, 3, −3, −3, 1, 1, 1, 1, 1}, {3, −1, −1, 1, 1, 3, 1, 1, −1, 1, −3, −1, −3, 1, 1, 3, 1, 1}, {−1, 3, 3, 1, 1, −1, 1, 1, 3, 3, −1, 1, −3, −1, −3, 1, −1}, {3, 3, 1, 1, −1, 1, 1, 3, 1, 1, −3, 1, −3, −1, −1, 1, −1, 3, 3, 1, 1, −1, 1, 1, 3, 1, 1}, {1, 3, 1, 1, 3, −1, 3, 3, 1, −3, 1, −3, −1, −1, −3, −3, 1, 1, 3, 3, −3, −1, 1, 1}, and {1, −1, 1, 1, −1, 3, −1, −1, 1, −3, 1, −3, 3, 3, −3, −3, 1, 1, −1, −1, −3, 3, 1, 1}; and processing the first signal based on the N elements in the sequence $\{f_n\}$.

18. The signal processing method according to claim 17, wherein the receiving a first signal carried on N subcarriers comprises:

obtaining, on N consecutive subcarriers or on N equally spaced subcarriers, the first signal on the N subcarriers.

19. The signal processing method according to claim 17, wherein the processing the first signal based on the N elements in the sequence $\{f_n\}$ comprises:

processing the first signal based on the N elements in the sequence $\{f_n\}$ when frequency shaping is performed on the first signal, or when π/2–BPSK modulation is performed on a received data channel.

20. The signal processing method according to claim 17, wherein the sequence $\{x_n\}$ comprising the element $x_n$ is determined from a first set of sequences, at least K sequences in the first set of sequences comprise the element $x_n = u \cdot e^{\rho_M \pi \cdot j \cdot s_n / M}$ of the sequence $\{x_n\}$, wherein K is a positive integer greater than or equal to 2, and the sequence $\{s_n\}$ comprising the element $s_n$ corresponding to each of the at least K sequences is selected from a sequence comprising a fourth sequence set and an equivalent sequence of sequences of the fourth sequence set, wherein when the M is 4, the fourth sequence set comprises:
{−1, −1, −1, −1, −1, −1, 3, −1, 3, 3, −1, −1}, {3, 3, −1, 3, −1, 3, 3, −1, −1, −1, −1, −1}, {−1, −1, −1, −1, −3, 3, −1, 3, −3, −1, −1, −1}, {−1, −1, −1, −1, 1, 3, −1, 3, 1, −1, −1, −1}, {−3, 3, −1, −1, −3, −1, −1, 3, −3, 3, −1, −1}, {1, 3, −1, −1, 1, −1, −1, 3, 1, 3, −1, −1}, {−1, 3, −1, 3, −1, 3, 3, −1, −1, −1, −1, −1}, (−3, 3, −1, −3, 1, −1, 1, 3, 1, 1, −1, −1}, {1, 3, −1, 1, −3, −1, −3, 3, −3, −3, −1, −1}, (3, −1, 3, 3, −1, 3, 3, 3, −1, −1, −1, −1}, {−1, 3, 1, −1, −3, 1, 3, −1, −1, −1, −1, −1}, {3, 1, 1, 1, −1, 3, 1, 1, 3, −3, −1, −1}, {3, −3, −3, −3, −1, 3, −3, −3, 3, 1, −1, −1}, {3, 1, 1, −3, 3, 1, 3, 1, 3, −3, −1, −1}, {3, −3, −3, 1, 3, −3, 3, −3, 3, 1, −1, −1}, {−3, 3, −3, −3, −3, −1, 3, −3, 3, 1, −1, −1}, {1, 3, 1, 1, 1, −1, 3, 1, 3, −3, −1, −1}, {−3, −3, 1, 3, −3, 3, −3, 1, −1, −3, −1, −1}, {−3, −3, 1, 1, −1, −1, −3, 1, −3, −3, −1, −1}, {1, 1, −3, −3, −1, −1, 1, −3, 1, 1, −1, −1}, {1, 3, −3, 1, −3, −1, −1, −1, −3, 3, −1, −1}, {−3, 3, 1, −3, 1, −1, −1, −1, 1, 3, −1, −1}, {3, −1, −3, −1, −3, 3, 3, −3, −1, 3, −1, −1}, {3, −1, 1, −1, 1, 3, 3, 1, −1, 3, −1, 1, −1}, {−3, 1, −1, −1, 3, 1, 3, −1, −1, 1, −1, −1}, {1, −3, −1, −1, 3, −3, 3, −1, −1, −3, −1, −1}, {1, −1, 1, −1, 3, −1, 1, 3, 3, 1, −1, −1}, {−3, 1, 3, −1, 3, −3, 3, 1, 3, 3, −1, −1}, {1, −3, 3, −1, 3, 1, 3, −3, 3, 3, −1, −1}, and {3, −1, 3, 3, −1, 3, 3, 3, −1, −1, −1}.

* * * * *